US010437333B2

(12) United States Patent
Bernstein et al.

(10) Patent No.: US 10,437,333 B2
(45) Date of Patent: *Oct. 8, 2019

(54) DEVICE, METHOD, AND GRAPHICAL USER INTERFACE FOR FORGOING GENERATION OF TACTILE OUTPUT FOR A MULTI-CONTACT GESTURE

(71) Applicant: Apple Inc., Cupertino, CA (US)

(72) Inventors: Jeffrey Traer Bernstein, San Francisco, CA (US); Julian Missig, Redwood City, CA (US); Avi E. Cieplinski, San Francisco, CA (US); Wayne C. Westerman, San Francisco, CA (US); Patrick Kessler, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 989 days.

This patent is subject to a terminal disclaimer.

(21) Appl. No.: 14/608,926

(22) Filed: Jan. 29, 2015

(65) Prior Publication Data

US 2015/0149899 A1  May 28, 2015

Related U.S. Application Data

(63) Continuation of application No. PCT/US2013/069479, filed on Nov. 11, 2013.
(Continued)

(51) Int. Cl.
*G06F 3/01* (2006.01)
*G06F 3/0488* (2013.01)
(Continued)

(52) U.S. Cl.
CPC .............. *G06F 3/016* (2013.01); *G06F 1/32* (2013.01); *G06F 3/0414* (2013.01);
(Continued)

(58) Field of Classification Search
CPC ...... G06F 3/016; G06F 3/0414; G06F 3/0488; G06F 3/04883; G06F 1/32;
(Continued)

(56) References Cited

U.S. PATENT DOCUMENTS 4,674,044 A   6/1987 Kalmus et al.
4,750,135 A   6/1988 Boilen
(Continued)

FOREIGN PATENT DOCUMENTS

AU   2016100649 A4   6/2016
CN   1658150          8/2005
(Continued)

OTHER PUBLICATIONS

Yatani et al., "SemFeel: A User Interface with Semantic Tactile Feedback for Mobile Touch-screen Devices", Proceedings of the 22nd annual ACM symposium on User interface software and technology (UIST '09), pp. 111-120, Oct. 2009. (Year: 2009).*
(Continued)

*Primary Examiner* — Jennifer N To
*Assistant Examiner* — Joseph R. Burwell
(74) *Attorney, Agent, or Firm* — Morgan, Lewis & Bockius LLP

(57) ABSTRACT

An electronic device with a display, a touch-sensitive surface, and one or more sensors to detect intensity of contacts with the touch-sensitive surface: detects, on the touch-sensitive surface, a gesture that includes an increase of intensity of a contact above a respective intensity threshold. In response to detecting the gesture: in accordance with a determination that the gesture includes a first number of contacts, the device generates a tactile output on the touch-sensitive surface; and in accordance with a determination that the gesture includes a second number of contacts
(Continued)

different from the first number, the device forgoes generating the tactile output on the touch-sensitive surface.

18 Claims, 58 Drawing Sheets

Related U.S. Application Data

(60) Provisional application No. 61/778,239, filed on Mar. 12, 2013, provisional application No. 61/747,278, filed on Dec. 29, 2012.

(51) Int. Cl.
  *G06F 3/041* (2006.01)
  *G06F 1/32* (2019.01)

(52) U.S. Cl.
  CPC ........ *G06F 3/0488* (2013.01); *G06F 3/04883* (2013.01); *G06F 2203/014* (2013.01); *G06F 2203/04104* (2013.01); *G06F 2203/04105* (2013.01); *G06F 2203/04808* (2013.01)

(58) Field of Classification Search
  CPC ..... G06F 2203/014; G06F 2203/04104; G06F 2203/04105; G06F 2203/04808
  See application file for complete search history.

(56) References Cited

U.S. PATENT DOCUMENTS

| | | |
|---|---|---|
| 4,864,520 A | 9/1989 | Setoguchi et al. |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,184,120 A | 2/1993 | Schultz |
| 5,270,922 A | 12/1993 | Higgins |
| 5,297,031 A | 3/1994 | Gutterman et al. |
| 5,297,032 A | 3/1994 | Trojan et al. |
| 5,374,787 A | 12/1994 | Miller et al. |
| 5,428,730 A | 6/1995 | Baker et al. |
| 5,455,965 A | 10/1995 | Shaughnessy et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,590,265 A | 12/1996 | Nakazawa |
| 5,627,914 A | 5/1997 | Pagallo |
| 5,689,651 A | 11/1997 | Lozman |
| 5,695,400 A | 12/1997 | Fenell, Jr. et al. |
| 5,710,896 A | 1/1998 | Seidl |
| 5,717,438 A | 2/1998 | Kim et al. |
| 5,717,725 A | 2/1998 | Campana, Jr. |
| 5,719,796 A | 2/1998 | Chen |
| 5,727,165 A | 3/1998 | Ordish et al. |
| 5,774,877 A | 6/1998 | Patterson, Jr. et al. |
| 5,775,996 A | 7/1998 | Othmer et al. |
| 5,793,301 A | 8/1998 | Patterson, Jr. et al. |
| 5,793,360 A | 8/1998 | Fleck et al. |
| 5,793,377 A | 8/1998 | Moore |
| 5,797,002 A | 8/1998 | Patterson, Jr. et al. |
| 5,801,692 A | 9/1998 | Muzio et al. |
| 5,805,167 A | 9/1998 | Van Cruyningen |
| 5,809,267 A | 9/1998 | Moran et al. |
| 5,819,293 A | 10/1998 | Comer et al. |
| 5,820,463 A | 10/1998 | O'Callaghan |
| 5,825,352 A | 10/1998 | Bisset et al. |
| 5,844,560 A | 12/1998 | Crutcher et al. |
| 5,845,266 A | 12/1998 | Lupien et al. |
| 5,872,922 A | 2/1999 | Hogan et al. |
| 5,880,733 A | 3/1999 | Horvitz et al. |
| 5,910,882 A | 6/1999 | Burrell |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,647 A | 8/1999 | Miller et al. |
| 5,946,667 A | 8/1999 | Tull, Jr. et al. |
| 5,953,708 A | 9/1999 | Midorikawa et al. |
| 5,963,923 A | 10/1999 | Garber |
| 6,002,397 A | 12/1999 | Jaaskelainen, Jr. |
| 6,012,046 A | 1/2000 | Lupien et al. |
| 6,014,643 A | 1/2000 | Minton |
| 6,031,989 A | 2/2000 | Cordell |
| 6,035,287 A | 3/2000 | Stallaert et al. |
| 6,072,488 A | 6/2000 | Mcfarland |
| 6,088,019 A | 7/2000 | Rosenberg |
| 6,088,027 A | 7/2000 | Konar et al. |
| 6,098,051 A | 8/2000 | Lupien et al. |
| 6,111,575 A | 8/2000 | Martinez et al. |
| 6,115,043 A | 9/2000 | Levine et al. |
| 6,121,960 A | 9/2000 | Carroll et al. |
| 6,131,087 A | 10/2000 | Luke et al. |
| 6,134,535 A | 10/2000 | Belzberg |
| 6,180,894 B1 | 1/2001 | Chao et al. |
| 6,195,647 B1 | 2/2001 | Martyn et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,229,542 B1 | 5/2001 | Miller |
| 6,243,080 B1 | 6/2001 | Moine |
| 6,247,000 B1 | 6/2001 | Hawkins et al. |
| 6,252,594 B1 | 6/2001 | Xia et al. |
| 6,266,684 B1 | 7/2001 | Kraus et al. |
| 6,272,474 B1 | 8/2001 | Garcia |
| 6,278,982 B1 | 8/2001 | Korhammer et al. |
| 6,282,521 B1 | 8/2001 | Howorka |
| 6,323,846 B1 | 11/2001 | Westerman et al. |
| 6,347,997 B1 | 2/2002 | Armstrong |
| 6,377,940 B2 | 4/2002 | Tilfors et al. |
| 6,396,523 B1 | 5/2002 | Segal et al. |
| 6,396,962 B1 | 5/2002 | Haffey et al. |
| 6,400,303 B2 | 6/2002 | Armstrong |
| 6,405,180 B2 | 6/2002 | Tilfors et al. |
| 6,408,282 B1 | 6/2002 | Buist |
| 6,411,998 B1 | 6/2002 | Bryant et al. |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,424 B1 | 10/2002 | Resman |
| 6,459,442 B1 | 10/2002 | Edwards et al. |
| 6,469,691 B1 | 10/2002 | Armstrong |
| 6,470,078 B1 | 10/2002 | Armstrong |
| 6,489,975 B1 | 12/2002 | Patil et al. |
| 6,489,978 B1 | 12/2002 | Gong et al. |
| 6,504,527 B1 | 1/2003 | Armstrong |
| 6,512,530 B1 | 1/2003 | Rzepkowski et al. |
| 6,512,761 B1 | 1/2003 | Schuster et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,570,557 B1 | 5/2003 | Westerman et al. |
| 6,583,798 B1 | 6/2003 | Hoek et al. |
| 6,590,568 B1 | 7/2003 | Astala et al. |
| 6,659,861 B1 | 12/2003 | Faris et al. |
| 6,661,438 B1 | 12/2003 | Shiraishi et al. |
| 6,670,952 B2 | 12/2003 | Jaeger et al. |
| 6,677,932 B1 | 1/2004 | Westerman |
| 6,735,307 B1 | 5/2004 | Volckers |
| 6,750,890 B1 | 6/2004 | Sugimoto |
| 6,772,132 B1 | 8/2004 | Kemp, II et al. |
| 6,822,635 B2 | 11/2004 | Shahoian et al. |
| 6,831,666 B1 | 12/2004 | Kreis |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1 | 7/2005 | Hyodo |
| 6,943,778 B1 | 9/2005 | Astala et al. |
| 6,954,899 B1 | 10/2005 | Anderson |
| 7,036,088 B2 | 4/2006 | Tunney |

(56) References Cited

U.S. PATENT DOCUMENTS

| | | |
|---|---|---|
| 7,058,146 B2 | 6/2006 | Paulraj et al. |
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |
| 7,411,575 B2 | 8/2008 | Hill et al. |
| 7,441,204 B2 | 10/2008 | Thomson et al. |
| 7,461,026 B2 | 12/2008 | Schluetter |
| 7,471,284 B2 | 12/2008 | Bathiche et al. |
| 7,479,949 B2 | 1/2009 | Jobs et al. |
| 7,492,720 B2 | 2/2009 | Pruthi et al. |
| 7,532,206 B2 | 5/2009 | Morrison |
| 7,533,352 B2 | 5/2009 | Chew et al. |
| 7,552,397 B2 | 6/2009 | Holecek et al. |
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,629,966 B2 | 12/2009 | Anson |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas-Ribikauskas et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 | 9/2010 | Eisenstadt et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Lutter |
| 8,024,670 B1 | 9/2011 | Rahmatian et al. |
| 8,040,142 B1 | 10/2011 | Bokma et al. |
| 8,046,712 B2 | 10/2011 | Landman et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| 8,138,504 B2 | 3/2012 | Harada et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,271,900 B2 | 9/2012 | Walizaka et al. |
| 8,279,180 B2 | 10/2012 | Hotelling et al. |
| 8,325,398 B2 | 12/2012 | Satomi et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,479,122 B2 | 7/2013 | Hotelling et al. |
| 8,482,535 B2 | 7/2013 | Pryor |
| 8,499,243 B2 | 7/2013 | Yuki |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,954,889 B2 | 2/2015 | Fujibayashi |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,032,321 B1 | 5/2015 | Cohen et al. |
| 9,046,999 B1 | 6/2015 | Teller et al. |
| 9,058,186 B2 | 6/2015 | Chaudhri |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |

(56) References Cited

U.S. PATENT DOCUMENTS

| | | |
|---|---|---|
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,619,076 B2 | 4/2017 | Bernstein et al. |
| 9,671,943 B2 | 6/2017 | Van der Velden |
| 9,733,716 B2 | 8/2017 | Shaffer |
| 9,760,241 B1 | 9/2017 | Lewbel |
| 10,055,066 B2 * | 8/2018 | Lynn .................. G06F 3/041 |
| 10,057,490 B2 | 8/2018 | Shin et al. |
| 2001/0024195 A1 | 9/2001 | Hayakawa |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |
| 2002/0027957 A1 | 3/2002 | Paulraj et al. |
| 2002/0035534 A1 | 3/2002 | Buist et al. |
| 2002/0042925 A1 | 4/2002 | Ebisu et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0140740 A1 | 10/2002 | Chen |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0178102 A1 | 11/2002 | Scheinberg et al. |
| 2002/0180763 A1 | 12/2002 | Kung |
| 2002/0186257 A1 | 12/2002 | Cadiz et al. |
| 2003/0001869 A1 | 1/2003 | Nissen |
| 2003/0074413 A1 | 4/2003 | Nielsen et al. |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0119562 A1 | 6/2003 | Kokubo |
| 2003/0122779 A1 | 7/2003 | Martin et al. |
| 2003/0128242 A1 | 7/2003 | Gordon |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0015662 A1 | 1/2004 | Cummings |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0022138 A1 | 1/2005 | Tunney |
| 2005/0039141 A1 | 2/2005 | Burke et al. |
| 2005/0073961 A1 | 4/2005 | Paik et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0001650 A1 | 1/2006 | Robbins et al. |
| 2006/0001657 A1 | 1/2006 | Monney et al. |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0031776 A1 | 2/2006 | Glein et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van Dok et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0224989 A1 | 10/2006 | Pettiross et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0128899 A1 | 6/2007 | Mayer |
| 2007/0152959 A1 | 7/2007 | Peters |
| 2007/0152980 A1 | 7/2007 | Kocienda et al. |
| 2007/0157089 A1 | 7/2007 | Van Os et al. |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |

(56) References Cited

U.S. PATENT DOCUMENTS

| | | |
|---|---|---|
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270186 A1 | 11/2007 | Gulliksson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2007/0299923 A1 | 12/2007 | Skelly et al. |
| 2008/0001924 A1 | 1/2008 | dos los Reyes et al. |
| 2008/0024459 A1 | 1/2008 | Poupyrev et al. |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |
| 2008/0222569 A1 | 9/2008 | Champion et al. |
| 2008/0225007 A1 | 9/2008 | Nakadaira et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Cho |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0187824 A1 | 7/2009 | Hinckley et al. |
| 2009/0197635 A1 | 8/2009 | Kim et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293007 A1 | 11/2009 | Duarte et al. |
| 2009/0293009 A1 | 11/2009 | Meserth et al. |
| 2009/0295739 A1 | 12/2009 | Nagara |
| 2009/0303187 A1 | 12/2009 | Pallakoff |
| 2009/0307583 A1 | 12/2009 | Tonisson |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0061637 A1 | 3/2010 | Mochizuki et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0088639 A1 | 4/2010 | Yach et al. |
| 2010/0088654 A1 | 4/2010 | Henhoeffer |
| 2010/0090988 A1 | 4/2010 | Park |
| 2010/0110082 A1 | 5/2010 | Myrick et al. |
| 2010/0111434 A1 | 5/2010 | Madden |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0146507 A1 | 6/2010 | Kang et al. |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156812 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |

(56) References Cited

U.S. PATENT DOCUMENTS

| | | |
|---|---|---|
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0248787 A1 | 9/2010 | Smuga et al. |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315345 A1 | 12/2010 | Laitinen |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0012851 A1 | 1/2011 | Ciesla et al. |
| 2011/0018695 A1 | 1/2011 | Bells et al. |
| 2011/0035145 A1 | 2/2011 | Yamasaki |
| 2011/0035662 A1 | 2/2011 | King et al. |
| 2011/0043652 A1 | 2/2011 | King et al. |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0070342 A1 | 3/2011 | Wilkens |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0102340 A1 | 5/2011 | Martin et al. |
| 2011/0102829 A1 | 5/2011 | Jourdan |
| 2011/0107272 A1 | 5/2011 | Aquilar |
| 2011/0109617 A1 | 5/2011 | Snook et al. |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145759 A1 | 6/2011 | Leffert et al. |
| 2011/0145764 A1 | 6/2011 | Higuchi et al. |
| 2011/0149138 A1 | 6/2011 | Watkins et al. |
| 2011/0163971 A1 | 7/2011 | Wagner et al. |
| 2011/0163978 A1 | 7/2011 | Park et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167369 A1 | 7/2011 | van Os |
| 2011/0167382 A1 | 7/2011 | Van Os |
| 2011/0169765 A1 | 7/2011 | Aono |
| 2011/0175826 A1 | 7/2011 | Moore et al. |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0181751 A1 | 7/2011 | Mizumori |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvuori et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296333 A1 | 12/2011 | Bateman et al. |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |

(56) References Cited

U.S. PATENT DOCUMENTS

| | | |
|---|---|---|
| 2012/0005622 A1 | 1/2012 | Park et al. |
| 2012/0007857 A1 | 1/2012 | Noda et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0013607 A1 | 1/2012 | Lee |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081326 A1* | 4/2012 | Heubel .................. G06F 3/016 345/173 |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Sort et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0144330 A1 | 6/2012 | Flint |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0158629 A1 | 6/2012 | Hinckley et al. |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0180001 A1 | 7/2012 | Griffin et al. |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256829 A1 | 10/2012 | Dodge |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Weeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0014057 A1 | 1/2013 | Reinpoldt et al. |
| 2013/0016042 A1 | 1/2013 | Makinen et al. |
| 2013/0016122 A1 | 1/2013 | Bhall et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063364 A1 | 3/2013 | Moore |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0076676 A1 | 3/2013 | Gan |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097564 A1 | 4/2013 | Morikawa et al. |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120280 A1 | 5/2013 | Kukulski |
| 2013/0120295 A1 | 5/2013 | Kim et al. |
| 2013/0120306 A1 | 5/2013 | Furukawa |
| 2013/0125039 A1 | 5/2013 | Murata |
| 2013/0127755 A1* | 5/2013 | Lynn ....................... G08B 6/00 345/173 |
| 2013/0135243 A1 | 5/2013 | Hirsch et al. |
| 2013/0135288 A1 | 5/2013 | King et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0194480 A1 | 8/2013 | Fukata et al. |

(56) References Cited

U.S. PATENT DOCUMENTS

| | | |
|---|---|---|
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222333 A1 | 8/2013 | Miles et al. |
| 2013/0222671 A1 | 8/2013 | Tseng et al. |
| 2013/0227413 A1 | 8/2013 | Thorsander et al. |
| 2013/0227419 A1 | 8/2013 | Lee et al. |
| 2013/0227450 A1 | 8/2013 | Na et al. |
| 2013/0228023 A1 | 9/2013 | Drasnin et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0293496 A1 | 11/2013 | Takamoto |
| 2013/0305184 A1 | 11/2013 | Kim et al. |
| 2013/0307790 A1 | 11/2013 | Konttori et al. |
| 2013/0307792 A1 | 11/2013 | Andres et al. |
| 2013/0314434 A1 | 11/2013 | Shetterly et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0335373 A1 | 12/2013 | Tomiyasu |
| 2013/0338847 A1 | 12/2013 | Lisseman et al. |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0013271 A1 | 1/2014 | Moore et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0062956 A1 | 3/2014 | Ishizone et al. |
| 2014/0063316 A1 | 3/2014 | Lee et al. |
| 2014/0063541 A1 | 3/2014 | Yamazaki |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0123080 A1 | 5/2014 | Gan |
| 2014/0139456 A1 | 5/2014 | Wigdor et al. |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1* | 6/2014 | Lawrence ............ G06F 3/0414 345/173 |
| 2014/0168153 A1 | 6/2014 | Deichmann et al. |
| 2014/0173517 A1 | 6/2014 | Chaudhri |
| 2014/0179377 A1 | 6/2014 | Song et al. |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0223376 A1 | 8/2014 | Tarvainen et al. |
| 2014/0229888 A1 | 8/2014 | Ko et al. |
| 2014/0237408 A1 | 8/2014 | Ohisson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0351744 A1 | 11/2014 | Jeon et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobyakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0067559 A1 | 2/2015 | Missig et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067560 A1 | 3/2015 | Cieplinski et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0067563 A1 | 5/2015 | Bernstein et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |

(56) References Cited

U.S. PATENT DOCUMENTS

| | | |
|---|---|---|
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0085385 A1 | 3/2016 | Gao et al. |
| 2016/0125234 A1 | 5/2016 | Ota et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357387 A1 | 12/2016 | Penha et al. |
| 2016/0357389 A1 | 12/2016 | Dakin et al. |
| 2016/0357390 A1 | 12/2016 | Federighi et al. |
| 2016/0357400 A1 | 12/2016 | Penha et al. |
| 2016/0357404 A1 | 12/2016 | Alonso Ruiz et al. |
| 2016/0360097 A1 | 12/2016 | Penha et al. |
| 2016/0360098 A1 | 12/2016 | King et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0115867 A1 | 4/2017 | Bargmann |
| 2017/0124699 A1 | 5/2017 | Lane |
| 2017/0139565 A1 | 5/2017 | Choi |
| 2017/0315694 A1 | 11/2017 | Ruiz et al. |
| 2018/0024681 A1 | 1/2018 | Bernstein et al. |
| 2018/0275862 A1 | 9/2018 | Khoe et al. |
| 2018/0364883 A1 | 12/2018 | Khoe et al. |
| 2018/0364904 A1 | 12/2018 | Bernstein et al. |
| 2019/0004605 A1 | 1/2019 | Flint et al. |
| 2019/0018562 A1 | 1/2019 | Bernstein et al. |
| 2019/0042075 A1 | 2/2019 | Bernstein et al. |
| 2019/0042078 A1 | 2/2019 | Bernstein et al. |
| 2019/0065043 A1 | 2/2019 | Zambetti et al. |
| 2019/0121493 A1 | 4/2019 | Bernstein et al. |
| 2019/0121520 A1 | 4/2019 | Cieplinski et al. |
| 2019/0138101 A1 | 5/2019 | Bernstein |
| 2019/0138102 A1 | 5/2019 | Missig |
| 2019/0138189 A1 | 5/2019 | Missig |
| 2019/0146643 A1 | 5/2019 | Foss et al. |
| 2019/0155503 A1 | 5/2019 | Ruiz et al. |
| 2019/0158727 A1 | 5/2019 | Penha et al. |
| 2019/0163358 A1 | 5/2019 | Dascola et al. |
| 2019/0171353 A1 | 6/2019 | Missig et al. |
| 2019/0171354 A1 | 6/2019 | Dascola et al. |

FOREIGN PATENT DOCUMENTS

| | | |
|---|---|---|
| CN | 1661556 | 8/2005 |
| CN | 1808362 A | 7/2006 |
| CN | 1955906 | 5/2007 |
| CN | 101102573 | 1/2008 |
| CN | 101118469 A | 2/2008 |
| CN | 101202866 A | 6/2008 |
| CN | 101222704 A | 7/2008 |
| CN | 101241397 A | 8/2008 |
| CN | 201107762 | 8/2008 |
| CN | 101320303 A | 12/2008 |
| CN | 100524183 | 8/2009 |
| CN | 101498979 A | 8/2009 |
| CN | 101593077 A | 12/2009 |
| CN | 101604208 A | 12/2009 |
| CN | 101650615 A | 2/2010 |
| CN | 101727268 | 6/2010 |
| CN | 101809526 A | 8/2010 |
| CN | 101965549 A | 2/2011 |
| CN | 101998052 A | 3/2011 |
| CN | 102004593 A | 4/2011 |
| CN | 102037435 | 4/2011 |
| CN | 102099776 | 6/2011 |
| CN | 102112946 A | 6/2011 |
| CN | 102160021 A | 8/2011 |
| CN | 102214038 A | 10/2011 |
| CN | 102349038 A | 2/2012 |
| CN | 102385478 A | 3/2012 |
| CN | 102438092 A | 5/2012 |
| CN | 102460355 A | 5/2012 |
| CN | 102483677 A | 5/2012 |
| CN | 102646013 A | 8/2012 |
| CN | 102662571 A | 9/2012 |
| CN | 102662573 A | 9/2012 |
| CN | 102792255 A | 11/2012 |
| CN | 102841677 A | 12/2012 |
| CN | 103097992 A | 5/2013 |
| CN | 103186345 A | 7/2013 |
| CN | 103518176 A | 1/2014 |
| CN | 103777850 A | 5/2014 |
| CN | 103793134 A | 5/2014 |
| CN | 103838465 A | 6/2014 |
| CN | 104024985 A | 9/2014 |
| CN | 104331239 A | 2/2015 |
| CN | 104392292 A | 3/2015 |
| CN | 101527745 A | 9/2015 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |

(56) References Cited

FOREIGN PATENT DOCUMENTS

| | | |
|---|---|---|
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1406150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 077 490 A2 | 7/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 708 985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 A | 3/2011 |
| GB | 2 474 153 A | 4/2011 |
| JP | 58-182746 | 10/1983 |
| JP | H06-161647 A | 6/1994 |
| JP | H07-98769 A | 4/1995 |
| JP | H07-104915 | 4/1995 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2000-148348 A | 5/2000 |
| JP | 2001-202192 A | 7/2001 |
| JP | 2001-222355 A | 8/2001 |
| JP | 2001-306207 A | 11/2001 |
| JP | 2002-041023 A | 2/2002 |
| JP | 2002-044536 A | 2/2002 |
| JP | 2002-149312 A | 5/2002 |
| JP | 3085481 U | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2004-288208 A | 10/2004 |
| JP | 2005-031786 A | 2/2005 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2005-222553 A | 8/2005 |
| JP | 2005-309933 A | 11/2005 |
| JP | 2005-352927 A | 12/2005 |
| JP | 2006-185443 A | 7/2006 |
| JP | 2007-116384 A | 5/2007 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-516348 A | 5/2008 |
| JP | 2008-146453 A | 6/2008 |
| JP | 2008-191086 A | 8/2008 |
| JP | 2008-537615 | 9/2008 |
| JP | 2008-305174 A | 12/2008 |
| JP | 2009-500761 | 1/2009 |
| JP | 2009-110243 A | 5/2009 |
| JP | 2009-129171 A | 6/2009 |
| JP | 2009-211704 A | 9/2009 |
| JP | 2009-217543 A | 9/2009 |
| JP | 2009-217815 A | 9/2009 |
| JP | 2009-294688 A | 12/2009 |
| JP | 2010-009321 A | 1/2010 |
| JP | 2010-503126 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-181934 A | 8/2010 |
| JP | 2010-198385 A | 9/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2010-176337 A | 8/2011 |
| JP | 2011-170538 A | 9/2011 |
| JP | 2011 192179 A | 9/2011 |
| JP | 2011-192215 A | 9/2011 |
| JP | 2011-197848 A | 10/2011 |
| JP | 2011-221640 A | 11/2011 |
| JP | 2011-232947 A | 11/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053687 A | 3/2012 |
| JP | 2012-053754 | 3/2012 |
| JP | 2012-053926 A | 3/2012 |
| JP | 2012-073873 A | 4/2012 |

(56) References Cited

FOREIGN PATENT DOCUMENTS

| | | |
|---|---|---|
| JP | 2012-509605 A | 4/2012 |
| JP | 2012-093820 A | 5/2012 |
| JP | 2012-118825 A | 6/2012 |
| JP | 2012-118993 A | 6/2012 |
| JP | 2012-123564 A | 6/2012 |
| JP | 2012-128825 A | 7/2012 |
| JP | 2012-527685 A | 11/2012 |
| JP | 2013-030050 A | 2/2013 |
| JP | 2013-058149 A | 3/2013 |
| JP | 2013-080521 A | 5/2013 |
| JP | 2013-105410 A | 5/2013 |
| JP | 2013-529339 A | 7/2013 |
| JP | 2013-542488 A | 11/2013 |
| JP | 2014-504419 | 2/2014 |
| JP | 2014-130567 A | 7/2014 |
| JP | 2014-140112 A | 7/2014 |
| JP | 2014-519109 A | 8/2014 |
| JP | 2014-529137 A | 10/2014 |
| JP | 2015-099555 A | 5/2015 |
| JP | 2015-521315 A | 7/2015 |
| JP | 2015-153420 A | 8/2015 |
| JP | 2015-185161 A | 10/2015 |
| KR | 2006-0071353 A | 6/2006 |
| KR | 2008-0045143 A | 4/2008 |
| KR | 2008-0054346 A | 6/2008 |
| KR | 2008-0078108 A | 8/2008 |
| KR | 2010-0010302 | 2/2010 |
| KR | 2010-0014095 A | 2/2010 |
| KR | 2010-0023637 | 3/2010 |
| KR | 2010-0034608 | 4/2010 |
| KR | 2010 0046087 | 6/2010 |
| KR | 2010 0070841 A | 6/2010 |
| KR | 2010-0133246 A | 12/2010 |
| KR | 2011 0026176 A | 3/2011 |
| KR | 2011 0086501 A | 7/2011 |
| KR | 20120103670 A | 9/2012 |
| KR | 20120135723 A | 12/2012 |
| KR | 2013-0099647 A | 9/2013 |
| KR | 2014 0016495 A | 2/2014 |
| KR | 2014 0029720 A | 3/2014 |
| KR | 2014 0043760 A | 4/2014 |
| KR | 2014 0079110 A | 6/2014 |
| KR | 2014 0122000 A | 10/2014 |
| KR | 20150013263 A | 2/2015 |
| KR | 20150021977 A | 3/2015 |
| RU | 2007145218 A | 7/2009 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 2/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/073020 A1 | 7/2006 |
| WO | WO 2006/094308 A2 | 9/2006 |
| WO | WO 2007/121557 A1 | 11/2007 |
| WO | WO 2008/030976 A2 | 3/2008 |
| WO | WO 2006/043209 A1 | 4/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/032598 A1 | 2/2010 |
| WO | WO 2010/090010 A1 | 8/2010 |
| WO | WO 2010/122813 A1 | 10/2010 |
| WO | WO 2010/134729 A2 | 11/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/137946 A1 | 10/2012 |
| WO | WO 2012/150540 A2 | 11/2012 |
| WO | WO 2012/153555 A1 | 11/2012 |
| WO | WO 2013/022486 A1 | 2/2013 |
| WO | WO 2013/169299 A1 | 11/2013 |
| WO | WO 2013/169300 A1 | 11/2013 |
| WO | WO 2013/169302 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

Alzond, "Full Screen Maximization with RightZoom," http://www.brighhub.com/computing/mac-platform/articles/31024.aspx>, Mar. 31, 2009, 6 pages.

Apple Inc., "iPhone User Guide for iPhone and iPhone 3G," http://manuals.info.apple.com/en_US/iPhone_User_Guide.pdf, Jul. 11, 2008, 154 pages.

Ask.MetaFilter, "Enable Screen Resize?" ask. Metafilter.com, Jan. 29, 2006, http://ask.metafilter.com/31720/Enable-screen-resize, 4 pages.

Awduche et al., "Synchronized Broadcast in Cellular Networks," 2nd Telecommunications R&D Conference in Massachusetts, Mar. 1996, 12 pages.

Azundris, "A Fire in the Sky," http://web.archive.org/web/20140722062639/http://blog.azundrix.com/archives/168-A-fire-in-the-sky.html, Jul. 22, 2014, 8 pages.

(56) References Cited

OTHER PUBLICATIONS

CrackBerry Forums, Windows 8 Bezel Control and Gestures http://wwwforums.crackberry.com/blackberry-playbook-f222/windows-8-bezel-control-gestures-705129/, Mar. 1, 2012, 8 pages.
Crook, "Microsoft Patenting Multi-Screen, Multi-Touch Gesures," http://techcrunch.com/2011/08/25/microsoft-awarded-patents-for-multi-screen-multi-touch-gestures/, Aug. 25, 2011, 8 pages.
Cvil.ly—a design blog, Interesting Touch Interactions on Windows 8, http://cvil.ly/2011/06/04/interesting-touch-interactions-on-windows-8/, Jun. 4, 2011, 3 pages.
Deeter, "DigiStamp Signs Strategic Partnership with European Trust Center EuroSignCard to Safeguard Monetary Transactions in Financial Sector," http://proquest.umi.com/, Mar. 14, 2001, 2 pages.
Dilger, "Inside Apple's iPad: Multitasking," Appleinsider.com, <http://www.appleinsider.com/articles/10/02/18/inside_apples_ipad_multitasking.html>, Feb. 17, 2010, 3 pages.
Fahey, "The iPad Blow Up iPhone Apps Read Good," Kotaku http://kotaku.com/5458316/the-ipad-blows-up-iphone-apps-rel-good, Jan. 27, 2010, 3 pages.
Fehily, "Visual QuickStart Guide: Microsoft Windows 7," Peachpit Press, 9 pages.
Fenlon, "The Case for Bezel Touch Gestures on Apple's iPad," http://www.tested.com/tech/tablets/3104-the-case-for-bezel-touch-gestures-on-apples-ipad/, Nov. 2, 2011, 6 pages.
Flowplayer, "Slowmotion: Flowplayer," http://web.archive.org/web/20150226191526/http://flash.flowplayer.org/plugins/streaming/slowmotion.html, Feb. 26, 2015, 4 pages.
Gorman, "Hands-On With Immersion HD Integrator Hi-Fi Haptics," http://www.engadget.com/201202/23/hands-on-with-immersion-hd-integrator-hi-fi-haptics/?utm_medium=referral&utm_source=pulsenews, Feb . 23, 2012, 10 pages.
Harris, "Windows Consumer Preveiw: Product Demo," https://www.youtube.com/watch?feature=[:auer-embedded&v=jDYAQmQ-phX8, Feb. 28, 2012, 3 pages.
HTC, "HTC One (M7)," Wikipedia, the free encyclopedia, https://en.wikipedia.org/wiki/HTC_One_(M7), Mar. 2013, 20 pages.
HTC, "User Manual—PDA Phone—HTC_P3050 Touch," http://web./archive.org/web/20101228223033/http://www.comparecellular.com, Nov. 2, 2007, 154 pages.
ICIMS Recruiting Software, "Blackberry Playbook Review," http://www.tested.com/tech.tablets/5749-blackberry-playbook-review/, 2015, 11 pages.
Jade et al., "Apple's iPhone 4.0 to Support Multitasking via Expose-like Interface," AppleInsider.com, Mar. 31, 20110, 4 pages.
Jade et al., "Apple's iPhone 4.0 Software to Deliver Multitasking Support," AppleSider.com, Mar. 11, 2010, 3 pages.
Kishore, "Make the OS X Maximize Button Work like Windows," http://www.switchingtomac.com/making-the-switch/make-the-os-x-maximize-buttom-work-like-windows/, May 5, 2009, 11 pages.
MacRumors, "Fit to Screen Button Poll for Mac / Windows Users," http://forums.macrumors.com/showthread.php?t=615215>, Dec. 11, 2008, 15 pages.
MacRumors, "Window, Fit to Screen?," http://forums.macrumors.com/showthread.php?t=439783>, Feb. 22, 2008, 15 pages.
McRitchie, "Internet Explorer Right-Click Menus," http://web.archive.org/web-201405020/http:/dmcritchie.mvps.org/ie/rightie6.htm, May 2, 2014, 10 pages.
MetalFilter Network Inc., "Enable Screen Resize?" http://ask.metafilter.com/31720/Enable-screen-resize>, Jan. 29, 2006, 4 pages.
Mick, "iPhone OS 4.0 Will Bring True Multitasking This Summer", Daily Tech, http:///www.dailytech.com/report+iphone+os+40+will+bring+true+multitasking+this+summer/article 17878.htm>, Mar. 11, 2010, 3 pages.
Moth, "Share Code—Write Code Once for Both Mobile and Desktop Apps," MSDN Magazine, Jul. 2007, http://msdn.microsoft.com/en-us/magazine/cc163387.aspx, 8 pages.
Newman, "Sprint's HTC EVO 4G: 5 Killer Features," pcworld, http://www.pcworld.com/article/192286/sprints_htc_evo_4g_5_killer_features.html, Mar. 24, 2010, 3 pages.
Nickinson, "Review: The New HTC Sense Interface on Android Phones," Android Central, Feb. 22, 2010, http://www.androidcentral.com/review-new-htc-sense-android-phone, 10 pages.
Nilsson, "Design Guidelines for Mobile Applications," SINTEF ICT, Jun. 2008, 73 pages.
Nilsson et al., "Design Patterns for User Interface for Mobile Applications," Advances in Engineering Software, Elsevier Sciences, Oxford, GB vol. 40, No. 12, Dec. 1, 2009, 11 pages.
Pallenberg, "Wow, the new iPad had gestures." https://plus.google.com/+SaschaPallenberg/posts/aaJtJogu8ac, Mar. 7, 2012, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
Reiger, "Effective Design for Multiple Screen Sizes," mobiForge, http://mobiforge.com/designing/story/effective-design-multiple-screen-sizes, Jan. 2009, 12 pages.
Robertson et al., "The Task Gallery: A 3D Window Manager," Redmond, WA, Sep. 12, 1999, 8 pages.
Savov, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.
Seffah et al., "Multi-devices "Multiple" User Interfaces: Development Models and Research Opportunities," The Journal of Systems Software, www.sciencedirect.com, Dec. 25, 2003, 14 pages.
Siracusa, "Antacid tablet," http://arstechnica.com/staff/2010/01/antacid-tablet/>, Jan. 1, 2010, 3 pages.
Sony, "Sony Xperia Z1", Wikipedia, the free encyclopedia, https://en.wikipedia.org/wiki/Sony_Xperia_Z1, Sep. 2013, 10 pages.
Tidwell, "Designing Interfaces," O'Reilly Media, Inc., USA, Nov. 2005, 348 pages.
Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.
Windows, "Stupid Geek Tricks: Tile or Cascade Multiple Windows in Windows 7," How to Geek, Feb. 18, 2010, 3 pages.
YouTube, "Blackberry Playbook bezel interation," https://www.youtube.com/watch?v=YGkzFqnOwXI, Jan. 10, 2011, 2 pages.
Office Action, dated May 22, 2012, received in U.S. Appl. No. 12/888,381, 18 pages.
Final Office Action, dated Nov. 19, 2012, received in U.S. Appl. No. 12/888,381, 14 pages.
Office Action, dated Dec. 10, 2013, received in U.S. Appl. No. 12/888,381, 13 pages.
Notice of Allowance, dated Oct. 21, 2014, received in U.S. Appl. No. 12/888,381, 8 pages.
Notice of Allowance, dated Feb. 17, 2015, received in U.S. Appl. No. 12/888,381, 5 pages.
Notice of Allowance (corrected), dated Apr. 9, 2015, received in U.S. Appl. No. 12/888,381, 2 pages.
Office Action, dated Aug. 8, 2013, received in Autralian Patent Application No. 2010350740, 3 pages.
Office Action, dated Aug. 28, 2012, received in Chinese Patent Application No. 201010602688.2, which corresponds with U.S. Appl. No. 12/888,381, 6 pages.
Office Action, dated May 24, 2013, received in Chinese Patent Application No. 201010602688.2, which corresponds with U.S. Appl. No. 12/888,381, 7 pages.
Office Action, dated Aug. 6, 2013, received in European Patent Application No. 10760867.1, which corresponds with U.S. Appl. No. 12/888,381, 4 pages.
Office Action, dated Dec. 6, 2013, received in Japanese Patent Application No. 2013-503722, which corresponds with U.S. Appl. No. 12/888,381, 2 pages.
Office Action, dated Nov. 29, 2013, received in Korean Patent Application No. 2012-7029281, which corresponds with U.S. Appl. No. 12/888,381, 4 pages.
Office Action, dated May 10, 2012, received in U.S. Appl. No. 12/888,382, 9 pages.
Final Office Action, dated Nov. 15, 2012, received in U.S. Appl. No. 12/888,382, 11 pages.

(56) References Cited

OTHER PUBLICATIONS

Office Action, dated Dec. 10, 2013, received in U.S. Appl. No. 12/888,382, 12 pages.
Notice of Allowance, dated Oct. 31, 2014, received in U.S. Appl. No. 12/888,382, 5 pages.
Notice of Allowance, dated Feb. 13, 2015, received in U.S. Appl. No. 12/888,382, 6 pages.
Office Action, dated May 17, 2012, received in U.S. Appl. No. 12/888,384, 15 pages.
Final Office Action, dated Nov. 7, 2012, received in U.S. Appl. No. 12/888,384, 14 pages.
Office Action, dated May 16, 2012, received in U.S. Appl. No. 12/888,386, 12 pages.
Final Office Action, dated Nov. 8, 2012, received in U.S. Appl. No. 12/888,386, 13 pages.
Office Action, dated Jan. 23, 2013, received in U.S. Appl. No. 12/888,389, 11 pages.
Final Office Action, dated Sep. 12, 2013, received in U.S. Appl. No. 12/888,389, 10 pages.
Notice of Allowance, dated Sep. 8, 2014, received in U.S. Appl. No. 12/888,389, 13 pages.
Notice of Allowance, dated Feb. 11, 2015, received in U.S. Appl. No. 12/888,389, 13 pages.
Notice of Allowance, dated Jun. 15, 2012, received in U.S. Appl. No. 12/888,391, 23 pages.
Office Action, dated Jun. 28, 2013, received in U.S. Appl. No. 13/077,524, 17 pages.
Office Action, dated Apr. 4, 2013, received in U.S. Appl. No. 12/789,426, 8 pages.
Office Action, dated Feb. 12, 2014, received in U.S. Appl. No. 13/077,524, 13 pages.
Notice of Allowance, dated May 27, 2015, received in U.S. Appl. No. 13/077,524, 9 pages.
Notice of Allowance, dated Sep. 15, 2015, received in U.S. Appl. No. 13/077,524, 9 pages.
Office Action, dated Mar. 19, 2013, received in U.S. Appl. No. 13/333,909, 18 pages.
Final Office Action, dated Dec. 5, 2013, received in U.S. Appl. No. 13/333,909, 24 pages.
Nlotice of Allowance, dated Mar. 31, 2014, received in U.S. Appl. No. 13/333,909, 20 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536.426 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Mar. 14, 2016, received in Japanese Patent Application No. 2015-549392, which corresponds with U.S. Appl. No. 14/608,926, 4 pages.
Office Action, dated Nov. 12, 2015, received in European Patent Application No,. 13724102.2, which corresponds with U.S. Appl. No. 14/536,646, 6 pages.
Office Action, dated Feb. 29, 2016, received in Japanese Patent Application No. 2015-511645, which corresponds with U.S. Appl. No. 14/536,646, 5 pages.
Office Action, dated Jan. 7, 2016, received in European Patent Application No. 13726053.5, which corresponds with U.S. Appl. No. 14/538,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 10-2015-7018448, which corresponds with U.S. Appl. No. 14/536,141, 6 pages.
Office Action, dated Nov. 11, 2015, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Jan. 29, 2016, received in Japanese Patent Application No. 2014-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Jan. 7, 2016, received in European Patent Application No. 13724107.1, which corresponds with U.S. Appl. No. 14/052,515, 11 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Nov. 23, 2015, received in U.S. Appl. No. 14/183,316, 17 pages.
Office Action, dated Jul. 7, 2015, received in U.S. Appl. No. 14/183,347, 14 pages.
Final Office Action, dated Dec. 18, 2015, received in U.S. Appl. No. 14/183,347, 6 pages.
Notice of Allowance, dated Apr. 6, 2016, received in U.S. Appl. No. 14/183,347, 7 pages.
Notice of Allowance (corrected), dated Apr. 19, 2016, received in U.S. Appl. No. 14/183,347, 3 pages.
Office Action, dated Mar. 31, 2016, received in U.S. Appl. No. 14/864,737, 17 pages.
Certificate of Grant, dated Apr. 7, 2016, received in Australian Patent Application No. 2016100293, which corresponds with U.S. Appl. No. 14/864,737, 1 page.
Office Action, dated Apr. 5, 2016, received in Danish Patent Application 201500577, which corresponds with U.S. Appl. No. 14/864,737, 7 pages.
Certificate of Grant, dated Mar. 24, 2016, received in Australian Patent Application No. 2016100254, which corresponds with U.S. Appl. No. 14/866,981, 1 page.
Office Action, dated Mar. 18, 2016, received in Danish Patent Application No. 201500575, which corresponds with U.S. Appl. No. 14/866,981, 9 pages.
Certificate of Grant, dated Mar. 24, 2016, received in Australian Patent Application No. 2016100251, which corresponds with U.S. Appl. No. 14/866,159, 1 page.
Office Action, dated Mar. 9, 2016, received in Danish Patent Application No. 201500574, which corresponds with U.S. Appl. No. 14/866,159, 11 pages.
Certificate of Grant, dated Mar. 24, 2016, received in Australian Patnet Application No. 2016100247, which corresponds with U.S. Appl. No. 14/868,078, 1 page.

(56) References Cited

OTHER PUBLICATIONS

Office Action, dated Mar. 30, 2016, received in Danish Patent Application No. 201500588, which corresponds with U.S. Appl. No. 14/868,078, 9 pages.
Office Action, dated Apr. 4, 2016, received in Danish Patent Application No. 201500582, which corresponds with U.S. Appl. No. 14/863,432, 10 pages.
Office Action, dated Mar. 22, 2016, received in Danish Patent Application No. 201500576, which corresponds with U.S. Appl. No. 14/866,989, 10 pages.
Office Action, dated Mar. 28, 2016, received in U.S. Appl. No. 14/869,899, 17 pages.
Office Action, dateed Feb. 3, 2016, received in Danish Patent Application No. 201500592, which corresponds with U.S. Appl. No. 14/866,989, 9 pages.
Office Action, dated Mar. 4, 2016, received in U.S. Appl. No. 14/866,992, 30 pages.
Office Action, dated Mar. 18, 2016, received in Danish Patent Application No. 201500593, which corresponds with U.S. Appl. No. 14/866,992, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Office Action, dated Jan. 25, 2016, received in U.S. Appl. No. 14/864,580, 29 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated Apr. 6, 2016, received in Danish Patent Application No. 201500596, which corresponds with U.S. Appl. No. 14/870,882, 7 pages.
Office Action, dated Apr. 7, 2016, received in Danish Patent Application No. 201500597, which corresponds with U.S. Appl. No. 14/871,227, 7 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.

Office Action, dated Mar. 18, 2016, received in Danish Patent Application No. 201500594, which corresponds with U.S. Appl. No. 14/867,823, 10 pages.
Office Action, dated Mar. 21, 2016, received in Danish Patent Application No. 201500598, which corresponds with U.S. Appl. No. 14/867,892, 9 pages.
Certificate of Grant, dated Mar. 24, 2016, received in Australian Patent Application No. 20161002253, which corresponds with U.S. Appl. No. 14/867,990, 1 page.
Office Action, dated Mar. 18, 2016, received in Danish Patent Application No. 201500581, which corresponds with U.S. Appl. No. 14/867,990, 9 pages.
International Search Report and Written Opinion, dated Dec. 10, 2010, received in International Patent Application No. PCT/US2010/050057, which corresponds with U.S. Appl. No. 12/888,381, 9 pages.
International Preliminary Search Report and Patentability, dated Oct. 9, 2012, received in International Patent Application No. PCT/US2010/050057, which corresponds with U.S. Appl. No. 12/888,381, 6 pages.
Extedded European Search Report, dated Nov. 6, 2015, received in European Patent Application No. 15183980.0, which corresponds with U.S. Appl. No. 14/536,426, 7 pages.
International Preliminary Report on Patentability, dated Jun. 30, 2015, received in International Patent Application No. PCT/US2013/069479, which corresponds with U.S. Appl. No. 14/608,926, 11 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Flixel, "Cinemagraph Pro for Mac", https://flixel.com/products/mac/cinemagraph-pro, 2014, 7 pages.
Gardner, "Recenz—Recent Apps in One Tap", You Tube, https://www.youtube.com/watch?v-qailSHRgsTo, May 15, 2015, 1 page.
IBM et al., "Pressure-Sensitive Icons", IBM Technical Disclosure Bulletin, vol. 33, No. 1B, Jun. 1, 1990, 3 pages.
IPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.

(56) References Cited

OTHER PUBLICATIONS

Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Phonebuff, "How to Pair Bluetooth on the iPhone", https://www.youtube.com/watch?v=LudNwEar9A8, Feb. 8, 2012, 3 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
VGJFeliz, "How to Master Android Lollipop Notifications in Four Minutes!", https://www.youtube.com/watch?v=S-zBRG7GJgs, Feb. 8, 2015, 5 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Office Action, dated Oct. 18, 2016, received in Australian Patent Application No. 2013368440, which corresponds with U.S. Appl. No. 14/536,426, 3 pages.

Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Final Office Action, dated May 6, 2016, received in U.S. Appl. No. 14/536,426, 23 pages.
Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Certificate of Grant, dated Jul. 29, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Nov. 11, 2016, received in European Patent Application No. 13795392.3, which corresponds with U.S. Appl. No. 14/608,926, 6 pages.
Office Action, dated May 12, 2016, received in Korean Patent Application No. 10-2015-7018853, which corresponds with U.S. Appl. No. 14/608,926, 4 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated May 31, 2016, received in European Patent Application No. 13724102.2, which corresponds with U.S. Appl. No. 14/536,646, 3 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Certificate of Grant, dated Jul. 7, 2016, received in Australian Patent Application No. 2013368443, which corresponds with U.S. Appl. No. 14/536,141, 3 pages.
Office Action, dated Oct. 7, 2016, received in European Patent Application No. 13798464.7, which corresponds with U.S. Appl. No. 14/608,942, 7 pages.
Office Action, dated Jul. 4, 2016, received in Japanese Patent Application No. 2015-549393, which corresponds with U.S. Appl. No. 14/536,141, 4 pages.
Office Action, dated Aug. 1, 2016, received in U.S. Appl. No. 14/536,203, 14 pages.
Notice of Allowance, dated Jun. 15, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259630, which corresponds with U.S. Appl. No. 14/536,203, 3 pages.

(56) References Cited

OTHER PUBLICATIONS

Office Action, dated May 31, 2016, received in European Patent Application No. 13724104.8, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Jul. 22, 2016, received in European Office Action No. 13798465.4, which corresponds with U.S. Appl. No. 14/608,965, 8 pages.
Office Action, dated Oct. 20, 2016, received in U.S. Appl. No. 14/536,247, 10 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Office Action, dated Nov. 4, 2016, received in Korean Patent Application No. 10-2015-7019984, which corresponds with U.S. Appl. No. 14/608,985, 8 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.

Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Office Action, dated May 10, 2016, received in Australian Patent Application No. 2016100254, which corresponds with U.S. Appl. No. 14/866,981, 6 pages.
Patent, dated Nov. 2, 2016, received in Australian Patent Application No. 2016100254, which corresponds with U.S. Appl. No. 14/866,981, 1 page.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 202016000156.9, which corresponds with U.S. Appl. No. 14/868,078, 3 pages.
Office Action (Search Report), dated Mar. 30, 2016, received in Australian Patent Application No. 201500588, which corresponds with U.S. Appl. No. 14/868,078, 9 pages.
Office Action, dated Sep. 2, 2016, received in Australian Patent Application No. 201500588, which corresponds with U.S. Appl. No. 14/868,078, 4 pages.
Office Action, dated May 9, 2016, received in U.S. Appl. No. 14/863,432, 26 pages.
Notice of Allowance, dated Nov. 14, 2016, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Office Action (Search Report), dated Apr. 4, 2016, received in Danish Patent Application No. 201500582, which corresponds with U.S. Appl. No. 14/863,432, 10 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.

(56) References Cited

OTHER PUBLICATIONS

Patent, dated Aug. 8, 2016, received in Australian Patent Application 2016100653, corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Final Office Action, dated Jul. 29, 2016, received in U.S. Appl. No.. 14/866,992, 35 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Notice of Allowance, dated Aug. 26, 2016, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Office Action, dated Oct. 7, 2016, received in Danish Patent Application No. 201500585, which corresponds with U.S. Appl. No. 14/864,627, 3 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Oct. 28, 2016, received in Danish Patent Application No. 201500579, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Intention to Grant, dated Jun. 10, 2016, received in Danish Patent Application No. 201500587, which corresponds with U.S. Appl. No. 14/866,987, 2 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Certificate of Exam, dated Jul. 21, 2016, received in Australian Patent Application No. 2016100652, which corresponds with U.S. Appl. No. 14/866,989, 1 page.
Intention to Grant, dated Jun. 10, 2016, received in Danish Patent Application No. 201500589, which corresponds with U.S. Appl. No. 14/866,989, 2 pages.
Notice of Allowance, dated Nov. 1, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Final Office Action, dated Nov. 4, 2016, received in U.S. Appl. No. 14/871,236, 24 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Search Report, dated May 26, 2016, received in Danish Patent Application No. 201500595, which corresponds with U.S. Appl. No. 14/871,236, 14 pages.
Office Action and Additional Search Report, dated Sep. 30, 2016, received in Danish Patent Application No. 201500595, which corresponds with U.S. Appl. No. 14/871,236, 10 pages.

(56) References Cited

OTHER PUBLICATIONS

Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action and Search Report, dated Jun. 9, 2016, received in Danish Patent Application No. 201500596, which corresponds with U.S. Appl. No. 14/870,882, 9 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Office Action, dated Apr. 29, 2016, received in U.S. Appl. No. 14/867,823, 28 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Office Action, dated May 10, 2016, received in U.S. Appl. No. 14/867,892, 28 pages.
Final Office Action, dated Nov. 2, 2016, received in U.S. Appl. No. 14/867,892, 48 pages.
Office Action, Sep. 14, 2016, received in Danish Patent Application No. 201500598, which corresponds with U.S. Appl. No. 14/867,892, 4 pages.
Office Action, dated May 23, 2016, received in Australian Patent Application No. 2016100253, which corresponds with U.S. Appl. No. 14/867,990, 5 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Sep. 26, 2016, received in Danish Patent Application No. 201500581, which corresponds with U.S. Appl. No. 14/867,990, 5 pages.

Office Action, dated Nov. 25, 2016, received in U.S. Appl. No. 15/081,771, 17 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
Office Action (Search Report), dated Nov. 10, 2016, received in Danish Patent Application No. 201670591, which corresponds with U.S. Appl. No. 15/231,745, 12 paegs.
Office Action and Search Report, dated Oct. 26, 2016, received in Danish Patent Application No. 201670592, which corresponds with U.S. Appl. No. 15/231,745, 8 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Apr. 25, 2016, received in International Patent Application No. PCT/US2016/018758, which corresponds with U.S. Appl. No.. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
Angelov, "Sponsor Flip Wall With Jquery & CSS", Tutorialzine. N.p., Mar. 24, 2010, Web. http://tutorialzine.com/2010/03/sponsor-wall-slip-jquery-css/, Mar. 24, 2010, 8 pages.
Anonymous, "Notifications, Android 4.4 and Lower", Android Developers, https://developer.android.com/design/patterns/notifications_k.html, May 24, 2015, 9 pages.
Brownlee, "Android 5.0 Lollipop Feature Review!", https//www.youtube.com/watch?v=pEDQ1z1-PvU, Oct. 27, 2014, 5 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Grant, "Android's Notification Center", https://www.objc.io/issues/11-android/android-notifications, Apr. 30, 2014, 26 pages.
IPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Microsoft, "Lumia—How to Personalize Your Start Screen", https://www.youtube.com/watch?v=6GI5Z3TrSEs, Nov. 11, 2014, 3 pages.

(56) References Cited

OTHER PUBLICATIONS

YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
Office Action, dated Mar. 15, 2017, received in U.S. Appl. No. 14/535,671, 13 pages.
Office Action, dated Jun. 29, 2017, received in U.S. Appl. No. 14/608,895, 30 pages.
Notice of Allowance, dated Dec. 20, 2016, received in Australian Patent Application No. 2013368440, which corresponds with U.S. Appl. No. 14/536,426, 3 pages.
Patent, dated May 12, 2017, received in Japanese Patent Application No. 2015-547948, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Apr. 5, 2017, received in U.S. Appl. No. 14/536,367, 16 pages.
Office Action, dated May 15, 2017 received in Australian Patent Application No. 2016216580, which corresponds with U.S. Appl. No. 14/536,426, 3 pages.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Office Action, dated May 4, 2017, received in Chinese Patent Application No. 201380068414.1, which corresponds with U.S. Appl. No. 14/608,926, 5 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Patent, dated May 26, 2017, received in European Patent Application No. 13724102.2 which corresponds with U.S. Appl. No. 14/536,646, 1 page.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Notice of Allowance, dated May 12 2017, received in U.S. Appl. No. 14/608,942, 10 pages.
Office Action, dated Mar. 29, 2017, received in Australian patent Application No. 2016201303, which corresponds with U.S. Appl. No. 14/608,942, 3 pages.

Notice of Allowance, dated May 12, 2017, received in Japanese Patent Application No. 2015-549393, which corresponds with U.S. Appl. No. 14/608,942, 5 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Office Action, dated Jun. 23, 2017, received in Japanese Patent Application No. 2016173113, which corresponds with U.S. Appl. No. 14/536,203 5 pages.
Office Action, dated Feb. 6, 2017, received in Korean Patent Application No. 2016-7033834, which corresponds with U.S. Appl. No. 14/536,203, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Office Action, dated Mar. 3, 2017, received in Japanese Patent Application No. 2016-125839, which corresponds with U.S. Appl. No. 14/536,267, 6 pages.
Office Action dated Jan. 5, 2017, received in Korean Patent Application No. 2016-7029533, which corresponds with U.S. Appl. No. 14/536,267, 12 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.

(56) References Cited

OTHER PUBLICATIONS

Office Action, dated May 18, 2017, received in Dutch Patent Application No. 2016452, which corresponds with U.S. Appl. No. 14/864,737, 22 pages.
Notice of Allowance, dated Feb. 10, 2017, received in U.S. Appl. No. 14/866,981, 5 pages.
Office Action, dated Mar. 14, 2017, received in Danish Patent Application No. 201500574, which corresponds with U.S. Appl. No. 14/866,159, 5 pages.
Notice of Allowance, dated Jan. 30, 2017, received in received in Danish Patent Application No. 201500588, which corresponds with U.S. Appl. No. 14/868,078 2 pages.
Notice of Allowance, dated May 2, 2017, received in received in Danish Patent Application No. 201500588, which corresponds with U.S. Appl. No. 14/868,078, 2 pages.
Office Action, dated May 18, 2017, received in Dutch Patent Application No. 2016376, which corresponds with U.S. Appl. No. 14/868,078, 15 pages.
Notice of Allowance, dated Apr. 27, 2017, receiVed in U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Office Action, dated Jun. 12, 2017, received in Danish Patent Application No. 201500582, which corresponds with U.S. Appl. No. 14/863,432, 5 pages.
Office Action, dated May 18, 2017, received in Dutch Patent Application No. 2016801, which corresponds with U.S. Appl. No. 14/863,432, 34 pages.
Final Office Action, dated Jan. 27, 2017, received in U.S. Appl. No. 14/866,511, 26 pages.
Notice of Allowance, dated Jan. 12, 2017, received in Chinese Patent Applicatiuon No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages
Office Action, dated Jun. 9, 2017, received in Japanese Patent Application No. 2016558214, which corresponds with U.S. Appl. No. 14/866,511, 6 pages.
Notice of Allowance, dated Apr. 27, 2017, received in U.S. Appl. No. 16/866,489, 27 pages.
Notice of Allowance, dated Feb. 28, 2017, received in U.S. Appl. No. 14/869,899, 9 pages.
Office Action, dated Apr. 13, 2017, received in U.S. Appl. No. 14/866,992, 34 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Jan. 4, 2017, received in U.S. Appl. No. 14/845,217, 5 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in U.S. Appl. No. 14/857,645, 5 pages.
Office Action, dated Mar. 31, 2017, received in U.S. Appl. No. 14/857,700, 14 pages.
Notice of Allowance, dated Dec. 28, 2016, received in U.S. Appl. No. 14/864,580, 8 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.
Office Action, dated May 4, 2017, received in Danish Patent Application No. 201500585, which corresponds with U.S. Appl. No. 14/864,627, 4 pages.
Certificate of Examination, dated Dec. 8, 2016, received in Australian Patent Application No. 2016100292, which corresponds with U.S. Appl. No. 14/866,361, 1 page.
Office Action, dated Jun. 15, 2017, received in Danish Patent Application No. 201500579, which corresponds with U.S. Appl. No. 14/866,361, 2 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Office Action, dated Jun. 16, 2017, received in Japanese Patent Application No. 2016-233450, which corresponds with U.S. Appl. No. 14/866,989, 6 pages.
Notice of Allowance, dated Feb. 28, 2017, received in U.S. Appl. No. 14/871,236, 9 pages.
Office Action, dated Jun. 15, 2017, received in Danish Patent Application No. 201500595, which corresponds with U.S. Appl. No. 14/871,236, 4 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Apr. 20, 2017, received in Chinese Patent Application No. 201621044346.2, which corresponds with U.S. Appl. No. 14/871,462, 3 pages.
Office Action, dated Mar. 13, 2017, received in Japanese Patent Application No. 2016-183289, which corresponds with U.S. Appl. No. 14/871,462, 5 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated May 4, 2017, received in Danish Patent Application No. 201500598, which corresponds with U.S. Appl. No. 14/867,823, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated May 3, 2017, received in Danish Patent Application No. 201500581, which corresponds with U.S. Appl. No. 14/867,990, 5 pages.
Final Office Action, dated Jun. 2, 2017, received in U.S. Appl. No. 15/081,771, 17 pages.
Final Office Action, dated May 1, 2017, received in U.S. Appl. No. 15/136,782, 18 pages.

(56) References Cited

OTHER PUBLICATIONS

Office Action, dated May 23, 2017, received in Danish Patent Application No. 201770190, which corresponds with U.S. Appl. No. 15/136,782, 7 pages.
Office Action, dated Jan. 20, 2017. received in U.S. Appl. No. 15/231,745, 21 pages.
Office Action, dated Jun. 29, 2017, received in Danish Patent Application No. 201670587, which corresponds with U.S. Appl. No. 15/231,745, 4 pages.
Office Action, dated Jan. 5, 2017, received in Danish Patent Application No. 201670592, which corresponds with U.S. Appl. No. 15/231,745, 3 pages.
Extended European Search Report, dated Mar. 15, 2017, recived in European Patent Application No. 17153418.3, which corresponds with U.S. Appl. No. 14/536,648, 7 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Office Action, dated Jun. 16, 2017, received in Chinese Patent Application No. 201380068295.X, which corresponds with U.S. Appl. No. 14/608,942, 6 pages.
Patent, dated Jun. 16, 2017, received in Japanese Patent Application No. 2015-549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.
Office Action, dated Jul. 21, 2017, received in Australian Patent Application No. 2016216658, which corresponds with U.S. Appl. No. 14/536,291, 3 pages.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Grant, dated Jul. 21, 2016, received in Dutch Patent Application No. 2016801, which corresponds with U.S. Appl. No. 14/871,227, 8 pages.
Notice of Allowance, dated Jul. 14, 2017, received in Japanese Patent Application No. 2016558214, which corresponds with U.S. Appl. No. 14/866,511, 5 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated Jul. 31, 2017, received in Japanese Patent Application No. 2017126445, which corresponds with U.S. Appl. No. 14/866,987, 6 pages.
Office Action, dated Aug. 4, 2017, received in Japanese Patent Application No. 2016-533201, which corresponds with U.S. Appl. No. 14/871,227, 6 pages.
Office Action, dated Jul. 6, 2017, received in U.S. Appl. No. 14/867,892, 55 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.
Office Action, dated Jul. 9, 2015, received in Australian Patent Application No. 2013259630, which corresponds with U.S. Appl. No. 14/536,203, 3 pages.
International Preliminary Report on Patentability, dated Jun. 30, 2015, received in International Patent Application No. PCT/US2013/069472, which corresponds with U.S. Appl. No. 14/608,895, 18 pages.
International Preliminary Report on Patentability, dated Jun. 30, 2015, received in International Application No. PCT/2013/069483, which corresponds to U.S. Appl. No. 14/608,942, 13 pages.
International Preliminary Report on Patentability, dated Jun. 30, 2015, received in International Patent Application No. PCT/US2013/069484, which corresponds with U.S. Appl. No. 14/608,965, 12 pages.
International Preliminary Report on Patentability, dated Jun. 30, 2015, received in International Patent Application No. PCT/US2013/069486, which corresponds with U.S. Appl. No. 14/608,985, 19 pages.

(56) References Cited

OTHER PUBLICATIONS

International Preliminary Report on Patentability, dated Jun. 30, 2015, received in International Patent Application No. PCT/US2013/069489, which corresponds with U.S. Appl. No. 14/609,006, 10 pages.
Bautisa, "Microsoft Mathematics Tutorial 7—The Ink Input", <URL:http://mathandmultimedia.com/2012/05/23/microsoft-math-tutorial-7-ink>, May 23, 2012, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Forlines, et al., "Glimpse: a Novel Input Model for Multi-level Devices", Chi '05 Extended Abstracts on Human Factors in Computing Systems, Apr. 2, 2005, 4 pages.
Harrison, "Stylus-Based Interface with Full Mouse Emulation", IBM Technical Disclosure Bulletin, vol. 34, No. 10B, Mar. 1, 1992, 3 pages.
Kaaresoja, et al., "Snap-Crackle-Pop: Tactile Feedback for Mobile Touch Screens", Proceedings of Eurohaptics vol. 2006, Jul. 3, 2006, 2 pages.
Minsky, "Computational Haptics the Sandpaper System for Synthesizing Texture for a Force-Feedback Display," Massachusetts Institute of Technology, Jun. 1978, 217 pages.
O'Hara, et al., "Pressure-Sensitive Icons", ip.com Journal, Jun. 1, 1990, 2 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011, 10 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.

International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, 14 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, 7 pages.
International Search Report and Written Opinion dated Apr. 7, 2014, received in International Application No. PCT/US2013/069483, 18 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14,536,203, 9 pages.
Invitation to Pay Additional Fees dated Apr. 17, 2014, received in International Application No. PCT/US2013/069484, 7 pages.
International Search Report and Written Opinion dated Jul. 9, 2014, received in International Application No. PCT/US2013/069484, 17 pages.
Invitation to Pay Additional Fees dated Sep. 25, 2013, received in International Application No. PCT/US2013/040098, which corresponds to U.S. Appl. No. 14/536,247, 8 pages.
International Search Report and Written Opinion dated Feb. 5, 2014, received in International Application No. PCT/US2013/040098, which corresponds to U.S. Appl. No. 14/536,247, 35 pages.

(56) References Cited

OTHER PUBLICATIONS

International Preliminary Report on Patentability dated Nov. 20, 2014, received in International Application No. PCT/2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Appl. No. 14/536,267, 7 pages.
International Search Report and Written Opinion dated Jan. 27, 2014, received in International Application No. PCT/US2013/040101, 30 pages.
International Preliminary Report on Patentability dated Nov. 20, 2014, received in International Application No. PCT/2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, 30 pages.
International Preliminary Report on Patentability dated Nov. 20, 2014, received in International Application No. PCT/2013/040108, which corresponds to U.S. Appl. No. 14/536,291, 25 pages.
Invitation to Pay Additional Fees dated Apr. 1, 2014, received in International Application No. PCT/US2013/069486, 7 pages.
International Search Report and Written Opinion dated Jun. 2, 2014, received in International Application No. PCT/US2013/069486, 7 pages.
International Search Report and Written Opinion dated Mar. 6, 2014, received in International Application No. PCT/US2013/069489, 12 pages.
International Search Report and Written Opinion dated Sep. 30, 2014, received in International Application No. PCT/US2014/047303, 10 pages.
Office Action, dated Aug. 27, 2015, received in Australian Patent Application No. 2013259614, which corresponds with U.S. Appl. No. 14/536,141, 4 pages.
Office Action, dated Aug. 10, 2015, received in Australian Patent Application No. 2013259637, which corresponds with U.S. Appl. No. 14/536,203, 3 pages.
Office Action, dated Aug. 18, 2015, received in Australian Patent Application No. 2013259642, which corresponds with U.S. Appl. No. 14/536,291, 3 pages.
MacKenzie et al., "The Tactile Touchpad", Chi '97 Extended Abstracts on Human Factors in Computing Systems Looking to the Future, Chi '97, Mar. 22, 1997, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "HTC One Favorite Camera Features", http://www.youtube.com/watch?v=sUYHfcjl4RU, Apr. 28, 2013, 3 pages.
Office Action, dated Nov. 30, 2017, received in U.S. Appl. No. 14/535,671, 21 pages.
Office Action, dated Feb. 22, 2018, received in U.S. Appl. No. 14/608,895, 20 pages.
Office Action, dated Nov. 6, 2017, received in Chinese Patent Application No. 201380068493.6, which corresponds with U.S. Appl. No. 14/608,895, 5 pages.
Notice of Allowance, dated Nov. 30, 2017, received in U.S. Appl. No. 14/536,367, 9 pages.
Certificate of Grant, dated Nov. 10, 2017, received in Hong Kong Patent Application No. 15107535.0, which corresponds with U.S. Appl. No. 14/536,426, 2 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Feb. 12, 2018, received in U.S. Appl. No. 14/536,464, 33 pages.
Notice of Acceptance, dated Dec. 20, 2017, received in Australian Patent Application No. 2016201451, which corresponds with U.S. Appl. No. 14/608,926, 3 pages.
Oral Summons, dated Feb. 13, 2017, received in European Patent Application No. 13795392.3, which corresponds with U.S. Appl. No. 14/608,926, 11 pages.
Notice of Allowance, dated Dec. 29, 2017, received in Korean Patent Application No. 2017-7018250, which corresponds with U.S. Appl. No. 14/608,926, 3 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Office Action, dated Feb. 2, 2018, received in Chinese Patent Application No. 201380035893.7, which corresponds with U.S. Appl. No. 14/536,141, 5 pages.
Office Action, dated Oct. 25, 2017, received in Chinese Patent Application No. 201380035977.0, which corresponds with U.S. Appl. No. 14/536,203, 5 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Notice of Allowance, dated Oct. 30, 2017, received in Korean Patent Application No. 2016-7033834, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.
Notice of Allowance, dated Jan. 29, 2018, received in Chinese Patent Application No. 201380035968.1, which corresponds with U.S. Appl. No. 14/536,267, 3 pages.
Office Action, dated Jan. 25, 2018, received in European Patent Application No. 13724106.3, which corresponds with U.S. Appl. No. 14/536,267, 5 pages.
Notice of Allowance, dated Nov. 17, 2017, received in Japanese Patent Application No. 2016-125839, which corresponds with U.S. Appl. No. 14/536,267, 5 pages.
Patent, dated Dec. 1, 2017, received in Korean Patent Application No. 2016-7029533, which corresponds with U.S. Appl. No. 14/536,267, 2 pages.
Notice of Allowance, dated Dec. 1, 2017, received in U.S. Appl. No. 14/536,291, 19 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Patent, dated Dec. 8, 2017, received in Chinese Patent Application No. 201380068399.0, which corresponds with U.S. Appl. No. 14/608,985, 4 pages.
Summons, dated Oct. 6, 2017, received in European Patent Application No. 13811032.5, which corresponds with U.S. Appl. No. 14/608,985, 6 pages.
Patent, dated Dec. 19, 2017, received in Korean Patent Application No. 2015-7019984, which corresponds with U.S. Appl. No. 14/608,985, 3 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.

(56) References Cited

OTHER PUBLICATIONS

Office Action, dated Feb. 14, 2018, received in Korean Patent Application No. 2017-7030129, which corresponds with U.S. Appl. No. 14/864,737, 17 pages.
Patent, Nov. 16, 2017, received in Dutch Patent Application No. 2016375, which corresponds with U.S. Appl. No. 14/866,981, 2 pages.
Office Action, dated Dec. 15, 2017, received in U.S. Appl. No. 14/866,159, 35 pages.
Office Action, dated Jan. 10, 2018, received in Danish Patent Application No. 201500574, which corresponds with U.S. Appl. No. 14/866,159, 2 pages.
Office Action, dated Oct. 6, 2017, received in U.S. Appl. No. 141868,078, 40 pages.
Certificate of Grant, dated Jan. 3, 2018, received in Australian Patent Application No. 2016229421, which corresponds with U.S. Appl. No. 14/868,078, 1 page.
Notice of Allowance, dated Oct. 4, 2017, received in U.S. Appl. No. 14/866,511, 37 pages.
Office Action, dated Nov. 24, 2017, received in European Patent Application No. 16727900.9, which corresponds with U.S. Appl. No. 14/866,511, 5 pages.
Office Action, dated Jan. 29, 2018, received in Danish Patent Application No. 201500592, which corresponds with U.S. Appl. No. 14/869,899, 2 pages.
Office Action, dated Dec. 14, 2017, received in Danish Patent Application No. 201670594, which corresponds with U.S. Appl. No. 14/869,899, 3 pages.
Final Office Action, dated Oct. 3, 2017, received in U.S. Appl. No. 14/866,992, 37 pages.
Office Action, dated Jan. 29, 2018, received in U.S. Appl. No. 14/866,992, 44 pages.
Office Action, dated Jan. 19, 2018, received in Australian Patent Application No. 201761478, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 Pages.
Final Office Action, dated Oct. 4, 2017, received in U.S. Appl. No. 14/856,517, 33 pages.
Final Office Action, dated Nov. 15, 2017, received in U.S. Appl. No. 14/856,519, 31 pages.
Notice of Allowance, dated Jan. 31, 2018, received in U.S. Appl. No. 14/856,519, 9 pages.
Notice of Allowance, dated Feb. 9, 2018, received in U.S. Appl. No. 14/856,522, 9 pages.
Office Action, dated Nov. 30, 2017, received in U.S. Appl. No. 14/857,636, 19 pages.
Notice of Allowance, dated Oct. 31, 2017, received in Danish Patent Application No. 201500596, which corresponds with U.S. Appl. No. 14/870,882, 2 pages.
Patent, dated Jan. 29, 2018, received in Danish Patent Application No. 201500596, which corresponds with U.S. Appl. No. 14/870,882, 4 pages.
Final Office Action, dated Feb. 16, 2018, received in U.S. Appl. No. 14/870,988, 18 pages.
Office Action, dated Nov. 22, 2017, received in U.S. Appl. No. 14/871,227, 24 pages.
Office Action, dated Oct. 16, 2017, received in Australian Patent Application No. 2016203040, which corresponds with U.S. Appl. No. 14/871,227, 5 pages.
Notice of Allowance, dated Jan. 4, 2018, received in Japanese Patent Application No. 2016-533201, which corresponds with U.S. Appl. No. 14/871,227, 4 pages.
Office Action, dated Oct. 26, 2017, received in U.S. Appl. No. 14/871,336, 22 pages.
Patent, dated Oct. 30, 2017, Danish Patent Application No. 201500601, which corresponds with U.S. Appl. No. 14/871,336, 5 pages.

Office Action, dated Oct. 16, 2017, received in U.S. Appl. No. 14/871,462, 26 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Nov. 13, 2017, received in Japanese Patent Application No. 2016-183289, which corresponds with U.S. Appl. No. 14/871,462, 5 pages.
Final Office Action, dated Nov. 29, 2017, received in U.S. Appl. No. 14/867,823, 47 pages.
Office Action, dated Jan. 23, 2018, received in Danish Patent Application No. 201500594, which corresponds with U.S. Appl. No. 14/867,823, 8 pages.
Final Office Action, dated Dec. 14, 2017, received in U.S. Appl. No. 14/867,892, 53 pages.
Office Action, dated Oct. 31, 2017, received in Danish Patent Application No. 201500598, which corresponds with U.S. Appl. No. 14/867,892, 2 pages.
Notice of Allowance, dated Jan. 26, 2018, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Feb. 19, 2018, received in Danish Patent Application No. 201500581, which corresponds with U.S. Appl. No. 14/867,990, 4 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Notice of Allowance, dated Oct. 20, 2017, received in U.S. Appl. No. 15/136,782, 9 pages.
Office Action, dated Jan. 8, 2018, received in Danish Patent Application No. 201770190, which corresponds with U.S. Appl. No. 15/136,782, 2 pages.
Office Action, dated Jan. 10, 2018, received in Danish Patent Application No. 201670590, which corresponds with U.S. Appl. No. 15/231,745, 2 pages.
Office Action, dated Jan. 30, 2018, received in Danish Patent Application No. 201670592, which corresponds with U.S. Appl. No. 15/231,745, 2 pages.
Patent, dated Oct. 30, 2017, received in Danish Patent Application No. 201670593, which corresponds with U.S. Appl. No. 15/231,745, 3 pages.
Office Action, dated Feb. 7, 2018, received in Danish Patent Application No. 201770709, 2 pages.
Office Action, dated Oct. 16, 2017, received in Danish Patent Application No. 201770710. 10 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.

(56) References Cited

OTHER PUBLICATIONS

Extended European Search Report, dated Oct. 17, 2017, received in European Patent Application No. 17184437.6, Which corresponds with U.S. Appl. No. 14/868,078, 8 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Extended European Search Report, dated Oct. 10, 2017, received in European Patent Application No. 17188507.2, which corresponds with U.S. Appl. No. 14/866,361, 9 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Sood, "Multitasking Gestures", http://cydia.saurik.com/package/org.thebigboxx.multitaskinggestures/, Mar. 3, 2014, 2 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in a Tap", https://www.youtube.com/watch?v=qailSHRgsTo, May 15, 2015, 1 page.
Certificate of Grant, dated Apr. 29, 2017, received in Australian Patent Application No. 2013368440, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Aug. 21, 2017, received in European Patent Application No. 15183980.0, which corresponds with U.S. Appl. No. 14/536,426, 3 pages.
Final Office Action, dated Aug. 25, 2017, received in U.S. Appl. No. 14/536,464, 30 pages.
Office Action, dated Sep. 25, 2017, received in U.S. Appl. No. 14/536,644, 29 pages.
Office Action, dated Aug. 22, 2017, received in Korean Patent Application No. 2017-7018250, which corresponds with U.S. Appl. No. 14/608,926, 2 pages.
Notice of Allowance, dated Sep. 20, 2017, received in U.S. Appl. No. 14/536,141, 10 pages.
Patent, dated Jul. 28, 2017, received in Japanese Patent Application No. 2015-511646, which corresponds with U.S. Appl. No. 14/536,141, 3 pages.
Office Action, dated Sep. 13, 2017, received in European Patent Application No. 16177863.4, which corresponds with U.S. Appl. No. 14/608,985, 4 pages.
Notice of Allowance, dated Sep. 1, 2017, received in Korean Patent Application No. 2016-7029533, which corresponds with U.S. Appl. No. 14/536,267, 4 pages.
Notice of Allowance, dated Sep. 19, 2017, received in Chinese Patent Application No. 201380068399.0, which corresponds with U.S. Appl. No. 14/608,985, 3 pages.
Office Action, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Patent, dated Jul. 28, 2017, received in Japanese Patent Application No. 2016-558331, which corresponds with U.S. Appl. No. 14/864,737, 3 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.

Notice of Allowance, dated Sep. 1, 2017, received in Korean Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Patent, dated Aug. 18, 2017, received in Japanese Patent Application No. 2016558214, which corresponds with U.S. Appl. No. 14/866,511, 3 pages.
Office Action, dated Sep. 5, 2017, received in Danish Patent Application No. 201500593, which corresponds with U.S. Appl. No. 14/866,992, 6 pages.
Office Action, dated Sep. 22, 2017, received in Japanese Patent Application No. 2017-029201, which corresponds with U.S. Appl. No. 14/857,636 8 pages.
Notice of Allowance, dated Sep. 22, 2017, received in Japanese Patent Application No. 2016-233449, which corresponds with U.S. Appl. No. 14/866,987, 5 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Final Office Action, dated Aug. 18, 2017, received in U.S. Appl. No. 14/869,873, 20 pages.
Office Action, dated Aug. 29, 2017, received in Korean Patent Application No. 2017-7014536, which corresponds with U.S. Appl. No. 15/081,771, 5 pages.
Notice of Allowance, dated Jul. 6, 2017, received in U.S. Appl. No. 15/231,745, 18 pages.
Office Action, dated Aug. 30, 2017, received in U.S. Appl. No. 15/655,749, 22 pages.
Extended European Search Report, dated Sep. 11, 2017, received in European Patent Application No. 17163309.2, which corresponds with U.S. Appl. No. 14/866,987, 8 pages.
Easton-Ellett, "Three Free Cydia Utilies to Remove iOS Notification Badges", http://www.ijailbreak.com/cydia/three-free-cydia-utilies-to-remove-ios-notification-badges, Apr. 14, 2012, 2 pages.
IPhoneHackstv, "Confero allows you to easily manage your Badge notifications—iPhone Hacks", youtube, https://wwwyoutube.com/watch?v=JCk61pnL4SU, Dec. 26, 2014, 3 pages.
Mandi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
YouTube, "Android Lollipop Lock-Screen Notification Tips", https://www.youtube.com/watch?v=LZTxHBOwzIU, Nov. 13, 2014, 3 pages.
Office Action, dated Mar. 9, 2018, received in European Patent Application No. 13795391.5, which corresponds with U.S. Appl. No. 14/536,426, 4 pages.
Final Office Action, dated Feb. 26, 2018, received in U.S. Appl. No. 14/536,235, 13 pages.
Office Action, dated May 8, 2018, received in Australian Patent Application No. 2016216580, which corresponds with U.S. Appl. No. 14/536,426, 5 pages.
Notice of Allowance, dated May 10, 2018, received in Chinese Patent Application No. 201380035982.1, which corresponds with U.S. Appl. No. 14/536,426, 2 pages.
Intention to Grant, dated Mar. 9, 2018, received in European Patent Application No. 15183980.0, which corresponds with U.S. Appl. No. 14/536,426, 5 pages.
Final Office Action, dated May 3, 2018, received in U.S. Appl. No. 14/536,644, 28 pages.

(56) References Cited

OTHER PUBLICATIONS

Certificate of Grant, dated May 3, 2018, received n Australian Patent Application No. 2016201451, which corresponds with U.S. Appl. No. 14/608,926, 1 page.
Notice of Allowance, dated Feb. 8, 2018, received in Chinese Patent Application No. 201380068414.1, which corresponds with U.S. Appl. No. 14/608,926, 2 pages.
Office Action, dated Apr. 9, 2018, received in European Patent Application No. 13726053.5, which corresponds with U.S. Appl. No. 14/536,141, 9 pages.
Notice of Acceptance, dated Mar. 7, 2018, received in Australian patent Application No. 2016201303, which corresponds with U.S. Appl. No. 14/608,942, 3 pages.
Office Action, dated Mar. 28, 2018, received in Chinese Patent Application No. 201380068295.X, which corresponds with U.S. Appl. No. 14/608,942, 5 pages.
Notice of Allowance, dated Feb. 28, 2018, received in U.S. Appl. No. 14/536,166, 5 pages.
Notice of Allowance, dated Apr. 4, 2018, received in Chinese Patent Application No. 201380035977.0, which corresponds with U.S. Appl. No. 14/536,203, 3 pages.
Patent, dated Feb. 16, 2018, received in Japanese Patent Application No. 2016173113, which corresponds with U.S. Appl. No. 14/536,203, 3 pages.
Oral Proceedings, dated Mar. 7, 2018, received in European Office Action No. 13798465.4, which corresponds with U.S. Appl. No. 14/608,965, 5 pages.
Notice of Acceptance, dated Feb. 27, 2018, received in Australian Patent Application No. 2016204411, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Notice of Allowance, dated Mar. 21, 2018, received in Danish Patent Application No. 201500574, which corresponds with U.S. Appl. No. 14/866,159, 2 pages.
Office Action, dated Apr. 25, 2018, received in European Patent Application No. 16708916.8, which corresponds with U.S. Appl. No. 14/868,078, 6 pages.
Notice of Allowance, dated Apr. 24, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Office Action, dated Mar. 13, 2018, received in U.S. Appl. No. 15/009,688, 10 pages.
Notice of Allowance, dated May 2, 2018, received in U.S. Appl. No. 14/856,519, 10 pages.
Final Office Action, dated Nov. 16, 2017, received in U.S. Appl. No. 14/856,520, 41 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.
Notice of Allowance, dated Mar. 16, 2018, received in Danish Patent Application No. 201500579, which corresponds with U.S. Appl. No. 14/866,361, 2 pages.
Office Action, dated May 7, 2018, received in European Patent Application No. 16189421.7, which corresponds with U.S. Appl. No. 14/866,987, 5 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Office Action, dated Feb. 26, 2018, received in Australian Patent Application No. 2017201079, which corresponds with U.S. Appl. No. 14/866,989, 6 pages.
Patent, dated Mar. 9, 2018, received in Japanese Patent Application No. 2016-233450, which corresponds with U.S. Appl. No. 14/866,989, 4 pages.
Notice of Allowance, dated Apr. 26, 2018, received in Danish Patent Application No. 201500595, which corresponds with U.S. Appl. No. 14/871,236, 2 pages.
Final Office Action, dated Mar. 9, 2018, received in U.S. Appl. No. 14/870,754, 19 pages.
Final Office Action, dated Apr. 20, 2018, received in U.S. Appl. No. 14/870,882, 7 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Final Office Action, dated Mar. 15, 2018, received in U.S. Appl. No. 14/871,336, 23 pages.
Office Action, dated Apr. 2, 2018, received in Japanese Patent Application No. 2018-020324, which corresponds with U.S. Appl. No. 14/874,336, 4 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Office Action, dated Feb. 28, 2018, received in U.S. Appl. No. 14/869,261, 26 pages.
Notice of Allowance, dated Mar. 30, 3018, received in U.S. Appl. No. 14/867,990, 5 pages.
Office Action, dated Apr. 19, 2018, received in U.S. Appl. No. 14/869,703, 19 pages.
Office Action, dated May 4, 2018, received in Australian Patent Application No. 2018202855, which corresponds with U.S. Appl. No. 15/136,782, 3 pages.
Notice of Allowance, dated Mar. 19, 2018, received in Danish Patent Application No. 201770190, which corresponds with U.S. Appl. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Apr. 11, 2018, received in Danish Patent Application No. 201670591, which corresponds with U.S. Appl. No. 15/231,745, 3 pages.
Notice of Allowance, dated Mar. 27, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.

(56) References Cited

OTHER PUBLICATIONS

Office Action, dated Apr. 20, 2018, received in European Patent Application No. 16756862.5, which corresponds with U.S. Appl. No. 15/272,345, 15 pages.
Office Action, dated Mar. 7, 2018, received in U.S. Appl. No. 15/482,618, 7 pages.
Office Action, dated Apr. 23, 2018, received in U.S. Appl. No. 15/499,691, 29 pages.
Final Office Action, dated May 10, 2018, received in U.S. Appl. No. 15/655,749, 19 pages.
Extended European Search Report, dated Mar. 2, 2018, received in European Patent Application No. 17206374.5, which corresponds with U.S. Appl. No. 15/272,343, 11 pages.
Notice of Allowance, dated May 16, 2018, received in U.S. Appl. No. 14/536,367, 5 pages.
Patent, dated May 4, 2018, received in Chinese Patent Application No. 201380068414.1, which corresponds with U.S. Appl. No. 14/608,926, 4 pages.
Patent, dated Apr. 27, 2018, received in Japanese Patent Application No. 2017-024234, which corresponds with U.S. Appl. No. 14/608,926, 3 pages.
Notice of Allowance, dated Mar. 20, 2018, received in U.S. Appl. No. 14/536,291, 5 pages.
Notice of Allowance, dated May 18, 2018, received in U.S. Appl. No. 14/866,159, 8 pages.
Notice of Allowance, dated May 24, 2018, received in U.S. Appl. No. 14/868,078, 6 pages.
Office Action, dated May 24, 2018, received in European Patent Application No. 16727900.9, which corresponds with U.S. Appl. No. 14/866,511, 7 pages.
Final Office Action, dated May 23, 2018, received in U.S. Appl. No. 14/869,873, 18 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "Acer Liquid Z5 Duo User's Manual", https://global-download.acer.com, Feb. 21, 2014, 65 pages.
Anonymous, "Android—What Should Status Bar Toggle Button Behavior Be?", https://ux.stackechange.com/questions/34814, Jan. 15, 2015, 2 pages.
Anonymous, "Event Handling Guide for iOS", https://github.com/lonfee88/iOSDevelopeLibrary/raw/master/EventHandlingiPhoneOS. pdf, Mar. 9, 2015, 74 pages.
Anonymous, "Event Handling Guide for iOS—GitHub", https://github.com/lonfee88/iOSDevelopeLibrary/blob/master/EventHandlingiPhoneOS.pdf, Apr. 15, 2015, 3 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Anonymous, "[new] WMP12 with Taskbar Toolbar for Windows 7—Windows Customization—WinMatrix", http://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Bilibili, "Android 5.0 Lollipop", https://www.bilibili.com/video/av1636064?from=search&seid=3128140235778895126, Oct. 19, 2014, 3 pages.
Dachis, "All the Awesome Things You Can Do With a Long Press on Your iPhone, iPad, or iPad Touch", www.lifehacker.com, Jan. 25, 2012, 4 pages.
Jauregui et al, "Design and Evaluation of 3D Cursors and Motion Parallax for the Exploration of Desktop Virtual Environments", IEEE Symposium on 3D User Interface 2012, Mar. 4, 2012, 8 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.

McGarry, "Everything You Can Do With Force Touch on Apple Watch", Macworld, www.macworld.com, May 6, 2015, 4 pages.
Neuburg, "Detailed Explanation iOS SDK", Oreilly Japan, Dec. 22, 2014, vol. 4, pp. 175-186, 15 pages.
Nickinson, "How to use Do Not Disturb on the HTC One M8", Android Central (Year: 2014), Apr. 7, 2014, 9 pages.
Ogino, iOS 7 Design Standard, Japan, Impress Japan Corporation, Nov. 21, 2013, 1st edition, pp. 58-59.
Oh, et al., "Moving Objects with 2D Input Devices in CAD Systems and Desktop Virtual Environments", Proceedings of Graphics Interface 2005, 8 pages, May 2005.
Plaisant et al, "Touchscreen Toggle Design", Proceedings of CHI '92, pp. 667-668, May 3-7, 1992, 2 pages.
Rubino et al., "How to Enable 'Living Images' on your Nokia Lumia with Windows Phone 8.1", https://www.youtube.com/watch?v=RX7vpoFy1Dg, Jun. 6, 2014, 5 pages.
Stewart, et al., "Characteristics of Pressure-Based Input for Mobile Devices", Proceedings of the SIGCHI Conference on Human Factors in Computing Systems, Apr. 2010, 10 pages.
Tweak, UltimateiDeviceVids, Cydia Tweak: Quick Center—Add 3-Touch Shortcuts to ControlCenter, https://www.youtube.com/watch?v=8rHOFpGvZFM, Mar. 22, 2016, 2 pages.
Tweak, "iCrackUriDevice, iOS 9.0.2 Jailbreak & 9.2.1-9.3 Support: QuickCenter 3D Touch Cydia Tweak!", https://www.youtube.com/watch?v=op-OBr3O_Fkl, Mar. 6, 2016, 3 pages.
UpDown-G, "Using Multiple Selection Mode in Android 4.0 / Getting Started", https://techbooster.org/android/13946, Mar. 7, 2012, 7 pages.
YouTube, "How to Use 3D Touch Multitasking on iPhone", https://www.youtube.com/watch?v=kDq05uRdrCg, Sep. 29, 2015, 1 page.
Notice of Allowance, dated Sep. 5, 2018, received in U.S. Appl. No. 14/535,671 (5448), 5 pages.
Notice of Allowance, dated Jun. 26, 2018, received in U.S. Appl. No. 14/608,895 (5839), 9 pages.
Office Action, dated Oct. 9, 2018, received in Chinese Patent Application No. 201380068493.6 (5839CN), which corresponds with U.S. Appl. No. 14/608,895, 3 pages.
Patent, dated Dec. 25, 2018, received in Chinese Patent Application No. 201380068493.6 (5839CN), which corresponds with U.S. Appl. No. 14/608,895, 4 pages.
Intention to Grant, dated Jul. 6, 2018, received in European Patent Application No. 13795391.5 (5839EP), which corresponds with U.S. Appl. No. 14/536,426, 5 pages.
Certificate of Grant, dated Dec. 26, 2018, received in European Patent Application No. 13795391.5 (5839EP), which corresponds with U.S. Appl. No. 14/536,426, 4 pages.
Office Action, dated Oct. 5, 2018, received in Korean Patent Application No. 2018-7028236 (5839KR01), which corresponds with U.S. Appl. No. 14/608,895, 6 pages.
Notice of Allowance, dated Aug. 15, 2018, received in U.S. Appl. No. 14/536,235 (5840), 5 pages.
Notice of Allowance, dated May 17, 2018, received in Australian Patent Application No. 2016216580 (5842AU02), which corresponds with U.S. Appl. No. 14/536,426, 3 pages.
Certificate of Grant, dated Sep. 13, 2018, received in Australian Patent Application No. 2016216580 (5842AU02), which corresponds with U.S. Appl. No. 14/536,426, 1 page.
Office Action, dated Apr. 12, 2019, received in Australian Patent Application No. 2018223021 (5842AU03), which corresponds with U.S. Appl. No. 14/536,426, 3 pages.
Patent, dated Aug. 17, 2018, received in Chinese Patent Application No. 201380035982.1 (5842CN), which corresponds with U.S. Appl. No. 14/536,426, 4 pages.
Notice of Allowance, dated Aug. 8, 2018, received in Chinese Patent Application No. 201510566550.4 (5842CN01), which corresponds with U.S. Appl. No. 14/536,426, 3 pages.
Patent, dated Oct. 23, 2018, received in Chinese Patent Application No. 201510566550.4 (5842CN01), which corresponds with U.S. Appl. No. 14/536,426, 4 pages.
Intention to Grant, dated Aug. 14, 2018, received in European Patent Application No. 15183980.0 (5842EP01), which corresponds with U.S. Appl. No. 14/536,426, 5 pages.

(56) References Cited

OTHER PUBLICATIONS

Decision to Grant, dated Jan. 10, 2019, received in European Patent Application No. 15183980.0 (5842EP01), which corresponds with U.S. Appl. No. 14/536,426, 4 pages.
Patent, dated Feb. 6, 2019, received in European Patent Application No. 15183980.0 (5842EP01), which corresponds with U.S. Appl. No. 14/536,426, 4 pages.
Office Action, dated Nov. 6, 2018, received in Japanese Patent Application No. 2018-000753 (5842JP01), which corresponds with U.S. Appl. No. 14/536,426, 8 pages.
Final Office Action, dated Jun. 22, 2018, received in U.S. Appl. No. 14/536,464 (5843), 32 pages.
Office Action, dated Nov. 2, 2018, received in U.S. Appl. No. 14/536,644 (5844), 24 pages.
Office Action, dated Feb. 22, 2019, received in Japanese Patent Application No. 2018-079290 (5845JP02), which corresponds with U.S. Appl. No. 14/608,926, 7 pages.
Notice of Allowance, dated Aug. 9, 2018, received in U.S. Appl. No. 14/536,646 (5846), 5 pages.
Notice of Acceptance, dated Jul. 19, 2018, received in Australian Patent Application No. 2016262773 (5847AU01), which corresponds with U.S. Patent Application No. 14/536,141, 3 pages.
Notice of Allowance, dated Aug. 31, 2018, received in Chinese Patent Application No. 201380035893.7 (5847CN), which corresponds with U.S. Appl. No. 14/536,141, 6 pages.
Patent, dated Oct. 23, 2018, received in Chinese Patent Application No. 201380035893.7 (5847CN), which corresponds with U.S. Appl. No. 14/536,141, 4 pages.
Office Action, dated Mar. 7, 2019, received in European Patent Application No. 13726053.5 (5847EP), which corresponds with U.S. Appl. No. 14/536,141, 5 pages.
Office Action, dated Aug. 13, 2018, received in Japanese Patent Application No. 2017-141953 (5847JP01), which corresponds with U.S. Appl. No. 14/536,141, 6 pages.
Certificate of Grant, dated Jul. 5, 2018, received in Australian patent Application No. 2016201303 (5848AU01), which corresponds with U.S. Appl. No. 14/608,942, 4 pages.
Office Action, dated Oct. 8, 2018, received in Chinese Patent Application No. 201380068295.X (5848CN), which corresponds with U.S. Appl. No. 14/608,942, 3 pages.
Decision to Grant, dated Sep. 13, 2018, received in European Patent Application No. 13798464.7 (5848EP), which corresponds with U.S. Appl. No. 14/608,942, 2 pages.
Notice of Allowance, dated Jan. 15, 2019, received in Korean Patent Application No. 2015-7018448 (5848KR), which corresponds with U.S. Patent Application No. 14/608,942, 5 pages.
Patent, dated Mar. 8, 2019, received in Korean Patent Application No. 2015-7018448 (5848KR), which corresponds with U.S. Appl. No. 14/608,942, 4 pages.
Notice of Acceptance, dated Jul. 19, 2018, received in Australian Patent Application No. 2016238917 (5850AU01), which corresponds with U.S. Appl. No. 14/536,203, 3 pages.
Certificate of Grant, dated Nov. 1, 2018, received in Australian Patent Application No. 2016238917 (5850AU01), which corresponds with U.S. Appl. No. 14/536,203, 1 page.
Patent, dated Jul. 6, 2018, received in Chinese Patent Application No. 201380035977.0 (5850CN), which corresponds with U.S. Appl. No. 14/536,203, 4 pages.
Decision to Grant, dated Oct. 24, 2018, received in European Patent Application No. 13724104.8 (5850EP), which corresponds with U.S. Appl. No. 14/536,203, 5 pages.
Intention to Grant, dated Mar. 18, 2019, received in European Patent Application No. 13724104.8 (5850EP), which corresponds with U.S. Appl. No. 14/536,203, 9 pages.
Office Action, dated Oct. 19, 2018, received in Japanese Patent Application No. 2018-022394 (5850JP02), which corresponds with U.S. Patent Application No. 14/536,203, 4 pages.
Office Action, dated Jul. 2, 2018, received in U.S. Appl. No. 14/608,965 (5851), 16 pages.
Final Office Action, dated Jan. 10, 2019, received in U.S. Appl. No. 14/608,965 (5851), 17 pages.
Office action, dated Aug. 1, 2018, received in Chinese Patent Application No. 201380074060.1 (5851CN), which corresponds with U.S. Appl. No. 14/608,965, 5 pages.
Office action, dated Nov. 1, 2018, received in Chinese Patent Application No. 201380074060.1 (5851CN), which corresponds with U.S. Appl. No. 14/608,965, 3 pages.
Office action, dated Apr. 3, 2019, received in Chinese Patent Application No. 201380074060.1 (5851CN), which corresponds with U.S. Appl. No. 14/608,965, 3 pages.
Decision to Grant, dated Sep. 6, 2018, received in European Office Action No. 13798465.4 (5851EP), which corresponds with U.S. Appl. No. 14/608,965, 2 pages.
Notice of Allowance, dated Jun. 1, 2018, received in U.S. Appl. No. 14/536,267 (5853), 5 pages.
Certificate of Grant, dated Jun. 28, 2018, received in Australian Patent Application No. 2016204411 (5853AU01), which corresponds with U.S. Appl. No. 14/536,267, 4 pages.
Office Action, dated Mar. 15, 2019, received in Australian Patent Application No. 2018204236 (5853AU02), which corresponds with U.S. Appl. No. 14/5326,267, 5 pages.
Office Action, dated Nov. 28, 2018, received in Chinese Patent Application No. 201610537334.1 (5853CN01), which corresponds with U.S. Appl. No. 14/536,267, 5 pages.
Office Action, dated Jun. 13, 2018, received in Chinese Patent Application No. 201810332044.2 (5853CN02), which corresponds with U.S. Appl. No. 14/536,267, 2 pages.
Intention to Grant, dated Jun. 27, 2018, received in European Patent Application No. 13724106.3 (5853EP), which corresponds with U.S. Appl. No. 14/536,267, 5 pages.
Decision to Grant, dated Oct. 18, 2018, received in European Patent Application No. 13724106.3 (5853EP), which corresponds with U.S. Appl. No. 14/536,267, 3 pages.
Grant Certificate, dated Nov. 14, 2018, received in European Patent Application No. 13724106.3 (5853EP), which corresponds with U.S. Appl. No. 14/536,267, 3 pages. 4 pages.
Decision to Grant, dated Nov. 29, 2018, received in European Patent Application No. 16177863.4 (5853EP01), which corresponds with U.S. Appl. No. 14/536,267, 4 pages.
Patent, dated Dec. 26, 2018, received in European Patent Application No. 16177863.4 (5853EP01), which corresponds with U.S. Appl. No. 14/536,267, 4 pages.
Office Action, dated Feb. 4, 2019, received in Japanese Patent Application No. 2017-237035 (5853JP02), which corresponds with U.S. Appl. No. 14/536,267, 7 pages.
Office Action, dated Jan. 29, 2018, received in Korean Patent Application No. 2017-7034838 (5853KR02), which corresponds with U.S. Appl. No. 14/536,267, 4 pages.
Notice of Allowance, dated Dec. 3, 2018, received in Korean Patent Application No. 2017-7034838 (5853KR02), which corresponds with U.S. Appl. No. 14/536,267, 5 pages.
Patent, dated Mar. 4, 2019, received in Korean Patent Application No. 2017-7034838 (5853KR02), which corresponds with U.S. Appl. No. 14/536,267, 4 pages.
Notice of Acceptance, dated Jul. 19, 2018, received in Australian Patent Application No. 2016216658 (5854AU01), which corresponds with U.S. Appl. No. 14/536,291, 3 pages.
Patent, dated Nov. 30, 2018, received in Australian Patent Application No. 2016216658 (5854AU01), which corresponds with U.S. Appl. No. 14/536,291, 4 pages.
Intention to Grant, dated Jan. 8, 2019, received in European Patent Application No. 17186744.3 (5854EP01), which corresponds with U.S. Appl. No. 14/536,291, 7 pages.
Office Action, dated Jun. 29, 2018, received in Japanese Patent Application No. 2017-083027 (5854JP01), which corresponds with U.S. Appl. No. 14/536,291, 5 pages.
Patent, dated Feb. 22, 2019, received in Japanese Patent Application No. 2017-083027 (5854JP01), which corresponds with U.S. Appl. No. 14/536,291, 3 pages.
Notice of Allowance, dated Jan. 15, 2019, received in Japanese Patent Application No. 2017-083027 (5854JP01), which corresponds with U.S. Appl. No. 14/536,291, 5 pages.

(56) References Cited

OTHER PUBLICATIONS

Notice of Allowance, dated Apr. 20, 2018, received in U.S. Appl. No. 14/608,985 (5855), 5 pages.
Intention to Grant, dated Jan. 16, 2019, received in European Patent Application No. 13811032.5 (5855EP), which corresponds with U.S. Appl. No. 14/608,985, 9 pages.
Certificate of Grant, dated Jun. 29, 2018, received in Hong Kong Patent Application No. 15112851.6 (5855HK), which corresponds with U.S. Patent Application No. 14/608,985, 2 pages.
Office Action, dated Oct. 11, 2018, received in U.S. Appl. No. 14/609,006 (5856), 12 pages.
Final Office Action, dated Aug. 7, 2018, received in U.S. Appl. No. 14/536,648 (5858), 14 pages.
Office Action, dated Jan. 2, 2019, received in U.S. Appl. No. 14/536,648 (5858) 12 pages.
Notice of Acceptance, dated Jul. 19, 2018, received in Australian Patent Application No. 2016247194 (5858AU), which corresponds with U.S. Appl. No. 14/536,648, 3 pages.
Intention to Grant, dated Apr. 1, 2019, received in European Patent Application No. 17153418.3 (5858EP), which corresponds with U.S. Appl. No. 14/536,648, 7 pages.
Notice of Allowance, dated Feb. 4, 2019, received in Japanese Patent Application No. 2017-008764 (5858JP), which corresponds with U.S. Appl. No. 14/536,648, 5 pages.
Patent, dated Mar. 1, 2019, received in Japanese Patent Application No. 2017-008764 (5858JP), which corresponds with U.S. Appl. No. 14/536,648, 3 pages.
Office Action, dated Aug. 24, 2018, received in Japanese Patent Application No. 2017-113598 (5859JP), which corresponds with U.S. Appl. No. 14/609,042, 6 pages.
Notice of Allowance, dated Apr. 9, 2019, received in Japanese Patent Application No. 2017-113598 (5859JP), which corresponds with U.S. Appl. No. 14/609,042, 5 pages.
Notice of Allowance, dated Dec. 17, 2018, received in Korean Patent Application No. 2017-7008614 (5859KR), which corresponds with U.S. Appl. No. 14/609,042, 5 pages.
Patent, dated Mar. 8, 2019, received in Korean Patent Application No. 2017-7008614 (5859KR), which corresponds with U.S. Appl. No. 14/609,042, 4 pages.
Notice of Acceptance, dated Mar. 12, 2019, received in Australian Patent Application No. 2016233792 (7246AU01), which corresponds with U.S. Appl. No. 14/864,737, 5 pages.
Office Action, dated Sep. 11, 2018, received in Chinese Patent Application No. 201610159295.6 (7246CN), which corresponds with U.S. Appl. No. 14/864,737, 6 pages.
Notice of Allowance, dated Apr. 17, 2019, received in Chinese Patent Application No. 201610159295.6 (7246CN), which corresponds with U.S. Appl. No. 14/864,737, 3 pages.
Grant Certificate, dated Apr. 25, 2018, received in European Patent Application No. 16710871.1 (7246EP), which corresponds with U.S. Appl. No. 14/864,737, 2 pages.
Patent, dated Dec. 26, 2018, received in Korean Patent Application No. 2017-7030129 (7246KR), which corresponds with U.S. Appl. No. 14/864,737, 4 pages.
Office Action, dated Nov. 5, 2018, received in Chinese Patent Application No. 201610131415.1 (7247CN), which corresponds with U.S. Appl. No. 14/866,981, 6 pages.
Office Action, dated Jun. 5, 2018, received in Chinese Patent Application No. 201610137839.9 (7265CN), which corresponds with U.S. Appl. No. 14/866,159, 11 pages.
Notice of Allowance, dated Dec. 6, 2018, received in Chinese Patent Application No. 201610137839.9 (7265CN), which corresponds with U.S. Appl. No. 14/866,159, 3 pages.
Patent, dated Feb. 19, 2019, received in Chinese Patent Application No. 201610137839.9 (7265CN), which corresponds with U.S. Appl. No. 14/866,159, 6 pages.
Patent, dated May 22, 2018, received in Danish Patent Application No. 201500574 (7265DK), which corresponds with U.S. Appl. No. 14/866,159, 2 pages.
Office Action, dated Feb. 7, 2019, received in Australian Patent Application No. 2017258967 (7267AU03), which corresponds with U.S. Appl. No. 14/868,078, 3 page.
Office Action, dated Aug. 20, 2018, received in Chinese Patent Application No. 01610130348.1 (7267CN), which corresponds with U.S. Appl. No. 14/868,078, 6 pages.
Office Action, dated Feb. 26, 2019, received in Chinese Patent Application No. 01610130348.1 (7267CN), which corresponds with U.S. Appl. No. 14/868,078, 4 pages.
Office Action, dated Oct. 25, 2018, received in European Patent Application No. 17184437.6 (7267EP01), which corresponds with U.S. Appl. No. 14/868,078, 6 pages.
Office Action, dated Dec. 4, 2018, received in Chinese Patent Application No. 201610342313.4 (7270CN), which corresponds with U.S. Appl. No. 14/863,432, 5 pages.
Office Action, dated Dec. 5, 2018, received in Chinese Patent Application No. 201610342264.4 (7294CN), which corresponds with U.S. Appl. No. 14/866,511, 4 pages.
Office Action, dated Jan. 2, 2019, received in European Patent Application No. 16727900.9 (7294EP), which corresponds with U.S. Appl. No. 14/866,511, 5 pages.
Notice of Acceptance, dated Aug. 23, 2018, received in Australian Patent Application No. 2018204611 (7309AU01), which corresponds with U.S. Appl. No. 14/869,899, 3 pages.
Patent, dated May 28, 2018, received in Danish Patent Application No. 201500592 (7309DK), which corresponds with U.S. Appl. No. 14/869,899, 2 pages.
Office Action, dated Oct. 9, 2018, received in Danish Patent Application No. 201670594 (7309DK01), which corresponds with U.S. Appl. No. 14/869,899, 2 pages.
Patent, dated Feb. 26, 2019, received in Danish Patent Application No. 201670594 (7309DK01), which corresponds with U.S. Appl. No. 14/869,899, 3 pages.
Office Action, dated Sep. 21, 2018, received in Japanese Patent Application No. 2018-100827 (7309JP), which corresponds with U.S. Appl. No. 14/869,899, 4 pages.
Notice of Allowance, dated Mar. 1, 2019, received in Japanese Patent Application No. 2018-100827 (7309JP), which corresponds with U.S. Appl. No. 14/869,899, 5 pages.
Patent, dated Apr. 5, 2019, received in Japanese Patent Application No. 2018-100827 (7309JP), which corresponds with U.S. Patent Application No. 14/869,899, 5 pages.
Office Action, dated Oct. 5, 2018, received in Korean Patent Application No. 2018-7017213 (7309KR), which corresponds with U.S. Appl. No. 14/869,899, 3 pages.
Office Action, dated Mar. 22, 2019, received in Korean Patent Application No. 2018-7017213 (7309KR), which corresponds with U.S. Appl. No. 14/869,899, 6 pages.
Final Office Action, dated Aug. 28, 2018, received in U.S. Appl. No. 14/866,992 (7310), 52 pages.
Notice of Acceptance, dated Mar. 12, 2019, received in Australian Patent Application No. 2016304890 (7310AU01), which corresponds with U.S. Appl. No. 14/866,992, 5 pages.
Office Action, dated Oct. 12, 2018, received in European Patent Application No. 16758008.3 (7310EP), which corresponds with U.S. Appl. No. 14/866,992, 11 pages.
Office Action, dated Jan. 11, 2019, received in Japanese Patent Application No. 2018-506425 (7310JP), which corresponds with U.S. Appl. No. 14/866,992, 6 pages.
Final Office Action, dated Sep. 19, 2018, received in U.S. Appl. No. 15/009,661 (7311), 28 pages.
Notice of Allowance, dated Aug. 3, 2018, received in U.S. Appl. No. 15/009,676 (7312), 6 pages.
Notice of Allowance, dated Nov. 15, 2018, received in U.S. Appl. No. 15/009,676 (7312), 6 pages.
Notice of Allowance, dated Nov. 6, 2018, received in U.S. Appl. No. 15/009,688 (7313), 10 pages.
Notice of Allowance, dated Jun. 29, 2018, received in U.S. Appl. No. 14/856,517 (7317), 11 pages.
Office Action, dated Nov. 20, 2018, received in U.S. Appl. No. 14/856,520 (7319), 36 pages.
Final Office Action, dated Apr. 17, 2019, received in U.S. Appl. No. 14/856,520 (7319), 38 pages.

(56) References Cited

OTHER PUBLICATIONS

Notice of Allowance, dated Aug. 16, 2018, received in U.S. Appl. No. 14/857,636 (7322), 5 pages.
Notice of Allowance, dated Jan. 15, 2019, received in Australian Patent Application No. 2017202816 (7322AU), which corresponds with U.S. Appl. No. 14/857,636, 3 pages.
Office Action, dated Jun. 25, 2018, received in Japanese Patent Application No. 2017-029201 (7322JP), which corresponds with U.S. Appl. No. 14/857,636, 4 pages.
Office Action, dated Nov. 28, 2018, received in Korean Patent Application No. 20177036645 (7322KR), which corresponds with U.S. Appl. No. 14/857,636, 6 pages.
Notice of Allowance, dated Aug. 16, 2018, received in U.S. Appl. No. 14/857,663 (7323), 5 pages.
Notice of Allowance, dated Oct. 9, 2018, received in U.S. Appl. No. 14/864,529 (7329), 11 pages.
Office Action, dated Nov. 7, 2018, received in Chinese Patent Application No. 201610342151.4 (7330CN), which corresponds with U.S. Appl. No. 14/864,580, 3 pages.
Office Action, dated Aug. 31, 2018, received in Australian Patent Application No. 2016276030 (7331AU), which corresponds with U.S. Appl. No. 14/864,601, 3 pages.
Certificate of Grant, dated Feb. 21, 2019, received in Australian Patent Application No. 2016276030 (7331AU), which corresponds with U.S. Appl. No. 14/864,601, 4 pages.
Office Action, dated Feb. 4, 2019, received in European Patent Application No. 16730554.9 (7331EP), which corresponds with U.S. Appl. No. 14/864,601, 10 pages.
Notice of Allowance, dated Dec. 10, 2018, received in Japanese Patent Application No. 2017-561375 (7331JP), which corresponds with U.S. Appl. No. 14/864,601, 5 pages.
Patent, dated Jan. 11, 2019, received in Japanese Patent Application No. 2017-561375 (7331JP), which corresponds with U.S. Appl. No. 14/864,601, 3 pages.
Office Action, dated Jan. 25, 2019, received in Korean Patent Application No. 2017-7033756 (7331KR), which corresponds with U.S. Appl. No. 14/864,601, 8 pages.
Office Action, dated Oct. 19, 2018, received in Chinese Patent Application No. 201610189298.4 (7334CN), which corresponds with U.S. Appl. No. 14/866,361, 6 pages.
Patent, dated May 22, 2018, received in Danish Patent Application No. 201500579 (7334DK), which corresponds with U.S. Appl. No. 14/866,361, 2 pages.
Office Action, dated Jun. 11, 2018, received in European Patent Application No. 17188507.2 (7334EP), which corresponds with U.S. Appl. No. 14/866,361, 10 pages.
Office Action, dated Jan. 30, 2019, received in European Patent Application No. 17188507.2 (7334EP), which corresponds with U.S. Appl. No. 14/866,361, 13 pages.
Office Action, dated Oct. 12, 2018, received in Japanese Patent Application No. 2017-141962 (7334JP), which corresponds with U.S. Appl. No. 14/866,361, 6 pages.
Office Action, dated Sep. 14, 2018, received in Korean Patent Application No. 2018-7013039 (7334KR), which corresponds with U.S. Appl. No. 14/866,361, 2 pages.
Notice of Allowance, dated Jan. 30, 2019, received in Korean Patent Application No. 2018-7013039 (7334KR), which corresponds with U.S. Appl. No. 14/866,361, 5 pages.
Patent, dated Apr. 3, 2019, received in Korean Patent Application No. 2018-7013039 (7334KR), which corresponds with U.S. Appl. No. 14/866,361, 4 pages.
Final Office Action, dated Oct. 11, 2018, received in U.S. Appl. No. 14/866,987 (7335), 20 pages.
Notice of Allowance, dated Apr. 4, 2019, received in U.S. Appl. No. 14/866,987 (7335), 5 pages.
Office Action, dated Dec. 4, 2018, received in Chinese Patent Application No. 201610342336.5 (7335CN), which corresponds with U.S. Appl. No. 14/866,987, 5 pages.
Office Action, dated Dec. 11, 2018, received in European Patent Application No. 16189421.7 (7335EP), which corresponds with U.S. Appl. No. 14/866,987, 6 pages.
Final Office Action, dated Jul. 3, 2018, received in U.S. Appl. No. 14/866,989 (7336), 17 pages.
Notice of Allowance, dated Jan. 17, 2019, received in U.S. Appl. No. 14/866,989 (7336), 8 pages.
Notice of Acceptance, dated Feb. 14, 2019, received in Australian Patent Application No. 2017201079 (7336AU02), which corresponds with U.S. Appl. No. 14/866,989, 3 pages.
Office Action, dated Sep. 19, 2018, received in Chinese Patent Application No. 201610342314.9 (7336CN), which corresponds with U.S. Appl. No. 14/866,989, 6 pages.
Office Action, dated Feb. 25, 2019, received in Chinese Patent Application No. 201610342314.9 (7336CN), which corresponds with U.S. Appl. No. 14/866,989, 3 pages.
Patent, dated Jun. 18, 2018, received in Danish Patent Application No. 201500595 (7337DK), which corresponds with U.S. Appl. No. 14/871,236, 3 pages.
Office Action, dated Jul. 19, 2018, received in Russian Patent Application No. 2017131408 (7337RU), which corresponds with U.S. Appl. No. 14/871,236, 8 pages.
Patent, dated Feb. 15, 2019, received in Russian Patent Application No. 2017131408 (7337RU), which corresponds with U.S. Appl. No. 14/871,236, 2 pages.
Notice of Allowance, dated Jul. 2, 2018, received in U.S. Appl. No. 14/870,754 (7338), 9 pages.
Notice of Allowance, dated Dec. 3, 2018, received in U.S. Appl. No. 14/870,754 (7338), 8 pages.
Notice of Allowance, dated Jul. 12, 2018, received in U.S. Appl. No. 14/870,882 (7339), 5 pages.
Notice of Allowance, dated Dec. 5, 2018, received in U.S. Appl. No. 14/870,882 (7339), 8 pages.
Office Action, dated Feb. 11, 2019, received in European Patent Application No. 17171972.7 (7339EP), which corresponds with U.S. Appl. No. 14/870,882, 7 pages.
Notice of Allowance, dated Aug. 27, 2018, received in U.S. Appl. No. 14/870,988 (7340), 11 pages.
Notice of Allowance, dated Jun. 11, 2018, received in U.S. Appl. No. 14/871,227 (7341), 11 pages.
Notice of Acceptance, dated Oct. 30, 2018, received in Australian Patent Application No. 2016203040 (7341AU), which corresponds with U.S. Patent Application No. 14/871,227, 4 pages.
Certificate of Grant, dated Feb. 28, 2019, received in Australian Patent Application No. 2016203040 (7341AU), which corresponds with U.S. Appl. No. 14/871,227, 1 page.
Office Action, dated Oct. 11, 2018, received in Australian Patent Application No. 2017245442 (7341AU02), which corresponds with U.S. Appl. No. 14/871,227, 4 pages.
Office Action, dated Nov. 16, 2018, received in Chinese Patent Application No. 201680000466.9 (7341CN), which corresponds with U.S. Appl. No. 14/871,227, 5 pages.
Intent to Grant, dated Sep. 17, 2018, received in European Patent No. 16711743.1 (7341EP), which corresponds with U.S. Appl. No. 14/871,227, 5 pages.
Patent, dated Nov. 28, 2018, received in European Patent No. 16711743.1 (7341EP), which corresponds with U.S. Appl. No. 14/871,227, 1 page.
Notice of Allowance, dated Oct. 1, 2018, received in Korean Patent Application No. 2016-7019816 (7341KR), which corresponds with U.S. Appl. No. 14/871,227, 6 pages.
Patent, dated Dec. 28, 2018, received in Korean Patent Application No. 2016-7019816 (7341KR), which corresponds with U.S. Appl. No. 14/871,227, 8 pages.
Office Action, dated Nov. 5, 2018, received in U.S. Appl. No. 14/871,336 (7342), 24 pages.
Notice of Allowance, dated Feb. 5, 2019, received in U.S. Appl. No. 14/871,336 (7342), 10 pages.
Office Action, dated Feb. 12, 2019, received in European Patent Application No. 17172266.3 (7342EP), which corresponds with U.S. Appl. No. 14/871,336, 6 pages.

(56) References Cited

OTHER PUBLICATIONS

Notice of Allowance, dated Oct. 12, 2018, received in Japanese Patent Application No. 2018-020324 (7342JP), which corresponds with U.S. Appl. No. 14/871,336, 5 pages.
Patent, dated Nov. 16, 2018, received in Japanese Patent Application No. 2018-020324 (7342JP), which corresponds with U.S. Appl. No. 14/871,336, 4 pages.
Notice of Allowance, dated Aug. 7, 2018, received in U.S. Appl. No. 14/867,823 (7344), 8 pages.
Final Office Action, dated Oct. 17, 2018, received in U.S. Appl. No. 14/867,892 (7345), 48 pages.
Final Office Action, dated Oct. 4, 2018, received in U.S. Appl. No. 14/869,361 (7346), 28 pages.
Office Action, dated Feb. 27, 2019, received in U.S. Appl. No. 14/869,361 (7346), 28 pages.
Notice of Allowance, dated May 31, 2018, received in U.S. Appl. No. 14/869,855 (7347), 10 pages.
Notice of Allowance, dated Jul. 30, 2018, received in U.S. Appl. No. 14/869,873 (7348), 8 pages.
Office Action, dated Sep. 7, 2018, received in U.S. Appl. No. 14/869,997 (7351), 23 pages.
Notice of Allowance, dated Apr. 4, 2019, received in U.S. Appl. No. 14/869,997 (7351), 9 pages.
Final Office Action, dated Oct. 26, 2018, received in U.S. Appl. No. 14/869,703 (7353), 19 pages.
Notice of Allowance, dated Mar. 12, 2019, received in U.S. Appl. No. 14/869,703 (7353), 6 pages.
Final Office Action, dated Jul. 3, 2018, received in U.S. Appl. No. 15/009,668 (7389), 19 pages.
Office Action, dated Jan. 10, 2019, received in U.S. Appl. No. 15/009,668 (7389), 17 pages.
Notice of Acceptance, dated Jan. 24, 2019, received in Australian Patent Application No. 2017202058 (7398AU), which corresponds with U.S. Appl. No. 15/081,771, 3 pages.
Notice of Allowance, dated Oct. 12, 2018, received in Japanese Patent Application No. 2017-086460 (7398JP), which corresponds with U.S. Appl. No. 15/081,771, 5 pages.
Notice of Allowance, dated Jun. 28, 2018, received in Korean Patent Application No. 2017-7014536 (7398KR), which corresponds with U.S. Appl. No. 15/081,771, 4 pages.
Patent, dated Sep. 28, 2018, received in Korean Patent Application No. 2017-7014536 (7398KR), which corresponds with U.S. Appl. No. 15/081,771, 3 pages.
Notice of Acceptance, dated Sep. 10, 2018, received in Australian Patent Application No. 2018202855 (7399AU), which corresponds with U.S. Appl. No. 15/136,782, 3 pages.
Certificate of Grant, dated Jan. 17, 2019, received in Australian Patent Application No. 2018202855 (7399AU), which corresponds with U.S. Appl. No. 15/136,782, 4 pages.
Patent, dated May 22, 2018, received in Danish Patent Application No. 201770190 (7399DK), which corresponds with U.S. Appl. No. 15/136,782, 2 pages.
Office Action, dated Apr. 17, 2019, received in European Patent Application No. 18171453.6 (7399EP), which corresponds with U.S. Appl. No. 15/136,782, 4 pages.
Office Action, dated Jun. 1, 2018, received in Japanese Patent Application No. 2018-062161 (7399JP), which corresponds with U.S. Appl. No. 15/136,782, 5 pages.
Office Action, dated Nov. 12, 2018, received in Japanese Patent Application No. 2018-062161 (7399JP), which corresponds with U.S. Appl. No. 15/136,782, 5 pages.
Notice of Allowance, dated Feb. 18, 2019, received in Japanese Patent Application No. 2018-062161 (7399JP), which corresponds with U.S. Appl. No. 15/136,782, 5 pages.
Patent, dated Mar. 22, 2019, received in Japanese Patent Application No. 2018-062161 (7399JP), which corresponds with U.S. Appl. No. 15/136,782, 5 pages.
Office Action, dated Oct. 31, 2018, received in Korean Patent Application No. 2018-7020659 (7399KR), which corresponds with U.S. Appl. No. 15/136,782, 5 pages.
Notice of Allowance, dated Feb. 25, 2019, received in Korean Patent Application No. 2018-7020659 (7399KR), which corresponds with U.S. Appl. No. 15/136,782, 5 pages.
Patent, dated Apr. 3, 2019, received in Korean Patent Application No. 2018-7020659 (7399KR), which corresponds with U.S. Appl. No. 15/136,782, 5 pages.
Office Action, dated Dec. 18, 2018, received in Danish Patent Application No. 201670587 (7403DK), which corresponds with U.S. Appl. No. 15/231,745, 4 pages.
Patent, dated May 28, 2018, received in Danish Patent Application No. 201670590 (7403DK01), which corresponds with U.S. Appl. No. 15/231,745, 2 pages.
Office Action, dated Nov. 23, 2018, received in Danish Patent Application No. 201670591 (7403DK02), which corresponds with U.S. Appl. No. 15/231,745, 7 pages.
Patent, dated May 28, 2018, received in Danish Patent Application No. 201670592 (7403DK03), which corresponds with U.S. Appl. No. 15/231,745, 2 pages.
Notice of Allowance, dated Oct. 4, 2018, received in U.S. Appl. No. 15/272,327 (7429), 46 pages.
Certificate of Grant, dated Jun. 28, 2018, received in Australian Patent Application No. 2018200705 (7429AU), which corresponds with U.S. Appl. No. 15/272,327, 4 pages.
Office Action, dated Mar. 22, 2019, received in Australian Patent Application No. 2018204234 (7429AU01), which corresponds with U.S. Appl. No. 15/272,327, 7 pages.
Office Action, dated Sep. 14, 2018, received in European Patent Application No. 15155939.4 (7429EP), which corresponds with U.S. Appl. No. 15/272,327, 5 pages.
Intention to Grant, dated Mar. 19, 2019, received in European Patent Application No. 15155939.4 (7429EP), which corresponds with U.S. Appl. No. 15/272,327, 6 pages.
Notice of Allowance, dated Jul. 30, 2018, received in Japanese Patent Application No. 2018-506989 (7429JP), which corresponds with U.S. Appl. No. 15/272,327, 4 pages.
Patent, dated Aug. 31, 2018, received in Japanese Patent Application No. 2018-506989 (7429JP), which corresponds with U.S. Appl. No. 15/272,327, 3 pages.
Office Action, dated Oct. 26, 2018, received in U.S. Appl. No. 15/272,341 (7430), 22 pages.
Final Office Action, dated Mar. 25, 2019, received in U.S. Appl. No. 15/272,341 (7430), 25 pages.
Notice of Allowance, dated Sep. 20, 2018, received in U.S. Appl. No. 15/272,343 (7431), 44 pages.
Office Action, dated Jan. 8, 2019, received in European Patent Application No. 17206374.5 (7431EP), which corresponds with U.S. Appl. No. 15/272,343, 5 pages.
Office Action, dated Oct. 15, 2018, received in U.S. Appl. No. 15/272,345 (7432). 31 pages.
Final Office Action, dated Apr. 2, 2019, received in U.S. Appl. No. 15/272,345 (7432). 28 pages.
Certificate of Grant, dated Jun. 28, 2018, received in Australian Patent Application No. 2016304832 (7432AU), which corresponds with U.S. Appl. No. 15/272,345, 4 pages.
Office Action, dated Nov. 13, 2018, received in European Patent Application No. 16756862.5 (7432EP), which corresponds with U.S. Appl. No. 15/272,345, 5 pages.
Decision to Grant, dated Jan. 31, 2019, received in European Patent Application No. 16756862.5 (7432EP), which corresponds with U.S. Appl. No. 15/272,345, 5 pages.
Patent, dated Feb. 27, 2019, received in European Patent Application No. 16756862.5 (7432EP), which corresponds with U.S. Appl. No. 15/272,345, 3 pages.
Notice of Allowance, dated Aug. 15, 2018, received in U.S. Appl. No. 15/482,618 (7491), 7 pages.
Notice of Allowance, dated Oct. 12, 2018, received in U.S. Appl. No. 15/499,693 (7495), 8 pages.
Office Action, dated Jan. 24, 2019, received in U.S. Appl. No. 15/655,749 (7506), 25 pages.
Notice of Allowance, dated Apr. 18, 2019, received in Korean Patent Application No. 2017-7034248 (7506KR), which corresponds with U.S. Appl. No. 15/655,749, 5 pages.

(56) References Cited

OTHER PUBLICATIONS

Office Action, dated Apr. 11, 2019, received in U.S. Appl. No. 15/889,115 (7526), 9 pages.
Notice of Allowance, dated Apr. 19, 2019, received in U.S. Appl. No. 16/252,478 (7600), 11 pages.
Extended European Search Report, dated Jul. 30, 2018, received in European Patent Application No. 18180503.7 (5842EP02), which corresponds with U.S. Appl. No. 14/536,426, 7 pages.
Extended European Search Report, dated Dec. 5, 2018, received in European Patent Application No. 18194127.9 (5848EP01), which corresponds with U.S. Appl. No. 14/608,942, 8 pages.
Extended European Search Report, dated Oct. 30, 2018, received in European Patent Application No. 18183789.9 (5853EP02), which corresponds with U.S. Appl. No. 14/536,267, 11 pages.
Extended European Search Report, dated Aug. 17, 2018, received in European Patent Application No. 18175195.9 (7309EP01), which corresponds with U.S. Appl. No. 14/869,899, 13 pages.
International Preliminary Report on Patentability, dated Sep. 12, 2017, received in International Patent Application No. PCT/US2016/021400 (7309WO), which corresponds with U.S. Appl. No. 14/869,899, 39 pages.
International Preliminary Report on Patentability, dated Feb. 13, 2018, received in International Patent Application No. PCT/US2016/046407 (7313WO), which corresponds with U.S. Appl. No. 15/009,688, 20 pages.
Extended European Search Report, dated Aug. 2, 2018, received in European Patent Application No. 18168941.5 (7337EP), which corresponds with U.S. Appl. No. 14/871,236, 11 pages.
Extended European Search Report, dated Mar. 8, 2019, received in European Patent Application No. 18205283.7 (7398EP), which corresponds with U.S. Appl. No. 15/081,771, 15 pages.
Extended European Search Report, dated Aug. 24, 2018, received in European Patent Application No. 18171453.6 (7339EP), which corresponds with U.S. Appl. No. 15/136,782, 9 pages.
Extended European Search Report, dated May 30, 2018, received in European Patent Application No. 18155939.4 (7429EP), which corresponds with U.S. Appl. No. 15/272,327, 8 pages.
Final Office Action, dated May 23, 2019, received in U.S. Appl. No. 14/609,006 (5856), 14 pages.
Examiner's Answer, dated May 9, 2019, received in U.S. Appl. No. 14/866,992 (7310), 26 pages.
Notice of Allowance, dated May 1, 2019, received in U.S. Appl. No. 15/009,668 (7389), 12 pages.
Office Action, dated May 22, 2019, received in U.S. Appl. No. 16/230,743 (7591), 7 pages.
Apple, "Apple—September Event 2014", https://www.youtube.com/watch?v=38lqQpqwPe7s, Sep. 10, 2014, 5 pages.
Nickinson, "Inside Android 4.2: Notifications and Quick Settings", https://www.andrloidcentral.com/inside-android-42-notifications-and-quick-settings, Nov. 3, 2012, 3 pages.
Viticci, "Apple Watch: Our Complete Overview—MacStories", https://www.macstories.net, Sep. 10, 2014, 21 pages.
Notice of Allowance, dated May 24, 2019, received in Korean Patent Application No. 2018-7028236 (5839KR01), which corresponds with U.S. Appl. No. 14/608,895, 4 pages.
Office Action, dated Jun. 6, 2019, received in Australian Patent Application No. 2018256626 (5846AU01), which corresponds with U.S. Appl. No. 14/536,646, 3 pages.
Office Action, dated Jun. 5, 2019, received in Australian Patent Application No. 2018256616 (5847AU02), which corresponds with U.S. Appl. No. 14/536,141, 3 pages.
Notice of Allowance, dated May 7, 2019, received in Chinese Patent Application No. 201380068295.X (5848CN), which corresponds with U.S. Appl. No. 14/608,942, 3 pages.
Patent, dated May 17, 2019, received in Chinese Patent Application No. 201380074060.1 (5851CN), which corresponds with U.S. Appl. No. 14/608,965, 6 pages.
Notice of Acceptance, dated Apr. 29, 2019, received in Australian Patent Application No. 2018204236 (5853AU02), which corresponds with U.S. Appl. No. 14/5326,267, 3 pages.
Patent, dated Apr. 19, 2019, received in Japanese Patent Application No. 2017-113598 (5859JP), which corresponds with U.S. Appl. No. 14/609,042, 2 pages.
Notice of Allowance, dated May 6, 2019, received in Chinese Patent Application No. 01610130348.1 (7267CN), which corresponds with U.S. Appl. No. 14/868,078 3 pages.
Intention to Grant, dated May 10, 2019, received in European Patent Application No. 16708916.8 (7267EP), which corresponds with U.S. Appl. No. 14/868,078, 5 pages.
Intention to Grant, dated May 22, 2019, received in European Patent Application No. 17184437.6 (7267EP01), which corresponds with U.S. Appl. No. 14/868,078, 7 pages.
Office Action, dated May 8, 2019, received in European Patent Application No. 18168939.9 (7309EP), which corresponds with U.S. Appl. No. 14/869,899, 10 pages.
Office Action, dated May 23, 2019, received in European Patent Application No. 18175195.9 (7309EP01), which corresponds with U.S. Appl. No. 14/869,899, 10 pages.
Patent, dated May 10, 2019, received in Korean Patent Application No. 2018-7017213 (7309KR), which corresponds with U.S. Appl. No. 14/869,899, 8 pages.
Certificate of Grant, dated May 9, 2019, received in Australian Patent Application No. 201761478 (7310AU02), which corresponds with U.S. Appl. No. 14/866,992, 3 pages.
Summons, dated May 8, 2019, received in European Patent Application No. 16758008.3 (7310EP), which corresponds with U.S. Appl. No. 14/866,992, 14 pages.
Certificate of Grant, dated May 16, 2019, received in Australian Patent Application No. 2017202816 (7322AU), which corresponds with U.S. Appl. No. 14/857,636, 4 pages.
Notice of Allowance, dated May 10, 2019, received in Korean Patent Application No. 20177036645 (7322KR), which corresponds with U.S. Appl. No. 14/857,636, 4 pages.
Notice of Allowance, dated May 29, 2019, received in Korean Patent Application No. 2017-7033756 (7331KR), which corresponds with U.S. Appl. No. 14/864,601, 5 pages.
Notice of Allowance, dated May 23, 2019, received in Chinese Patent Application No. 201610189298.4 (7334CN), which corresponds with U.S. Appl. No. 14/866,361, 3 pages.
Rejection Decision, dated Apr. 28, 2019, received in Chinese Patent Application No. 201610342336.5 (7335CN), which corresponds with U.S. Appl. No. 14/866,987, 4 pages.
Rejection Decision, dated Apr. 24, 2019, received in Chinese Patent Application No. 201610342314.9 (7336CN), which corresponds with U.S. Appl. No. 14/866,989, 3 pages.
Notice of Allowance, dated Jun. 5, 2019, received in Chinese Patent Application No. 201680000466.9 (7341CN), which corresponds with U.S. Appl. No. 14/871,227, 5 pages.
Notice of Allowance, dated May 21, 2019, received in Chinese Patent Application No. 201610131507.X (7351CN), which corresponds with U.S. Appl. No. 14/867,990, 3 pages.
Decision to Grant, dated Apr. 26, 2019, received in European Patent Application No. 15155939.4 (7429EP), which corresponds with U.S. Appl. No. 15/272,327, 2 pages.
Intention to Grant, dated May 13, 2019, received in European Patent Application No. 17206374.5 (7431EP), which corresponds with U.S. Appl. No. 15/272,343, 7 pages.
Office Action, dated May 31, 2019, received in Australian Patent Application No. 2018253539 (7563AU), which corresponds with U.S. Appl. No. 16/049,725, 3 pages.

* cited by examiner

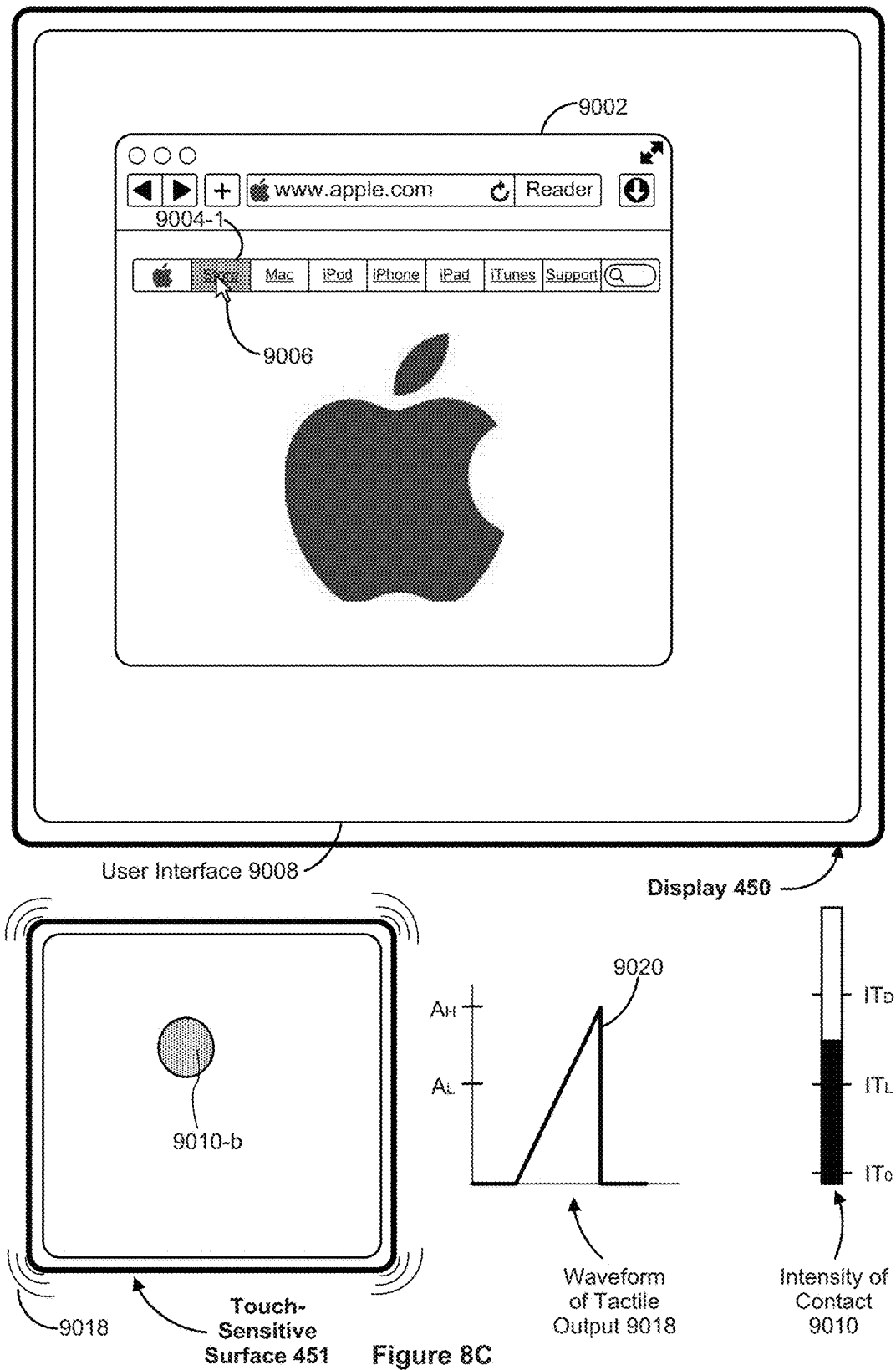

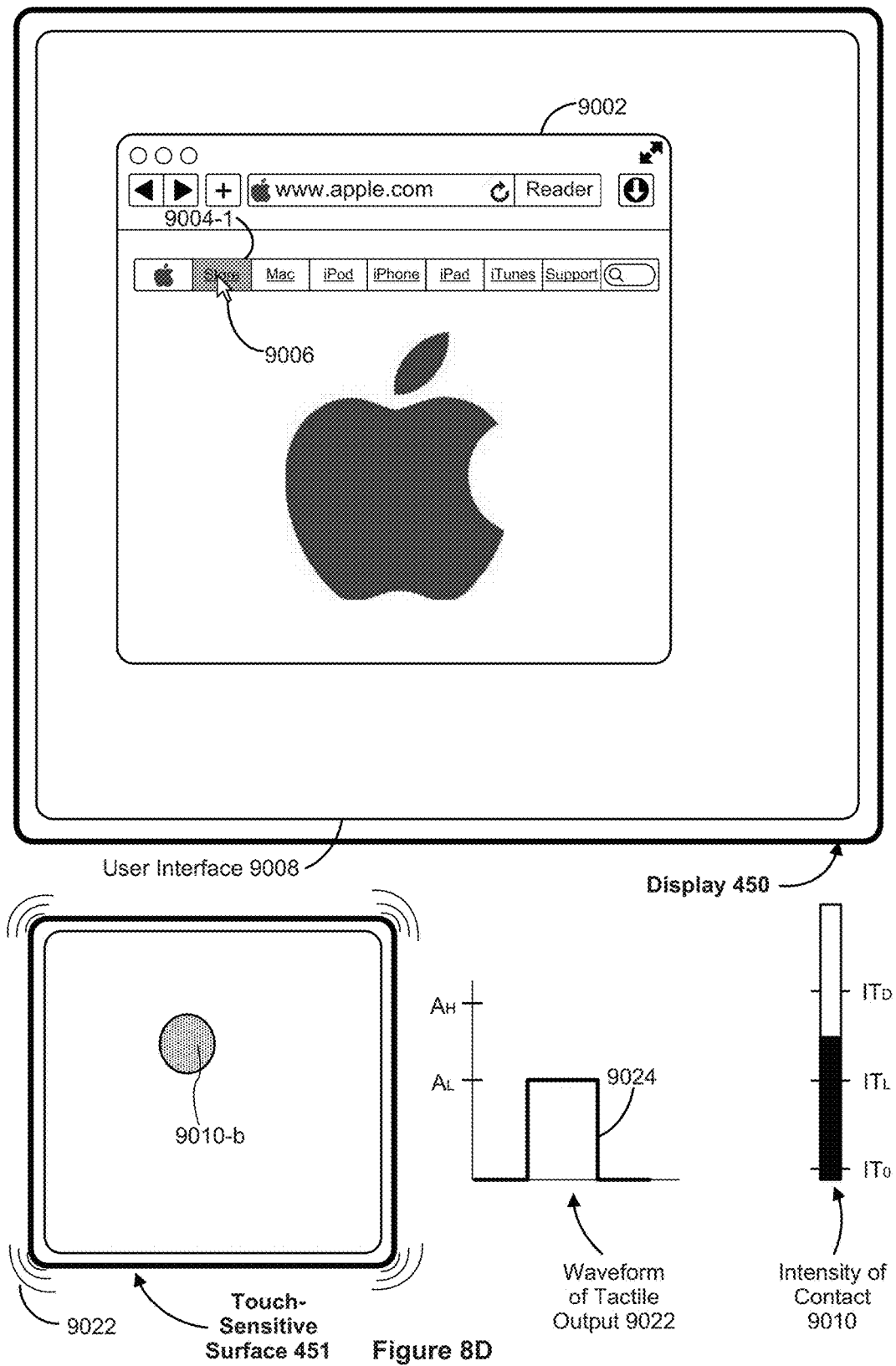

DEVICE, METHOD, AND GRAPHICAL USER INTERFACE FOR FORGOING GENERATION OF TACTILE OUTPUT FOR A MULTI-CONTACT GESTURE

RELATED APPLICATIONS

This application is a continuation of PCT Patent Application Serial No. PCT/US2013/069479, filed on Nov. 11, 2013, entitled "Device, Method, and Graphical User Interface for Forgoing Generation of Tactile Output for a Multi-Contact Gesture," which claims the benefit of and priority to U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" and U.S. Provisional Patent Application No. 61/747,278, filed Dec. 29, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with more efficient methods and interfaces for providing feedback when a focus selector moves over a user interface object. Such methods and interfaces may complement or replace conventional methods for providing feedback when a focus selector moves over a user interface object. Such methods and interfaces reduce the cognitive burden on a user and produce a more efficient human-machine interface.

In accordance with some embodiments, a method is performed at an electronic device with a display, a touch-sensitive surface. The method includes: displaying, on the display, a plurality of user interface objects, where each of the plurality of user interface objects includes a plurality of subdivisions. The method further includes, detecting movement of a contact on the touch-sensitive surface that corresponds to movement of a focus selector over a respective user interface object in the plurality of user interface objects. The method further includes, in response to detecting the movement of the contact: in accordance with a determination that output criteria have been met, generating tactile outputs that correspond to a respective boundary of the respective user interface object and subdivisions of the respective user interface object; and in accordance with a determination that the output criteria have not been met, generating tactile outputs that correspond to the respective boundary of the respective user interface object without generating tactile outputs that correspond to the subdivisions of the respective user interface object.

In accordance with some embodiments, an electronic device includes a display unit configured to display one or more user interface objects; a touch-sensitive surface unit configured to receive user contacts; and a processing unit coupled to the display unit and the touch-sensitive surface unit. The processing unit is configured to: enable display of a plurality of user interface objects on the display unit, where each of the plurality of user interface objects includes a plurality of subdivisions; and detect movement of a contact on the touch-sensitive surface that corresponds to movement of a focus selector over a respective user interface object in the plurality of user interface objects. The processing unit is further configured to, in response to detecting the movement of the contact: in accordance with a determination that output criteria have been met, generate tactile outputs that correspond to a respective boundary of the respective user interface object and subdivisions of the respective user interface object; and in accordance with a determination that the output criteria have not been met, generate tactile outputs that correspond to the respective boundary of the respective user interface object without generating tactile outputs that correspond to the subdivisions of the respective user interface object.

Thus, electronic devices with displays and touch-sensitive surfaces are provided with faster, more efficient methods and interfaces for providing feedback when a focus selector moves over a subdivision of a user interface object, thereby increasing the effectiveness, efficiency, and user satisfaction with such devices. Such methods and interfaces may complement or replace conventional methods for providing feedback when a focus selector moves over a subdivision of a user interface object.

There is a need for electronic devices with faster, more efficient methods and interfaces for providing feedback when interacting with a user interface object, for example, to more efficiently differentiate feedback corresponding to a selection event from feedback corresponding to an activation event. Such methods and interfaces may complement or replace conventional methods for providing feedback when interacting with a user interface object. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: detecting a contact on the touch-sensitive surface, where the contact corresponds to a focus selector on the display. The method further includes: detecting a gesture based on input from the contact. The method further includes, in response to detecting the gesture: in accordance with a determination that the gesture corresponds to movement of the focus selector over a respective user interface object without activating the respective user interface object, generating a first tactile output on the touch-sensitive surface that corresponds to movement of the focus selector over the respective user interface object; and in accordance with a determination that the gesture corresponds to an increase of intensity of the contact above an activation intensity threshold while the focus selector is over the respective user interface object, generating a second tactile output on the touch-sensitive surface that corresponds to activation of the respective user interface object, where the second tactile output is different from the first tactile output.

In accordance with some embodiments, an electronic device includes a display unit configured to display one or more user interface objects; a touch-sensitive surface unit configured to receive user contacts; and a processing unit coupled to the display unit and the touch-sensitive surface unit. The processing unit is configured to: enable display of one or more user interface objects on the display unit; detect a contact on the touch-sensitive surface unit, where the contact corresponds to a focus selector on the display unit; and detect a gesture based on input from the contact. The processing unit is further configured to, in response to detecting the gesture: in accordance with a determination that the gesture corresponds to movement of the focus selector over a respective user interface object without activating the respective user interface object, generating a first tactile output on the touch-sensitive surface that corresponds to movement of the focus selector over the respective user interface object; and in accordance with a determination that the gesture corresponds to an increase of intensity of the contact above an activation intensity threshold while the focus selector is over the respective user interface object, generating a second tactile output on the touch-sensitive surface that corresponds to activation of the respective user interface object, where the second tactile output is different from the first tactile output.

Thus, electronic devices with displays, touch-sensitive surfaces and one or more sensors to detect intensity of contacts with the touch-sensitive surface are provided with faster, more efficient methods and interfaces for providing feedback when interacting with a user interface object, thereby increasing the effectiveness, efficiency, and user satisfaction with such devices. Such methods and interfaces may complement or replace conventional methods for providing feedback when interacting with a user interface object.

There is a need for electronic devices with faster, more efficient methods and interfaces for providing feedback when a focus selector moves over a user interface object. Such methods and interfaces may complement or replace conventional methods for providing feedback when a focus selector moves over a user interface object. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface. The method includes displaying an application window that includes a control region and a content region distinct from the control region on the display, where the control region includes a plurality of affordances for performing operations on content in the content region and the content region displays content that includes one or more affordances integrated into the content. The method further includes detecting a contact on the touch-sensitive surface. The method further includes detecting a gesture that includes movement of the contact across the touch-sensitive surface that corresponds to movement of a focus selector on the display across the application window. The method further includes, in response to detecting the gesture: in accordance with a determination that the gesture corresponds to movement of the focus selector over a first affordance in the control region, generating a first tactile output on the touch-sensitive surface that corresponds to movement of the focus selector over an affordance in the control region; and in accordance with a determination that the gesture corresponds to movement of the focus selector over a second affordance in the content region, generating a second tactile output on the touch-sensitive surface that corresponds to movement of the focus selector over an affordance in the content region, where the second tactile output is different from the first tactile output.

In accordance with some embodiments, an electronic device includes a display unit configured display an application window; a touch-sensitive surface unit configured to receive user contacts; and a processing unit coupled to the display unit and the touch-sensitive surface unit. The processing unit is configured to: enable display of an application window that includes a control region and a content region distinct from the control region on the display, where: the control region includes a plurality of affordances for performing operations on content in the content region; and the content region displays content that includes one or more affordances integrated into the content. The processing unit is further configured to detect a contact on the touch-sensitive surface unit. The processing unit is further configured to detect a gesture that includes movement of the contact across the touch-sensitive surface unit that corresponds to movement of a focus selector on the display across the application window. The processor unit is further configured to, in response to detecting the gesture: in accordance with a determination that the gesture corresponds to movement of the focus selector over a first affordance in the control region, generate a first tactile output on the touch-sensitive surface unit that corresponds to movement of the focus selector over an affordance in the control region; and in accordance with a determination that the gesture corresponds to movement of the focus selector over a second affordance in the content region, generate a second tactile output on the touch-sensitive surface unit that corresponds to movement of the focus selector over an affordance in the content region, where the second tactile output is different from the first tactile output.

Thus, electronic devices with displays, touch-sensitive surfaces are provided with faster, more efficient methods and interfaces for providing feedback when a focus selector moves over a user interface object, thereby increasing the effectiveness, efficiency, and user satisfaction with such devices. Such methods and interfaces may complement or replace conventional methods for providing feedback when a focus selector moves over a user interface object.

There is a need for electronic devices with faster, more efficient methods and interfaces for adjusting a tactile output level in accordance with an adjustment of a volume level. Such methods and interfaces may complement or replace conventional methods for adjusting a tactile output level. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a touch-sensitive surface. The method includes: detecting a first plurality of inputs on the touch-sensitive surface; in response to detecting the first plurality of inputs, providing tactile feedback in accordance with a tactile output level of the device; and receiving a request to adjust a volume level of the device by a respective amount. The method further includes, in response to the request to adjust the volume level: adjusting the volume level by the respective amount from a first non-zero volume level to a second non-zero volume level; and adjusting the tactile output level of the device in accordance with the respective amount.

In accordance with some embodiments, an electronic device includes a display unit configured to display information; a touch-sensitive surface unit configured to receive contacts; a tactile feedback unit configured to provide tactile feedback; an audio unit configured to produce an audio signal and an audio control signal in accordance with at least a volume level; and a processing unit coupled to the display unit, the touch-sensitive surface unit, the tactile feedback unit, and the audio unit. The processing unit is configured to: detect a first plurality of inputs on the touch-sensitive surface unit; in response to detecting the first plurality of inputs, provide tactile via the tactile feedback unit feedback in accordance with a tactile output level of the device; and receive a request to adjust a volume level of the device by a respective amount. The processing unit is further configured to, in response to the request to adjust the volume level: adjust the volume level by the respective amount; and adjust the tactile output level of the device in accordance with the respective amount.

Thus, electronic devices with displays and touch-sensitive surfaces are provided with faster, more efficient methods and interfaces for adjusting a tactile output level in accordance with an adjustment of a volume level, thereby increasing the effectiveness, efficiency, and user satisfaction with such devices. Such methods and interfaces may complement or replace conventional methods for adjusting a tactile output level.

There is a need for electronic devices with more efficient methods and interfaces for generating a tactile output for a gesture having a first number of contacts (e.g., a single contact gesture) and forgoing generation of a tactile output for a gesture having a second number of contacts (e.g., a multi-contact gesture). Such methods and interfaces may complement or replace conventional methods for tactile output generation. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a touch-sensitive surface, where the device includes one or more sensors to detect intensity of contacts with the touch-sensitive surface. The method includes: detecting, on the touch-sensitive surface, a gesture that includes an increase of intensity of a contact above a respective intensity threshold. The method further includes, in response to detecting the gesture: in accordance with a determination that the gesture includes a first number of contacts, generating a tactile output on the touch-sensitive surface; and in accordance with a determination that the gesture includes a second number of contacts different from the first number, forgoing generating the tactile output on the touch-sensitive surface.

In accordance with some embodiments, an electronic device includes a display unit configured to display a graphical user interface; a touch-sensitive surface unit configured to receive contacts; one or more sensor units configured to detect intensity of contacts with the touch-sensitive surface unit; a tactile output unit configured to generate a tactile output; and a processing unit coupled to the display unit, the touch-sensitive surface unit, the one or more sensor units, and the tactile output unit. The processing unit is configured to detect, on the touch-sensitive surface unit, a gesture that includes an increase of intensity of a contact above a respective intensity threshold. The processing unit is further configured to, in response to detecting the gesture: in accordance with a determination that the gesture includes a first number of contacts, generate a tactile output via the tactile output unit on the touch-sensitive surface unit; and in accordance with a determination that the gesture includes a second number of contacts different from the first number, forgo generating the tactile output on the touch-sensitive surface unit.

Thus, electronic devices with displays, touch-sensitive surfaces, and one or more sensors to detect intensity of contacts with the touch-sensitive surface are provided with more efficient methods and interfaces for generating a tactile output for a gesture having a first number of contacts and forgoing generation of a tactile output for a gesture having a second number of contacts, thereby increasing the effectiveness, efficiency, and user satisfaction with such devices. Such methods and interfaces may complement or replace conventional methods for generating a tactile output for a gesture having a first number of contacts and forgoing generation of a tactile output for a gesture having a second number of contacts.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods, which are updated in response to inputs, as described in any of the methods. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods. In accordance with some embodiments, an electronic device includes: a display, a touch-sensitive surface, and optionally one or more sensors to detect intensity of contacts with the touch-sensitive surface; and means for performing the operations of any of the methods. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8E illustrate exemplary user interfaces for providing feedback when interacting with a user interface object in accordance with some embodiments.

DESCRIPTION OF EMBODIMENTS

Figure 1A:
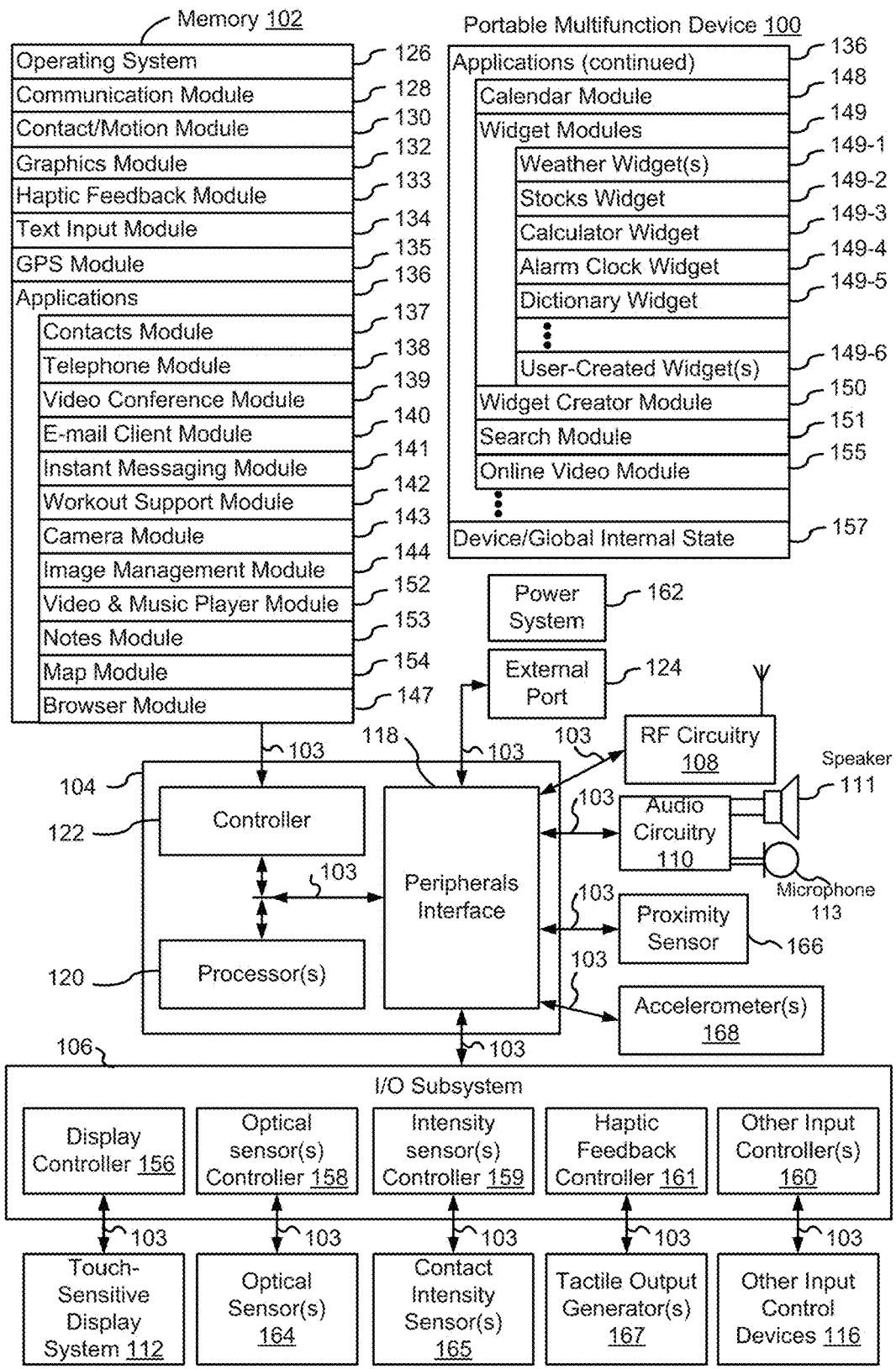
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact.

For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

methods and user interfaces described below improve upon this visual feedback by providing tactile feedback indicating that the user has scrolled over or selected a particular subdivision (e.g., individual words, letters or spaces) of the larger user interface object (e.g., a block of text) In particular, FIGS. 5A-5M illustrate exemplary user interfaces for providing feedback when a focus selector moves over a user interface object. FIGS. 6A-6C are flow diagrams illustrating a method of providing feedback when a focus selector moves over a user interface object. The user interfaces in FIGS. 5A-5M are used to illustrate the processes in FIGS. 6A-6C. by providing different tactile feedback to the user when a focus selector moves over a respective user interface object than when the user subsequently activates the respective user interface object In particular, FIGS. 8A-8E illustrate exemplary user interfaces for providing feedback when interacting with a user interface object. FIG. 9 is a flow diagram illustrating a method of providing feedback when interacting with a user interface object. The user interfaces in FIGS. 8A-8E are used to illustrate the processes in FIG. 9. Many electronic devices have graphical user interfaces that display application windows having separate regions for displaying content-independent affordances such as control affordances. The embodiments described below provide improved methods and user interfaces for generating feedback to a user navigating a complex user interface environment by providing different tactile feedback to the user when a focus selector moves over an affordance displayed in a control region and an affordance displayed in a content region of an application window. In particular, FIGS. 11A-11D illustrate exemplary user interfaces for providing feedback when a focus selector moves over a user interface object. FIGS. 12A-12B are flow diagrams illustrating a method of providing feedback when a focus selector moves over a user interface object. The user interfaces in FIGS. 11A-11D are used to illustrate the processes in FIGS. 12A-12B.

Many electronic devices change output levels of sensory properties of the device in response to the enablement of a setting or mode of the device. However, there are sometimes a large number of sensory properties to adjust and adjusting output levels of these sensory properties separately can be confusing and difficult for users. The embodiments below provide a more convenient and intuitive user interface by adjusting a tactile output level of a device in tandem with an adjustment of a volume level of the device. In particular, FIGS. 14A-14I illustrate exemplary user interfaces for adjusting a tactile output level in accordance with an adjustment of a volume level. FIGS. 15A-15C are flow diagrams illustrating a method of adjusting a tactile output level in accordance with an adjustment of a volume level. The user interfaces in FIGS. 14A-14I are used to illustrate the processes in FIGS. 15A-15C.

Many electronic devices provide a form of confirmation to a user in response to an event being triggered by a user action. For example, when a user clicks on an affordance (e.g., an icon button) corresponding to respective content (e.g., an electronic document, an image, or a video), an audio output is provided via a speaker to the user to confirm that the user is clicking on the affordance. However, this confirmation or feedback can be distracting or confusing to a user when it occurs in response to inputs that do not correspond to the feedback. The embodiments described below provide a more convenient and intuitive interface by generating a tactile output in response to detecting a gesture that includes a first number of contacts (e.g., one contact) and forging generating the tactile output if the gesture includes a second number of contacts (e.g., two or more contacts). In particular, FIGS. 17A-17F illustrate exemplary user interfaces for generating a tactile output for a gesture having a first number of contacts and forgoing generation of a tactile output for a gesture having a second number of contacts. FIG. 18 is a flow diagram illustrating a method of generating a tactile output for a gesture having a first number of contacts and forgoing generation of a tactile output for a gesture having a second number of contacts. The user interfaces in FIGS. 17A-17F are used to illustrate the processes in FIG. 18.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
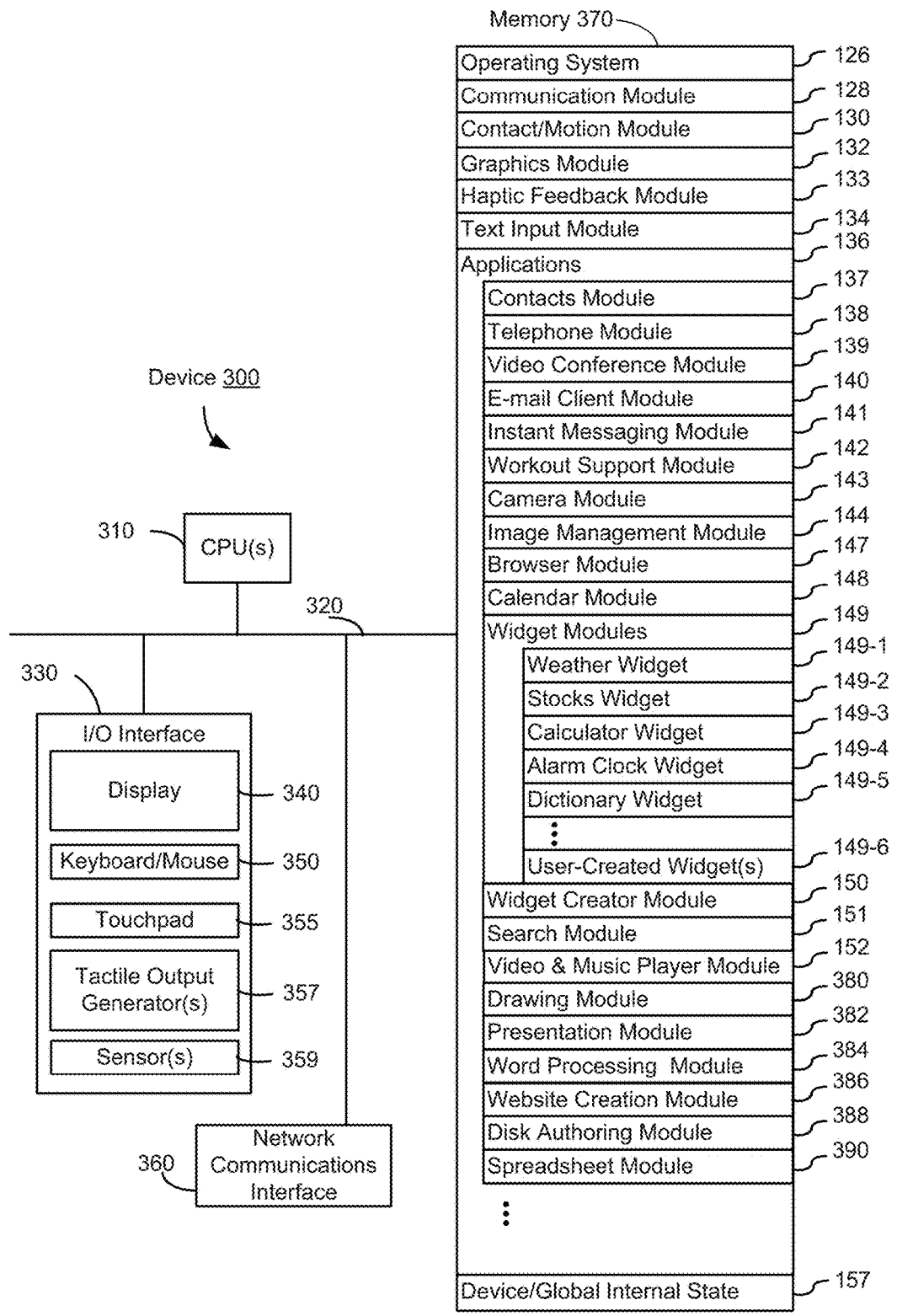
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
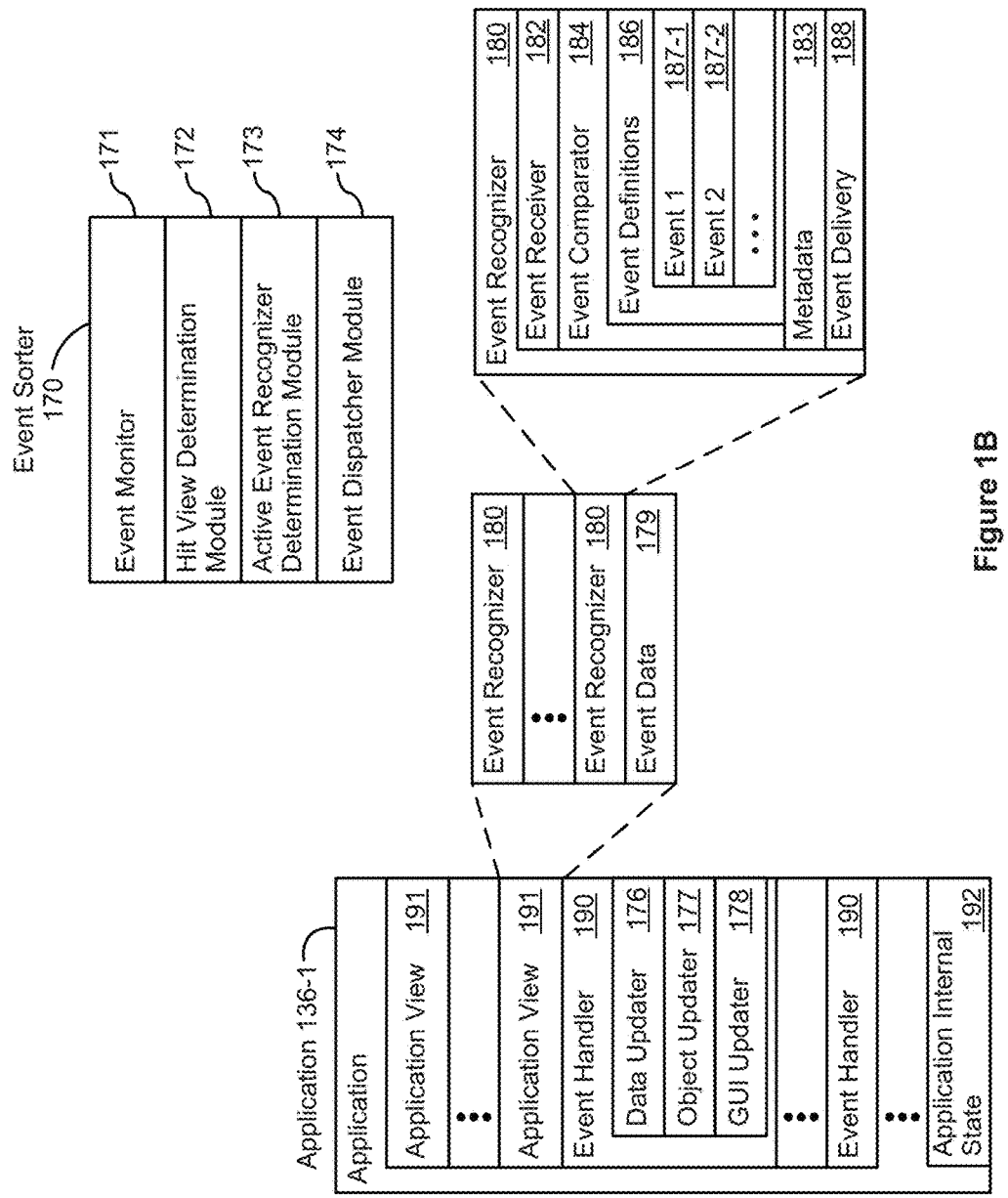
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
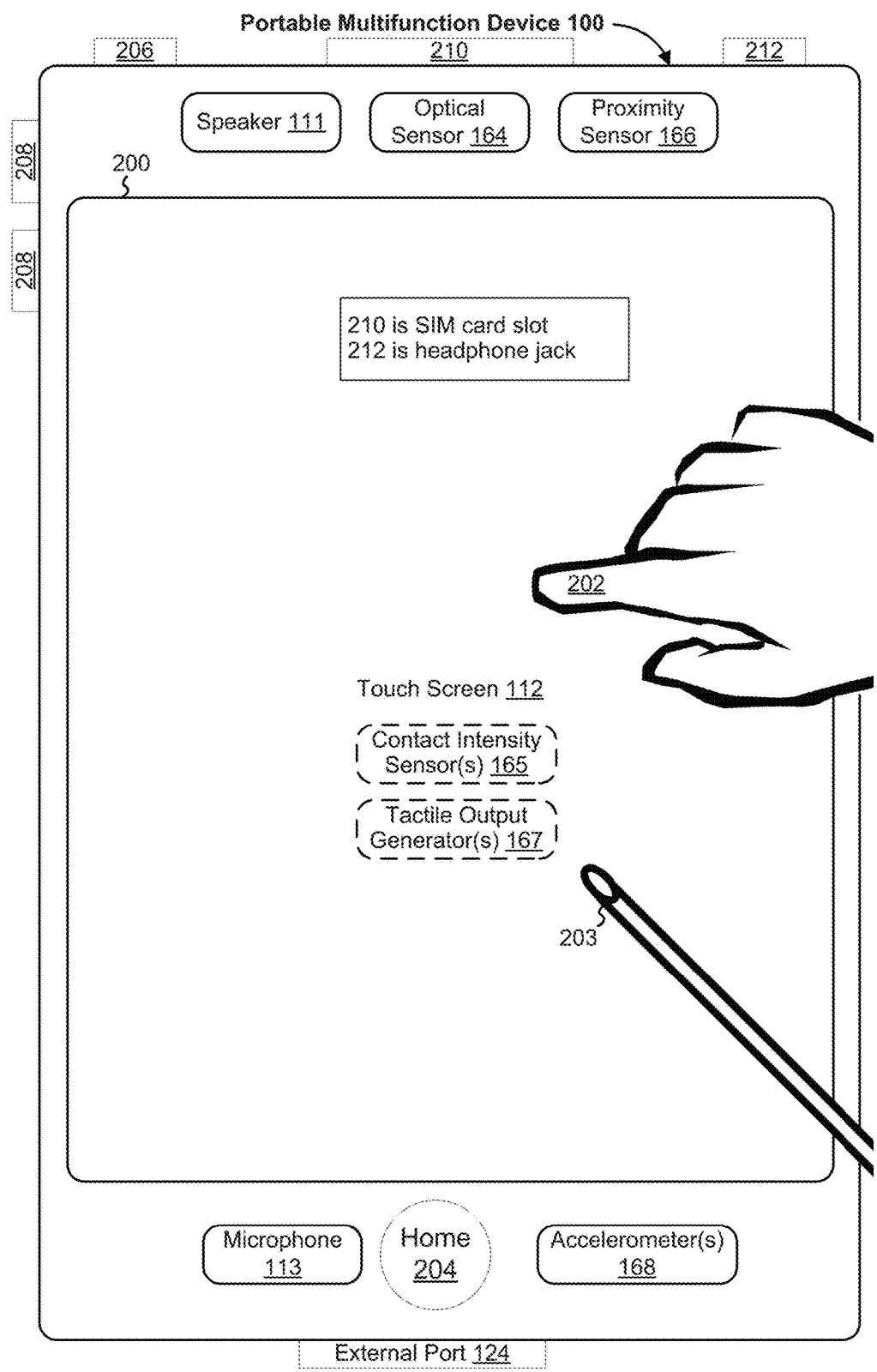
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
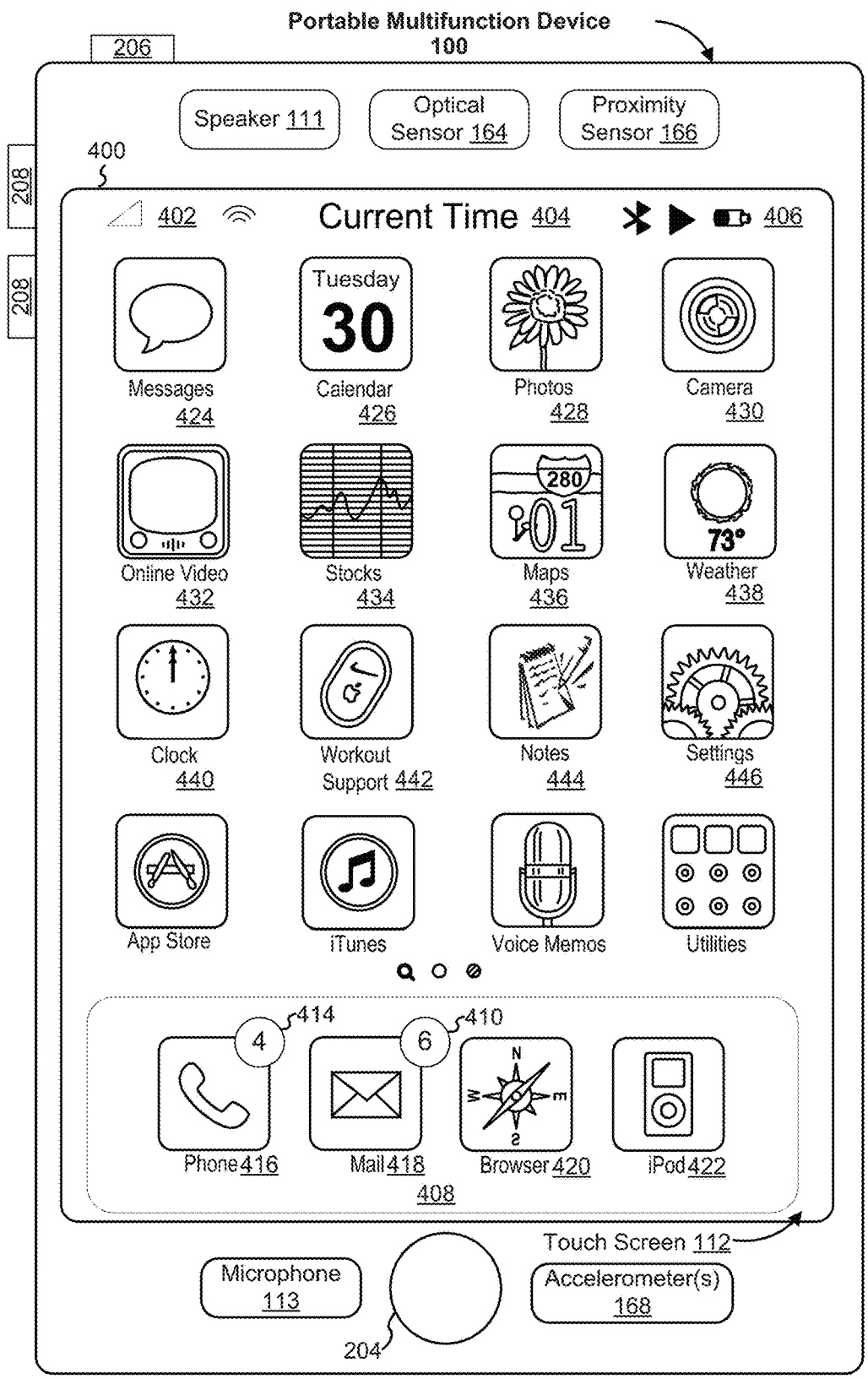
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
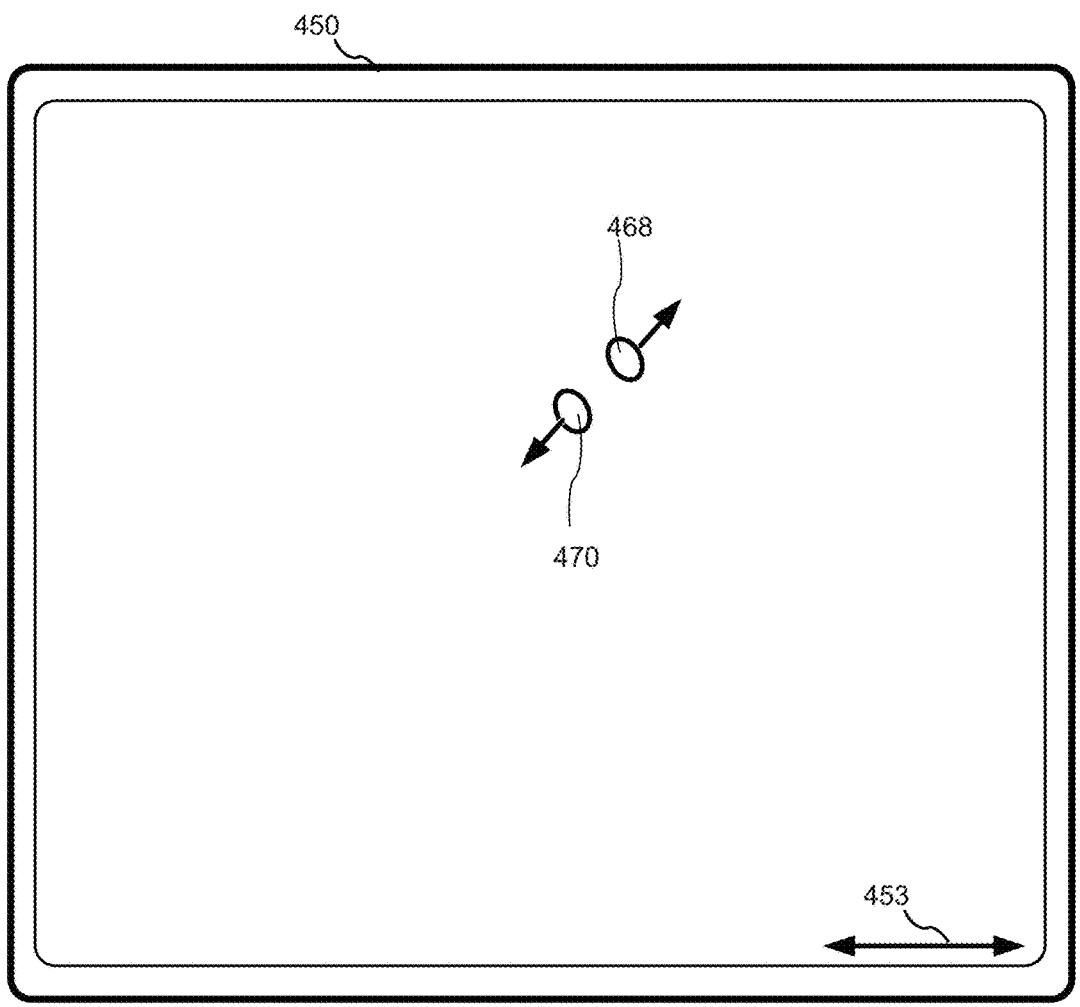
FIG. 4B illustrates an exemplary user interface for a multifunction device with a touch-sensitive surface that is separate from the display in accordance with some embodiments.
Figure 4B:
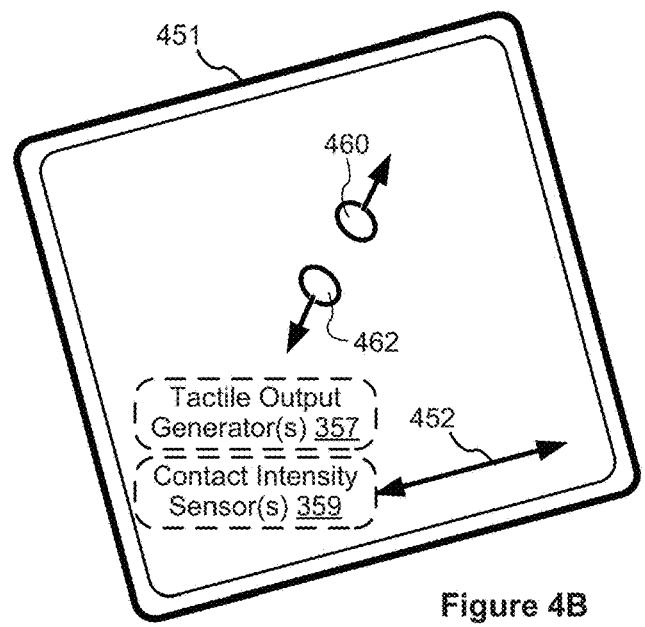

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Conditionally Providing Tactile Feedback Corresponding to Subdivisions of a User Interface Object Many electronic devices have graphical user interfaces that display a plurality of user interface object at the same time. For example, a graphical user interface will, in some circumstances, simultaneously display any combination of multiple blocks of text, web browsers, menus, application windows, toolbars, status bars and the like, providing the user with a large number of potential inputs and functionalities. Moreover, many of these user interface objects will have a number of selectable or activatable user interface objects displayed therein, e.g., subdivisions of the larger user interface object. Given the complexity of a user interface environment that arises from displaying multiple user interface objects having a number of functional subdivisions displayed therein, there is a need to provide feedback that enables the user to more efficiently and conveniently navigate through the user interface environment.

The embodiments described below provide improved methods and user interfaces for generating feedback to a user navigating a complex user interface. More specifically, these methods and user interfaces provide tactile feedback to the user when a focus selector moves over a user interface object. The tactile feedback allows the user to more efficiently discern between subdivisions of a user interface object, instead of or in addition to audible and/or visual feedback. For example, existing methods for selecting a sub-set of text within a larger block of text requires the user drag a focus selector over the text, causing a change in the visual appearance of individual words, letters and/or spaces selected. These approaches only provide visual confirmation that the desired sub-set of text has been selected prior to further manipulation (e.g., copying, editing, deleting, pasting or formatting). Advantageously, the methods and user interfaces described below improve upon this visual feedback by providing tactile feedback indicating that the user has scrolled over or selected a particular subdivision (e.g., individual words, letters or spaces) of the larger user interface object (e.g., a block of text).

Moreover, the methods and user interfaces described below allow the tactile feedback to be conditional upon a particular action performed by the user. That is, the tactile outputs are, optionally, selectively quieted, as desired. For example, when scrolling over or selecting a large sub-set of text, the tactile output are, optionally, conditionally suppressed when the focus selector is moved rapidly over the text, when the user does not require a high level of feedback from the user interface, and then generated again when the focus selector is moved more slowly. In this fashion, the user is provided additional feedback when trying to determine the precise endpoint of the desired text, providing increased productivity and an overall more efficient user experience. Although exemplified by the selection of a sub-set of text, the methods and user interfaces described below are useful for improving a user's efficiency when working with any number of user interface objects and subdivisions thereof. For example, web browsers displaying multiple hyperlinks, directory menus displaying multiple folders, application icons and/or application icons, and spreadsheets containing multiple individual cells.

FIGS. 5A-5L illustrate exemplary user interfaces for providing feedback when a focus selector moves over a user interface object in accordance with some embodiments. The user interfaces in these figures are used to illustrate the processes described below, including the processes in FIGS. 6A-6C.

FIGS. 5E-5I include intensity diagrams that show the current intensity of the contact on the touch-sensitive surface relative to a plurality of intensity thresholds including a first intensity threshold (e.g., light press intensity threshold "$IT_L$") and a second threshold (e.g., deep press intensity threshold "$IT_D$"). FIGS. 5C, 5D, and 5K include velocity diagrams that show the current velocity of the contact on the touch-sensitive surface relative to a first velocity threshold (e.g., a fast velocity threshold "$VT_F$") and a second threshold (e.g., a slow velocity threshold $VT_S$"). In some embodiments, the second velocity threshold is higher than the first velocity threshold. These velocity diagrams are typically not part of the displayed user interface, but are provided to aid in the interpretation of the figures.

Figure 5A:
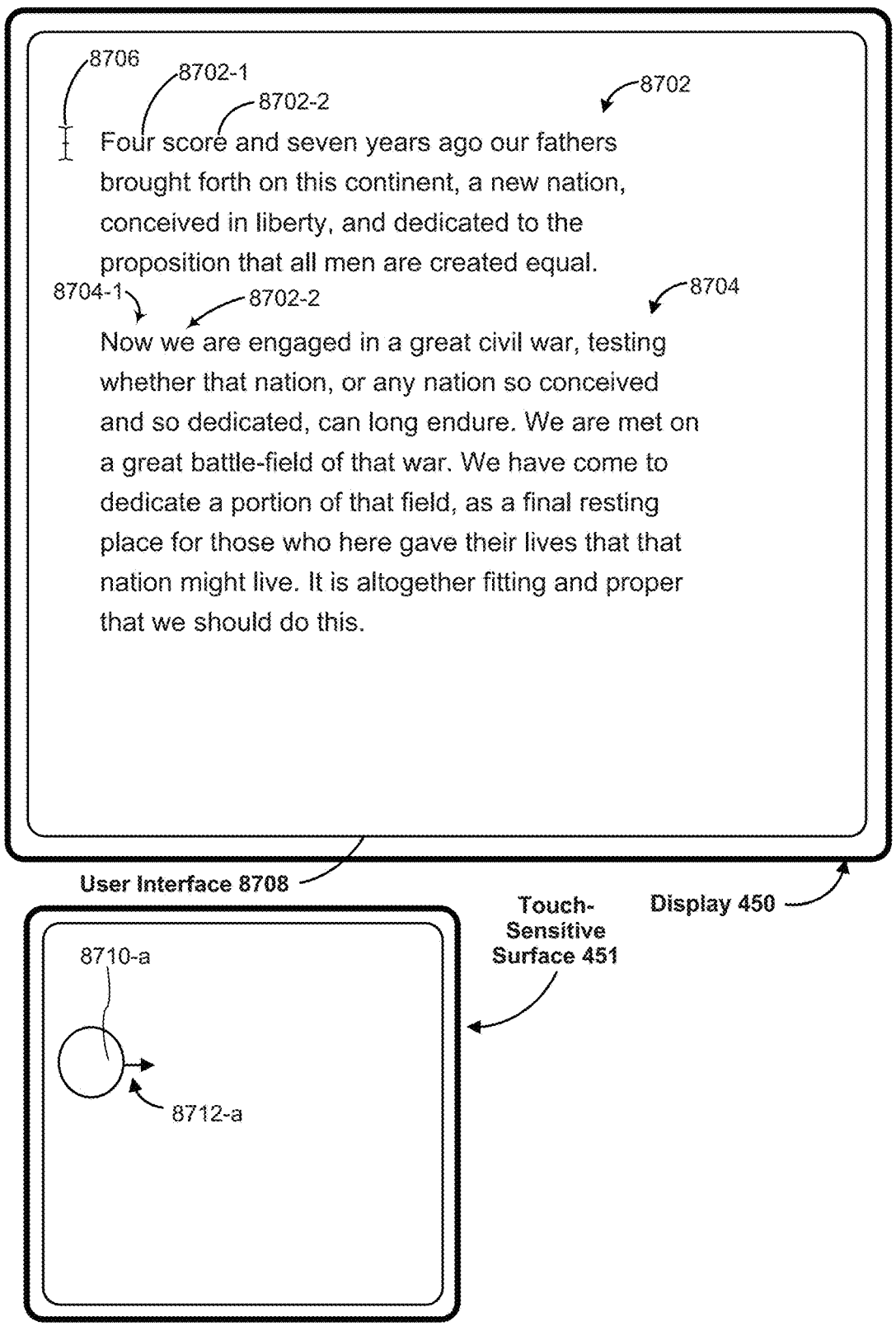
FIGS. 5A-5M illustrate exemplary user interfaces for providing feedback when a focus selector moves over a user interface object in accordance with some embodiments.
Figure 6A:
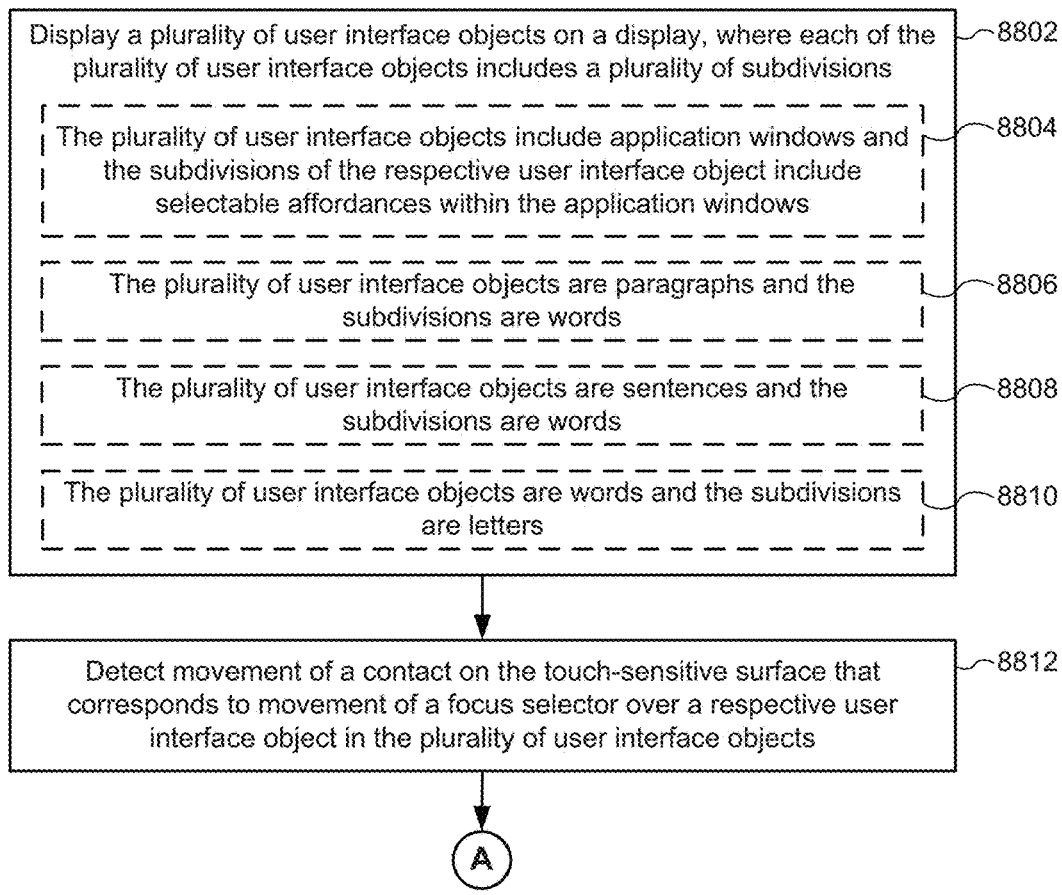
FIGS. 6A-6C are flow diagrams illustrating a method of providing feedback when a focus selector moves over a user interface object in accordance with some embodiments.
Figure 6B:
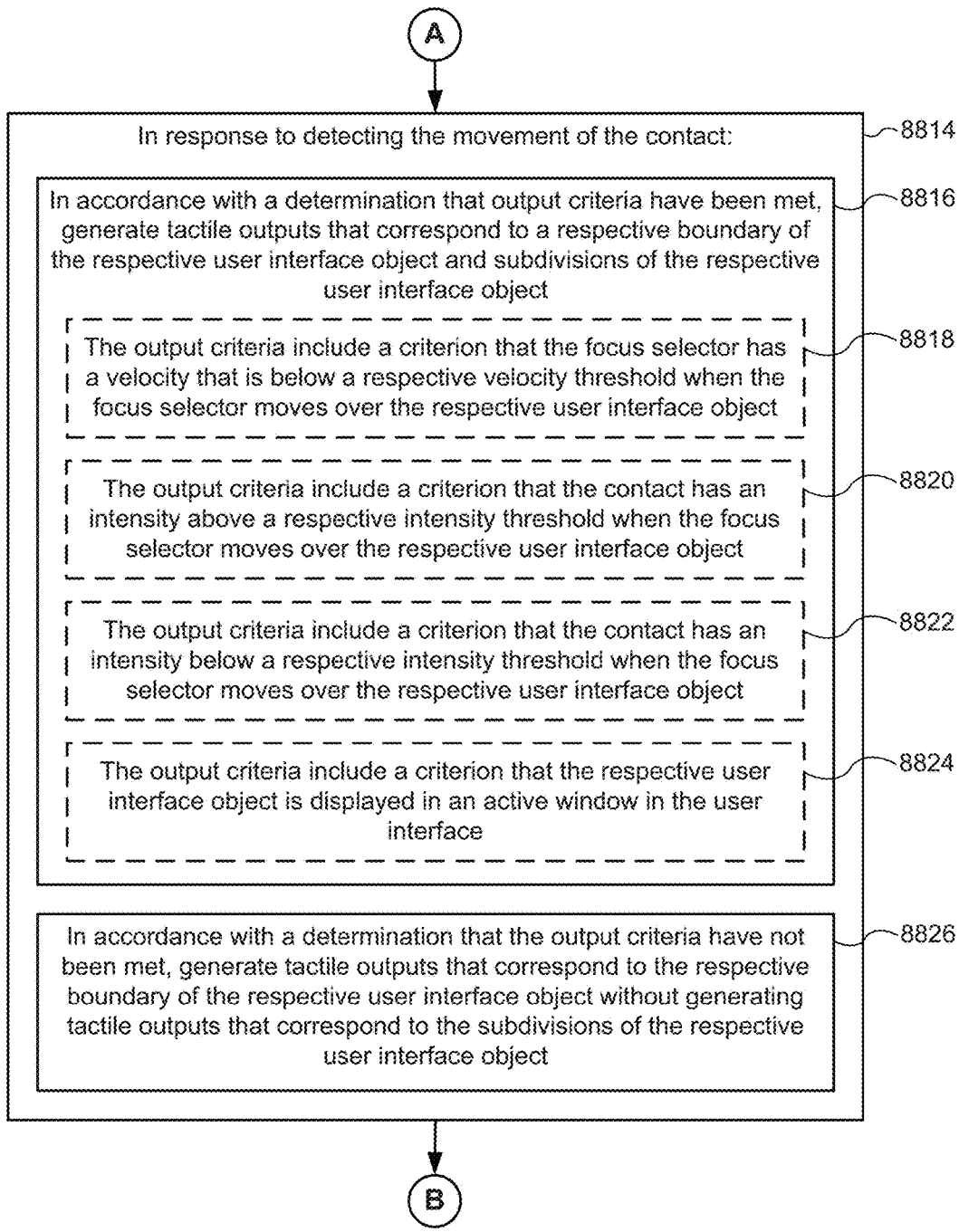
Figure 6C:
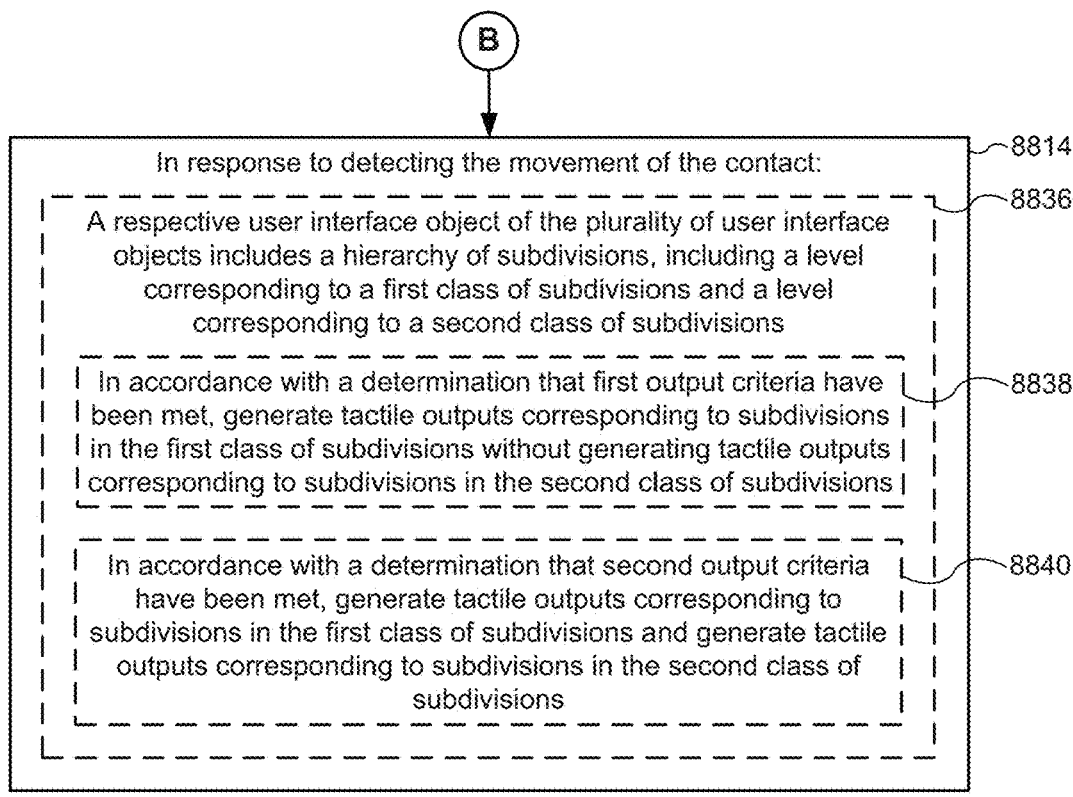

FIG. 5A illustrates exemplary user interface 8708 displaying text that includes multiple user interface objects (e.g., paragraphs) in accordance with some embodiments. In FIG. 5A, user interface 8708 is displayed on display 450 of an electronic device that also includes touch-sensitive surface 451 and one or more sensors for detecting intensity of contacts with touch-sensitive surface 451. In some embodiments, touch-sensitive surface 451 is a touch screen display that is optionally display 450 or a separate display. User interface 8708 displays a plurality of user interface objects, including first user interface object 8702 and second user interface object 8704, where the first user interface object 8702 and second user interface object 8704 include a plurality of subdivisions. For example, first user interface object 8702, e.g., the first paragraph displayed on display 450, includes a plurality of subdivisions (e.g., individual words), including first user interface object subdivision 8702-1 (i.e., the word "Four") and second user interface object subdivision 8702-2 (i.e., the word "score"). In FIG. 5A, user interface 8708 also displays cursor 8706, controllable by the user through contacts on touch-sensitive surface 451. For example, detection of movement of a contact on touch-sensitive surface 451 corresponds to movement of cursor 8706 on user interface 8708. While paragraphs 8702 and 8704 are described above as user interface objects with subdivisions, in some embodiments, the words (or sentences) of these paragraphs are considered to be user interface objects with subdivisions (e.g., the sentences are user interface objects with words as subdivisions, or the words are user interface objects with letters as subdivisions).

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 5A-5M and FIGS. 6A-6C will be discussed with reference to display 450 and a separate touch-sensitive surface 451, however analogous operations are, optionally, performed on a device with a touch-sensitive display system 112 in response to detecting movement of the contacts described in FIGS. 5A-5M on the touch-sensitive display system 112 while displaying the user interfaces shown in FIGS. 5A-5M on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 8706.

Figure 5B:
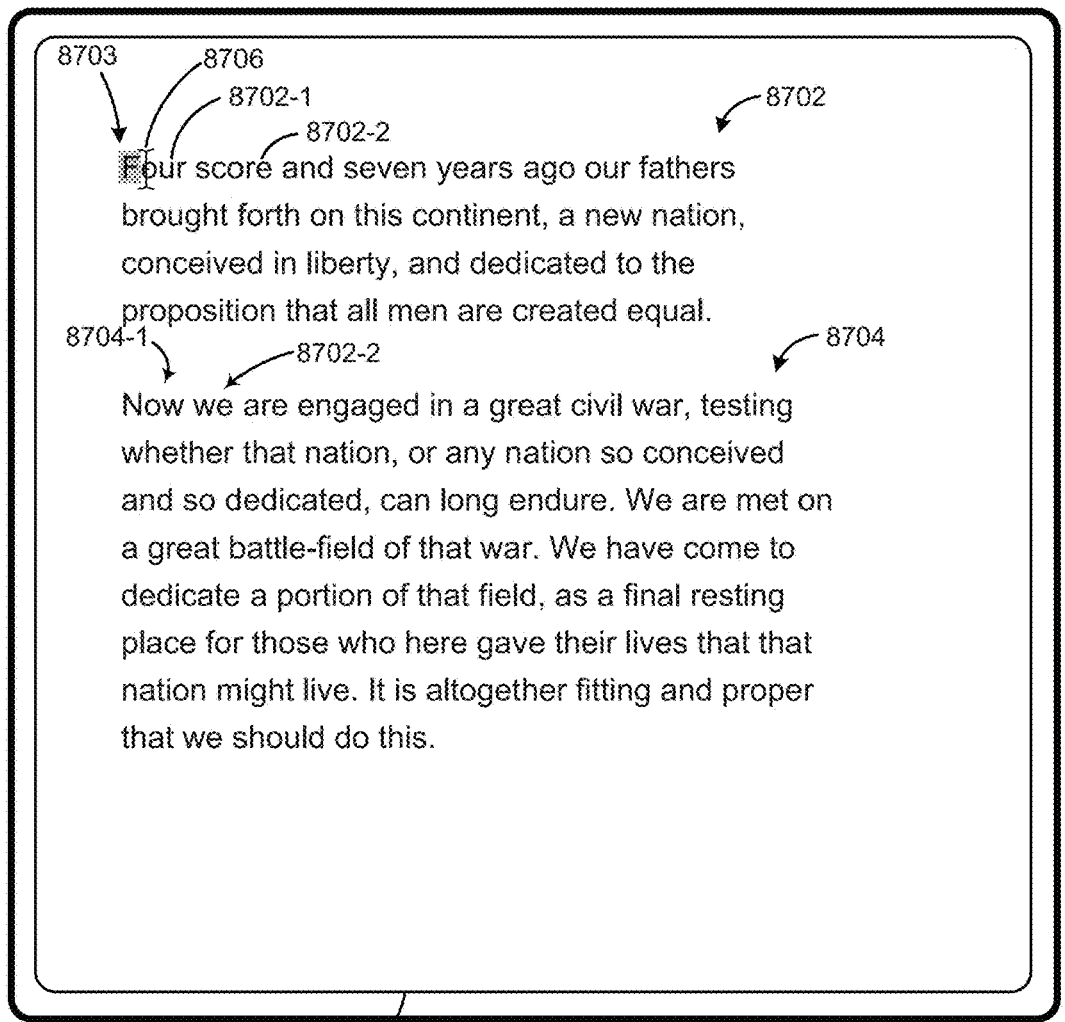
Figure 5B:
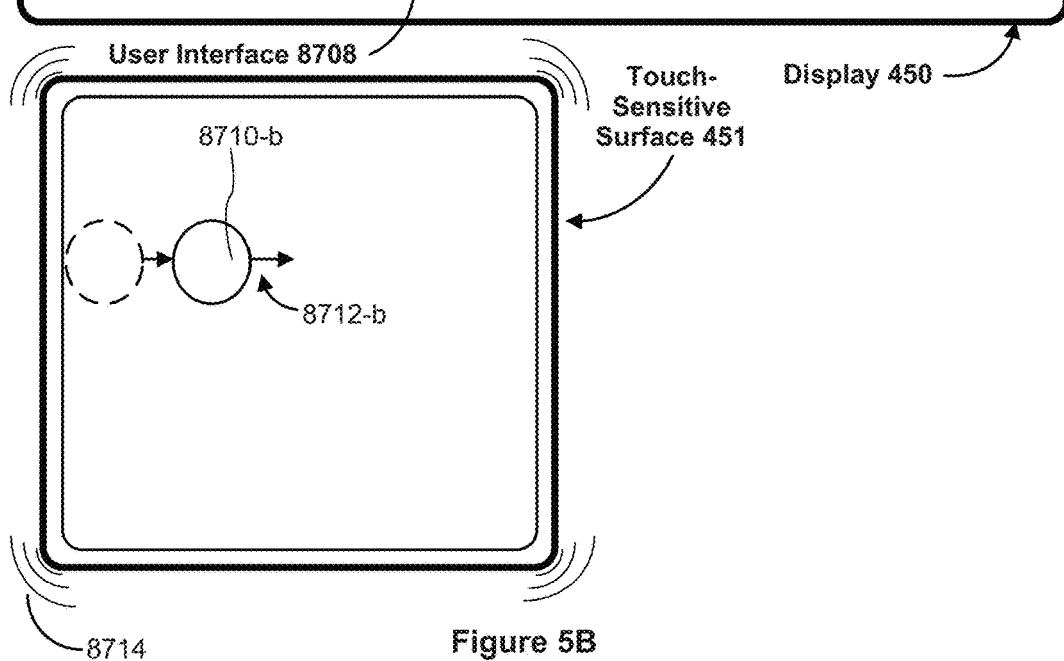
Figure 5C:
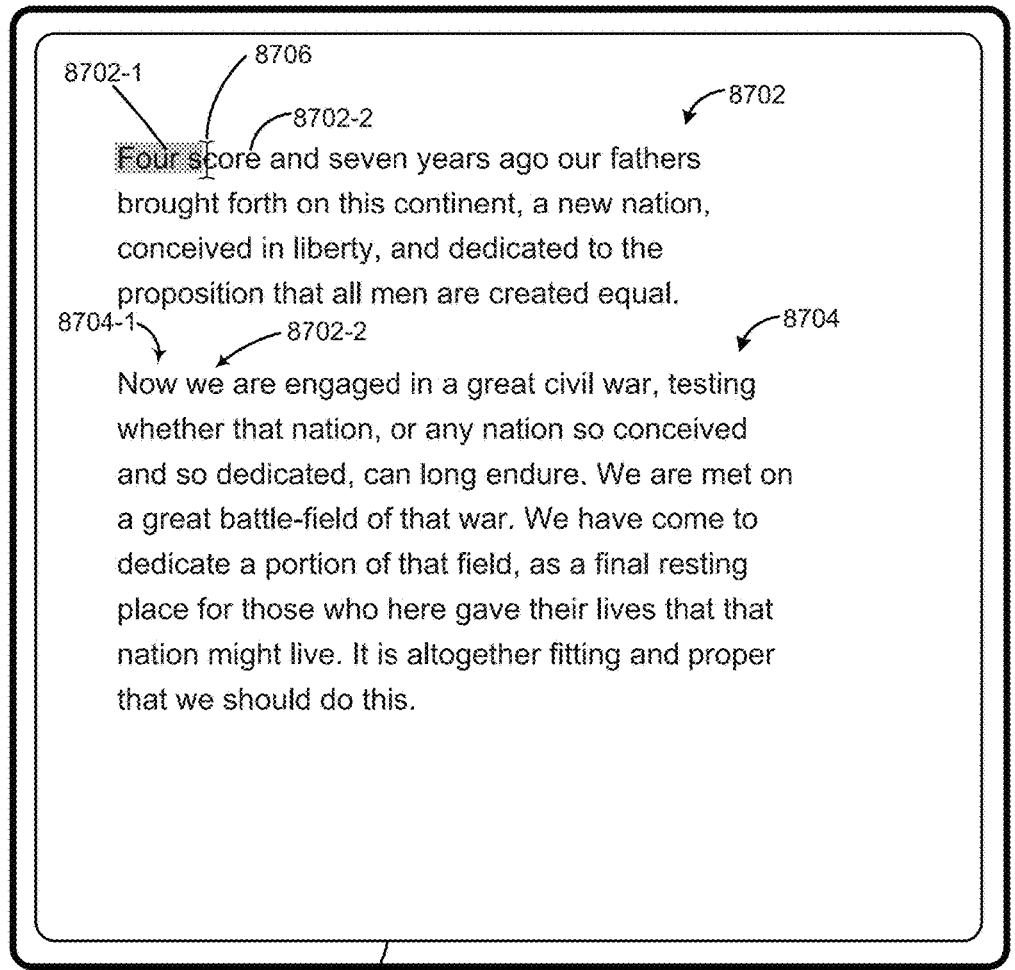
Figure 5C:
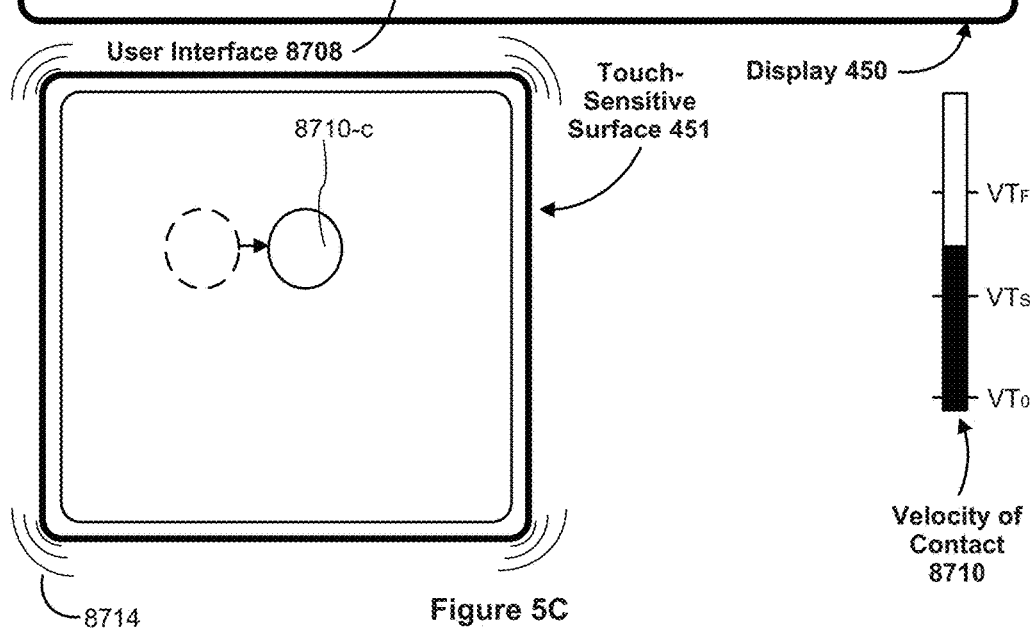
Figure 5D:
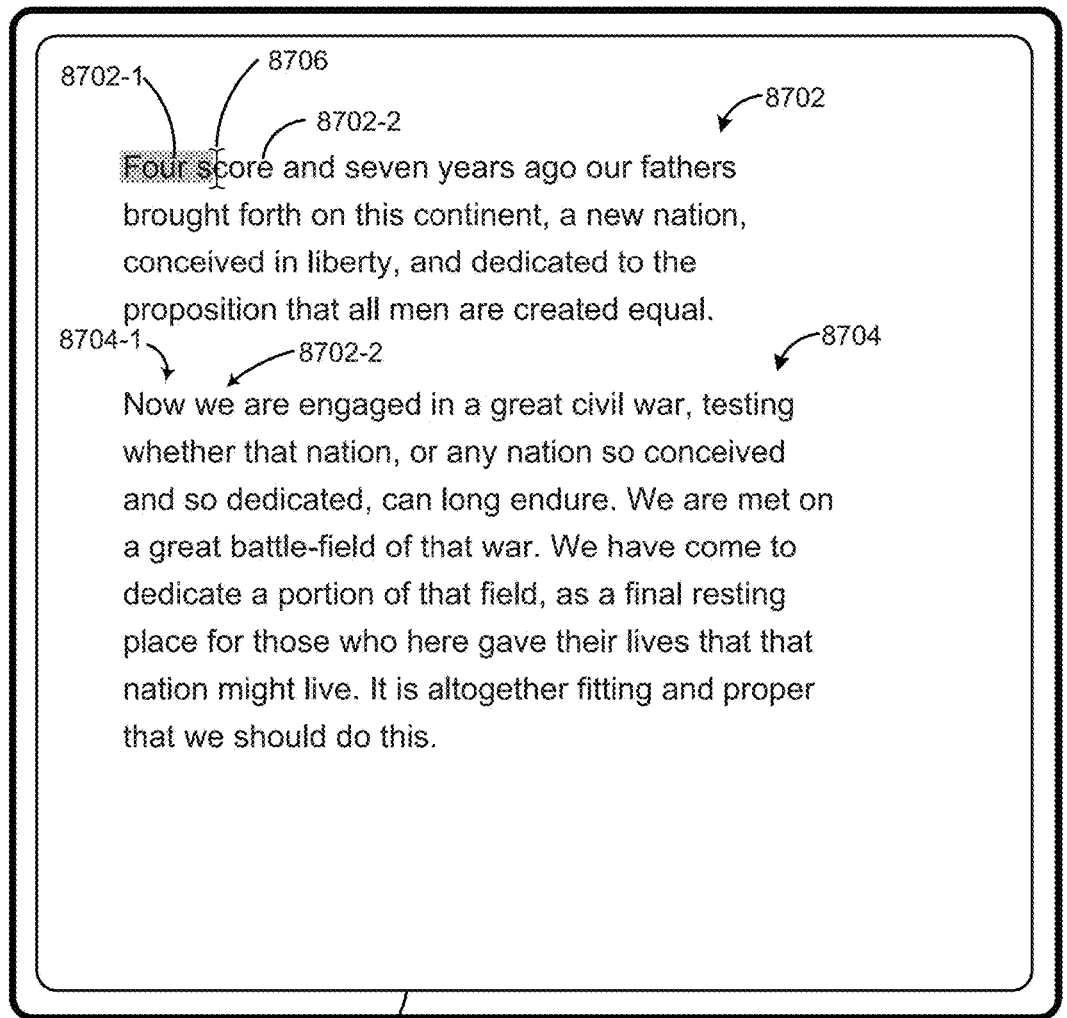
Figure 5D:
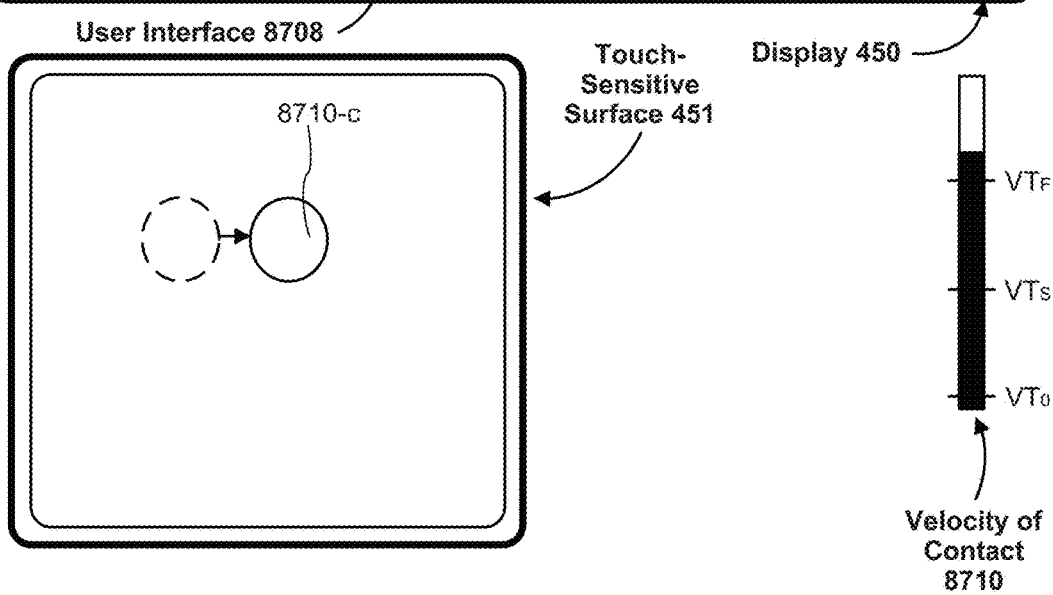
Figure 5E:
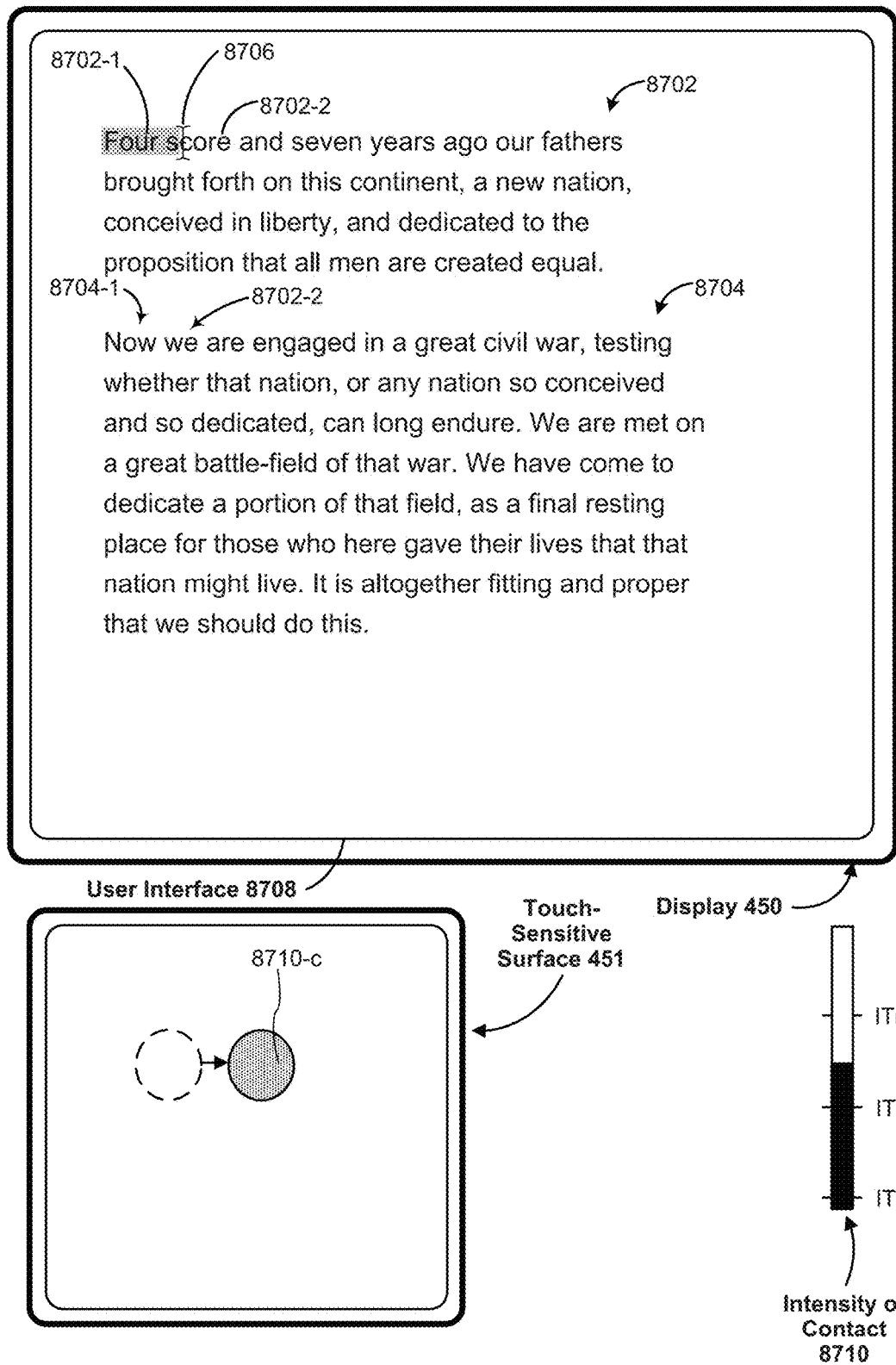
Figure 5F:
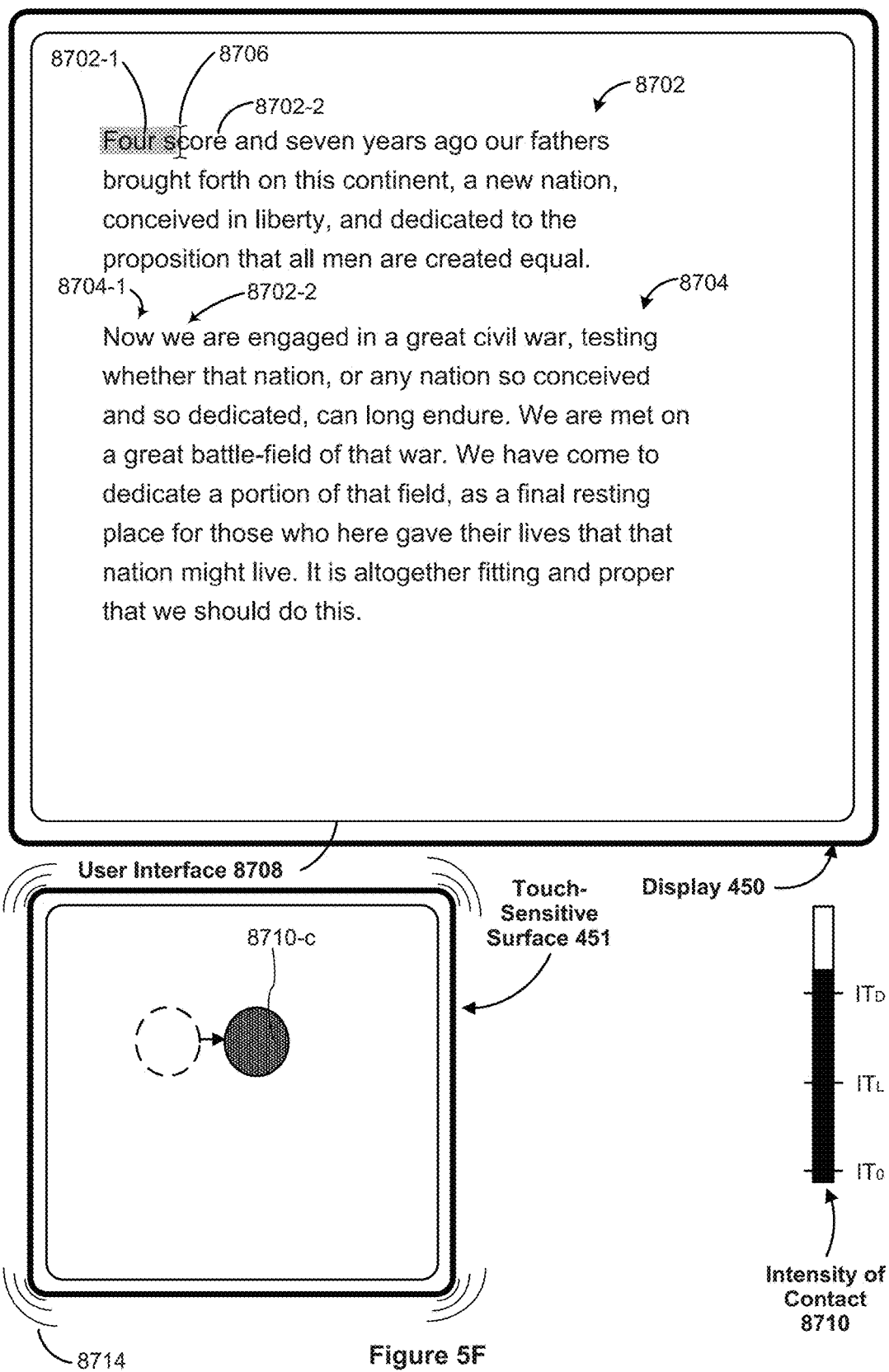
Figure 5G:
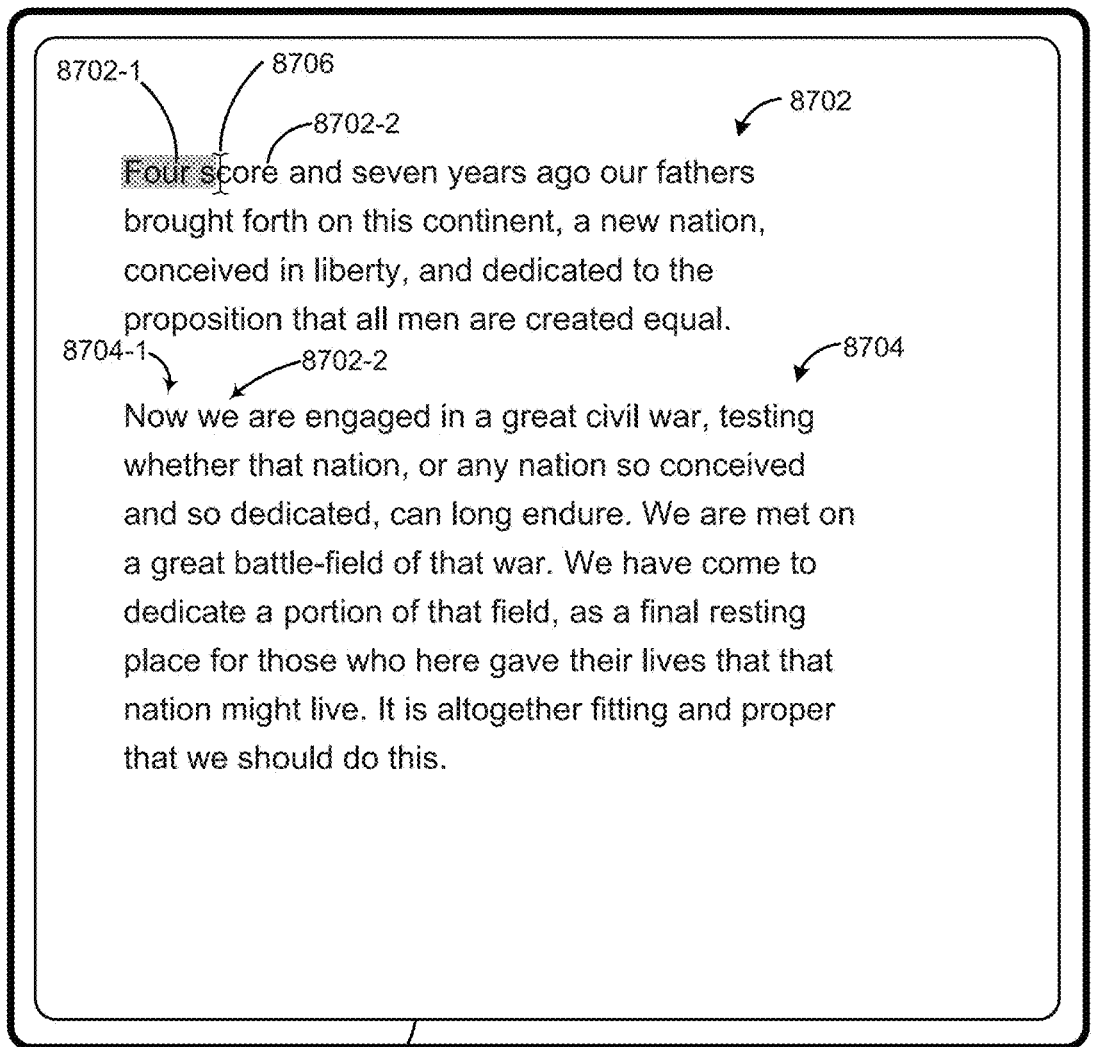
Figure 5G:
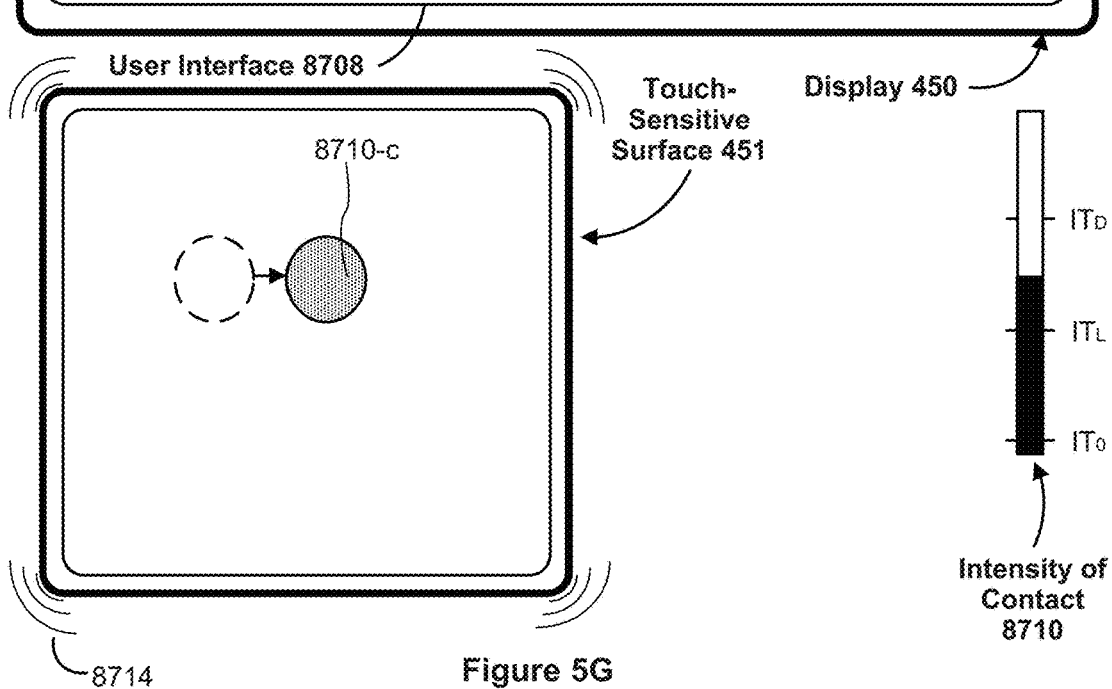
Figure 5H:
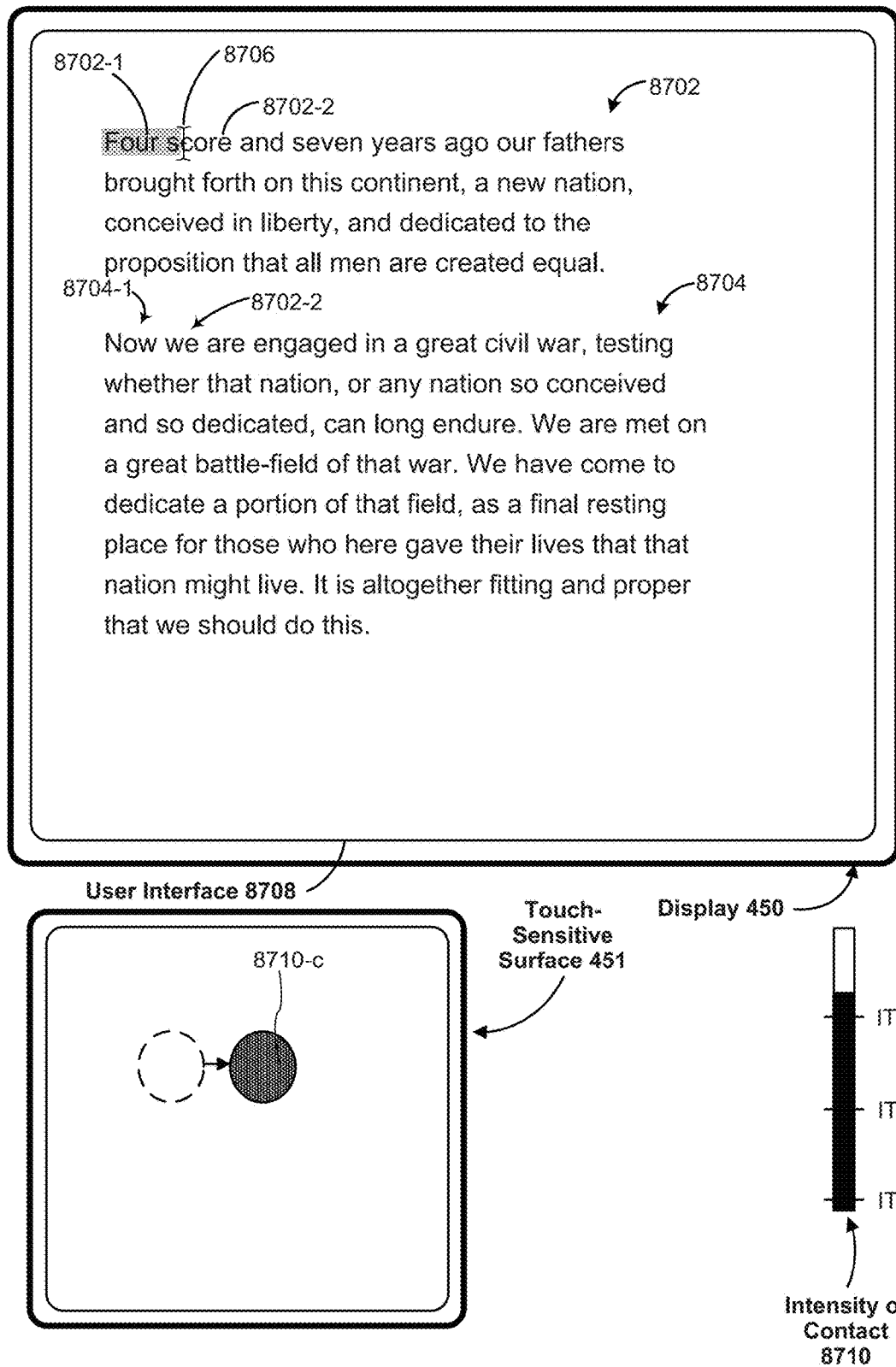
Figure 5I:
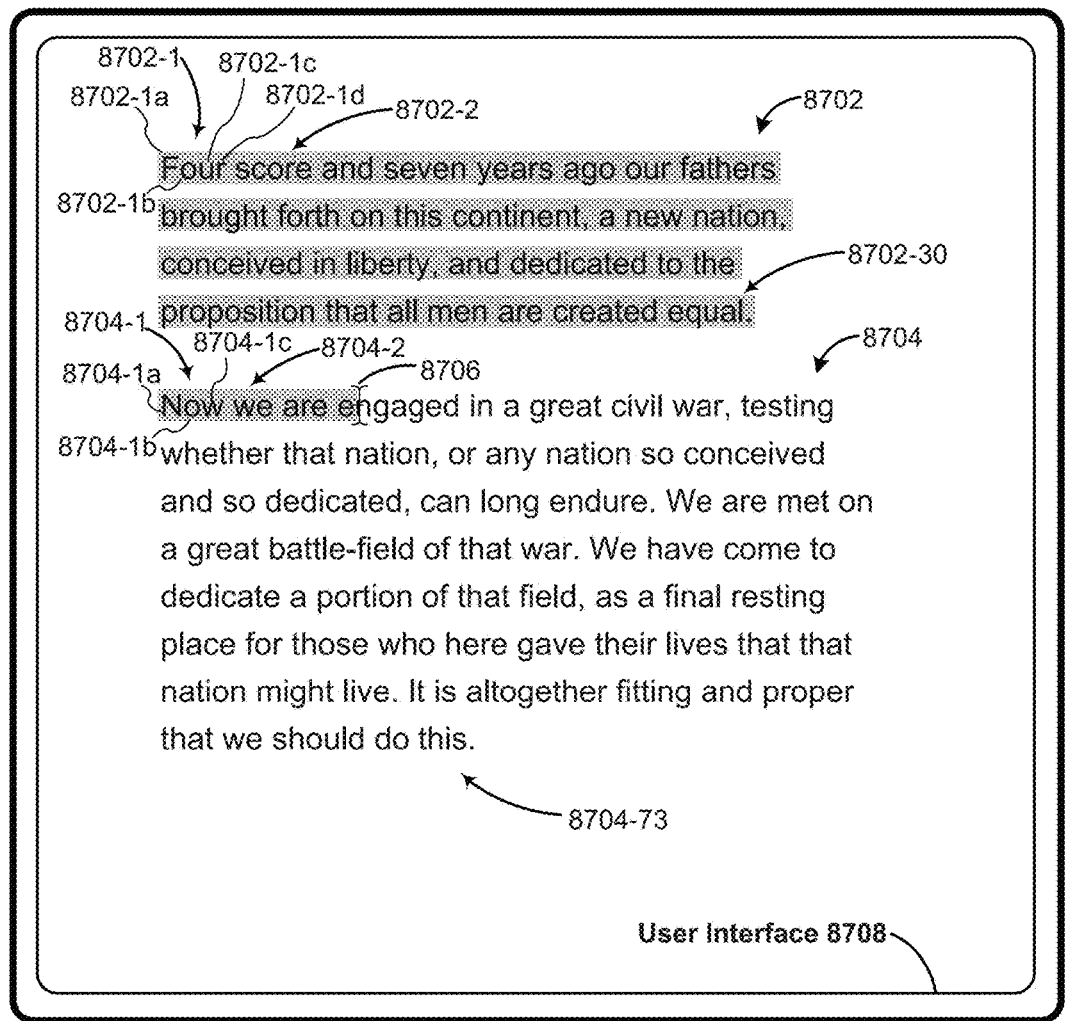
Figure 5I:
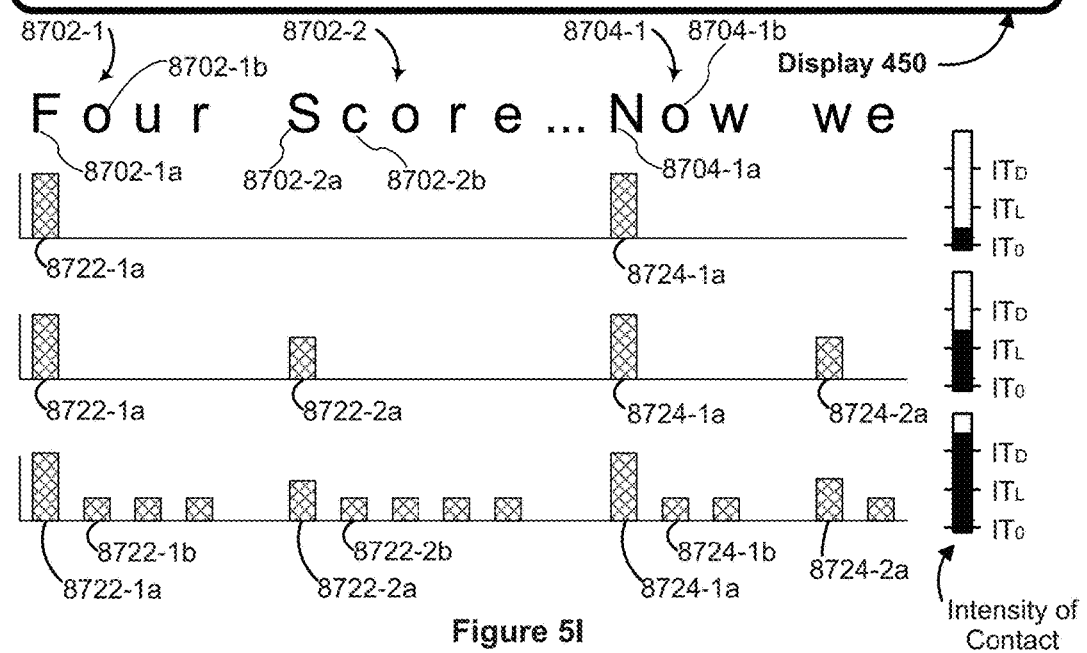
Figure 5J:
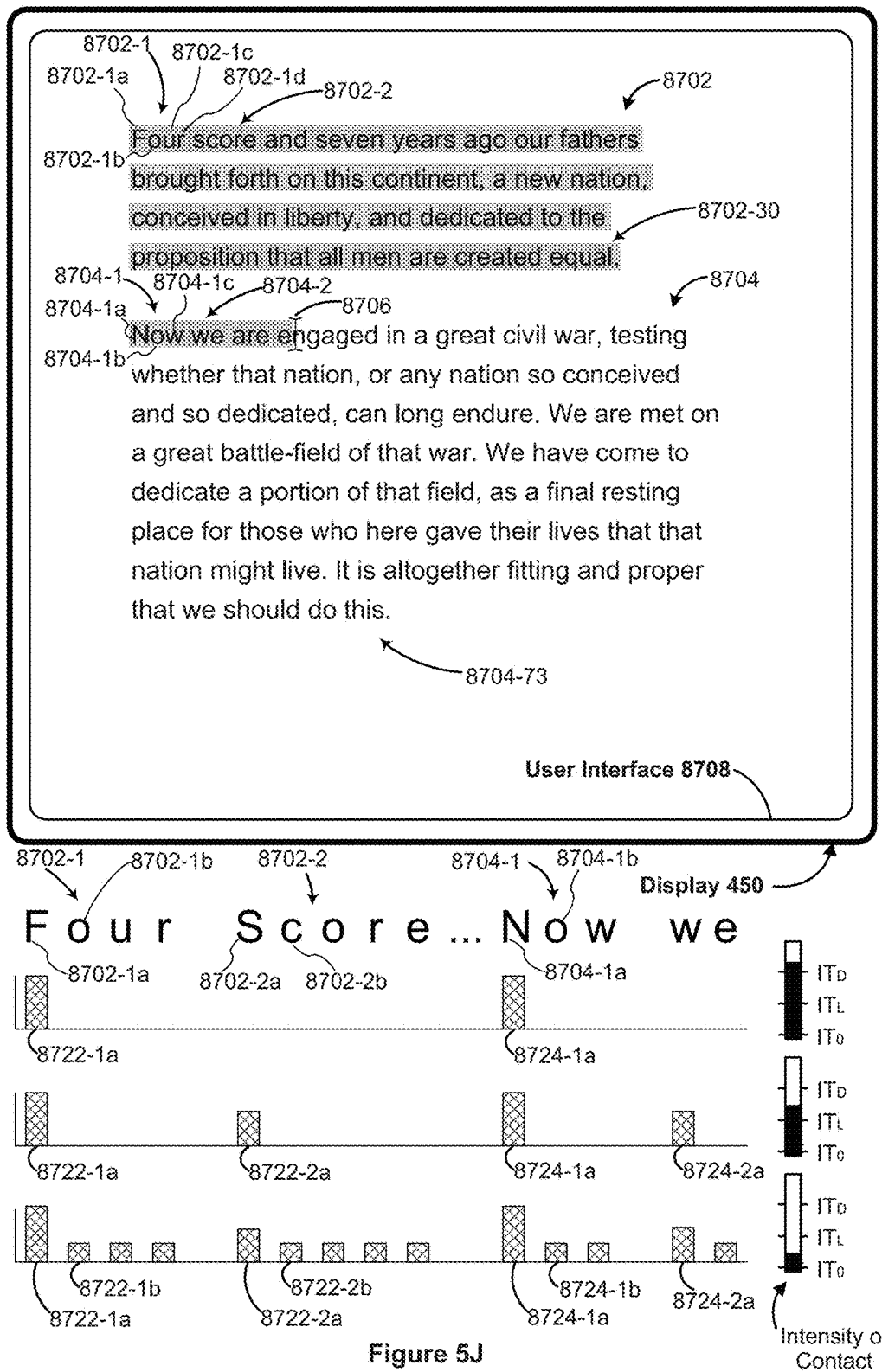
Figure 5K:
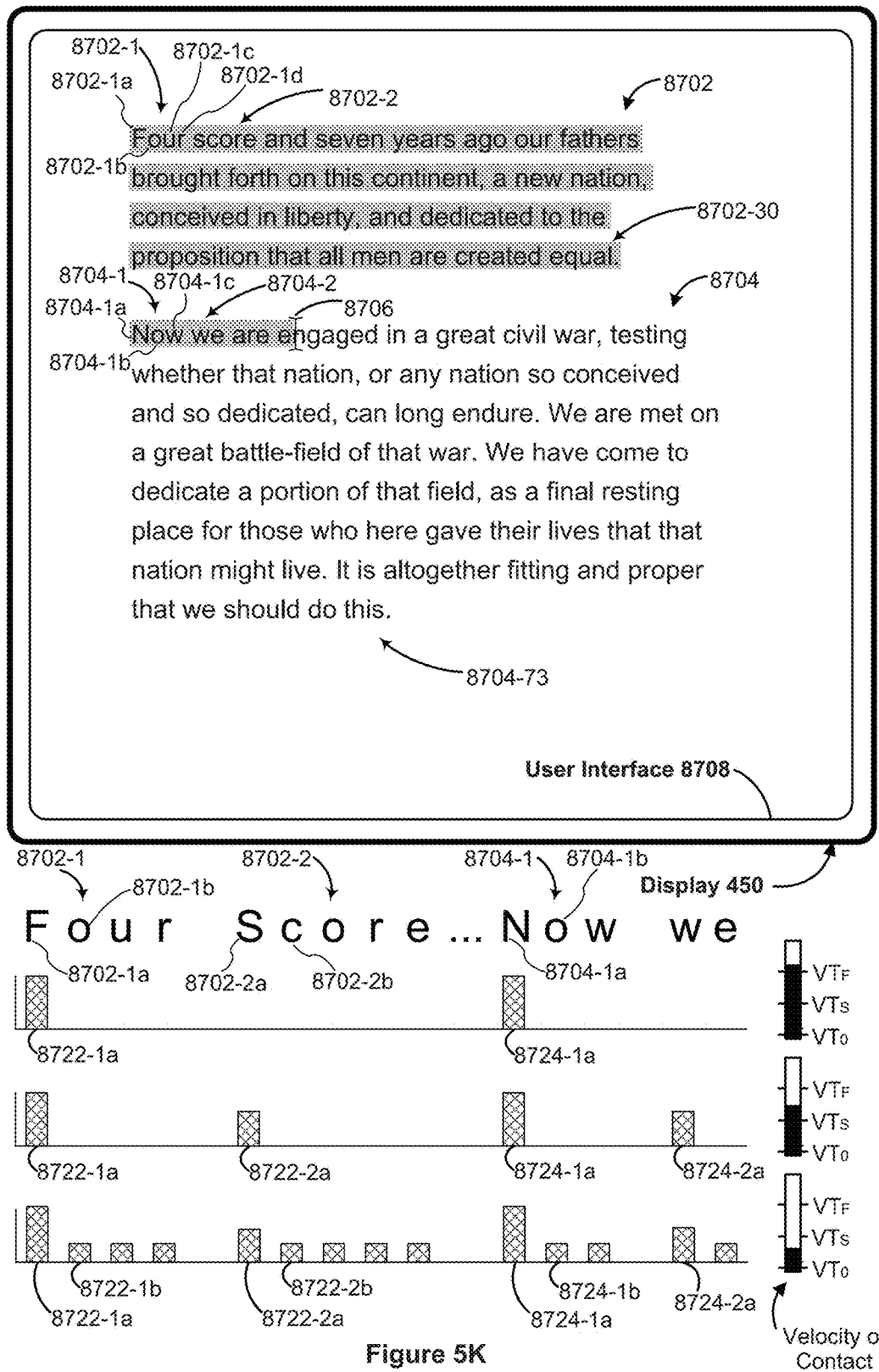

FIGS. 5A-5K illustrate that contact 8710 and gesture 8712 are detected on touch-sensitive surface 451 (e.g., movement 8712-a of contact 8710 from location 8710-a in FIG. 5A to location 8710-b in FIG. 5B; movement 8712-b of contact 8710 from location 8710-b in FIG. 5B to location 8710-c in FIG. 5C; movement 8712-b of contact 8710 from location 8710-b in FIG. 5B to location 8710-c in FIG. 5D; movement 8712-b of contact 8710 from location 8710-b in FIG. 5B to location 8710-c in FIG. 5E; movement 8712-b of contact 8710 from location 8710-b in FIG. 5B to location 8710-c in FIG. 5F; movement 8712-b of contact 8710 from location 8710-b in FIG. 5B to location 8710-c in FIG. 5G; and/or movement 8712-b of contact 8710 from location 8710-b in FIG. 5B to location 8710-c in FIG. 5H. Contact 8710 occurs at a position on touch-sensitive surface 451 corresponding to an area on display 450 occupied by first user interface object 8702 (e.g., contact 8710 corresponds to a focus selector on the display, such as cursor 8706 which is at or near a location of user interface object 8702). Gesture 8712 includes movement of contact 8710 on touch-sensitive surface 451 that corresponds to movement of focus selector (e.g., a cursor 8706) on display 450 (e.g., as illustrated in FIGS. 5A-5F).

FIG. 5B illustrates that continuation of gesture 8712 includes movement of contact 8710 on touch-sensitive surface 451 that corresponds to movement of cursor 8706 over user interface object 8702 displayed on display 450 (e.g., movement of the cursor 8706 into a respective area of the display that is occupied by a first paragraph of text). In response to detecting movement of contact 8710 on touch-sensitive surface 451 that corresponds to movement of cursor 8706 over user interface object 8702, tactile output generators 167 generate tactile outputs 8714 that correspond to boundary 8703 of user interface object 8702 (e.g., a beginning of paragraph 8702).

FIGS. 5B-5C illustrate an example where, in accordance with a determination that output criteria have been met, tactile output generators 167 generate tactile outputs 8714 that correspond to boundary 8703 of the user interface object 8702, as in FIG. 5B, and subdivision 8702-2 (i.e., the word "score") of user interface object 8702, as in FIG. 5C. FIGS. 5B and 5D illustrate an example where, in accordance with a determination that the output criteria have not been met, tactile output generators 167 generate tactile outputs 8714 that correspond to boundary 8703 of the user interface object 8702, as in FIG. 5B, without generating tactile outputs that correspond to subdivision 8702-2 of user interface object 8702, as in FIG. 5D.

In some embodiments, as illustrated in FIGS. 5C-5D, the output criteria include a criterion that the focus selector has a velocity that is below a respective velocity threshold (e.g., "$VT_F$") when the focus selector moves over the respective user interface object. For example, as illustrated in FIG. 5C, in response to detecting movement of cursor 8706 over user interface object 8702, in accordance with a determination that an output criterion (e.g., that cursor 8706, or alternatively contact 8710, has a velocity that is below a respective velocity threshold $VT_F$) has been met (e.g., because cursor 8706, or alternatively contact 8710, has a velocity that is below $VT_F$ in FIG. 5C), tactile output generators 167 generate tactile outputs 8714 that correspond to boundary 8703 (e.g., as shown in FIG. 5B) of the user interface object 8702 and subdivision 8702-2 (e.g., as shown in FIG. 5C). In contrast, as illustrated in FIG. 5D, in response to detecting movement of cursor 8706 over user interface object 8702, in accordance with a determination that an output criterion (e.g., that cursor 8706, or alternatively contact 8710, has a velocity that is below a respective velocity threshold $VT_F$) has not been met (e.g., because cursor 8706, or alternatively contact 8710, has a velocity below $VT_F$ in FIG. 5D), tactile output generators 167 generate tactile outputs 8714 that correspond to boundary 8703 (e.g., as shown in FIG. 5B) of the user interface object without generating tactile outputs that correspond to subdivision 8702-2 (e.g., as shown in FIG. 5D).

In some embodiments, as illustrated in FIGS. 5E-5F, the output criteria include a criterion that the contact has an intensity above a respective intensity threshold (e.g., "$IT_D$") when the focus selector moves over the respective user interface object. For example, as illustrated in FIG. 5E, in response to detecting movement of cursor 8706 over user interface object 8702, in accordance with a determination that an output criterion (e.g., that contact 8710 has an intensity above a respective intensity threshold "$IT_D$") has not been met (e.g., because contact 8710 has an intensity below $IT_D$ in FIG. 5E), tactile output generators 167 generate tactile outputs 8714 that correspond to boundary 8703 of the user interface object (e.g., as shown in FIG. 5B) without generating tactile outputs that correspond to subdivision 8702-2. In contrast, as illustrated in FIG. 5F, in response to detecting movement of cursor 8706 over user interface object 8702, in accordance with a determination that an output criterion (e.g., that contact 8710 has an intensity above a respective intensity threshold "$IT_D$") has been met (e.g., because contact 8710 has an intensity above $IT_D$ in FIG. 5F), tactile output generators 167 generate tactile outputs 8714 that correspond to boundary 8703 of the user interface object 8702 (e.g., as shown in FIG. 5B) and subdivision 8702-2 (e.g., as shown in FIG. 5F).

In some embodiments, as illustrated in FIGS. 5G-5H, the output criteria include a criterion that the contact has an intensity below a respective intensity threshold (e.g., "$IT_D$") when the focus selector moves over the respective user interface object. For example, as illustrated in FIG. 5G, in response to detecting movement of cursor 8706 over user interface object 8702, in accordance with a determination that an output criterion (e.g., that contact 8710 has an intensity below a respective intensity threshold $IT_D$) has been met (e.g., because contact 8710 has an intensity below $IT_D$ in FIG. 5G), tactile output generators 167 generate tactile outputs 8714 that correspond to boundary 8703 (e.g., as shown in FIG. 5B) of the user interface object 8702 and subdivision 8702-2 (e.g., as shown in FIG. 5G). In contrast, as illustrated in FIG. 5H, in response to detecting movement of cursor 8706 over user interface object 8702, in accordance with a determination that an output criterion (e.g., that contact 8710 has an intensity below a respective intensity threshold $IT_D$) has not been met (e.g., because contact 8710 has an intensity above $IT_D$ in FIG. 5H), tactile output generators 167 generate tactile outputs 8714 that correspond to boundary 8703 (e.g., as shown in FIG. 5B) of the user interface object without generating tactile outputs that correspond to subdivision 8702-2 (e.g., as shown in FIG. 5H).

FIGS. 5I-5K illustrates an example, where first user interface object 8702 and second user interface object 8704 include a hierarchy of subdivisions, including a level corresponding to a first class of subdivisions and a level corresponding to a second class of subdivisions. For example, first user interface object 8702, e.g., the first paragraph displayed on display 450, includes a first class of subdivisions (e.g., individual words), including first user interface object subdivision 8702-1 (i.e., the word "Four") and second user interface object subdivision 8702-2 (i.e., the word "score"), and a second class of subdivisions (e.g., individual letters), including first user interface super-sub-division 8702-1a (i.e., the letter "F") and second user interface super-subdivision 8702-1b (i.e., the letter "o").

FIGS. 5I-5K illustrate tactile outputs generated in response to detecting a continuation of gesture 8712 includes movement of contact 8710 on touch-sensitive surface 451 that corresponds to movement of cursor 8706 over first user interface object 8702 and second user interface object 8704 displayed on display 450 (e.g., movement of the cursor into a respective area of the display that is occupied by a first paragraph of text followed by movement into a respective area of the display that is occupied by a second paragraph of text). In response to detecting movement of contact 8710 on touch-sensitive surface 451 that corresponds to movement of cursor 8706 over user interface object 8702, tactile output generators 167 generate tactile outputs 8714 that correspond to boundary 8703 of user interface object 8702, as shown in FIG. 5B.

In some embodiments, illustrated in FIGS. 5I-5K, in accordance with a determination that first output criteria have been met, tactile output generators 167 generate: tactile outputs 8722-1a and 8724-1a that correspond to respective boundaries of first user interface object 8702 and second user interface object 8704; and tactile outputs (e.g., tactile outputs 8722-2a and 8724-2a) that correspond to respective boundaries of first class subdivisions (e.g., individual words) 8702-2 to 8702-30 and 8704-2 to 8704-73, without generating tactile outputs corresponding to subdivisions in the second class of subdivisions (e.g., individual letters), and in accordance with a determination that second output criteria have been met, (optionally, in addition to a determination that the first output criteria have been met) tactile output generators 167 generate tactile outputs: 8722-1a and 8724-1a that correspond to respective boundaries of first user interface object 8702 and second user interface object 8704; tactile outputs 8722-2a and 8724-2a that correspond to respective boundaries of first class subdivisions (e.g., individual words) 8702-2 to 8702-30 and 8704-2 to 8704-73; and tactile outputs (e.g., tactile outputs 8722-1b and 8724-1b) that correspond to respective boundaries of second class subdivisions (e.g., individual letters) including subdivisions 8702-1b to 8702-2d and 8704-1b to 8704-1c. In some embodiments, for a user interface object that is an application window with a block of text, the first and second subdivision levels include two or more of: paragraphs, sentences, words, and letters.

In some embodiments where tactile outputs are generated for different types of boundaries (e.g., boundaries of user interface objects, boundaries of the first class of subdivisions and boundaries of the second class of subdivisions), the tactile outputs generated for a first type of boundary are different from the tactile outputs generated for a second type of boundary. For example, in FIGS. 5I-5K, the tactile outputs 8722-1a and 8724-1a that correspond to respective boundaries of first user interface object 8702 and second user interface object 8704 have a first magnitude and/or movement profile; the tactile outputs 8722-2a and 8724-2a that correspond to respective boundaries of first class subdivisions (e.g., individual words) 8702-2 and 8704-2 have a second magnitude and/or movement profile that is different from the first magnitude/movement profile. Similarly, tactile outputs 8722-1b and 8724-1b that correspond to respective boundaries of second class subdivisions (e.g., individual letters) 8702-1b and 8704-1b have a third magnitude and/or movement profile that is different from the first magnitude/movement profile and the second magnitude/movement profile. While the different types of boundaries are shown in FIGS. 5I-5K as being associated with tactile outputs with different magnitudes and/or movement profiles, in some embodiments, some or all of the different types of boundaries are associated with tactile outputs with the same or substantially similar magnitudes and/or movement profiles.

FIG. 5I illustrates an example where the output criteria include criteria based on contact intensity. In some of these embodiments, if the focus selector moves over a row of text while the user is pressing down very hard with the contact (e.g., with an intensity above a second intensity threshold "$IT_D$"), the device generates tactile outputs corresponding to the beginnings or ends of paragraphs or sentences, individual words, and individual letters. In contrast, when the focus selector moves over a row of text while the user is pressing down slightly less hard with the contact (e.g., with an intensity below a second intensity threshold "$IT_D$" but above a first intensity threshold "$IT_L$"), the device generates tactile outputs corresponding to the beginnings or ends of paragraphs or sentences and individual words but not individual letters. In contrast, when the focus selector moves over a row of text while the user is pressing down lightly with the contact (e.g., with an intensity below a first intensity threshold "$IT_L$"), the device only generates tactile outputs corresponding to beginnings or endings of paragraphs or sentences.

FIG. 5J illustrates an example where the output criteria include criteria based on contact intensity. In some of these embodiments, if the focus selector moves over a row of text while the user is pressing down very hard with the contact (e.g., with an intensity above a second intensity threshold "$IT_D$"), the device only generates tactile outputs corresponding to beginnings or endings of paragraphs or sentences. In contrast, when the focus selector moves over a row of text while the user is pressing down slightly less hard with the contact (e.g., with an intensity below a second intensity threshold "$IT_D$" but above a first intensity threshold "$IT_L$"), the device generates tactile outputs corresponding to the beginnings or ends of paragraphs or sentences and individual words but not individual letters. In contrast, when the focus selector moves over a row of text while the user is pressing down lightly with the contact (e.g., with an intensity below a first intensity threshold "$IT_L$"), the device generates tactile outputs corresponding to the beginnings or ends of paragraphs or sentences, individual words, and individual letters.

FIG. 5K illustrates an example where the output criteria include criteria based on contact velocity, or optionally focus selector velocity. In some of these embodiments, when the contact, or optionally the focus selector, is moving very fast (e.g., at a velocity above a fast velocity threshold "$VT_F$"), the device only generates tactile outputs corresponding to beginnings or endings of paragraphs or sentences. In contrast, when the contact, or optionally the focus selector, is moving slightly slower (e.g. at a velocity below a fast velocity threshold "$VT_F$" but above a slow velocity threshold "$VT_S$") the device generates tactile outputs corresponding to the beginnings or ends of paragraphs or sentences and individual words. In contrast, when the contact, or optionally the focus selector, is moving very slowly (e.g., at a velocity below a slow velocity threshold "$VT_S$"), the device generates tactile outputs corresponding to the beginnings or ends of paragraphs or sentences, individual words, and individual letters.

Figure 5L:
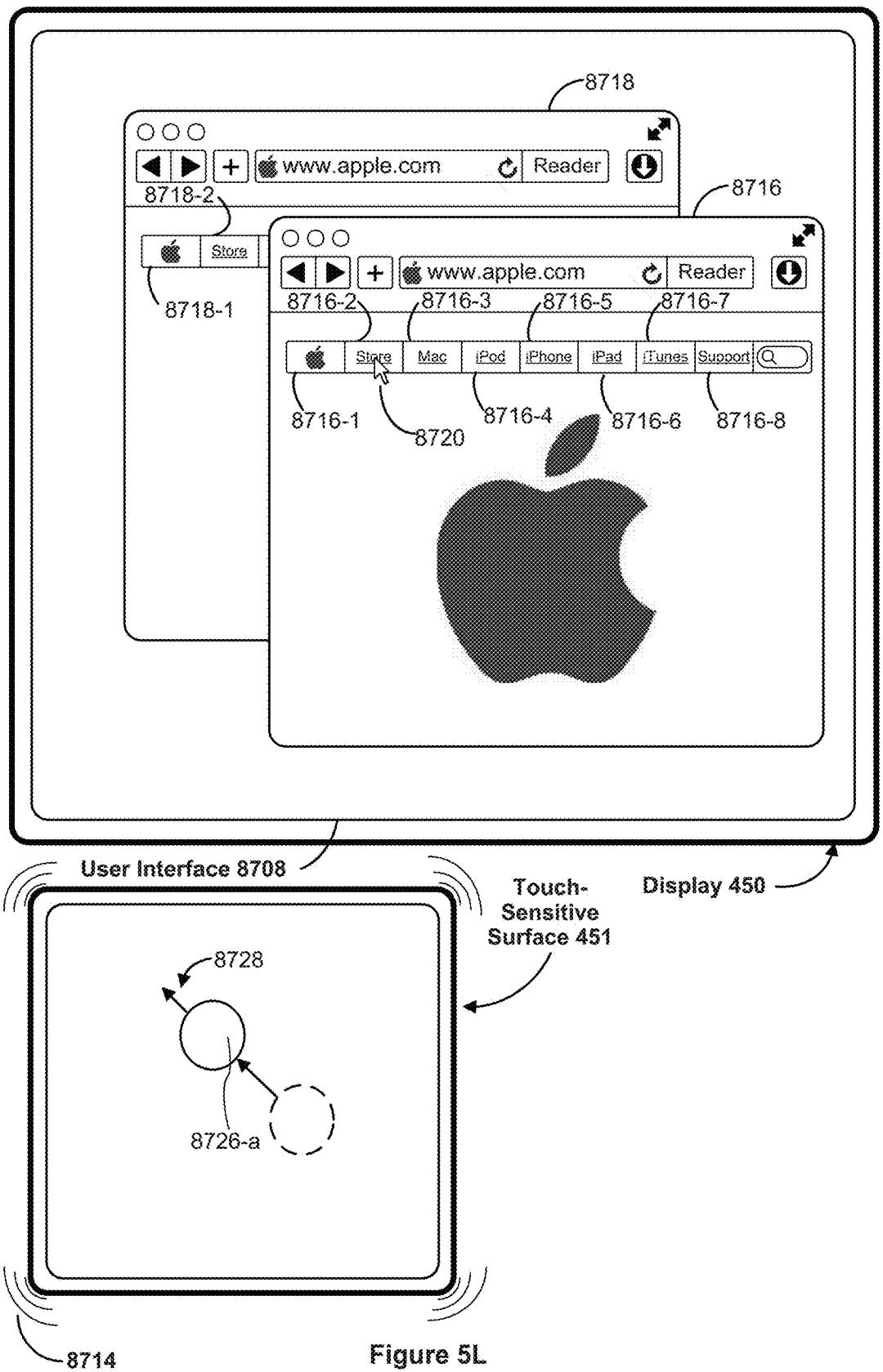

FIG. 5L illustrates an example where movement 8728 of contact 8726 on touch sensitive surface 451 corresponds to movement of cursor 8720 over subdivision 8716-2 (e.g., a hyperlink) of user interface object 8716 (e.g., an active web browser window), and in response to detecting movement of cursor 8720 over user interface object subdivision 8716-2 displayed in active user interface object 8716, where a determination that output criterion including that the respective user interface object is displayed in an active window in the user interface has been met (e.g., because user interface object 8716 is active), tactile output generators 167 generate tactile outputs 8714 that correspond to user interface object subdivision 8716-2. In contrast, as illustrated in FIG. 5M, continuation of gesture 8728 on touch sensitive surface 451 corresponds to movement of cursor 8720 over subdivision 8718-2 (e.g., a hyperlink) of user interface object 8718 (e.g., an inactive web browser window), and in response to detecting movement of cursor 8720 over user interface object subdivision 8718-2 displayed in inactive user interface object 8718, where a determination that output criterion including that the respective user interface object is displayed in an active window in the user interface has not been met (e.g., because user interface object 8718 is inactive), tactile outputs that correspond to user interface object subdivision 8718-2 are not generated.

Figure 5M:
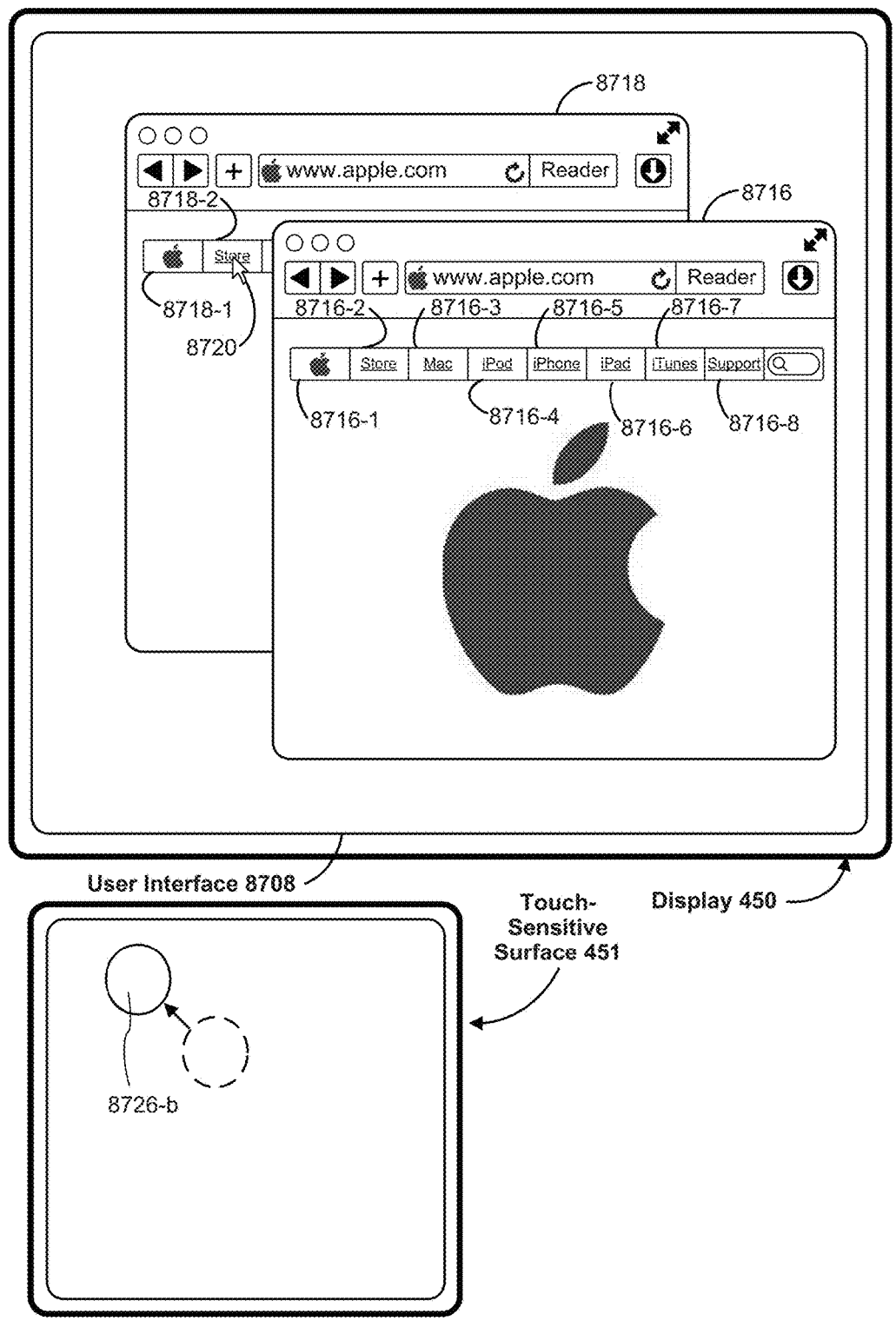

In some embodiments, as illustrated in FIGS. 5L-5M, the plurality of user interface objects include application windows (e.g., web browsers, document windows, file menus, and other application windows) and the subdivisions of the respective user interface object include selectable affordances within the application windows. (e.g., hyperlinks, folders, controls, and document icons).

In some embodiments, as illustrated in FIGS. 5A-5K, the plurality of user interface objects include blocks of text (e.g., paragraphs, sentences, or words) and the subdivisions of the respective user interface object include smaller portions of the text (e.g., sentences, words, or letters). In some embodiments, the plurality of user interface objects include paragraphs and the subdivisions of the respective user interface object include individual sentences. In some embodiments, the plurality of user interface objects include paragraphs and the subdivisions of the respective user interface object include individual words. In some embodiments, the plurality of user interface objects include paragraphs and the subdivisions of the respective user interface object include individual letters. In some embodiments, the plurality of user interface objects include sentences and the subdivisions of the respective user interface object include individual words. In some embodiments, the plurality of user interface objects include sentences and the subdivisions of the respective user interface object include individual letters. In some embodiments, the plurality of user interface objects include words and the subdivisions of the respective user interface object include individual letters.

In some embodiments, as illustrated in FIGS. 5I-5K, a respective user interface object of the plurality of user interface objects includes a hierarchy of subdivisions, including a level corresponding to a first class of subdivisions and a level corresponding to a second class of subdivisions (e.g., for a user interface object that is an application window with a block of text, the first and second subdivision levels include two or more of: paragraphs, sentences, words, and letters). In some embodiments, the plurality of user interface objects include paragraphs, a first class of subdivisions includes individual sentences, a second class of subdivisions includes individual words, and a third class of subdivisions includes individual letters. In some embodiments, the plurality of user interface objects include paragraphs, a first class of subdivisions includes individual sentences, a second class of subdivisions includes individual words. In some embodiments, the plurality of user interface objects include paragraphs, a first class of subdivisions includes individual sentences, a second class of subdivisions includes individual letters. In some embodiments, the plurality of user interface objects include paragraphs, a first class of subdivisions includes individual words, a second class of subdivisions includes individual letters. In some embodiments, the plurality of user interface objects include sentences, a first class of subdivisions includes individual words, a second class of subdivisions includes individual letters.

FIGS. 6A-6C are flow diagrams illustrating a method 8800 of providing feedback when a focus selector moves over a subdivision of a user interface object in accordance with some embodiments. The method 8800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 8800 are, optionally, combined and/or the order of some operations is, optionally, changed.

As described below, the method 8800 provides an intuitive way to provide feedback when a focus selector moves over a user interface object. The method reduces the cognitive burden on a user when detecting feedback when a focus selector moves over a user interface object, thereby creating a more efficient human-machine interface. For battery-operated electronic devices, enabling a user to detect feedback when a focus selector moves over a user interface object faster and more efficiently conserves power and increases the time between battery charges.

In some embodiments, the device displays (8802) a plurality of user interface objects (e.g., first user interface object 8702 and second user interface object 8704 in FIGS. 5A-5K or first user interface object 8716 and second user interface object 87!6 in FIGS. 5L-5M) on a display (e.g., display 450 in FIGS. 5A-5K), where each of the plurality of user interface objects includes a plurality of subdivisions (e.g., first user interface object subdivisions 8702-1 and 8702-2, and second user interface object subdivisions 8704-1 and 8704-2, in FIGS. 5A-5K or first user interface object subdivisions 8716-1 and 8716-2, and second user interface object subdivisions 8718-1 and 8718-2, in FIGS. 5L-5M).

In some embodiments, the plurality of user interface objects include (8804) application windows and the subdivisions of the respective user interface object include selectable affordances within the application windows (e.g., hyperlinks, folders, controls, document icons), as shown in FIGS. 5L-5M. In other embodiments, the plurality of user interface objects are (8806) paragraphs and the subdivisions are words. In other embodiments, the plurality of user interface objects are (8808) sentences and the subdivisions are words. In yet other embodiments, the plurality of user interface objects are (8810) words and the subdivisions are letters (e.g., the device generates tactile-outputs for each letter if a focus selector is moving slowly over a sentence, but only at the beginning of each word if the focus selector is moving quickly).

In some embodiments, while the device displays the user interface objects, the device detects (8812) movement of a contact (e.g., contact 8710 in FIGS. 5A-5H or contact 8726 in FIGS. 5L-5M) on the touch-sensitive surface (e.g., touch-sensitive surface 451) that corresponds to movement of a focus selector (e.g., cursor 8706 in FIGS. 5A-5K or cursor 8720 in FIGS. 5L-5M) over a respective user interface object (e.g., first user interface object 8702 in FIGS. 5A-5K or first user interface object 8716 in FIGS. 5L-5M) in the plurality of user interface objects.

In some embodiments, in response (8814) to detecting the movement of the contact: in accordance with a determination that output criteria have been met, the device generates (8816) tactile outputs (e.g., tactile outputs 8714 in FIGS. 5B-5C) that correspond to a respective boundary (e.g., a tactile output corresponding to boundary 8703 in FIG. 5B) of the respective user interface object and subdivisions (e.g., tactile outputs corresponding to subdivisions 8702-1 and 8702-2 in FIG. 5C) of the respective user interface object (e.g., user interface object 8702 in FIGS. 5B-5C). In some embodiments, the output criteria are subdivision-tactile-output criteria (e.g., criteria that are used to determined whether or not to provide tactile output corresponding to subdivisions in a respective user interface object).

In some embodiments, the output criteria include (8818) a criterion that the focus selector has a velocity that is below a respective velocity threshold when the focus selector moves over the respective user interface object. In some embodiments, if the focus selector moves quickly over a row of text, tactile outputs are generated at the beginning of paragraphs but not for individual sentences, words, and/or letters, whereas if the focus selector moves slowly over the row of text, tactile outputs are generated for the beginnings of paragraphs, as well as for individual sentences, words and/or individual letters. In some embodiments, if the focus selector moves quickly over a row of text, tactile outputs are generated at the beginning of sentences but not for individual words and/or letters, whereas if the focus selector moves slowly over the row of text, tactile outputs are generated for the beginnings of sentences, as well as for individual words and/or letters. In some embodiments, if the focus selector moves quickly over a row of text, tactile outputs are generated at the beginning of words but not for individual letters, whereas if the focus selector moves slowly over the row of text, tactile outputs are generated for the beginnings of words and also for individual letters.

In some embodiments, the output criteria include (8820) a criterion that the contact has an intensity above a respective intensity threshold when the focus selector moves over the respective user interface object. In some embodiments, if the focus selector moves over a row of text while the user is pressing down lightly with the contact, tactile outputs are generated at the beginning of paragraphs but not for individual sentences, words, and/or letters, whereas if the focus selector moves over the row of text while the user is pressing down hard with the contact, tactile outputs are generated for the beginnings of paragraphs, as well as for individual sentences, words and/or individual letters. In some embodiments, if the focus selector moves over a row of text while the user is pressing down lightly with the contact, tactile outputs are generated at the beginning of sentences but not for individual words and/or letters, whereas if the focus selector moves over the row of text while the user is pressing down hard with the contact, tactile outputs are generated for the beginnings of sentences, as well as for individual words and/or letters. In some embodiments, if the focus selector moves over a row of text while the user is pressing down lightly with the contact, tactile outputs are generated at the beginning of words but not for individual letters, whereas if the focus selector moves over the row of text while the user is pressing down hard with the contact, tactile outputs are generated for the beginnings of words and also for individual letters.

In some embodiments, the output criteria include (8822) a criterion that the contact has an intensity below a respective intensity threshold when the focus selector moves over the respective user interface object. In some embodiments, if the focus selector moves over a row of text while the user is pressing down hard with the contact, tactile outputs are generated at the beginning of paragraphs but not for individual sentences, words, and/or letters, whereas if the focus selector moves over the row of text while the user is pressing down lightly with the contact, tactile outputs are generated for the beginnings of paragraphs, as well as for individual sentences, words and/or individual letters. In some embodiments, if the focus selector moves over a row of text while the user is pressing down hard with the contact, tactile outputs are generated at the beginning of sentences but not for individual words and/or letters, whereas if the focus selector moves over the row of text while the user is pressing down lightly with the contact, tactile outputs are generated for the beginnings of sentences, as well as for individual words and/or letters. In some embodiments, if the focus selector moves over a row of text while the user is pressing down hard with the contact, tactile outputs are generated at the beginning of words but not for individual letters, whereas if the focus selector moves over the row of text while the user is pressing down lightly with the contact, tactile outputs are generated for the beginnings of words and also for individual letters.

In some embodiments, the output criteria include (8824) a criterion that the respective user interface object is displayed in an active window in the user interface. In some embodiments the output criteria include a criterion that the respective user interface object is displayed in an active window in the user interface. For example, if the focus selector moves over a row of text of a background window, tactile outputs are generated at the beginning of words but not for individual letters or no tactile outputs are generated, whereas if the focus selector moves over a row of text of the active window, tactile outputs are generated for the beginnings of words and, in some embodiments, also for individual letters. In some embodiments, as illustrated in FIGS. 5L-5M, tactile outputs are generated in response to detecting movement of the focus selector when the focus selector moves over elements in the active window but not when the focus selector moves over elements in an inactive window. For example, if there are a plurality of web browser pages that have hyperlinks open, and the focus selector moves over a plurality of hyperlinks, tactile outputs are generated for the hyperlinks in the active browser window, but tactile outputs are not generated for hyperlinks in the background browser window(s).

In response (8814) to detecting the movement of the contact: in accordance with a determination that the output criteria have not been met, the device generates (8826) tactile outputs (e.g., tactile outputs 8714 in FIG. 5B) that correspond to the respective boundary (e.g., boundary 8703 in FIG. 5B) of the respective user interface object without generating tactile outputs that correspond to the subdivisions (e.g., subdivisions 8702-1 and 8702-2 in FIG. 5D) of the respective user interface object (e.g., user interface object 8702 in FIGS. 5B and 5D). For example in FIGS. 5B and 5D, when the contact has a velocity above $VT_F$, the device generates a tactile output when cursor 8706 moves over a boundary of paragraph 8702 but does not generate a tactile output when cursor 8706 moves over a boundary of word 8702-2. Similarly, in FIGS. 5B and 5E, when the contact has an intensity below $IT_D$, the device generates a tactile output when cursor 8706 moves over a boundary of paragraph 8702 but does not generate a tactile output when cursor 8706 moves over a boundary of word 8702-2.

In some embodiments, a respective user interface object of the plurality of user interface objects includes (8836) a hierarchy of subdivisions, including a level corresponding to a first class of subdivisions (e.g., first user interface object first class subdivisions 8702-1 and 8702-2 corresponding to words in paragraph 8702 and second user interface object first class subdivisions 8704-1 and 8704-2 corresponding to words in paragraph 8704 in FIGS. 5I-5K) and a level corresponding to a second class of subdivisions (e.g., first user interface object second class subdivisions 8702-1a, 8702-1b, 8702-1c and 8702-1d, corresponding to letters in words in paragraph 8702 and second user interface object second class subdivisions 8704-1a, 8704-1b and 8704-1c corresponding to letters in words in paragraph 8704 in FIGS. 5I-5K). For example, for a user interface object that is an application window with a block of text, the first and second subdivision levels include two or more of: paragraphs, sentences, words, and letters.

In some embodiments, in response (8814) to detecting the movement of the contact: in accordance with a determination that first output criteria have been met, the device generates (8838) tactile outputs (e.g., tactile outputs 8722-1a, 8722-2a, 8724-1a and 8724-2a in FIG. 5K) corresponding to subdivisions in the first class of subdivisions (e.g., first class user interface object subdivisions 8702-1, 8702-2, 8704-1 and 8704-2 that correspond to words in paragraphs in FIGS. 5I-5K) without generating tactile outputs corresponding to subdivisions in the second class of subdivisions (e.g., second class user interface object subdivisions 8702-1b, 8702-2b, and 8704-1b that correspond to letters in words in FIGS. 5I-5K).

In some embodiments, in response (8814) to detecting the movement of the contact: in accordance with a determination that second output criteria have been met (optionally, in addition to a determination that the first output criteria have been met), the device generates (8840) tactile outputs (e.g., tactile outputs 8722-1a, 8722-2a, 8724-1a and 8724-2a in FIGS. 5I-5K) corresponding to subdivisions in the first class of subdivisions (e.g., first class user interface object subdivisions 8702-1, 8702-2, 8704-1 and 8704-2 that correspond to words in paragraphs in FIGS. 5I-5K) and the device generates tactile outputs (e.g., tactile outputs 8722-1b, 8722-2b, 8724-1b and 8724-2b in FIGS. 5I-5K) corresponding to subdivisions in the second class of subdivisions (e.g., second class user interface object subdivisions 8702-1b, 8702-2b, and 8704-1b that correspond to letters in words in FIGS. 5I-5K). For example, when the contact is moving very fast, the device only generates tactile outputs corresponding to ends of sentences, when the contact is moving slightly slower the device generates tactile outputs corresponding to the ends of words and sentences, and when the contact is moving very slowly, the device generates tactile outputs corresponding to the ends of words, sentences, and individual letters.

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 8800 described above with respect to FIGS. 6A-6C. For example, the contacts, gestures, user interface objects, tactile outputs, intensity thresholds, velocity thresholds and focus selectors described above with reference to method 8800 optionally have one or more of the characteristics of the contacts, gestures, user interface objects, tactile outputs, intensity thresholds, velocity thresholds and focus selectors described herein with reference to other methods described herein. For brevity, these details are not repeated here.

Figure 7:
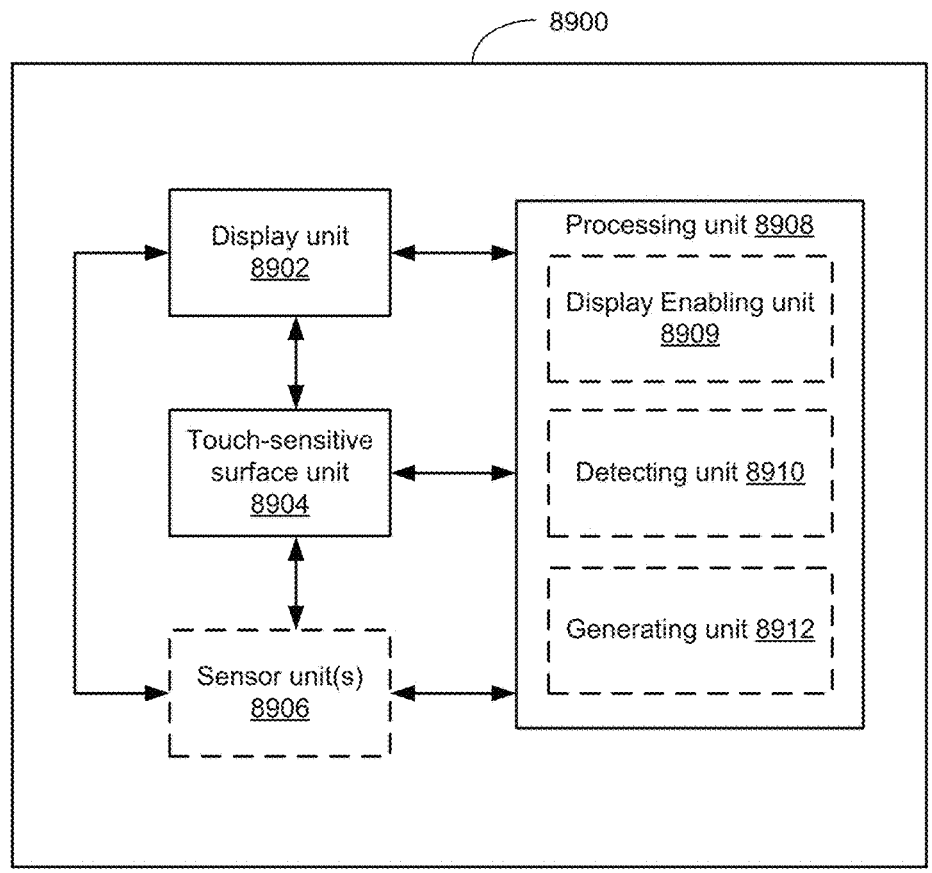
FIG. 7 is a functional block diagram of an electronic device in accordance with some embodiments.

In accordance with some embodiments, FIG. 7 shows a functional block diagram of an electronic device 8900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 8900 includes a display unit 8902 configured to display one or more user interface objects, a touch-sensitive surface unit 8904 configured to receive user contacts, optionally one or more sensor units 8906 configured to detect intensity of contacts with the touch-sensitive surface unit 8904; and a processing unit 8908 coupled to the display unit 8902, the touch-sensitive surface unit 8904 and the one or more sensor units 8906. In some embodiments, the processing unit 8908 includes a display enabling unit 8909, a detecting unit 8910, and a generating unit 8912.

In some embodiments, the processing unit 8908 is configured to enable display (e.g., with the display enabling unit 8909) of a plurality of user interface objects on the display unit 8902, where each of the plurality of user interface objects includes a plurality of subdivisions. In some embodiments, the processing unit 8908 is further configured to detect movement of a contact on the touch-sensitive surface that corresponds to movement of a focus selector over a respective user interface object in the plurality of user interface objects (e.g., with the detecting unit 8910); and in response to detecting the movement of the contact: in accordance with a determination that output criteria have been met, the processing unit 8908 is configured to generate tactile outputs (e.g., with the generating unit 8912) that correspond to a respective boundary of the respective user interface object and subdivisions of the respective user interface object; and in accordance with a determination that the output criteria have not been met, the processing unit 8908 is configured to generate tactile outputs (e.g., with the generating unit 8912) that correspond to the respective boundary of the respective user interface object without generating tactile outputs that correspond to the subdivisions of the respective user interface object.

In some embodiments, the output criteria include a criterion that the focus selector has a velocity that is below a respective velocity threshold when the focus selector moves over the respective user interface object.

In some embodiments, the output criteria include a criterion that the contact has an intensity above a respective intensity threshold when the focus selector moves over the respective user interface object.

In some embodiments, the output criteria include a criterion that the contact has an intensity below a respective intensity threshold when the focus selector moves over the respective user interface object.

In some embodiments, the output criteria include a criterion that the respective user interface object is displayed in an active window in the user interface.

In some embodiments, the plurality of user interface objects include application windows and the subdivisions of the respective user interface object include selectable affordances within the application windows.

In some embodiments, the plurality of user interface objects are paragraphs, and the subdivisions are words.

In some embodiments, the plurality of user interface objects are sentences, and the subdivisions are words.

In some embodiments, the plurality of user interface objects are words, and the subdivisions are letters.

In some embodiments, a respective user interface object of the plurality of user interface objects includes a hierarchy of subdivisions, including a level corresponding to a first class of subdivisions and a level corresponding to a second class of subdivisions. In some of these embodiments, in response to detecting the movement of the contact: in accordance with a determination that first output criteria have been met, the processing unit 8908 is configured to generate tactile outputs (e.g., with the generating unit 8912) corresponding to subdivisions in the first class of subdivisions without generating tactile outputs corresponding to subdivisions in the second class of subdivisions; and in accordance with a determination that second output criteria have been met, the processing unit 8908 is configured to generate tactile outputs (e.g., with the generating unit 8912) corresponding to subdivisions in the first class of subdivisions and generate tactile outputs (e.g., with the generating unit 8912) corresponding to subdivisions in the second class of subdivisions.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6C are, optionally, implemented by components depicted in FIGS. 1A-1B or FIG. 7. For example, detection operation 8812 and determination operations 8816, 8826, 8838 and 8840 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface or generation of a tactile output (e.g., corresponding to a boundary of a user interface object or subdivision thereof). When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Tactile Feedback when Interacting with a User Interface Object

Many electronic devices have graphical user interfaces that display user interface objects that can be activated in response to a user input (e.g., by clicking or scrolling over the object). For example, a graphical user interface optionally displays an application window containing a button, hyperlink, document launch icon, application launch icon, menu or other selectable affordance associated with a particular action (e.g., launching an application, loading content associated with a hyperlink or manipulating an object within an application). Typically, a user accesses the activatable content by first selecting the appropriate user interface object (e.g., via moving a focus selector over the object) and secondly activating the user interface object (e.g., via "clicking" on the object). Given the complexity of a user interface environment containing multiple user interface objects associated with activatable content, there is a need to provide feedback that enables the user to more efficiently and conveniently navigate through the user interface environment.

The embodiments described below provide improved methods and user interfaces for providing feedback to a user navigating a complex user interface environment. More specifically, these methods and user interfaces provide different tactile feedback to the user when a focus selector moves over a respective user interface object than when the user subsequently activates the respective user interface object. The tactile feedback distinguishes between these two actions by providing physical cues that feel different to the user. In this fashion, the methods and user interfaces provided below allow the user to more efficiently and conveniently discern between these two actions by providing tactile feedback, instead of or in addition to audible and/or visual feedback. Some methods for distinguishing between the selection and activation of a user interface object rely on an audible or visual cue. However, there are many situations (e.g., at work, in a theatre and in various social situations) where the volume of an electronic device will be lowered or muted, rendering audible cues ineffective. Advantageously, the methods and user interfaces described below augment or replace audible feedback by providing tactile feedback indicating that a user interface object has been selected and/or activated.

Figure 8A:
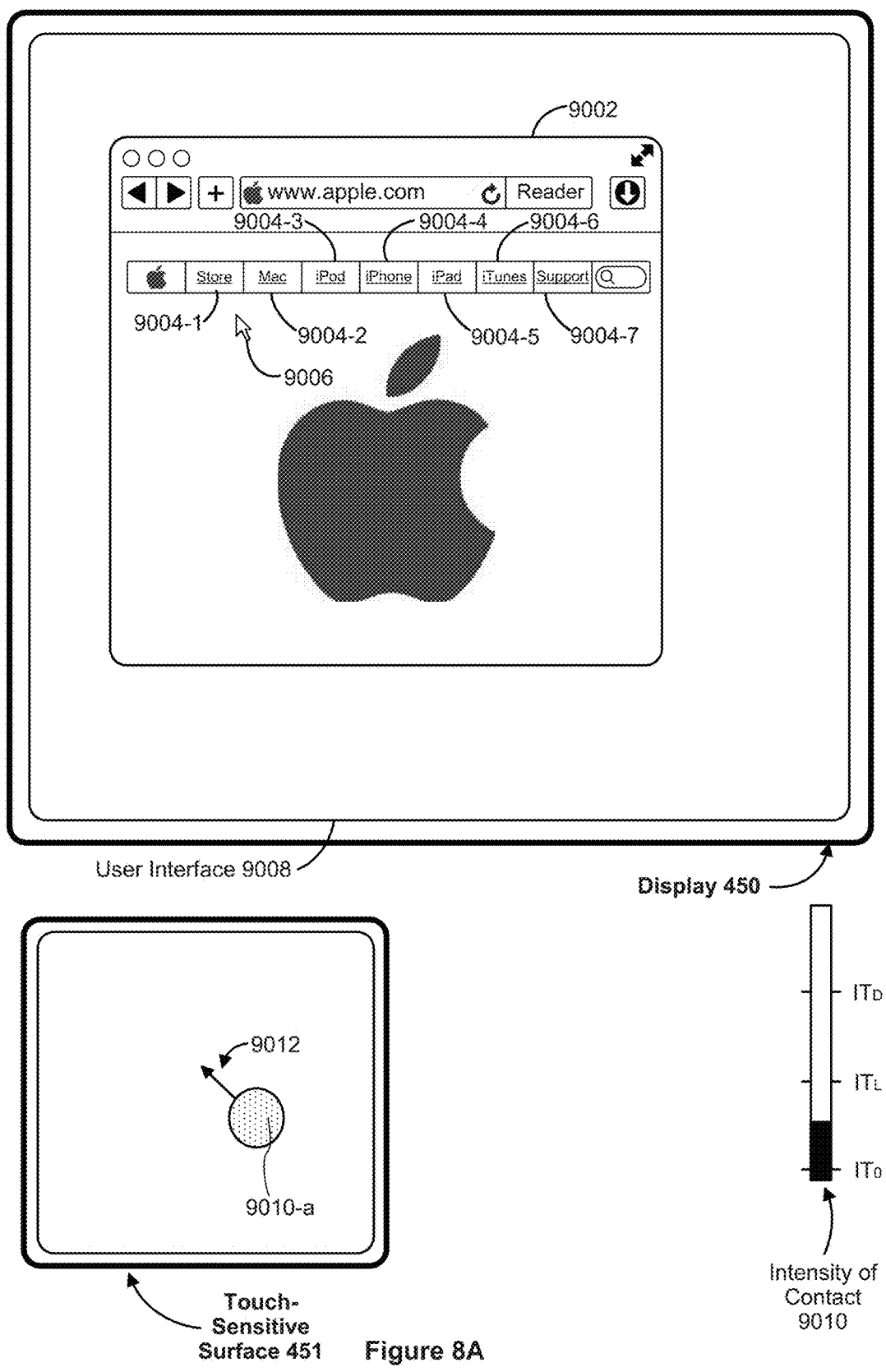
Figure 8B:
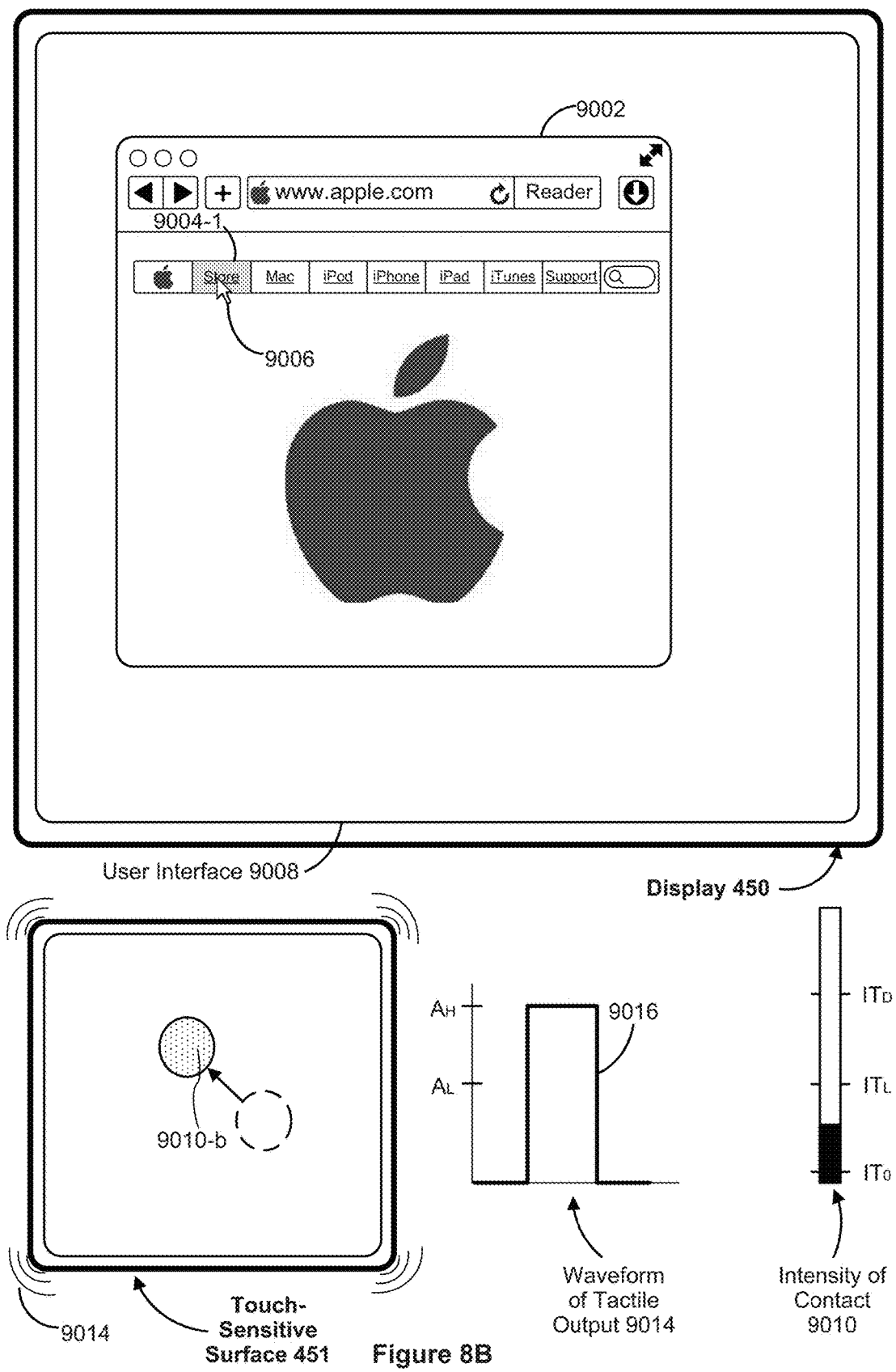

FIGS. 8A-8E illustrate exemplary user interfaces for providing feedback when interacting with a user interface object in accordance with some embodiments. The user interfaces in these figures are used to illustrate the processes described below, including the processes in FIG. 9. FIGS. 8A-8D include intensity diagrams that show the current intensity of the contact on the touch-sensitive surface relative to a plurality of intensity thresholds including an activation intensity threshold (e.g., light press intensity threshold "$IT_L$"). In some embodiments, operations similar to those described below with reference to $IT_L$ are performed with reference to a different intensity threshold (e.g., "$IT_D$"). These intensity diagrams are typically not part of the displayed user interface, but are provided to aid in the interpretation of the figures. FIGS. 8B-8D include waveform diagrams that show the amplitude (e.g., a high amplitude "AH" or low amplitude "AL") and shape (e.g., square or sawtooth) of the waveform corresponding to tactile output generated on the touch-sensitive surface in response to a tactile output triggering event (e.g., selection or activation of a user interface object). These waveform diagrams are typically not part of the displayed user interface, but are provided to aid in the interpretation of the figures.

FIG. 8A illustrates exemplary user interface 9008 displaying one or more user interface objects 9004. For example, user interface 9008 displays web browser 9002 (e.g., a user interface application window) that includes navigation button 9004-1 (e.g., a user interface object with an activatable hyperlink) and cursor 9006 (e.g., a focus selector). In FIG. 8A, user interface 9008 is displayed on display 450 of an electronic device that also includes touch-sensitive surface 451 and one or more sensors for detecting intensity of contacts with touch-sensitive surface. In some embodiments, touch-sensitive surface 451 is a touch screen display that is optionally display 450 or a separate display.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 8A-8H and FIG. 9 will be discussed with reference to display 450 and a separate touch-sensitive surface 451, however analogous operations are, optionally, performed on a device with a touch-sensitive display system 112 in response to detecting movement of the contacts described in FIGS. 8A-8H on the touch-sensitive display system 112 while displaying the user interfaces shown in FIGS. 8A-8H on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 9006.

FIGS. 8A-8E illustrate various embodiments where cursor 9006, controlled by contact 9010 on touch-sensitive surface 451 and movement 9012 thereof, moves over (e.g., selects) and then clicks (e.g., activates) user navigation button 9006. In response, tactile output generators 167 provide different feedback (e.g., tactile outputs 9014, 9018 and 9022) to the user, identifying the actions as either selection or activation events. For example, depending on the type of action (e.g., selection or activation), the tactile outputs have a unique waveform (e.g., square waveforms 9016 and 9024 or sawtooth waveform 9020) or amplitude (e.g., a high amplitude "AH" or low amplitude "AL") indicating to the user which action was performed through their sense of touch.

Figure 8E:
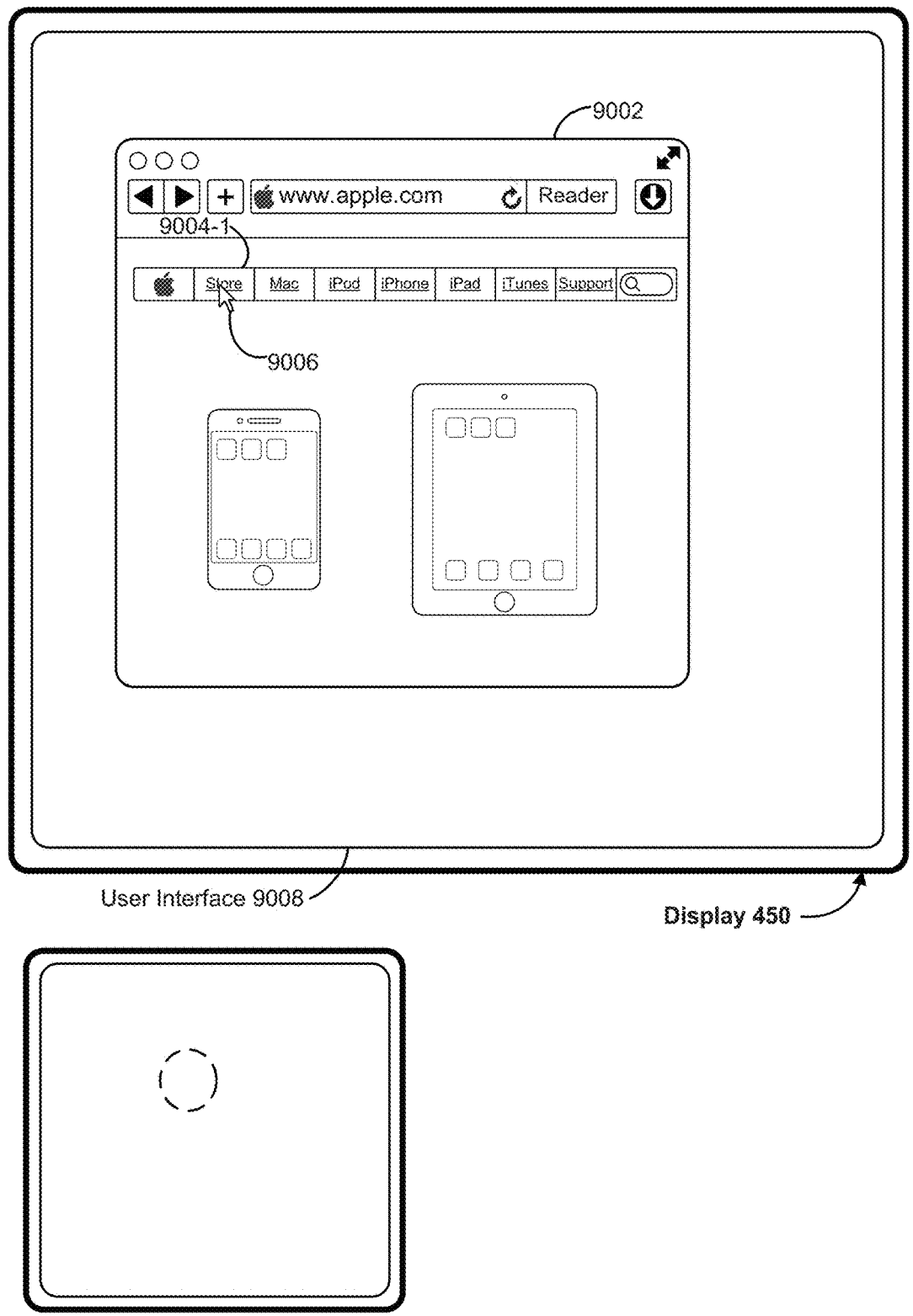
Figure 9:
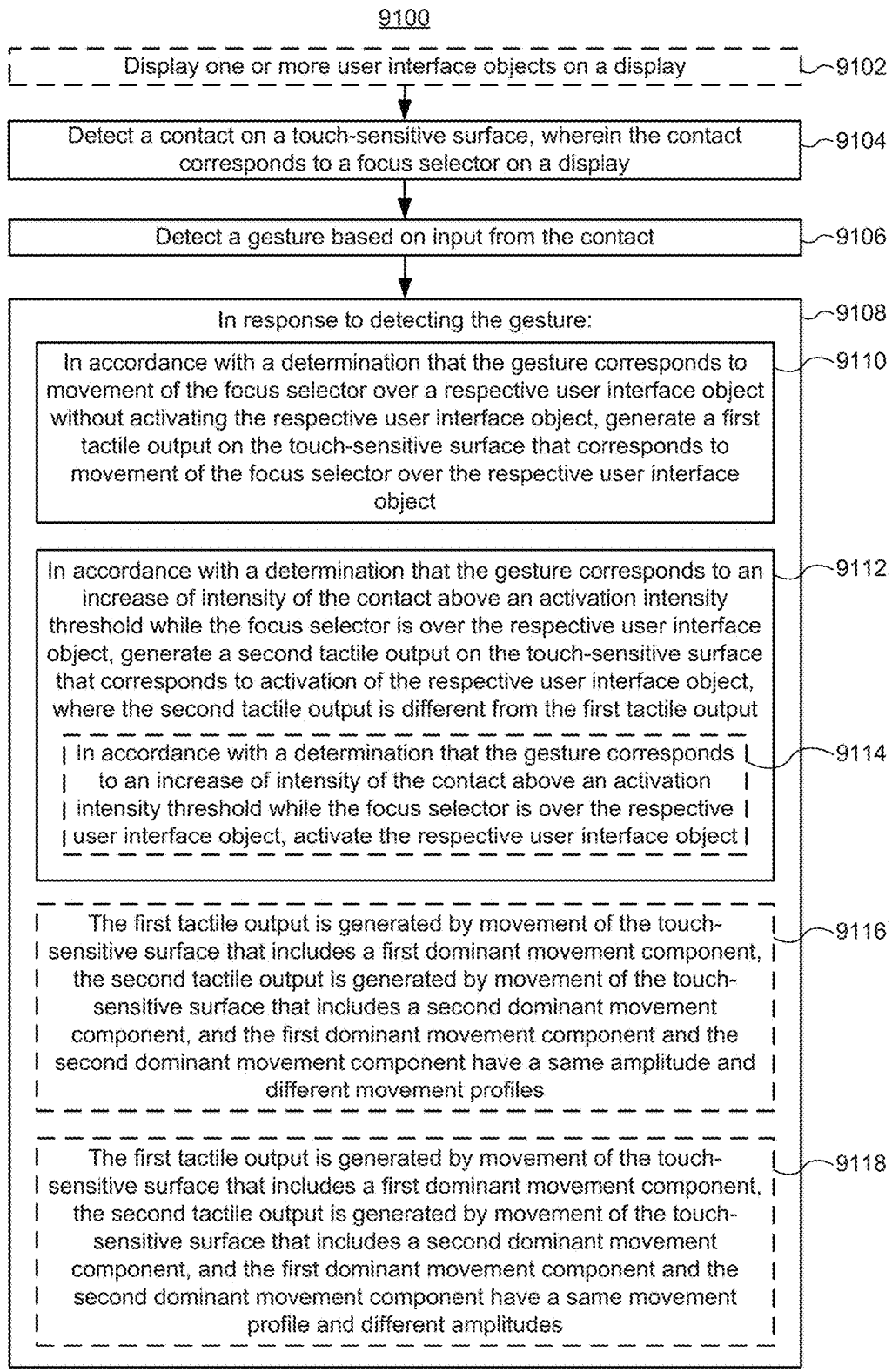
FIG. 9 is a flow diagram illustrating a method of providing feedback when interacting with a user interface object in accordance with some embodiments.

FIGS. 8A-8E illustrate that contact 9010, corresponding to cursor 9002 displayed on display 450, and a gesture including movement 9012 of contact 9010 (e.g., movement 9012-a of contact 9010 from location 9010-a in FIG. 8A to location 9010-b in FIG. 8B) or change in intensity of contact 9010 (e.g., change in intensity of contact 9010 from an intensity below $IT_L$ in FIGS. 8A-8B to an intensity above $IT_L$ in FIG. 8C-8D; and/or liftoff of contact 9010 in FIG. 8C or FIG. 8D, as illustrated in FIG. 8E) are detected on touch-sensitive surface 451. Contact 9010 is detected at a position on touch-sensitive surface 451 corresponding to an area on display 450 occupied by focus selector 9006 (e.g., contact 9010 corresponds to a focus selector on the display, such as cursor 9006 which is at or near a location of user interface object 9002). In some embodiments, movement of contact 9010 on touch-sensitive surface 451 corresponds to movement of focus selector (e.g., a cursor 9006) on display 450 (e.g., as illustrated in FIGS. 8A-8B).

FIGS. 8A-8B illustrate an example of a beginning of a gesture where cursor 9006 moves over navigation button 9004-1, in accordance with movement 9012 of contact 9010, corresponding to cursor 9006 on display 450, on touch-sensitive surface 451, without activating navigation button 9004-1. In FIG. 8B, the device (e.g., via tactile output generators 167) generates first tactile outputs 9014 having a signature corresponding to a scroll over event (e.g., waveform 9016 and/or high amplitude "AH"), because the focus selector scrolled over the user interface object without activating the user interface object.

FIGS. 8B-8D illustrate various examples where the device detects a continuation of a gesture including movement 9012 of contact 9010, or a second gesture initiated after the completion of movement 9012, that includes an increase of intensity of contact 9010 above an activation intensity threshold (e.g., light press intensity threshold "$IT_L$"). In FIGS. 8C-8D, the device (e.g., via tactile output generators 167) generates second tactile outputs 9018 or 9022 having a signature corresponding to an activation event (e.g., waveform 9020 and/or low amplitude "AL"). For example, after moving a cursor over an activatable user interface object (e.g., a hyperlink or navigation button associated therewith), causing the device to generate a first tactile feedback (e.g., tactile output 9014, as shown in FIG. 8B), the user pushes down with greater force on the touch-sensitive surface to activate the user interface object, and in response the device generates a second tactile feedback (e.g., tactile output 9018 in FIG. 8C or tactile output 9022 in FIG. 8D) that feels different from the first tactile feedback (e.g., tactile output 9014 in FIG. 8B).

FIGS. 8B and 8C illustrate an example where the second tactile output (e.g., tactile output 9018) has a different movement profile (e.g., waveform 9020), but substantially the same maximum amplitude (e.g., "AH"), as the first tactile output (e.g., tactile output 9014). For example, the tactile feedback corresponding to activation of the user interface object feels different from, but is equally (or approximately) as strong as, the tactile feedback corresponding to selection of the user interface object. In contrast, FIGS. 8B and 8D illustrate an example where the second tactile output (e.g., tactile output 9022) has substantially the same movement profile (e.g., waveform 9024), but a different maximum amplitude (e.g. "AL"), as the first tactile output (e.g., tactile output 9014). For example, the tactile feedback corresponding to activation of the user interface object feels similar to, but is noticeably stronger or weaker than, the tactile feedback corresponding to selection of the user interface object.

FIGS. 8C-8E illustrate various examples where, in response to an increase of intensity of contact 9010 above an activation intensity threshold (e.g., light press intensity threshold "$IT_L$"), where contact 9010 corresponds to an area on display 450 occupied by focus selector 9006 located over user interface object 9004-1, the user interface object is activated. For example, as illustrated in FIG. 8E, after the user pushes down harder on touch-sensitive surface 451 (e.g., via contact 9010), with cursor 9006 positioned over navigation button 9004-1, and lifts off the contact from the touch-sensitive surface (or, alternatively, reduces the intensity of contact 9010 to an intensity between $IT_0$ and $IT_L$ without lifting contact 9010 off of the touch-sensitive surface 451), content associated with a hyperlink embedded within the navigation button is loaded onto web browser 9004-1 (e.g., a new webpage is loaded on web browser 9002).

Figure 8F:
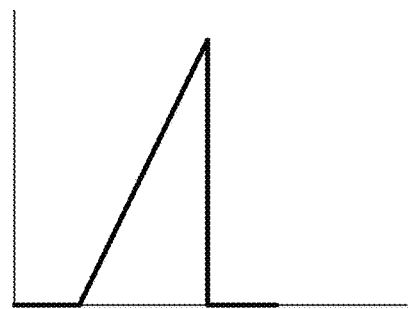
FIGS. 8F-8H illustrate exemplary waveforms of movement profiles for generating tactile outputs in accordance with some embodiments.
Figure 8G:
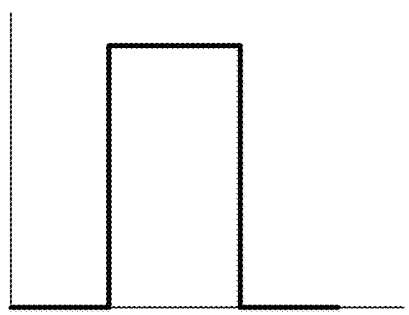
Figure 8H:
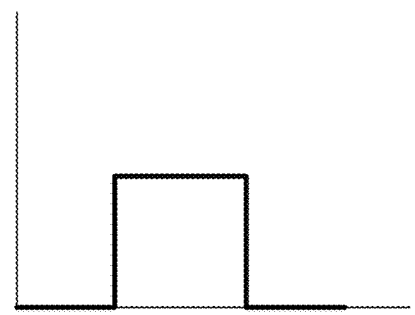

As described above, tactile outputs are, optionally, generated for a selection of a user interface object and an activation of a user interface object. FIGS. 8F-8H illustrate example waveforms of movement profiles for generating these tactile outputs. FIG. 8F illustrates a sawtooth waveform. FIG. 8G illustrates a square waveform and FIG. 8H illustrates a square waveform that has a lower amplitude than the square waveform of FIG. 8G. The high-amplitude square movement profile in FIG. 8G is, optionally, associated with moving over (e.g., scrolling over) a user interface object; the tactile output generated for moving over (e.g., scrolling over) a user interface object is, optionally, generated in accordance with a high-amplitude square movement profile. The low-amplitude square movement profile in FIG. 8H is, optionally, associated with activation of a user interface object; the tactile output generated for activation of a user interface object are, optionally, generated in accordance with a low-amplitude square movement profile. The sawtooth movement profile in FIG. 8F is, optionally, associated with activation of a user interface object; the tactile output generated for activation of a user interface object is, optionally, generated in accordance with the sawtooth movement profile.

FIG. 9 is a flow diagram illustrating a method 9100 of providing feedback when interacting with a user interface object in accordance with some embodiments. The method 9100 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 9100 are, optionally, combined and/or the order of some operations is, optionally, changed.

As described below, the method 9100 provides an intuitive way to provide feedback when interacting with a user interface object. The method reduces the cognitive burden on a user when detecting feedback when interacting with a user interface object, thereby creating a more efficient human-machine interface. For battery-operated electronic devices, enabling a user to detect feedback when interacting with a user interface object faster and more efficiently conserves power and increases the time between battery charges.

In some embodiments, the device displays (9102) one or more interface objects (e.g., user interface objects 9004 including one or more of the affordances, controls, buttons or hyperlinks displayed in application window 9002) on a display (e.g., display 450 in FIGS. 8A-8E.

In some embodiments, while the device displays the user interface objects, the device detects (9104) a contact (e.g., contact 9010) on a touch-sensitive surface (e.g., touch sensitive surface 451), where the contact corresponds to a focus selector (e.g., cursor 9006) on a display (e.g., display 450). In some embodiments, the contact is a finger contact. In some embodiments, the contact is the focus selector (e.g., when the device has a touch screen, the focus selector is, optionally, contact 9010). In some embodiments, the contact corresponds to a cursor or selection box that is displayed on the display.

In some embodiments, while the device displays the user interface objects, the device detects (9106) a gesture based on input from the contact (e.g., movement 9012 of contact 9010 in FIGS. 8A-8B, increase of intensity of contact 9010 in FIGS. 8B-8D, and/or liftoff of contact 9010 in FIGS. 8C-8E). In some embodiments, the gesture includes a change in intensity of the contact. In some embodiments, the gesture includes movement of the contact. In some embodiments, the gesture includes both movement of the contact and a change in intensity of the contact.

In some embodiments, in response (9108) to detecting the gesture: in accordance with a determination that the gesture corresponds to movement of the focus selector over a respective user interface object (e.g., navigation button 9004-1) without activating the respective user interface object (e.g., moving a mouse cursor over a button without activating the button), the device generates (9110) a first tactile output (e.g., tactile output 9014 in FIG. 8B) on the touch-sensitive surface that corresponds to movement of the focus selector over the respective user interface object (e.g., navigation button 9004-1). In some embodiments, the respective user interface object is a button, a hyperlink, a document icon, an application launch icon or another selectable affordance.

In response (9108) to detecting the gesture: in accordance with a determination that the gesture corresponds to an increase of intensity of the contact above an activation intensity threshold (e.g., light press intensity threshold "$IT_L$") while the focus selector is over the respective user interface object, the device generates (9112) a second tactile output (e.g., tactile output 9018 in FIG. 8C or 9022 in FIG. 8D) on the touch-sensitive surface that corresponds to activation of the respective user interface object, where the second tactile output is different from the first tactile output. For example, where a "detent" (e.g., tactile output 9014 in FIG. 8B) that is generated on the touch-sensitive surface when a user moves a cursor/contact over a user interface object feels different from a "click" (e.g., tactile output 9018 in FIG. 8C or tactile output 9022 in FIG. 8D) that is generated on the touch-sensitive surface when a user activates the user interface object. In some embodiments, the first tactile output is more prominent (e.g., has a larger amplitude) than the second tactile output. In some embodiments, the second tactile output is more prominent (e.g., has a larger amplitude) than the first tactile output.

In some embodiments, in response (9108) to detecting the gesture: in accordance with a determination that the gesture corresponds to an increase of intensity of the contact above an activation intensity threshold (e.g., light press intensity threshold "$IT_L$") while the focus selector is over the respective user interface object, the device activates (9114) the respective user interface object (e.g., loads content associated with a hyperlink embedded with navigation button 9004-1, as illustrated in FIG. 8E). In some embodiments, activating the user interface object includes launching an application corresponding to an application icon or loading content associated with a hyperlink. In some embodiments, the respective user interface object is activated in response to detecting an increase in intensity of the contact above the activation intensity threshold (e.g., the down stroke of the press input). In some embodiments, the respective user interface object is activated in response to detecting an increase in intensity of the contact above the activation intensity threshold (e.g., "$IT_L$") followed by a subsequent decrease in intensity of the contact below the activation intensity threshold (e.g., "$IT_L$") or a slightly lower hysteresis intensity threshold (e.g., the up stroke of the press input). In some embodiments, the respective user interface object is activated in response to detecting an increase in intensity of the contact above the activation intensity threshold (e.g., "$IT_L$") followed by a liftoff of the contact from the touch-sensitive surface.

In some embodiments, the first tactile output is generated (9116) by movement of the touch-sensitive surface that includes a first dominant movement component, the second tactile output is generated by movement of the touch-sensitive surface that includes a second dominant movement component, and the first dominant movement component and the second dominant movement component have substantially a same amplitude (e.g., high amplitude "AH" in FIGS. 8B-8C) and substantially different movement profiles (e.g., square waveform 9016 in FIGS. 8B and 8G and sawtooth waveform 9020 in FIGS. 8C and 8F). In some embodiments, movement of the touch-sensitive surface corresponds to an initial impulse, ignoring any unintended resonance. In some embodiments, the movement profiles differ in their waveform shape (e.g., square, sine, squine, triangle or sawtooth waveform shape), waveform pulse width and/or waveform pulse period (e.g., frequency). For example, as illustrated in FIGS. 8B-8C, a "detent" that is generated on the touch-sensitive surface when a user moves a cursor/contact over a user interface object has a square waveform movement profile (e.g., waveform 9016 in FIGS. 8B and 8G), whereas a "click" that is generated on the touch-sensitive surface when a user activates the user interface object has a sawtooth waveform movement profile (e.g., waveform 9020 in FIGS. 8C and 8F), or vice versa.

In some embodiments, the first tactile output is generated (9118) by movement of the touch-sensitive surface that includes a first dominant movement component, the second tactile output is generated by movement of the touch-sensitive surface that includes a second dominant movement component, and the first dominant movement component and the second dominant movement component have a substantially same movement profile (e.g., square waveform 9016 in FIGS. 8B and 8G and square waveform and 9024 in FIGS. 8D and 8H) and substantially different amplitudes (e.g., high amplitude "AH" in FIG. 8B and low amplitude "AL" in FIG. 8D). In some embodiments, movement of the touch-sensitive surface corresponds to an initial impulse, ignoring any unintended resonance. For example, as illustrated in FIGS. 8B and 8D, a "detent" that is generated on the touch-sensitive surface when a user moves a cursor/contact over a user interface object has greater amplitude than a "click" that is generated on the touch-sensitive surface when a user activates the user interface object (e.g., high amplitude "AH" of tactile output 9014 in FIG. 8B is greater than low amplitude "AL" of tactile output 9022 in FIG. 8D), or vice versa.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 9100 described above with respect to FIG. 9. For example, the contacts, gestures, user interface objects, tactile sensations, intensity thresholds and focus selectors described above with reference to method 9100 optionally have one or more of the characteristics of the contacts, gestures, user interface objects, tactile sensations, intensity thresholds and focus selectors described herein with reference to other methods described herein. For brevity, these details are not repeated here.

Figure 10:
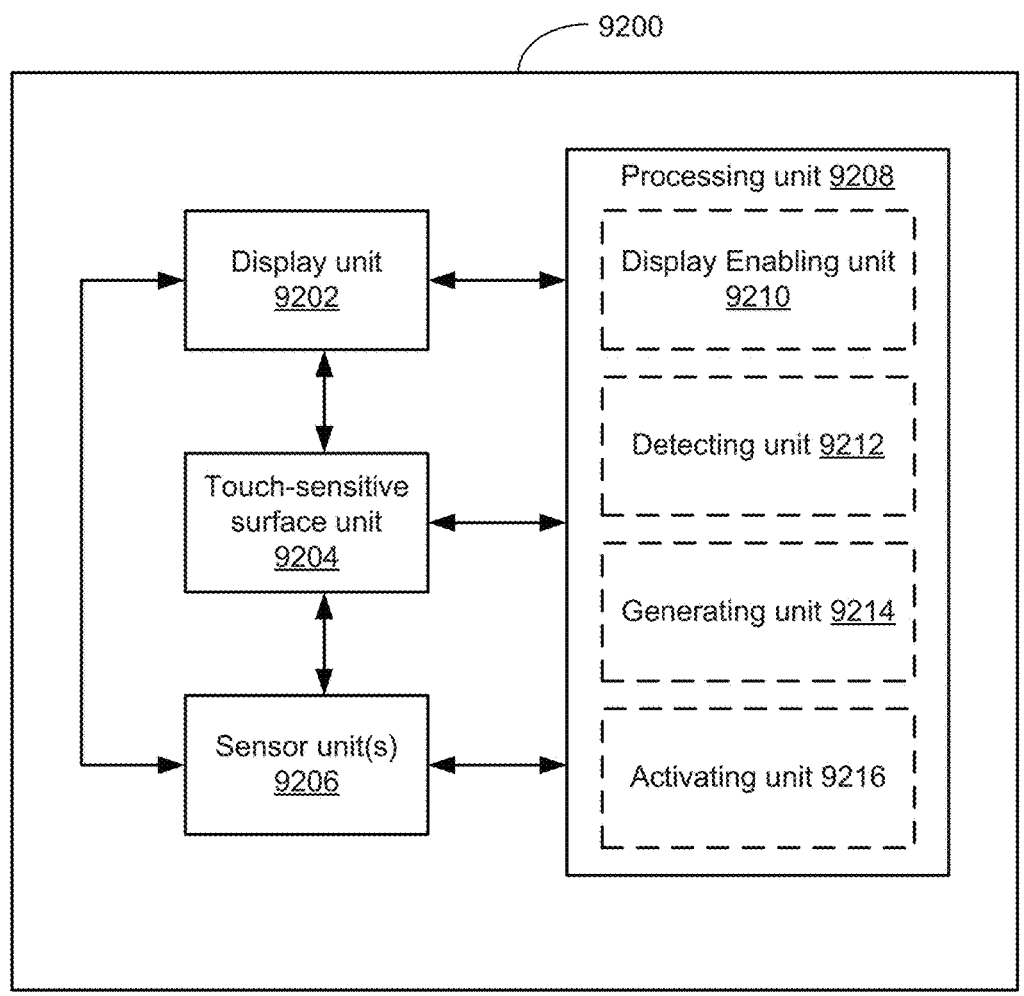
FIG. 10 is a functional block diagram of an electronic device in accordance with some embodiments.

In accordance with some embodiments, FIG. 10 shows a functional block diagram of an electronic device 9200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 9200 includes a display unit 9202 configured to display one or more user interface objects, a touch-sensitive surface unit 9204 configured to receive user contacts, one or more sensor units 9206 configured to detect intensity of contacts with the touch-sensitive surface unit 9204; and a processing unit 9208 coupled to the display unit 9202, the touch-sensitive surface unit 9204 and the one or more sensor units 9206. In some embodiments, the processing unit 9208 includes a display enabling unit 9210, a detecting unit 9212, a generating unit 9214 and an activating unit 9216.

In some embodiments, the processing unit 9208 is configured to enable display (e.g., with the display enabling unit 9210) of one or more user interface objects on display unit 9202. In some embodiments, the processing unit 9208 is configured to detect a contact on the touch-sensitive surface unit 9204 (e.g., with detecting unit 9212), where the contact corresponds to a focus selector on display unit 9202. In some embodiments, the processing unit 9208 is further configured to detect a gesture based on input from the contact (e.g., with detecting unit 9212); and in response to detecting the gesture: in accordance with a determination that the gesture corresponds to movement of the focus selector over a respective user interface object of the one or more user interface objects without activating the respective user interface object, the processing unit 9208 is configured to generate a first tactile output on the touch-sensitive surface unit 9204 that corresponds to movement of the focus selector over the respective user interface object (e.g., with the generating unit 9214); and in accordance with a determination that the gesture corresponds to an increase of intensity of the contact above an activation intensity threshold while the focus selector is over the respective user interface object, the processing unit 9208 is configured to generate a second tactile output on the touch-sensitive surface unit 9204 that corresponds to activation of the respective user interface object, where the second tactile output is different from the first tactile output (e.g., with the generating unit 9214).

In some embodiments, the processing unit 9208 is further configured to, in accordance with a determination that the gesture corresponds to an increase of intensity of the contact above an activation intensity threshold (e.g., $IT_L$) while the focus selector is over the respective user interface object, activate the respective user interface object (e.g., with the activating unit 9216).

In some embodiments, the first tactile output is generated by movement of the touch-sensitive surface unit 9204 that includes a first dominant movement component, the second tactile output is generated by movement of the touch-sensitive surface unit 9204 that includes a second dominant movement component, and the first dominant movement component and the second dominant movement component have a same amplitude and different movement profiles.

In some embodiments, the first tactile output is generated by movement of the touch-sensitive surface unit 9204 that includes a first dominant movement component, the second tactile output is generated by movement of the touch-sensitive surface unit 9204 that includes a second dominant movement component, and the first dominant movement component and the second dominant movement component have a same movement profile and different amplitudes.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 9 are, optionally, implemented by components depicted in FIGS. 1A-1B or FIG. 10. For example, detection operations 9104 and 9106, determination operations 9110, 9112 and 9114 and generation operations 9110 and 9112 are, optionally, implemented by event sorter 170, event recognizer 180, and event handler 190, respectively. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection or activation of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. In some embodiments, event handler 190 accesses a respective tactile output generator 167 to generate a tactile output. Similarly, it would be clear to a person having ordinary skill in the art how other processes can be implemented based on the components depicted in FIGS. 1A-1B.

Providing Tactile Feedback that Distinguishes Between User Interface Objects

Many electronic devices have graphical user interfaces that display application windows having separate regions for displaying content-independent affordances (e.g., affordances which are always displayed in the application window irrespective of the content displayed), e.g., "control regions," and content-dependent affordances (e.g., affordances which are displayed in the application window only when a specific content is displayed), e.g., "content regions." For example, a web browser window optionally includes a control region displaying affordances that perform an operation on content displayed in a content region (e.g., moving forward and backwards in the browser history, inputting a URL address or bookmarking a web page) without being dependent upon the content itself. Likewise, a web browser window optionally includes a content region displaying affordances that are integrated into the displayed content (e.g., a hyperlink, text box or drop-down menu) that are associated with the particular content being displayed (e.g., a web page). Given the complexity of a user interface environment where certain affordances displayed in an application window are content-independent and other affordances are content-dependent, there is a need to provide feedback that enables the user to more efficiently and conveniently navigate through the user interface environment.

The embodiments described below provide improved methods and user interfaces for generating feedback to a user navigating a complex user interface environment. More specifically, these methods and user interfaces provide different tactile feedback to the user when a focus selector moves over an affordance displayed in a control region and an affordance displayed in a content region of an application window. The tactile feedback distinguishes between these two actions by providing physical cues that feel different to the user. In this fashion, the methods and user interfaces provided below allow the user to more efficiently and conveniently discern the type of affordance selected by providing tactile feedback, instead of or in addition to audible and/or visual feedback. Some methods for distinguishing between the selection and activation of a user interface object rely on an audible or visual cue. However, there are many situations (e.g., at work, in a theatre and in various social situations) where the volume of an electronic device will be lowered or muted, rendering audible cues ineffective. Advantageously, the methods and user interfaces described below augment or replace audible feedback by providing tactile feedback indicating the type or location of an affordance displayed in an application window.

Figure 11A:
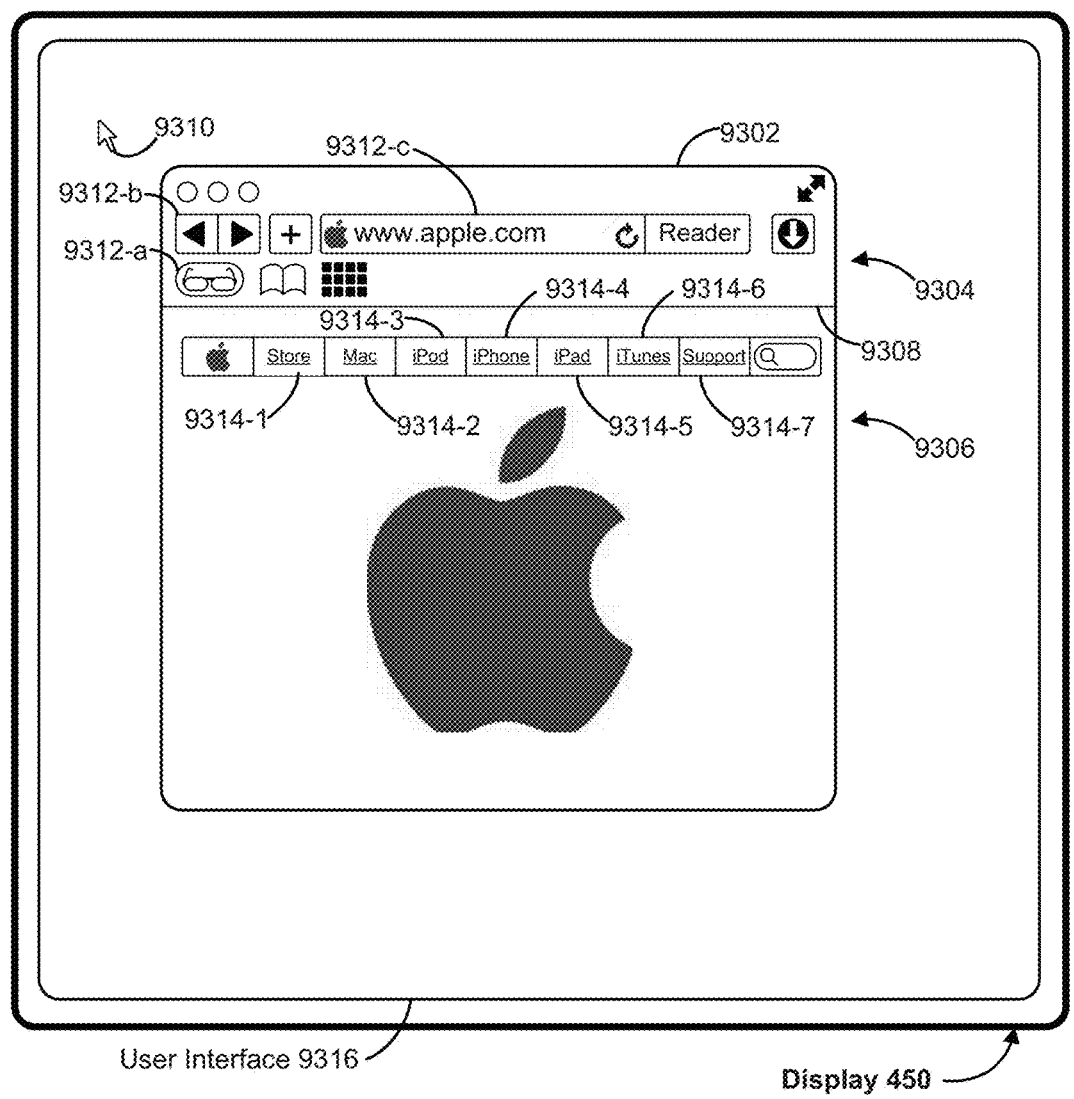
FIGS. 11A-11D illustrate exemplary user interfaces for providing feedback when a focus selector moves over a user interface object in accordance with some embodiments.
Figure 11A:
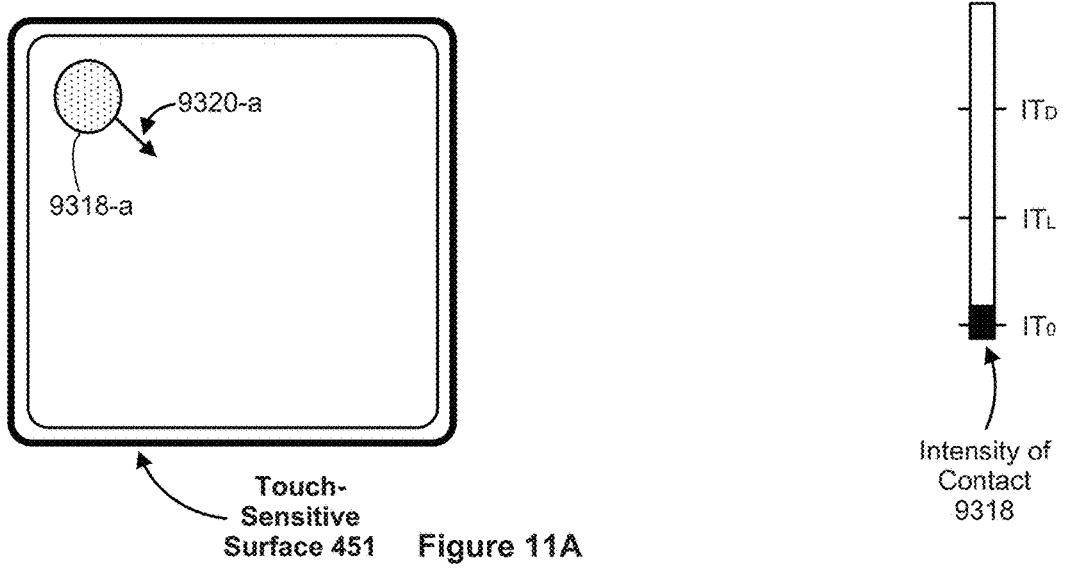
Figure 11B:
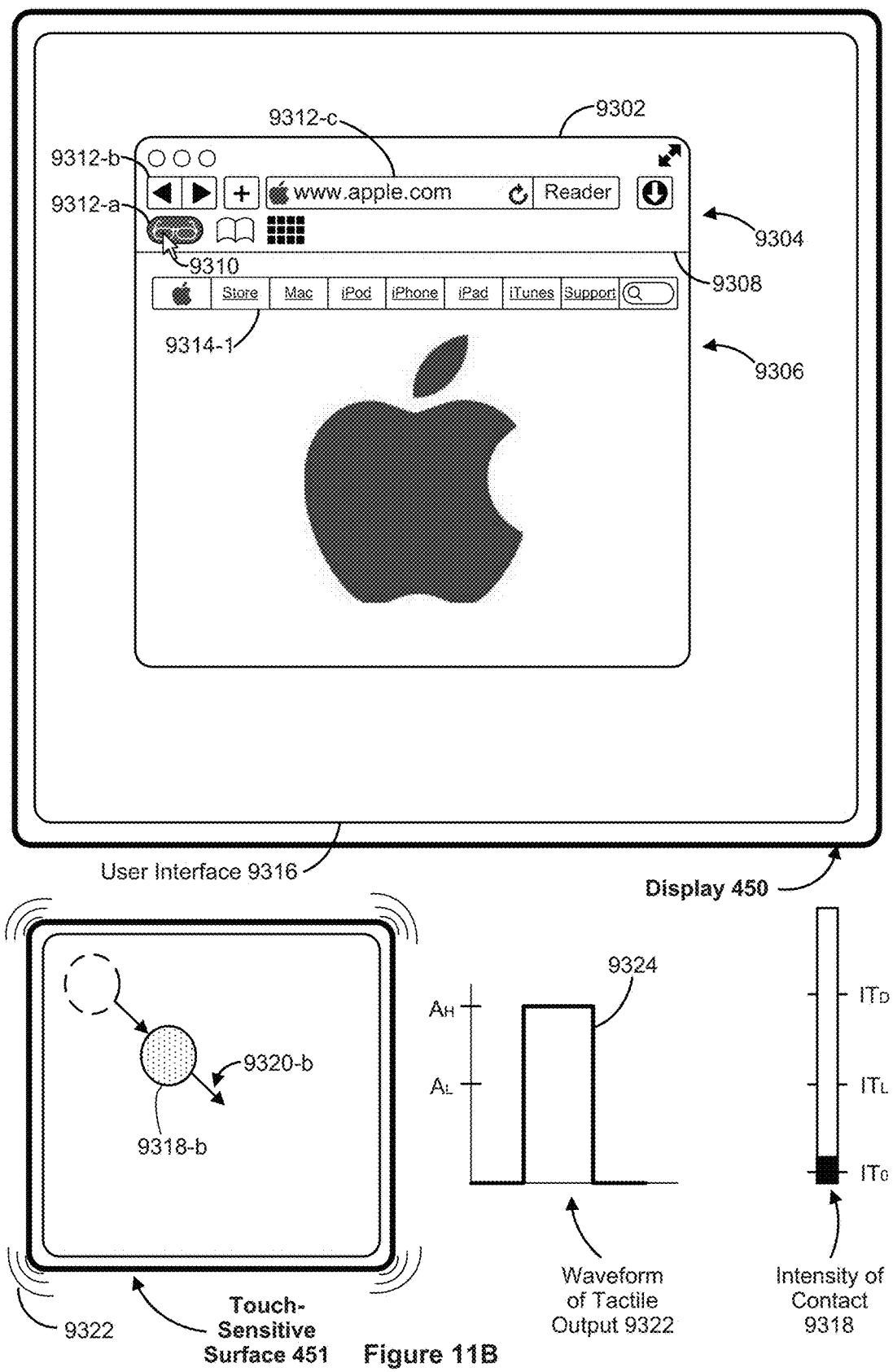
Figure 11C:
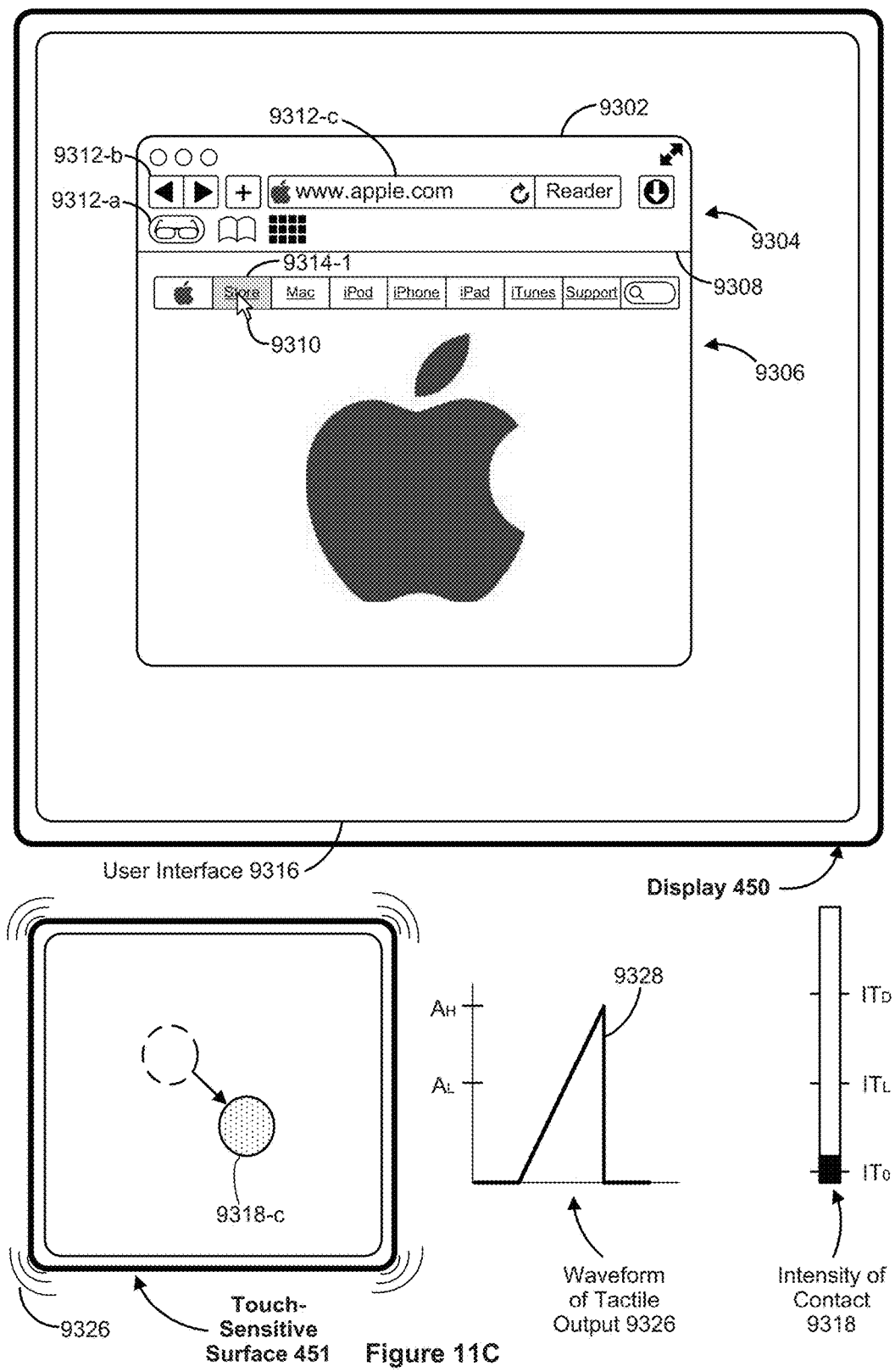
Figure 11D:
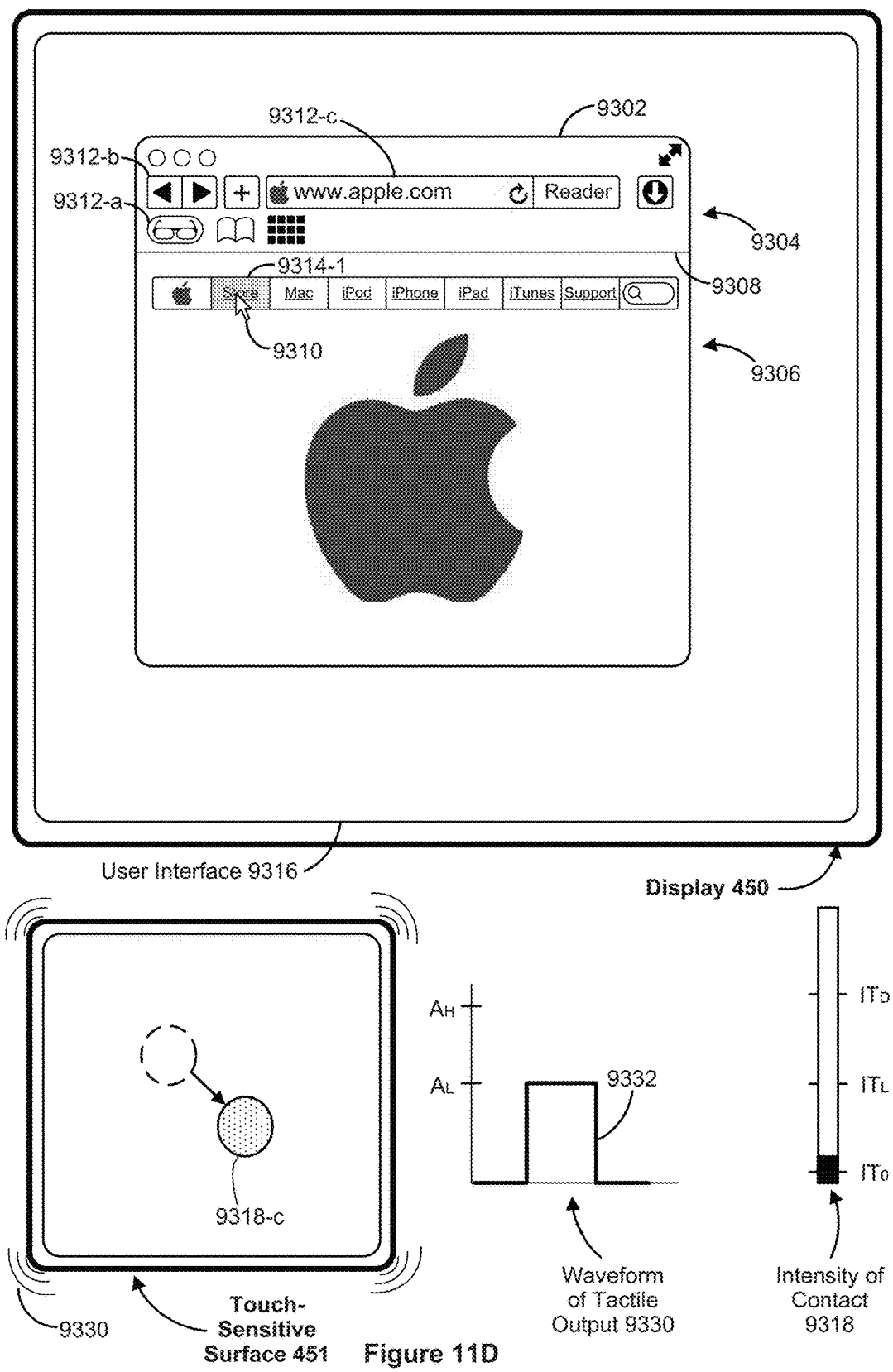
Figure 12A:
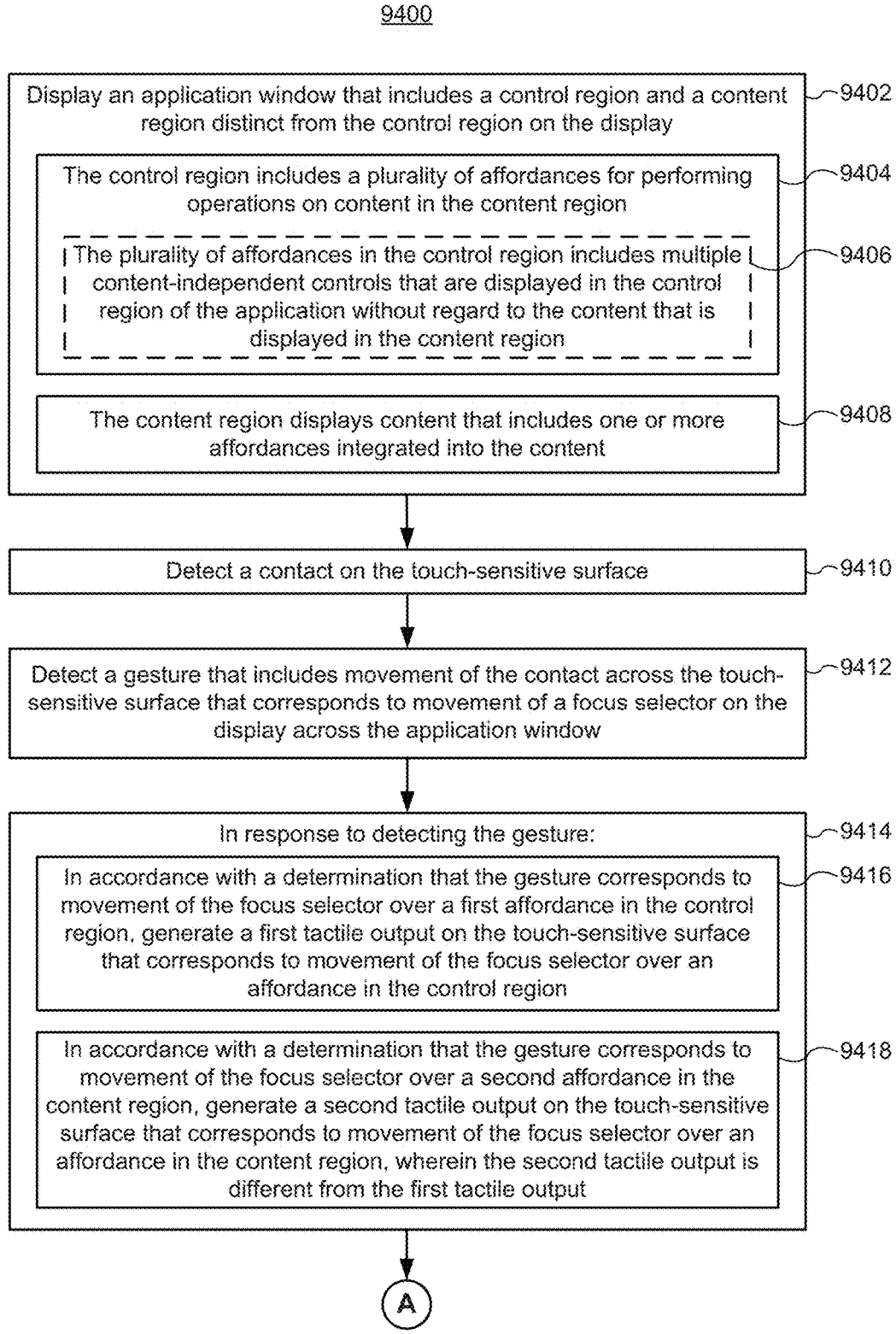
FIGS. 12A-12B are flow diagrams illustrating a method of providing feedback when a focus selector moves over a user interface object in accordance with some embodiments.
Figure 12B:
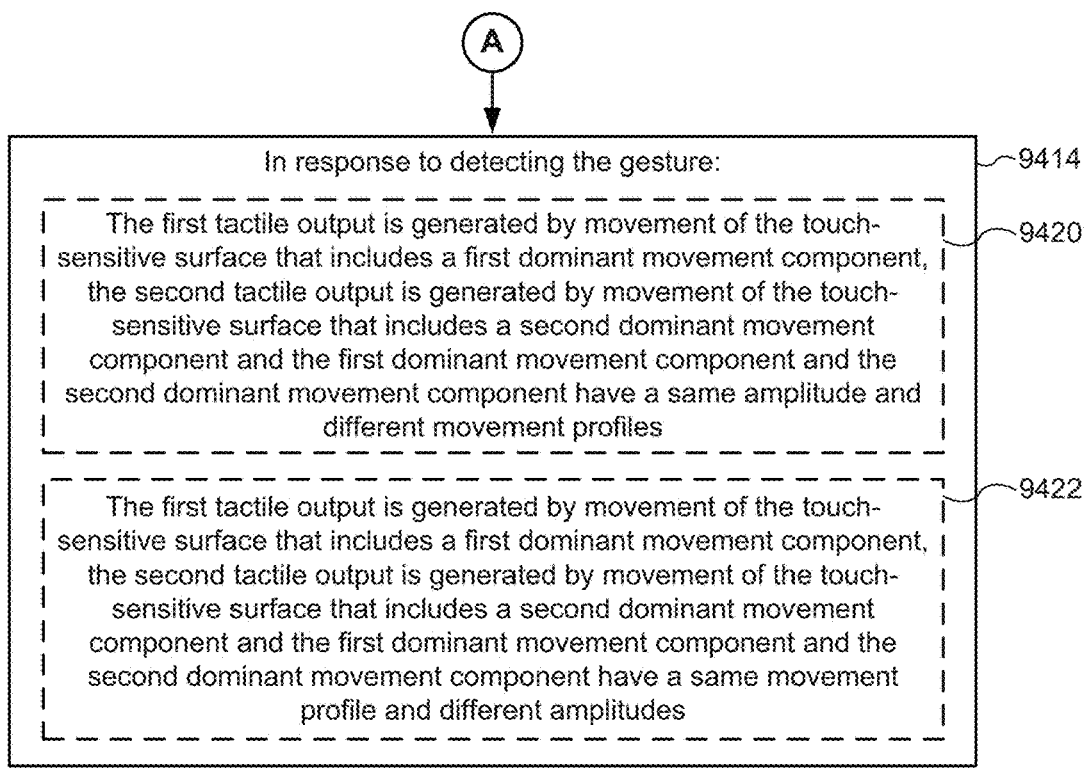

FIGS. 11A-11D illustrate exemplary user interfaces for providing feedback when a focus selector moves over a user interface object in accordance with some embodiments. The user interfaces in these figures are used to illustrate the processes described below, including the processes in FIGS. 12A-12B. FIGS. 11A-11D include intensity diagrams that show the current intensity of the contact on the touch-sensitive surface relative to a plurality of intensity thresholds including a contact detection intensity threshold (e.g., "$IT_0$") and a light press intensity threshold (e.g., "$IT_L$"). In some embodiments, operations similar to those described below with reference to $IT_L$ are performed with reference to a different intensity threshold (e.g., "$IT_D$"). In some embodiments, the operations described below are not dependent on an intensity of the contact. FIGS. 11B-11D include waveform diagrams that show the amplitude (e.g., a high amplitude "AH" or low amplitude "AL") and shape (e.g., square or triangle) of the waveform corresponding to tactile output generated on the touch-sensitive surface in response to a qualifying event (e.g., selection or activation of a user interface object). These waveform diagrams are typically not part of the displayed user interface, but are provided to aid in the interpretation of the figures.

FIG. 11A illustrates exemplary user interface 9316 displaying application window 9302 that includes control region 9304 (e.g., located above bar 9308) and content region 9306 (e.g., located below bar 9308) distinct from the control region. In FIG. 11A, user interface 9316 is displayed on display 450 of an electronic device that also includes touch-sensitive surface 451 and one or more sensors for detecting intensity of contacts with touch-sensitive surface. In some embodiments, touch-sensitive surface 451 is a touch screen display that is optionally display 450 or a separate display. User interface 9316 displays control region 9304 that includes a plurality of affordances 9312 for performing operations on content in the content region (e.g., icon 9312-a for saving browser based content, icon 9312-b for navigating backwards in the browser's history and navigation bar 9312-c for inputting a web address). In some embodiments, control region 9304 includes one or more content-dependent affordances. User interface 9316 displays content region 9306 displaying content that includes one or more content-dependent affordances 9314 (e.g., a navigation button 9314-1 associated with a hyperlink) integrated into the content. User interface 9316 also displays cursor 9310, controllable by the user through contacts on touch-sensitive surface 451. For example, detection of movement of a contact (e.g., a gesture) on touch-sensitive surface 451 corresponds to movement of cursor 9310 on user interface 9316.

In some embodiments, the plurality of affordances in control region 9304 (e.g., affordances 9312 in FIGS. 11A-11D) includes multiple content-independent controls that are displayed in the control region of the application without regard to the content that is displayed in content region 9306.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 11A-11G and FIGS. 12A-12B will be discussed with reference to display 450 and a separate touch-sensitive surface 451, however analogous operations are, optionally, performed on a device with a touch-sensitive display system 112 in response to detecting movement of the contacts described in FIGS. 11A-11G on the touch-sensitive display system 112 while displaying the user interfaces shown in FIGS. 11A-11G on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 9310.

FIGS. 11A-11D illustrate various embodiments where cursor 9310, controlled by contact 9318 on touch-sensitive surface 451 and movement 9320 thereof, moves over an affordance in either control region 9304 (e.g., affordances 9312) or content region 9306 (e.g., navigation button 9314-1). In response, tactile output generators 167 provide different feedback (e.g., tactile outputs 9322, 9326 and 9330) to the user, identifying the affordances as located in either the control region or the content region. For example, depending on the location of the affordance (e.g., in control region 9304 or content region 9306), the tactile outputs have a different waveform (e.g., square waveforms 9324 and 9332 or sawtooth waveform 9328) and/or amplitude (e.g., a high amplitude "AH" or low amplitude "AL") indicating to the user where the affordance is located, so that the user can tell based on the tactile output whether an affordance under or near the focus selector is a control affordance or a content affordance.

FIGS. 11A-11D illustrate that contact 9318, corresponding to cursor 9310 displayed on display 450, and a gesture including movement 9320 of contact 9318 (e.g., movement 9320-a of contact 9318 from location 9318-a in FIG. 11A to location 9318-b in FIG. 11B or movement 9320-b of contact 9318 from location 9318-b in FIG. 11B to location 9318-c in FIG. 11C or FIG. 11D) are detected on touch-sensitive surface 451. Contact 9318 is detected at a position on touch-sensitive surface 451 corresponding to an area on display 450 occupied by focus selector 9310 (e.g., contact 9318 corresponds to a focus selector on the display, such as cursor 9310 which is at or near a location of web browser window 9302). In some embodiments, movement of contact 9318 on touch-sensitive surface 451 corresponds to movement of focus selector (e.g., a cursor 9310) on display 450 (e.g., as illustrated in FIGS. 11A-11D).

FIGS. 11A-11B illustrate an example of a beginning of a gesture where cursor 9310 moves over affordance 9312-a located in control region 9304 of web browser window 9302, in accordance with movement 9320-a of contact 9318 on touch-sensitive surface 451. In FIG. 11B, the device (e.g., via tactile output generators 167) generates first tactile output 9322 having a signature corresponding to an affordance (e.g., icon 9312-a) located in control region 9304 (e.g., waveform 9324 and/or high amplitude "AH"). FIG. 11B illustrates an example where, in accordance with a determination that the focus selector (e.g., cursor 9310) moves over an affordance displayed in a control region of an application window (e.g., icon 9312-a in control region 9304 of web browser 9302), the electronic device generates a tactile output (e.g., tactile output 9322) that corresponds to affordances located in the control region (e.g., that feels different from a tactile output generated in response to movement of the cursor over an affordance in a content region of an application window).

FIGS. 11C-11D illustrate various examples where the device detects movement 9320-b of contact 9318 on touch-sensitive surface 451 that corresponds to movement of cursor 9310 past the boundary of control region 9306 (e.g., below line 9308) and over navigation button 9314-1 located in content region 9306 of web browser window 9302. In FIGS. 11C-11D, the device (e.g., via tactile output generators 167) generates second tactile outputs 9326 or 9330 having a signature corresponding to an affordance (e.g., navigation button 9314-1) located in content region 9306 (e.g., sawtooth waveform 9328 and/or a square waveform 9332 with low amplitude "AL"). FIGS. 11C-11D illustrate examples where, in accordance with a determination that the focus selector (e.g., cursor 9310) moves over an affordance displayed in a control region of an application window (e.g., navigation button 9314-1 in control region 9304 of web browser window 9302), the electronic device generates a tactile output (e.g., tactile output 9326 or 9330) that corresponds to affordances located in the control region (e.g., that feels different from a tactile output generated in response to movement of the cursor over an affordance located in a control region of an application window).

FIGS. 11B and 11C illustrate an example where the second tactile output (e.g., tactile output 9326 in FIG. 11C) has substantially the same maximum amplitude (e.g., high amplitude "AH"), but a substantially different movement profile (e.g., sawtooth waveform 9328), as the first tactile output (e.g., tactile output 9322 in FIG. 11B having square waveform 9324). For example, the tactile feedback corresponding to the movement of cursor 9310 over navigation button 9314-1 located in content region 9306 is equally (or approximately) as strong as, but feels different from, the tactile feedback corresponding to the movement of cursor 9310 over icon 9312-a located in control region 9304. In contrast, FIGS. 11B and 11D illustrate an example where the second tactile output (e.g., tactile output 9330 in FIG. 11D) has substantially the same movement profile (e.g., square waveform 9324), but a different maximum amplitude (e.g. low amplitude "AL"), as the first tactile output (e.g., tactile output 9322 in FIG. 11B having a high amplitude "AH").

For example, the tactile feedback corresponding to the movement of cursor 9310 over navigation button 9314-1 located in content region 9306 feels similar to, but is noticeably stronger or weaker than, the tactile feedback corresponding to the movement of cursor 9310 over icon 9312-a located in control region 9306.

Figure 11E:
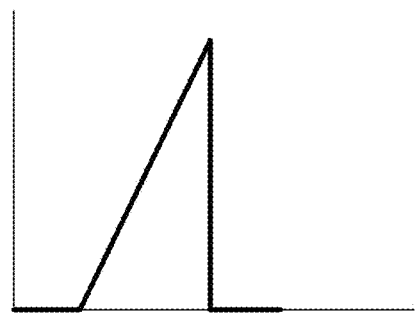
FIGS. 11E-11G illustrate exemplary waveforms of movement profiles for generating tactile outputs in accordance with some embodiments.
Figure 11F:
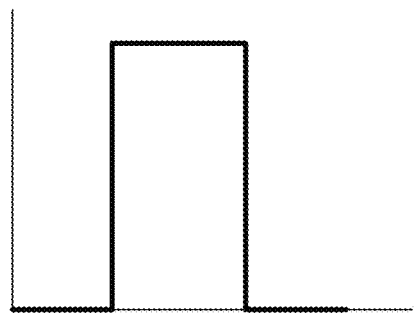
Figure 11G:
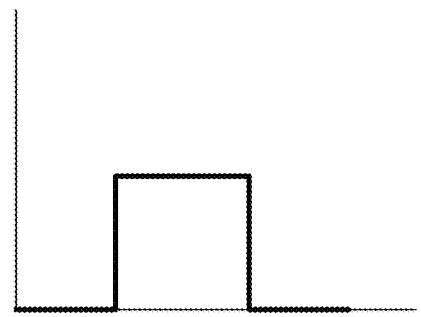

As described above, tactile outputs are, optionally, generated for affordances located in a control region and a content region of a respective application window (e.g., web browser window 9302). FIGS. 11E-11G illustrate example waveforms of movement profiles for generating these tactile outputs. FIG. 11E illustrates a sawtooth waveform. FIG. 11F illustrates a square waveform and FIG. 11G illustrates a square waveform that has a lower amplitude than the square waveform of FIG. 11F. The high-amplitude square movement profile in FIG. 11F is, optionally, associated with movement of a focus selector over an affordance located in a control region of an application window; the tactile output generated for moving over (e.g., scrolling over) an affordance in a control region of an application window is, optionally, generated in accordance with a high-amplitude square movement profile. The low-amplitude square movement profile in FIG. 11G is, optionally, associated with movement of a focus selector over an affordance located in a content region of an application window; the tactile output generated for moving over (e.g., scrolling over) an affordance in a content region of an application window is, optionally, generated in accordance with a low-amplitude square movement profile. The sawtooth movement profile in FIG. 11E is, optionally, associated with movement of a focus selector over an affordance located in a content region of an application window; the tactile output generated for selection of an affordance in a content region of an application window is, optionally, generated in accordance with the sawtooth movement profile.

FIGS. 12A-12B are flow diagrams illustrating a method 9400 of providing feedback when a focus selector moves over a user interface object in accordance with some embodiments. The method 9400 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 9400 are, optionally, combined and/or the order of some operations is, optionally, changed.

As described below, the method 9400 provides an intuitive way to provide feedback when a focus selector moves over a user interface object. The method reduces the cognitive burden on a user when detecting feedback when a focus selector moves over a user interface object, thereby creating a more efficient human-machine interface. For battery-operated electronic devices, enabling a user to detect feedback when a focus selector moves over a user interface object faster and more efficiently conserves power and increases the time between battery charges.

In some embodiments, the device displays (9402) an application window (e.g., web browser window 9302 in FIGS. 11A-11D) that includes a control region (e.g., control region 9304 in FIGS. 11A-11D) and a content region (e.g., content region 9306 in FIGS. 11A-11D) distinct from the control region on a display (e.g., display 450 in FIGS. 11A-11D). In some embodiments, the control region includes (9404) a plurality of affordances for performing operations on content in the content region (e.g., icon 9312-a for saving browser based content, icon 9312-b for navigating backwards in the browser's history and navigation bar 9312-c for inputting a web address). In some embodiments, the plurality of affordances includes a toolbar of a web browser with buttons and drop down menus that are content-independent. In some embodiments, the plurality of affordances in the control region includes (9406) multiple content-independent controls that are displayed in the control region of the application without regard to the content that is displayed in the content region. For example, application-specific controls that are not content-dependent, such as back/forward/reload/home buttons in a web browser and bold/italic/underline buttons in a word processing application.

In some embodiments, the content region displays (9408) content that includes one or more affordances (e.g., the hyperlinks shown in the webpage in content region 9306 including navigation button 9314-1 in FIGS. 11A-11D) integrated into the content. For example, in some embodiments, the content is a webpage with a plurality of hyperlinks, text boxes, drop down menus and/or other selectable affordances that are content-dependent.

In some embodiments, while the device displays an application window that includes a control region and a content region distinct from the control region, the device detects (9410) a contact (e.g., contact 9318 in FIGS. 11A-11D) on a touch-sensitive surface (e.g., touch-sensitive surface 451 in FIGS. 11A-11D). In some embodiments, the contact is a finger contact.

In some embodiments, while the device displays an application window that includes a control region and a content region distinct from the control region, the device detects (9412) a gesture that includes movement of the contact across the touch-sensitive surface (e.g., movement 9320 of contact 9318 in FIGS. 11A-11D) that corresponds to movement of a focus selector (e.g., cursor 9310 in FIGS. 11A-11D) on the display across the application window. In some embodiments, the contact is the focus selector (e.g., when the device has a touch screen, the focus selector is, optionally, contact 9318). In some embodiments, the contact corresponds to a cursor or selection box that is displayed on the display.

In some embodiments, in response (9414) to detecting the gesture: in accordance with a determination that the gesture corresponds to movement of the focus selector over a first affordance in the control region (e.g., icon 9312-a in control region 9304 in FIG. 11B), the device generates (9416) a first tactile output (e.g., tactile output 9322 in FIG. 11B) on the touch-sensitive surface (e.g., touch-sensitive surface 451) that corresponds to movement of the focus selector over an affordance in the control region.

In response (9414) to detecting the gesture: in accordance with a determination that the gesture corresponds to movement of the focus selector over a second affordance in the content region (e.g., navigation button 9314-1 in content region 9306 in FIGS. 11C-11D), the device generates (9418) a second tactile output (e.g., tactile output 9326 in FIG. 11C or tactile output 9330 in FIG. 11D) on the touch-sensitive surface (e.g., touch-sensitive surface 451) that corresponds to movement of the focus selector over an affordance in the content region, wherein the second tactile output is different from the first tactile output. For example, in some embodiments, a "detent" that is generated on the touch-sensitive surface when a user moves a cursor/contact over a button in a toolbar of an application feels different from a "detent" that is generated on the touch-sensitive surface when a user moves a cursor/contact over a hyperlink in content displayed in the application. In some embodiments, the first tactile output is more prominent (e.g., has a larger amplitude) than the second tactile output. In some embodiments, the second tactile output is more prominent (e.g., has a larger amplitude) than the first tactile output.

In some embodiments, the first tactile output is generated (9420) by movement of the touch-sensitive surface that includes a first dominant movement component, the second tactile output is generated by movement of the touch-sensitive surface that includes a second dominant movement component and the first dominant movement component and the second dominant movement component have a substantially same amplitude (e.g., high amplitude "AH" in FIGS. 11B-11C) and substantially different movement profiles (e.g., square waveform 9324 in FIGS. 11B and 11F and sawtooth waveform 9328 in FIGS. 11C and 11E). In some embodiments, movement of the touch-sensitive surface corresponds to an initial impulse, ignoring any unintended resonance. In some embodiments, the movement profiles differ in their waveform shape (e.g., square, sine, squine, triangle or sawtooth waveform shape), waveform pulse width and/or waveform pulse period (e.g., frequency). For example, as illustrated in FIGS. 11B-11C, a "detent" that is generated with the touch-sensitive surface when a user moves a cursor/contact over a button in a toolbar of an application has a square waveform movement profile (e.g., waveform 9324 in FIGS. 11B and 11F), whereas a "detent" that is generated with the touch-sensitive surface when a user moves a cursor/contact over a hyperlink in content displayed in the application has a sawtooth waveform movement profile (e.g., waveform 9328 in FIGS. 11C and 11E), or vice versa.

In some embodiments, the first tactile output is generated (9422) by movement of the touch-sensitive surface that includes a first dominant movement component, the second tactile output is generated by movement of the touch-sensitive surface that includes a second dominant movement component and the first dominant movement component and the second dominant movement component have substantially a same movement profile (e.g., square waveforms 9324 in FIGS. 11B and 11F and square waveform in FIGS. 11D and 11G) and substantially different amplitudes (e.g., high amplitude "AH" in FIG. 11B and low amplitude "AL" in FIG. 11D). In some embodiments, movement of the touch-sensitive surface corresponds to an initial impulse, ignoring any unintended resonance. For example, as illustrated in FIGS. 11B and 11D, a "detent" that is generated with the touch-sensitive surface when a user moves a cursor/contact over a button in a toolbar of an application has less amplitude than a "detent" that is generated with the touch-sensitive surface when a user moves a cursor/contact over a hyperlink in content displayed in the application (e.g., high amplitude "AH" of tactile output 9322 in FIG. 11B is greater than low amplitude "AL" of tactile output 9330 in FIG. 11D), or vice versa.

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 9400 described above with respect to FIGS. 12A-12B. For example, the contacts, gestures, user interface objects, tactile sensations and focus selectors described above with reference to method 9400 optionally have one or more of the characteristics of the contacts, gestures, user interface objects, tactile sensations and focus selectors described herein with reference to other methods described herein (e.g., those listed ). For brevity, these details are not repeated here.

Figure 13:
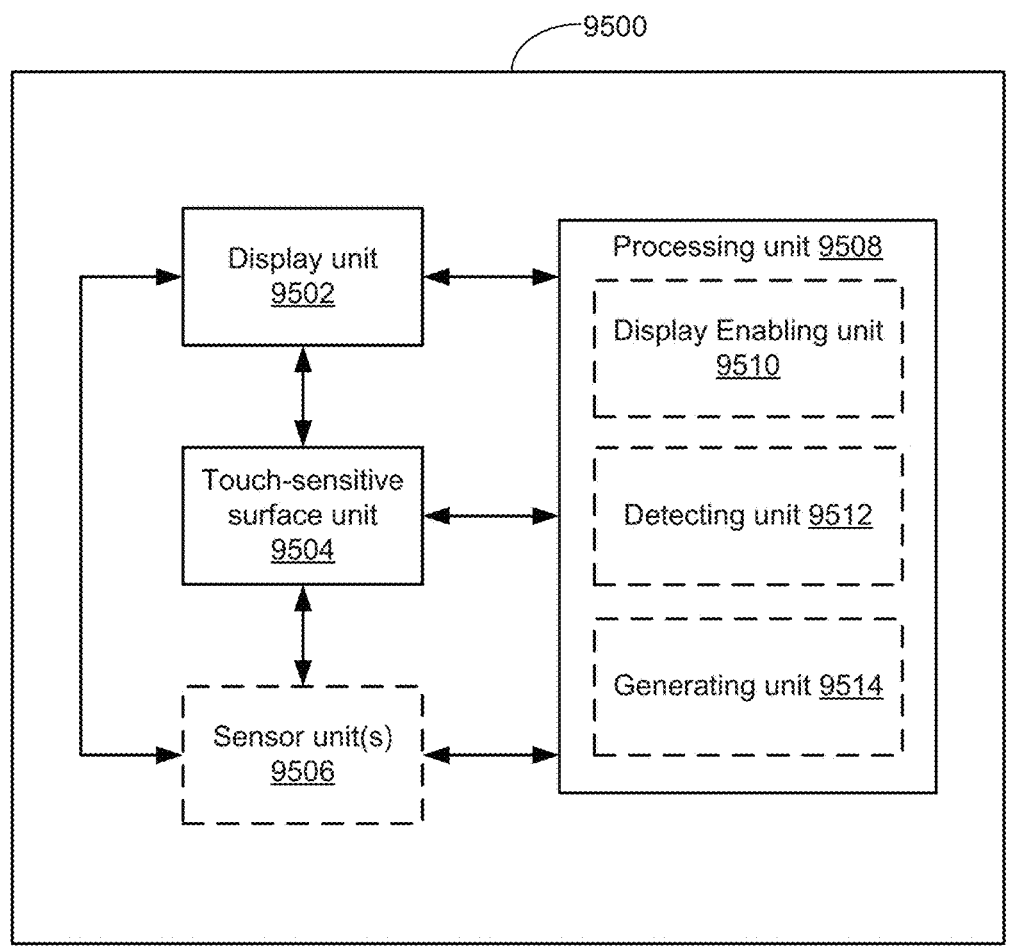
FIG. 13 is a functional block diagram of an electronic device in accordance with some embodiments.

In accordance with some embodiments, FIG. 13 shows a functional block diagram of an electronic device 9500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 9500 includes a display unit 9502 configured to display an application window that includes a control region and a content region distinct from the control region, a touch-sensitive surface unit 9504 configured to receive user contacts, optionally one or more sensor units 9506 configured to detect intensity of contacts with the touch-sensitive surface unit 9504; and a processing unit 9508 coupled to the display unit 9502, the touch-sensitive surface unit 9504 and optionally the one or more sensor units 9506. In some embodiments, the processing unit 9508 includes a display enabling unit 9510, a detecting unit 9512 and a generating unit 9514.

In some embodiments, the processing unit 9508 is configured to enable display (e.g., with the display enabling unit 9510) of an application window that includes a control region and a content region distinct from the control region on the display, where the control region includes a plurality of affordances for performing operations on content in the content region and the content region displays content that includes one or more affordances integrated into the content. In some embodiments, the processing unit 9508 is further configured to detect a contact on the touch-sensitive surface unit 9504 (e.g., with the detecting unit 9512). In some embodiments, the processing unit 9508 is further configured to detect a gesture that includes movement of the contact across the touch-sensitive surface unit 9504 (e.g., with the detecting unit 9512) that corresponds to movement of a focus selector on the display unit 9502 across the application window; and in response to detecting the gesture: in accordance with a determination that the gesture corresponds to movement of the focus selector over a first affordance in the control region, the processing unit 9508 is configured to generate a first tactile output on the touch-sensitive surface unit 9504 (e.g., with the generating unit 9514) that corresponds to movement of the focus selector over an affordance in the control region; and in accordance with a determination that the gesture corresponds to movement of the focus selector over a second affordance in the content region, the processing unit 9508 is configured to generate a second tactile output on the touch-sensitive surface unit 9504 (e.g., with the generating unit 9514) that corresponds to movement of the focus selector over an affordance in the content region, where the second tactile output is different from the first tactile output.

In some embodiments, the plurality of affordances in the control region includes multiple content-independent controls that are displayed in the control region of the application without regard to the content that is displayed in the content region.

In some embodiments, the first tactile output is generated by movement of the touch-sensitive surface unit 9504 that includes a first dominant movement component, the second tactile output is generated by movement of the touch-sensitive surface unit 9504 that includes a second dominant movement component and the first dominant movement component and the second dominant movement component have a same amplitude and different movement profiles.

In some embodiments, the first tactile output is generated by movement of the touch-sensitive surface unit 9504 that includes a first dominant movement component, the second tactile output is generated by movement of the touch-sensitive surface unit 9504 that includes a second dominant movement component and the first dominant movement component and the second dominant movement component have a same movement profile and different amplitudes.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12B are, optionally, implemented by components depicted in FIGS. 1A-1B or FIG. 13. For example, detection operations 9410 and 9412, determination operations 9416 and 9418 are, optionally, implemented by event sorter 170, event recognizer 180 and event handler 190, respectively. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. In some embodiments, event handler 190 accesses a respective tactile output generator 167 to generate a tactile output on touch-sensitive surface 451. Similarly, it would be clear to a person having ordinary skill in the art how other processes can be implemented based on the components depicted in FIGS. 1A-1B.

Adjusting a Tactile Output Level in Accordance with an Adjustment of a Volume Level Many electronic devices also change output levels of sensory properties of the device in response to the enablement of a setting or mode of the device. However, there are sometimes a large number of sensory properties to adjust and adjusting output levels of these sensory properties separately can be confusing and difficult for users. The embodiments below provide a more convenient and intuitive user interface by adjusting a tactile output level of a device in tandem with an adjustment of a volume level of the device. Subsequently, the device provides the adjusted tactile output level in response to detection of a plurality of inputs on a touch-sensitive surface. In some embodiments, the tactile output level changes in parallel with the volume level. In some embodiments, the tactile output level changes inversely to the volume level.

FIGS. 14A-14I illustrate exemplary user interfaces for adjusting a tactile output level in accordance with an adjustment of a volume level in accordance with some embodiments. The user interfaces in these figures are used to illustrate the processes described below, including the processes in FIGS. 15A-15C.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 14A-14I and FIGS. 15A-15C will be discussed with reference to display 450 and a separate touch-sensitive surface 451, however analogous operations are, optionally, performed on a device with a touch-sensitive display system 112.

Figure 14A:
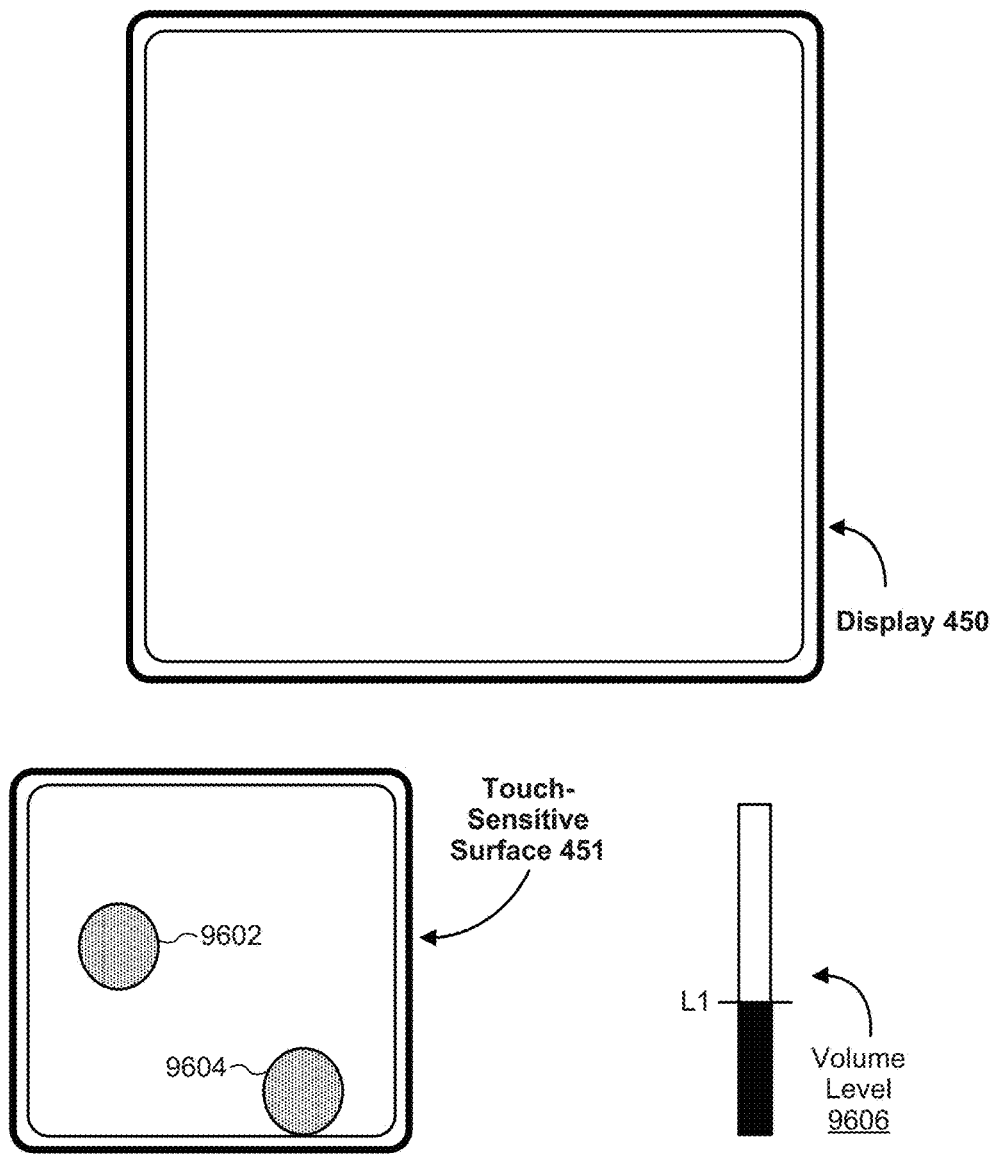
FIGS. 14A-14I illustrate exemplary user interfaces for adjusting a tactile output level in accordance with an adjustment of a volume level in accordance with some embodiments.
Figure 15A:
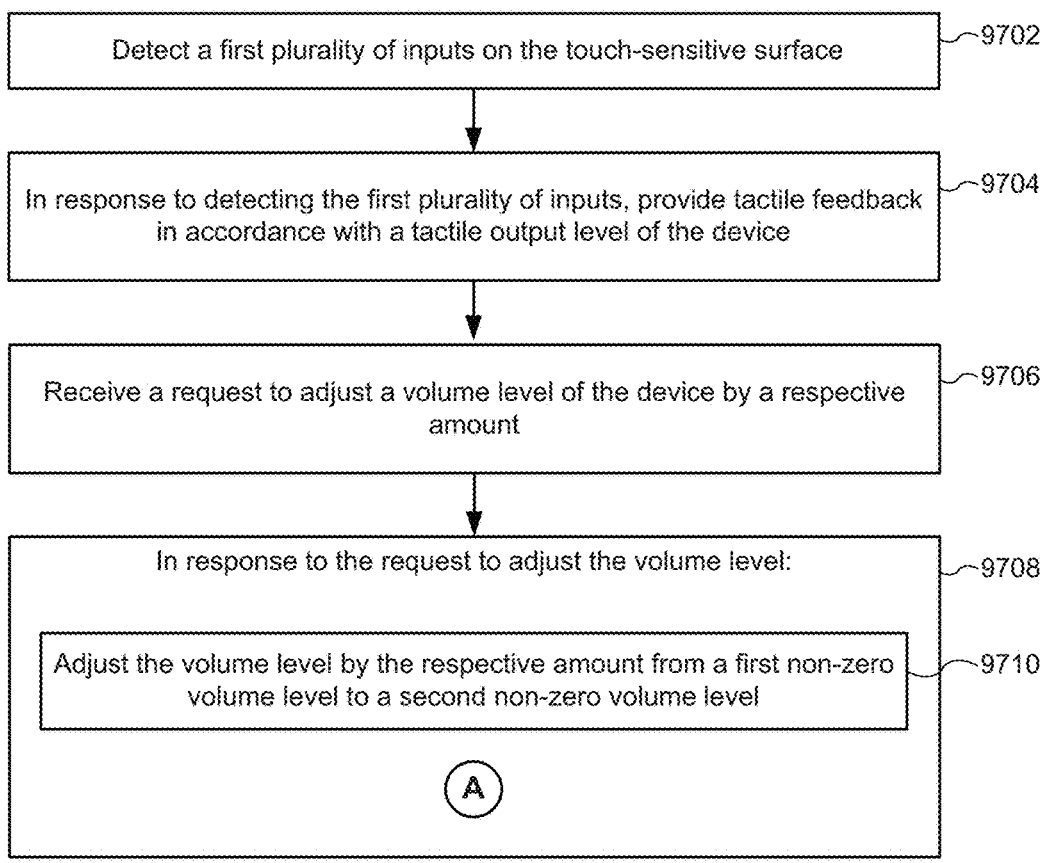
FIGS. 15A-15C are flow diagrams illustrating a method of adjusting a tactile output level in accordance with an adjustment of a volume level in accordance with some embodiments.
Figure 15B:
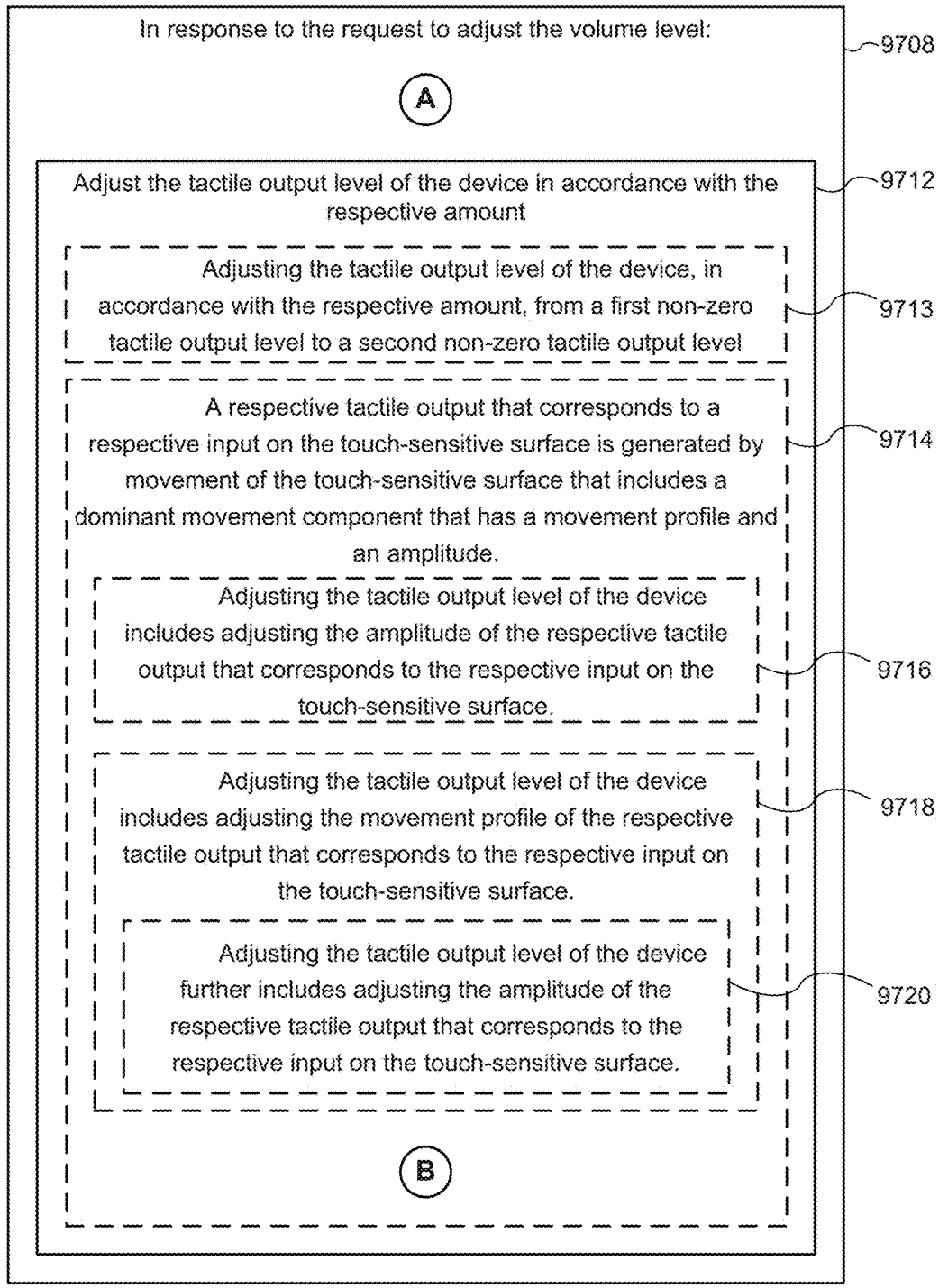
Figure 15C:
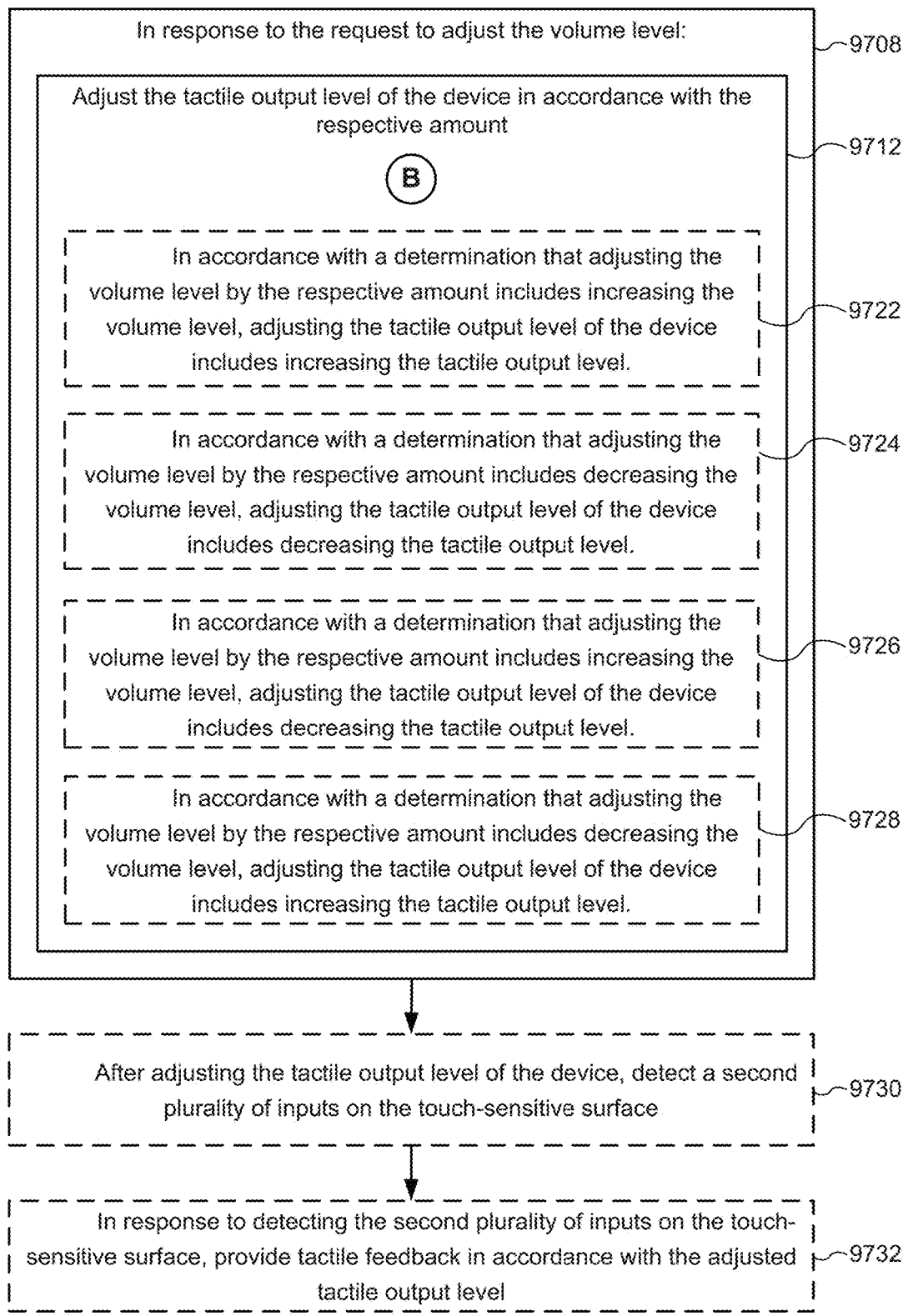

FIG. 14A illustrates the device detecting a first plurality of inputs on the touch-sensitive surface 451, including contacts 9602 and 9604. FIG. 14A further illustrates volume level 9606 at a first level (e.g., L1).

Figure 14B:
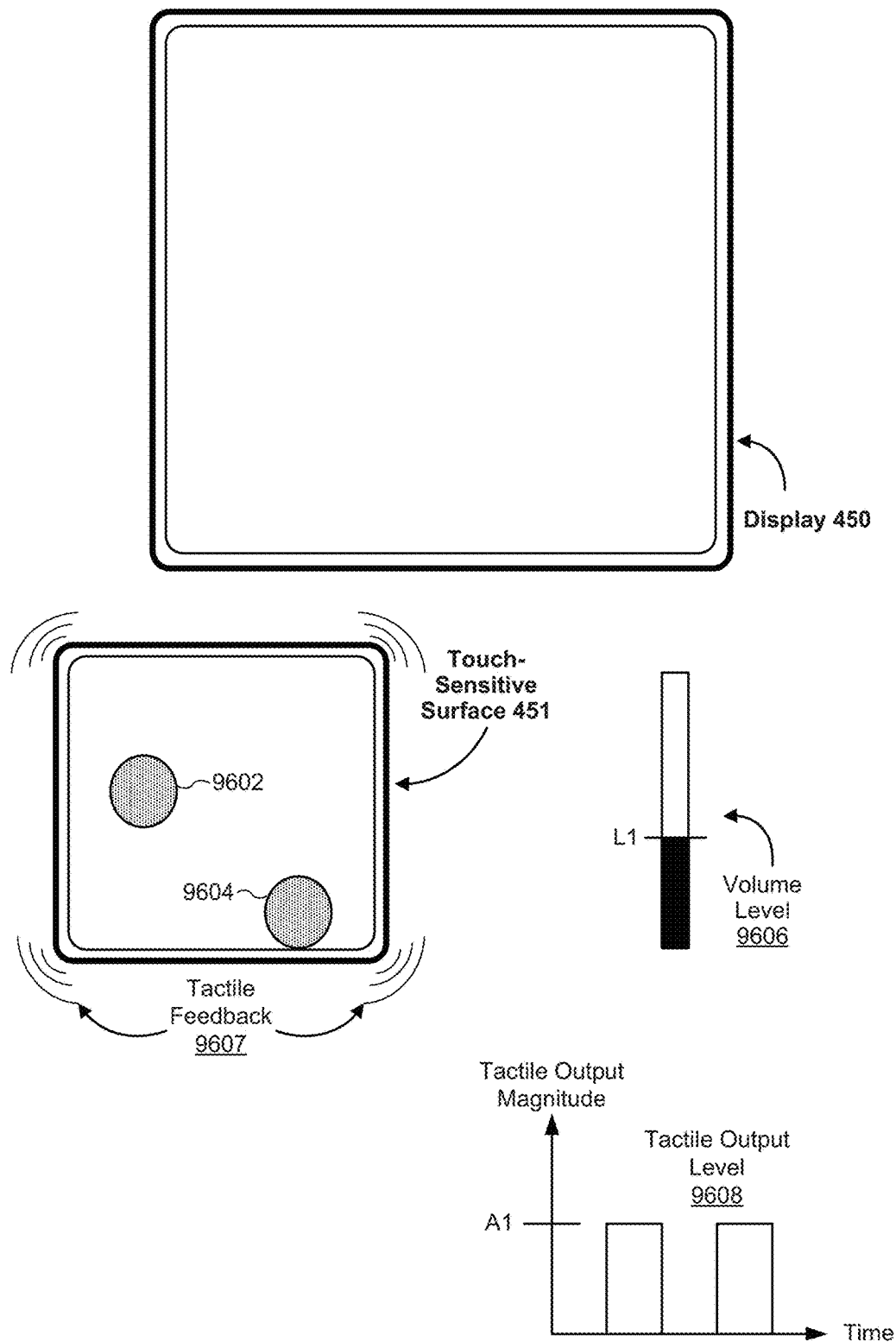

FIG. 14B illustrates the device providing tactile feedback 9607 in accordance with a tactile output level 9608 in response to detecting the first plurality of inputs (e.g., contacts 9602 and 9604). FIG. 14B further illustrates volume level 9606 at the first level (e.g., L1).

Figure 14C:
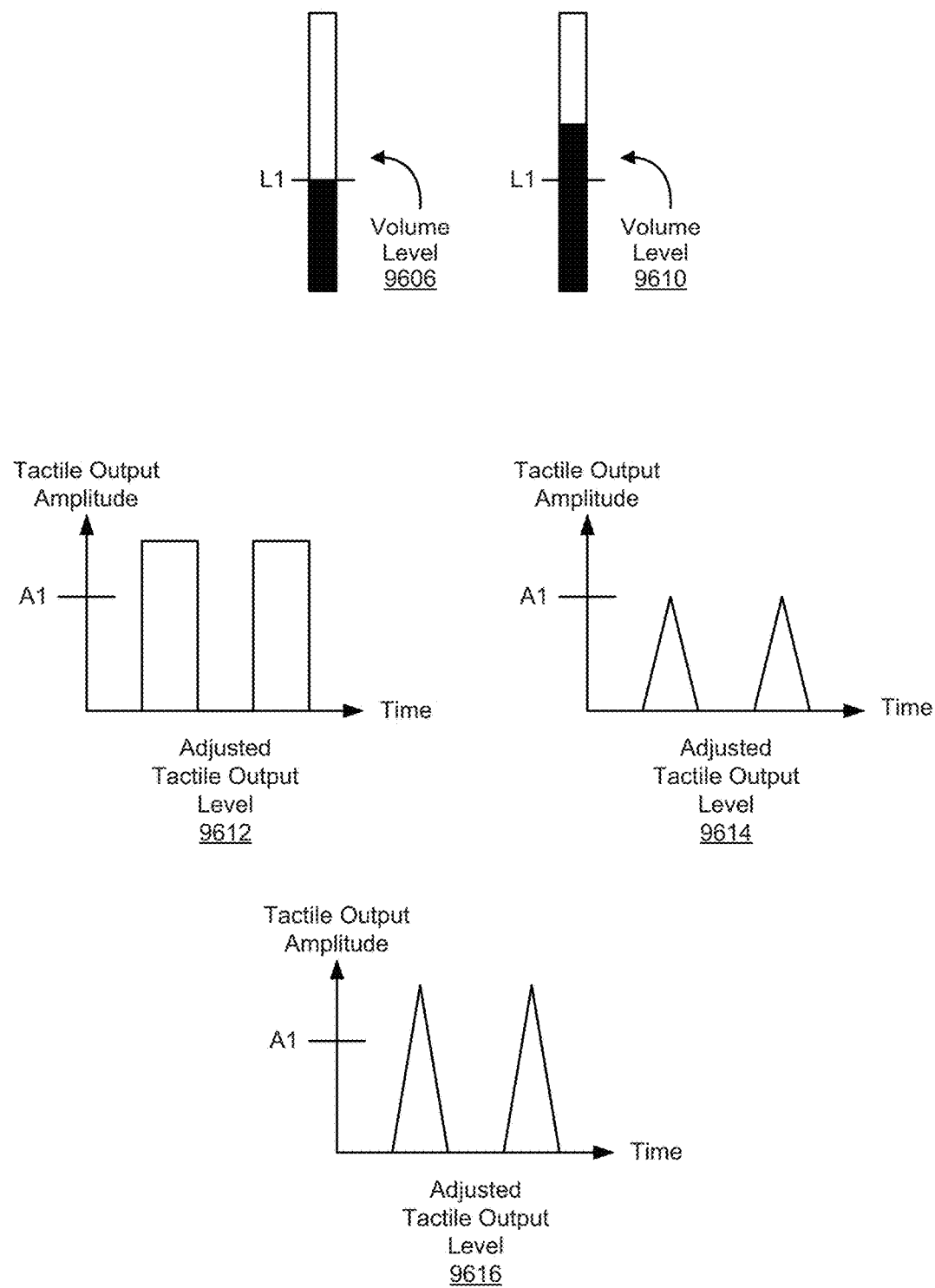

FIG. 14C illustrates the volume level increasing by a respective amount (e.g., the difference between volume level 9606 and volume level 9610) from a first non-zero volume level to a second non-zero volume level in response to a request to adjust the volume of the device by the respective amount (e.g., from L1 to a level above L1, both of which are non-zero volume levels in this example). FIG. 14C further illustrates adjusting the tactile output level (e.g., tactile output level 9608 in FIG. 14B) of the device by adjusting the amplitude of the respective tactile output that corresponds to the respective input on the touch-sensitive surface 451 in response to the request to adjust volume level 9606. FIG. 14C, for example, shows adjusted tactile output level 9612 with an amplitude above A1 in contrast to the amplitude of tactile output level 9608 in FIG. 14B at A1, both of which are non-zero tactile output levels in this example.

In some embodiments, the request to adjust the volume of the device is received when a user depresses a physical button (e.g., a button for increasing or decreasing volume, or a rocker switch for adjusting the volume up or down depending on the direction in which it is depresses). In some embodiments, a request to adjust the volume of the device is received when the user makes a corresponding gesture on the touch sensitive surface 451, for example, when the user slides a displayed volume indicator (displayed on the display 450) in a direction corresponding to increased or decreased volume. In some embodiments, both modes of adjusting volume are available to the user.

FIG. 14C further illustrates adjusting the tactile output level (e.g., tactile output level 9608 in FIG. 14B) of the device by adjusting the movement profile of the respective tactile output that corresponds to the respective input on the touch-sensitive surface 451 in response to the request to adjust volume level 9606. FIG. 14C, for example, shows adjusted tactile output level 9614 with a different waveform shape (e.g., triangular shape) in contrast to the waveform shape of tactile output level 9608 in FIG. 14B (e.g., rectangular shape).

FIG. 14C further illustrates adjusting the tactile output level (e.g., tactile output level 9608 in FIG. 14B) of the device by adjusting the amplitude and the movement profile of the respective tactile output that corresponds to the respective input on the touch-sensitive surface 451 in response to the request to adjust volume level 9606. FIG. 14C, for example, shows adjusted tactile output level 9616 with both a greater amplitude (e.g., above A1) and a different waveform shape (e.g., triangular shape) than tactile output level 9608 in FIG. 14B (e.g., with an amplitude at A1 and a rectangular shape).

Figure 14D:
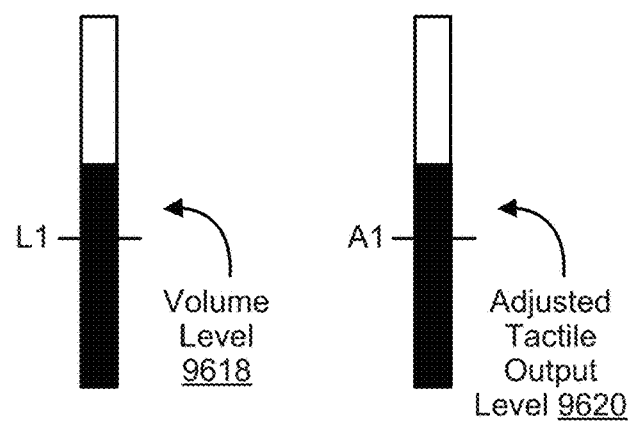

FIG. 14D illustrates adjusting the tactile output level of the device by increasing the tactile output level in accordance with a determination that adjusting the volume level by the respective amount includes increasing the volume level. In this example, the volume level (e.g., volume level 9606 in FIG. 14B) increases to a level above L1 (e.g., volume level 9618). FIG. 14D further illustrates increasing the tactile output level 9608 to adjusted tactile output level 9620 in tandem with volume level 9618.

Figure 14E:
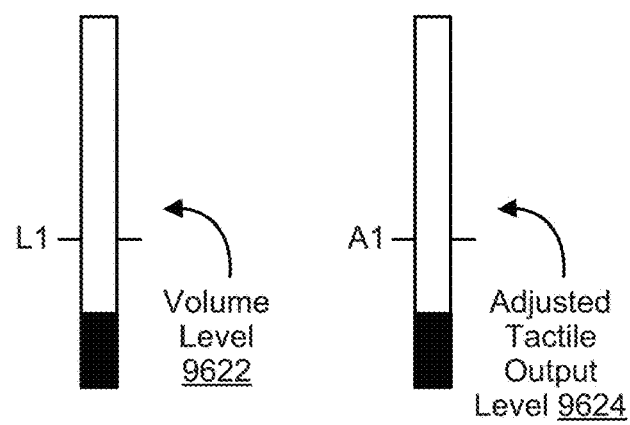

FIG. 14E illustrates adjusting the tactile output level of the device by decreasing the tactile output level in accordance with a determination that adjusting the volume level by the respective amount includes decreasing the volume level. In this example, the volume level (e.g., volume level 9606 in FIG. 14B) decreases to a level below L1 level (e.g., volume level 9622). FIG. 14E further illustrates decreasing the tactile output level 9608 to adjusted tactile output level 9624 (e.g., a non-zero level below A1) in tandem with volume level 9622.

Figure 14F:
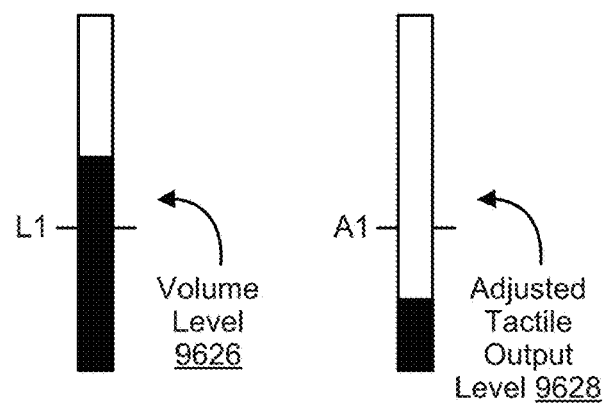

FIG. 14F illustrates adjusting the tactile output level of the device by decreasing the tactile output level in accordance with an increase in the volume level by a respective amount. In this example, the volume level (e.g., volume level 9606 in FIG. 14B) increases to a level above L1 (e.g., volume level 9626). FIG. 14F further illustrates decreasing the tactile output level 9608 to adjusted tactile output level 9628—the inverse of the change in volume level to volume level 9626.

Figure 14G:
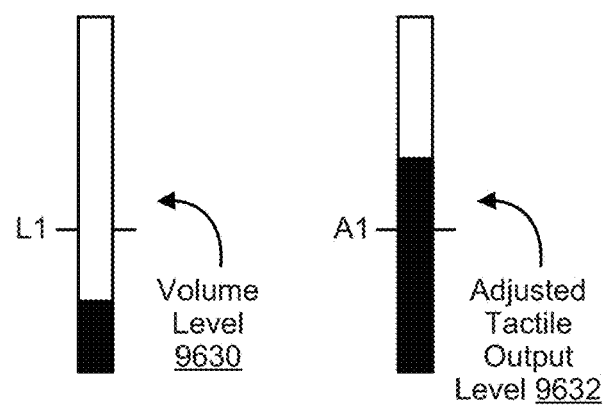

FIG. 14G illustrates adjusting the tactile output level of the device by increasing the tactile output level in accordance with a decrease in the volume level by a respective amount. In this example, the volume level (e.g., volume level 9606 in FIG. 14B) decreases to a level below L1 (e.g., volume level 9630). FIG. 14G further illustrates increasing the tactile output level 9608 to adjusted tactile output level 9632 above A1—the inverse of the change in volume level to volume level 9630.

Figure 14H:
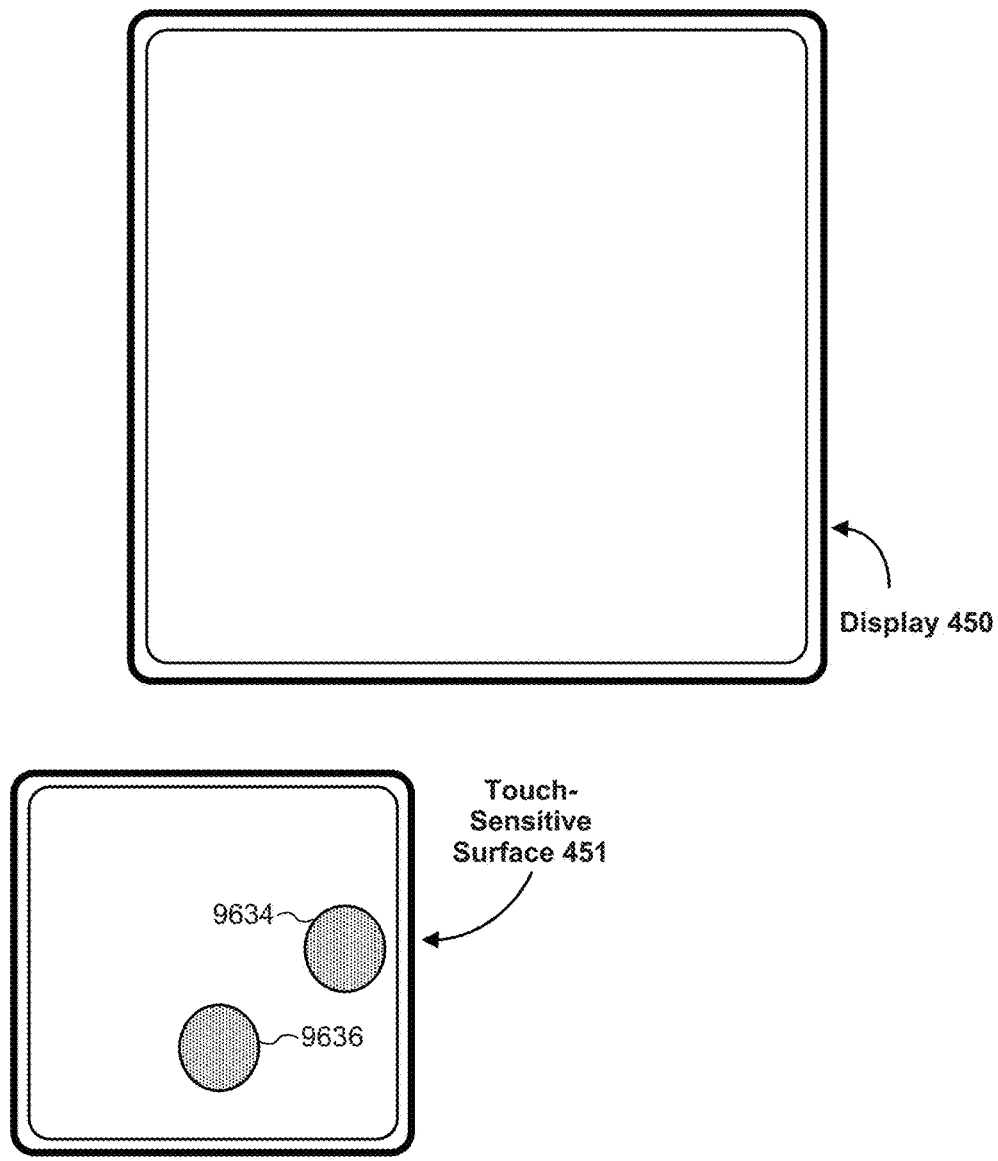

FIG. 14H illustrates the device detecting a second plurality of inputs (e.g., contacts 9634 and 9636) on the touch-sensitive surface 451. The device detects contacts 9634 and 9636, for example, subsequent to adjusting the tactile output level of the device (e.g., from the tactile output level 9608 in FIG. 14B to the tactile output level 9612 in FIG. 14C).

Figure 14I:
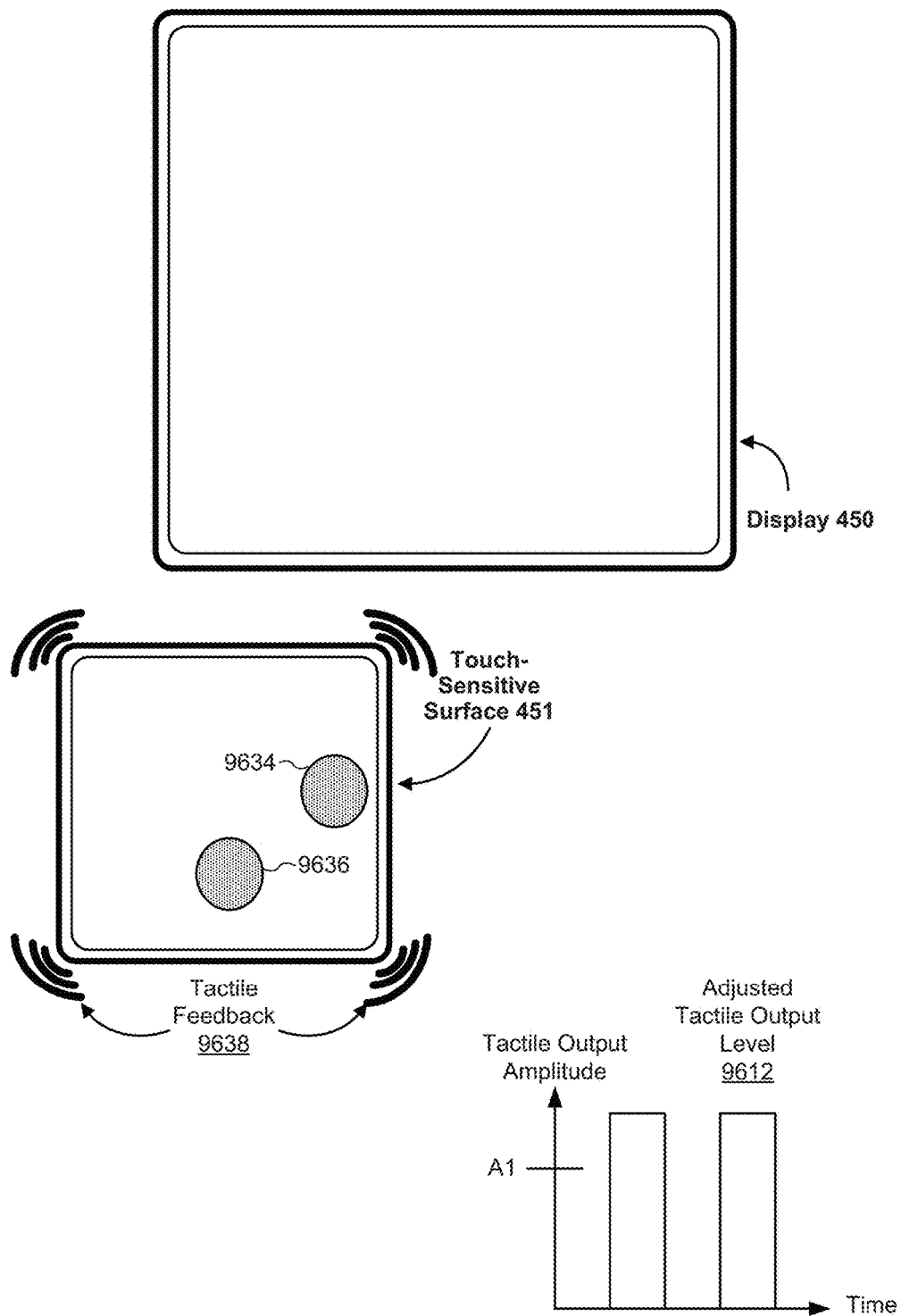

FIG. 14I illustrates the device providing tactile feedback 9638 in accordance with adjusted tactile output level 9612 and in response to detecting the second plurality of inputs (e.g., contacts 9634 and 9636) on the touch-sensitive surface 451.

FIGS. 15A-15C are flow diagrams illustrating a method 9700 of adjusting a tactile output level in accordance with an adjustment of a volume level in accordance with some embodiments. The method 9700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 9700 are, optionally, combined and/or the order of some operations is, optionally, changed.

As described below, the method 9700 provides an intuitive way to adjust a tactile output level in accordance with an adjustment of a volume level. The method reduces the cognitive burden on a user when adjusting a tactile output level in accordance with an adjustment of a volume level, thereby creating a more efficient human-machine interface. For battery-operated electronic devices, enabling a user to adjust a tactile output level in accordance with an adjustment of a volume level faster and more efficiently conserves power and increases the time between battery charges.

The device detects (9702) a first plurality of inputs on the touch-sensitive surface. FIG. 14A, for example, shows a first plurality of inputs (e.g., contacts 9602 and 9604) on the touch-sensitive surface 451.

In response to detecting the first plurality of inputs, the device provides (9704) tactile feedback in accordance with a tactile output level of the device (e.g., the tactile output level corresponds to an average magnitude of tactile outputs, a magnitude of a reference tactile output generated by the device, or a magnitude of a maximum tactile output generated by the device). FIG. 14B, for example, shows the device providing tactile feedback 9607 in accordance with tactile output level 9608 and in response to detecting the first plurality of inputs (e.g., contacts 9602 and 9604).

The device receives (9706) a request to adjust a volume level (e.g., audio output level) of the device by a respective amount. FIG. 14C, for example, shows the request to adjust the volume level of the device by a respective amount (e.g., the difference between volume level 9606 and volume level 9610, both of which are non-zero volume levels in this example).

In response to the request (9708) to adjust the volume level, the device adjusts (9710) the volume level by the respective amount from a first non-zero volume level to a second non-zero volume level. FIG. 14C, for example, shows increasing volume level 9606 (e.g., at level L1, a non-zero volume level) to volume level 9610 (e.g., at a level above L1, a non-zero volume level) in response to the request to adjust the volume level of the device.

In response to the request (9708) to adjust the volume level, the device also adjusts (9712) the tactile output level of the device in accordance with the respective amount. FIG. 14C, for example, shows adjusting the tactile output level 9608 to adjusted tactile output level 9612 in response to the request to adjust the volume level of the device (e.g., from volume level 9605 to volume level 9608).

In some embodiments, adjusting the tactile output level of the device comprises adjusting (9713) the tactile output level of the device, in accordance with the respective amount, from a first non-zero tactile output level to a second non-zero tactile output level. FIG. 14C, for example, shows adjusted tactile output level 9612 with an amplitude above A1 in contrast to the amplitude of tactile output level 9608 in FIG. 14B at A1, both of which are non-zero tactile output levels in this example.

In some embodiments, a respective tactile output that corresponds to a respective input on the touch-sensitive surface is generated (9714) by movement of the touch-sensitive surface that includes a dominant movement component that has a movement profile (e.g., a waveform shape such as square, sine, squine, sawtooth or triangle; and/or width/period) and an amplitude (e.g., movement corresponding to the initial impulse, ignoring any unintended resonance). In some embodiments, in response to the request (9708) to adjust the volume level, adjusting the tactile output level of the device includes adjusting (9716) the amplitude of the respective tactile output that corresponds to the respective input on the touch-sensitive surface (e.g., increasing or decreasing the amplitude of the initial impulse of the respective tactile output). FIG. 14C, for example, shows adjusting the amplitude of tactile output level 9608 in FIG. 14B (e.g., with an amplitude at A1) to produce adjusted output level 9612 (e.g., with an amplitude above A1), both of which are non-zero tactile output levels in this example.

In some embodiments, a respective tactile output that corresponds to a respective input on the touch-sensitive surface is generated (9714) by movement of the touch-sensitive surface that includes a dominant movement component that has a movement profile (e.g., a waveform shape such as square, sine, squine, sawtooth or triangle; and/or width/period) and an amplitude (e.g., movement corresponding to the initial impulse, ignoring any unintended resonance). In some embodiments, in response to the request (9708) to adjust the volume level, adjusting the tactile output level of the device includes adjusting (9718) the movement profile of the respective tactile output that corresponds to the respective input on the touch-sensitive surface (e.g., increasing or decreasing the width or shape of the initial impulse of the respective tactile output). FIG. 14C, for example, shows adjusting the movement profile of tactile output level 9608 in FIG. 14B (e.g., with a rectangular waveform shape) to produce adjusted output level 9614 (e.g., with a triangular waveform shape).

In some embodiments, in response to the request (9708) to adjust the volume level, adjusting the tactile output level of the device includes adjusting (9718) the movement profile of the respective tactile output that corresponds to the respective input on the touch-sensitive surface and further includes adjusting (9720) the amplitude of the respective tactile output that corresponds to the respective input on the touch-sensitive surface. FIG. 14C, for example, shows adjusting both the movement profile and the amplitude of tactile output level 9608 in FIG. 14B (e.g., with a rectangular waveform shape and an amplitude at A1) to produce adjusted output level 9616 (e.g., with a triangular waveform shape and an amplitude above A1).

In some embodiments, in response to the request (9708) to adjust the volume level, in accordance with a determination that adjusting the volume level by the respective amount includes increasing the volume level, adjusting the tactile output level of the device includes increasing (9722) the tactile output level (e.g., the tactile output changes in tandem with the audio output). For example, when the audio output level is increased by 50% the tactile output level is increased by 50%. FIG. 14D, for example, shows volume level 9618 (e.g., a 50% increase from volume level 9606 in FIG. 14B) and adjusted tactile output level 9620 (e.g., a 50% increase from tactile output level 9608 in FIG. 14B).

In some embodiments, in response to the request (9708) to adjust the volume level, in accordance with a determination that adjusting the volume level by the respective amount includes decreasing the volume level, adjusting the tactile output level of the device includes decreasing (9724) the tactile output level (e.g., the tactile output changes in tandem with the audio output). For example, when the audio output level is decreased by 50% the tactile output level is decreased by 50%. FIG. 14E, for example, shows volume level 9622 (e.g., a 50% decrease from volume level 9606 in FIG. 14B) and adjusted tactile output level 9624 (e.g., a 50% decrease from tactile output level 9608 in FIG. 14B).

In some embodiments, in response to the request (9708) to adjust the volume level, in accordance with a determination that adjusting the volume level by the respective amount includes increasing the volume level, adjusting the tactile output level of the device includes decreasing (9726) the tactile output level (e.g., the increased audio output is a replacement for the decreased tactile output). For example, when the audio output level is increased by 50% the tactile output level is decreased by 50%. FIG. 14F, for example, shows volume level 9626 (e.g., a 50% increase from volume level 9606 in FIG. 14B) and adjusted tactile output level 9628 (e.g., a 50% decrease from tactile output level 9608 in FIG. 14B).

In some embodiments, in response to the request (9708) to adjust the volume level, in accordance with a determination that adjusting the volume level by the respective amount includes decreasing the volume level, adjusting the tactile output level of the device includes increasing (9728) the tactile output level (e.g., the increased tactile output is a replacement for the decreased audio output). For example, when the audio output level is decreased by 50% the tactile output level is increased by 50%. FIG. 14G, for example, shows volume level 9630 (e.g., a 50% decrease from volume level 9606 in FIG. 14B) and adjusted tactile output level 9632 (e.g., a 50% increase from tactile output level 9608 in FIG. 14B).

In some embodiments, after adjusting the tactile output level of the device, the device detects (9730) a second plurality of inputs on the touch-sensitive surface. FIG. 14H, for example, shows the device detecting a second plurality of inputs (e.g., contacts 9634 and 9636) on the touch-sensitive surface 451. The device detects contacts 9634 and 9636 on the touch-sensitive surface 451, for example, subsequent to adjusting the tactile output level of the device (e.g., from tactile output level 9608 in FIG. 14B to adjusted tactile output level 9612 in FIG. 14C).

In some embodiments, in response to detecting the second plurality of inputs on the touch-sensitive surface, the device provides (9732) tactile feedback in accordance with the adjusted tactile output level. FIG. 14I, for example, shows the device providing tactile feedback 9638 in accordance with adjusted tactile output level 9612. The device provides tactile feedback 9638, for example, subsequent to detecting the second plurality of inputs (e.g., contacts 9634 and 9636) on the touch-sensitive surface 451.

It should be understood that the particular order in which the operations in FIGS. 15A-15C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 9700 described above with respect to FIGS. 15A-15C. For example, the contacts (inputs), gestures and tactile sensations described above with reference to method 9700 optionally have one or more of the characteristics of the contacts (inputs), gestures, and tactile sensations described herein with reference to other methods described herein. For brevity, these details are not repeated here.

Figure 16:
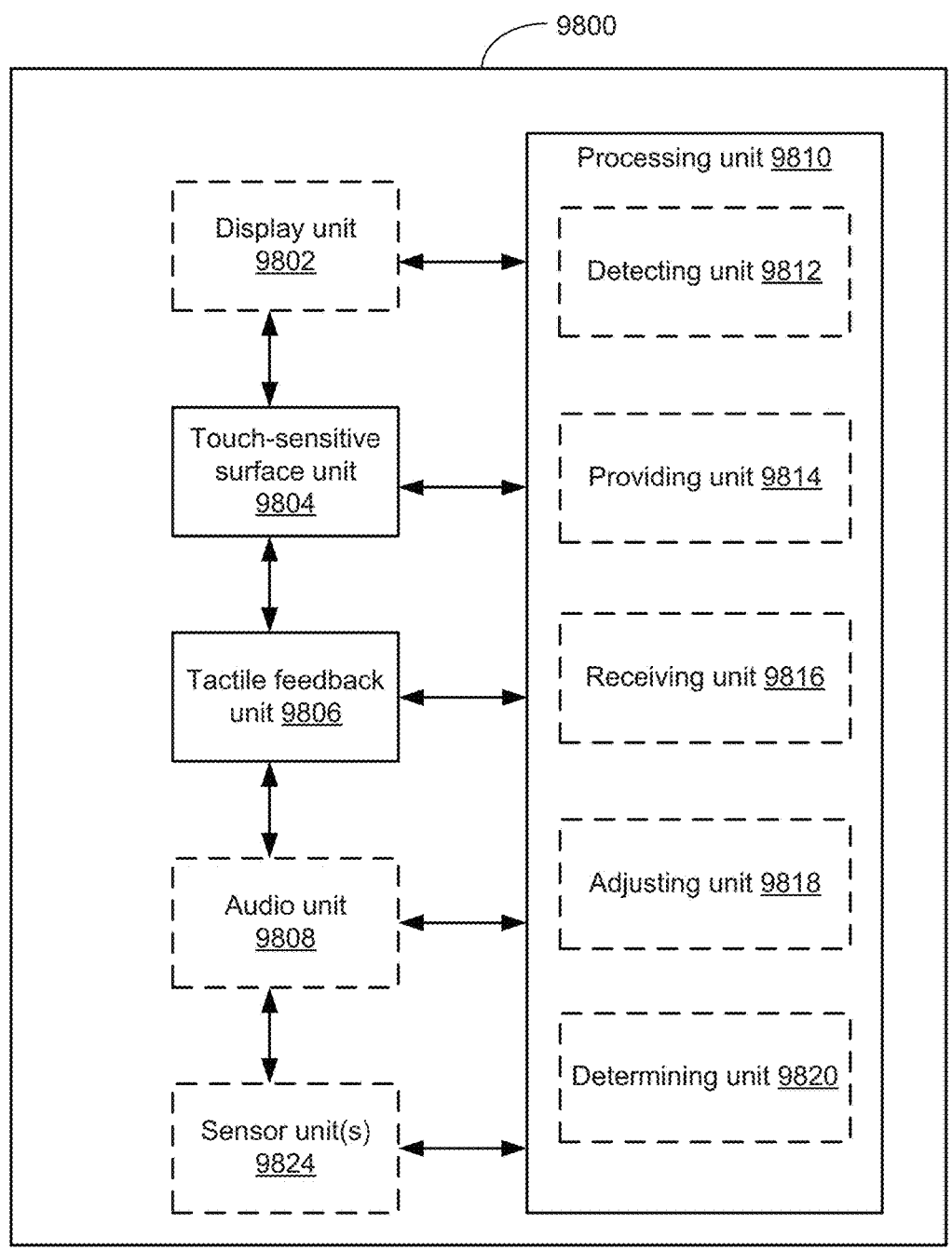
FIG. 16 is a functional block diagram of an electronic device in accordance with some embodiments.

In accordance with some embodiments, FIG. 16 shows a functional block diagram of an electronic device 9800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein 989898.

As shown in FIG. 16, an electronic device 9800 includes a display unit 9802 configured to display information; a touch-sensitive surface unit 9804 configured to receive inputs (e.g., contacts); a tactile feedback unit 9806 configured to provide tactile feedback (e.g., generated by movement of the touch-sensitive surface unit 9804); an audio unit 9808 configured to produce an audio signal and an audio control signal in accordance with at least a volume level (optionally includes an audio speaker); and a processing unit 9810 coupled to the display unit 9802, the touch-sensitive surface unit 9804, the tactile feedback unit 9806, and the audio unit 9808. In some embodiments, processing unit 9810 includes a detecting unit 9812, a providing unit 9814, a receiving unit 9816, an adjusting unit 9818, and a determining unit 9820. Optionally, electronic device 9800 further includes one or more sensor units 9824 configured to detect intensity of contacts with the touch-sensitive surface unit 9804.

The processing unit 9810 is configured to: detect (e.g., with the detecting unit 9812) a first plurality of inputs on the touch-sensitive surface unit 9804; in response to detecting the first plurality of inputs, provide (e.g., with the providing unit 9814) tactile feedback via tactile feedback unit 9806 in accordance with a tactile output level of the device; and receive (e.g., with the receiving unit 9816) a request to adjust a volume level of the device by a respective amount. The processing unit 9810 is further configured to, in response to the request to adjust the volume level: adjust (e.g., with adjusting the unit 9818) the volume level by the respective amount; and adjust (e.g., with the adjusting unit 9818) the tactile output level of the device in accordance with the respective amount.

In some embodiments, a respective tactile output that corresponds to a respective input on the touch-sensitive surface unit 9804 is generated by movement of the touch-sensitive surface unit 9804 that includes a dominant movement component that has a movement profile and an amplitude; adjusting the tactile output level of the device includes adjusting (e.g., with the adjusting unit 9818) the amplitude of the respective tactile output that corresponds to the respective input on the touch-sensitive surface unit 9804.

In some embodiments, a respective tactile output that corresponds to a respective input on the touch-sensitive surface unit 9804 is generated by movement of the touch-sensitive surface unit 9804 that includes a dominant movement component that has a movement profile and an amplitude; adjusting the tactile output level of the device includes adjusting (e.g., with the adjusting unit 9818) the movement profile of the respective tactile output that corresponds to the respective input on the touch-sensitive surface unit 9804.

In some embodiments, the processing unit 9810 is configured to adjust the tactile output level of the device by adjusting (e.g., with the adjusting unit 9818) the movement profile and the amplitude of the respective tactile output that corresponds to the respective input on the touch-sensitive surface unit 9804.

In some embodiments, after adjusting (e.g., with the adjusting unit 9818) the tactile output level of the device, the processing unit 9810 is configured to detect (e.g., with the detecting unit 9812) a second plurality of inputs on the touch-sensitive surface unit 9804; and in response to detecting the second plurality of inputs on the touch-sensitive surface unit 9804, provide (e.g., with the providing unit 9814) tactile feedback via tactile feedback unit 9806 in accordance with the adjusted tactile output level.

In some embodiments, the processing unit 9810 is configured to adjust (e.g., with the adjusting unit 9818) the output level of the device by: in accordance with a determination (e.g., with the determining unit 9820) that adjusting the volume level by the respective amount includes increasing the volume level, adjusting (e.g., with the adjusting unit 9818) the tactile output level of the device includes increasing the tactile output level; and in accordance with a determination (e.g., with the determining unit 9820) that adjusting the volume level by the respective amount includes decreasing the volume level, adjusting (e.g., with the adjusting unit 9818) the tactile output level of the device includes decreasing the tactile output level.

In some embodiments, the processing unit 9810 is configured to adjust (e.g., with the adjusting unit 9818) the output level of the device by: in accordance with a determination (e.g., with the determining unit 9820) that adjusting the volume level by the respective amount includes increasing the volume level, adjusting (e.g., with the adjusting unit 9818) the tactile output level of the device includes decreasing the tactile output level; and in accordance with a determination (e.g., with the determining unit 9820) that adjusting the volume level by the respective amount includes decreasing the volume level, adjusting (e.g., with the adjusting unit 9818) the tactile output level of the device includes increasing the tactile output level.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 15A-15C are, optionally, implemented by components depicted in FIGS. 1A-1B or FIG. 16. For example, detecting operations 9702 and 9728, providing operations 9704 and 9730, receiving operation 9706, adjusting operations 9710-9712, and determining operations 9720-9726 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Forgoing Generation of Tactile Output for a Multi-Contact Gesture

Many electronic devices provide a form of confirmation to a user in response to an event being triggered by a user action. For example, when a user clicks on an affordance (e.g., an icon button) corresponding to respective content (e.g., an electronic document, an image, or a video), an audio output is provided via a speaker to the user to confirm that the user is clicking on the affordance. Similarly, for example, after a user clicks on a hyperlink corresponding to a webpage, a web browser displays some form of visual confirmation (e.g., a semicircular arrow spinning in a clockwise manner or a spinning globe) indicating that the webpage associated with the hyperlink is being loaded. However, this confirmation or feedback can be distracting or confusing to a user when it occurs in response to inputs that do not correspond to the feedback. The embodiments described below provide a more convenient and intuitive interface by generating a tactile output in response to detecting a gesture that includes a first number of contacts (e.g., one contact) and forging generating the tactile output if the gesture includes a second number of contacts (e.g., two or more contacts). Furthermore, in some embodiments, the device assigns less than all of a plurality of contacts to the gesture; thereby, excluding one or more of the plurality of contacts from the gesture in accordance with predefined gesture criteria (e.g., shape, surface area, intensity, or chronological order).

FIGS. 17A-17F illustrate exemplary user interfaces for generating a tactile output for a gesture having a first number of contacts (e.g., a single contact gesture) and forgoing generation of a tactile output for a gesture having a second number of contacts (e.g., a multi-contact gesture) in accordance with some embodiments. The user interfaces in these figures are used to illustrate the processes described below, including the processes in FIG. 18. FIGS. 17A-17F include intensity diagrams that show the current intensity of the contact on the touch-sensitive surface relative to a plurality of intensity thresholds including a respective threshold (e.g., "$IT_L$"). In some embodiments, operations similar to those described below with reference to "$IT_L$" are performed with reference to a different intensity threshold (e.g., "$IT_D$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 17A-17F and FIG. 18 will be discussed with reference to display 450 and a separate touch-sensitive surface 451; however, analogous operations are, optionally, performed on a device with a touch-sensitive display system 112 in response to detecting the contacts described in FIGS. 17A-17F on the touch-sensitive display system 112 while displaying the user interfaces shown in FIGS. 17A-17F on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 9904.

Figure 17A:
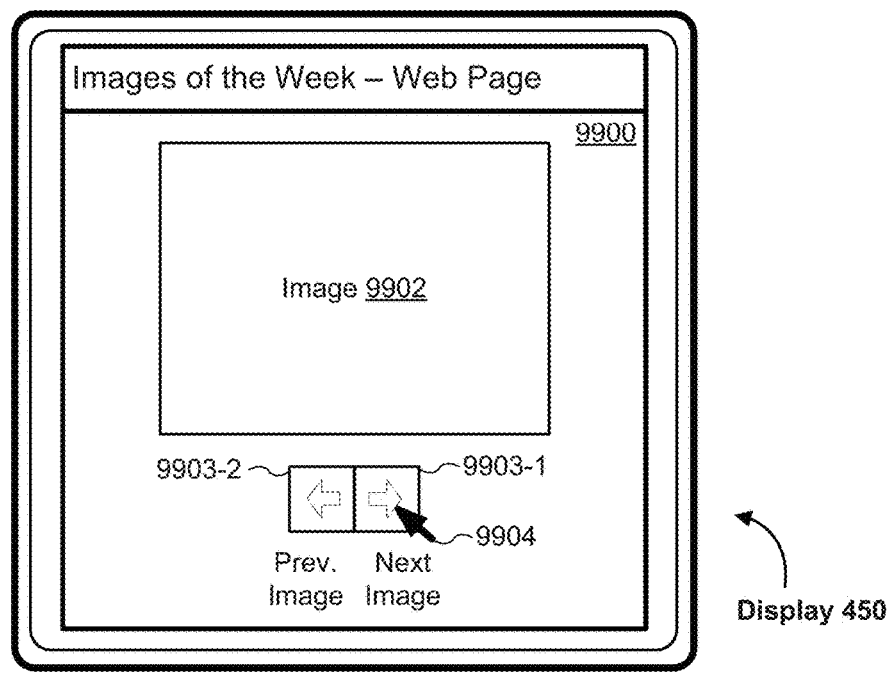
FIGS. 17A-17F illustrate exemplary user interfaces for generating a tactile output for a gesture having a first number of contacts and forgoing generation of a tactile output for a gesture having a second number of contacts in accordance with some embodiments.
Figure 17A:
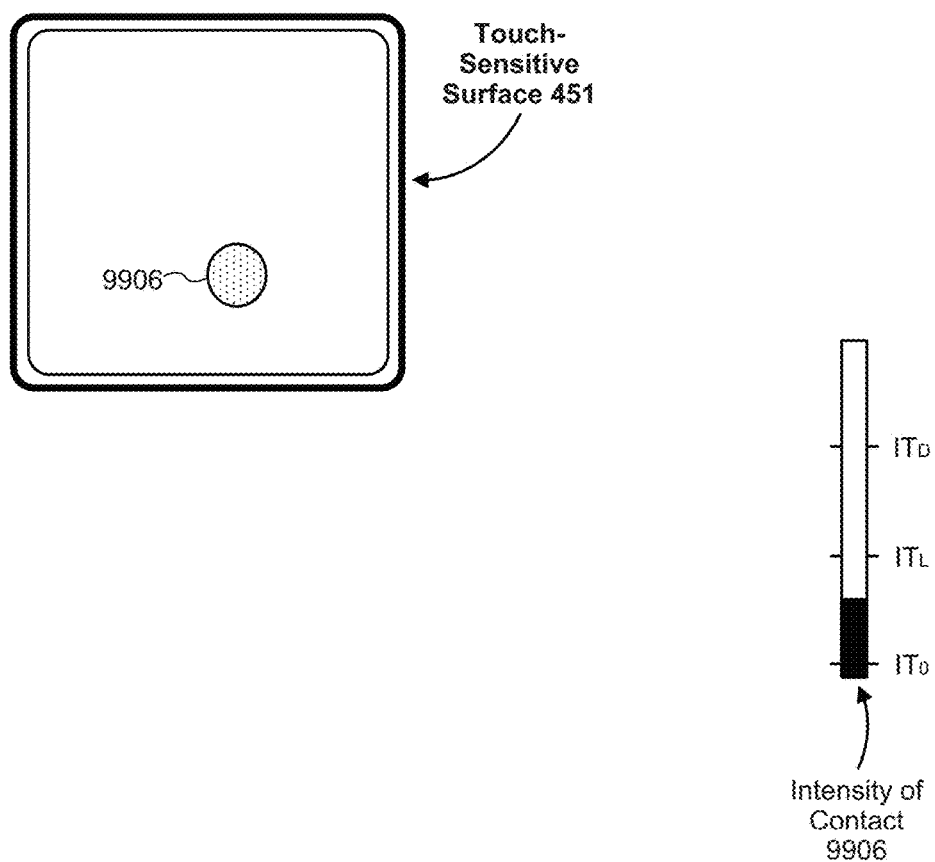
Figure 18:
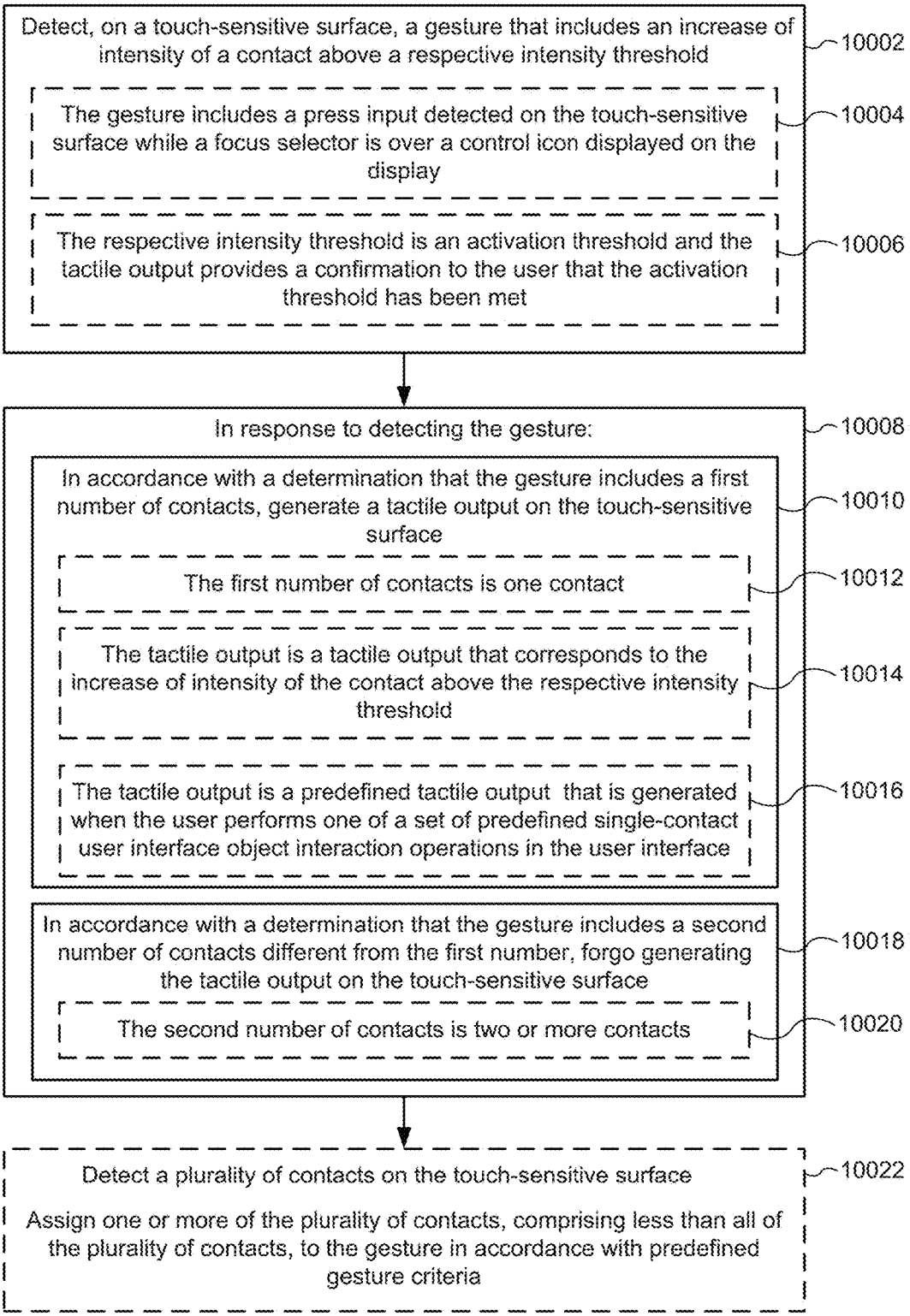
FIG. 18 is a flow diagram illustrating a method of generating a tactile output for a gesture having a first number of contacts and forgoing generation of a tactile output for a gesture having a second number of contacts in accordance with some embodiments.

FIG. 17A illustrates a user interface 9900 displayed on a display 450 of an electronic device. In this example, the user interface 9900 is associated with an application (e.g., a web browser), and the user interface 9900 includes image 9902 and control icons 9903 (e.g., next image button 9903-1 and previous image button 9903-2, associated with a sequence of images of the week). FIG. 17A further illustrates a contact 9906 detected on touch-sensitive surface 451 and a displayed representation of a focus selector (e.g., cursor 9904) corresponding to contact 9906. In this example, cursor 9904 is located over next image button 9903-1. FIG. 17A illustrates the intensity of contact 9906 between $IT_0$ and $IT_L$.

Figure 17B:
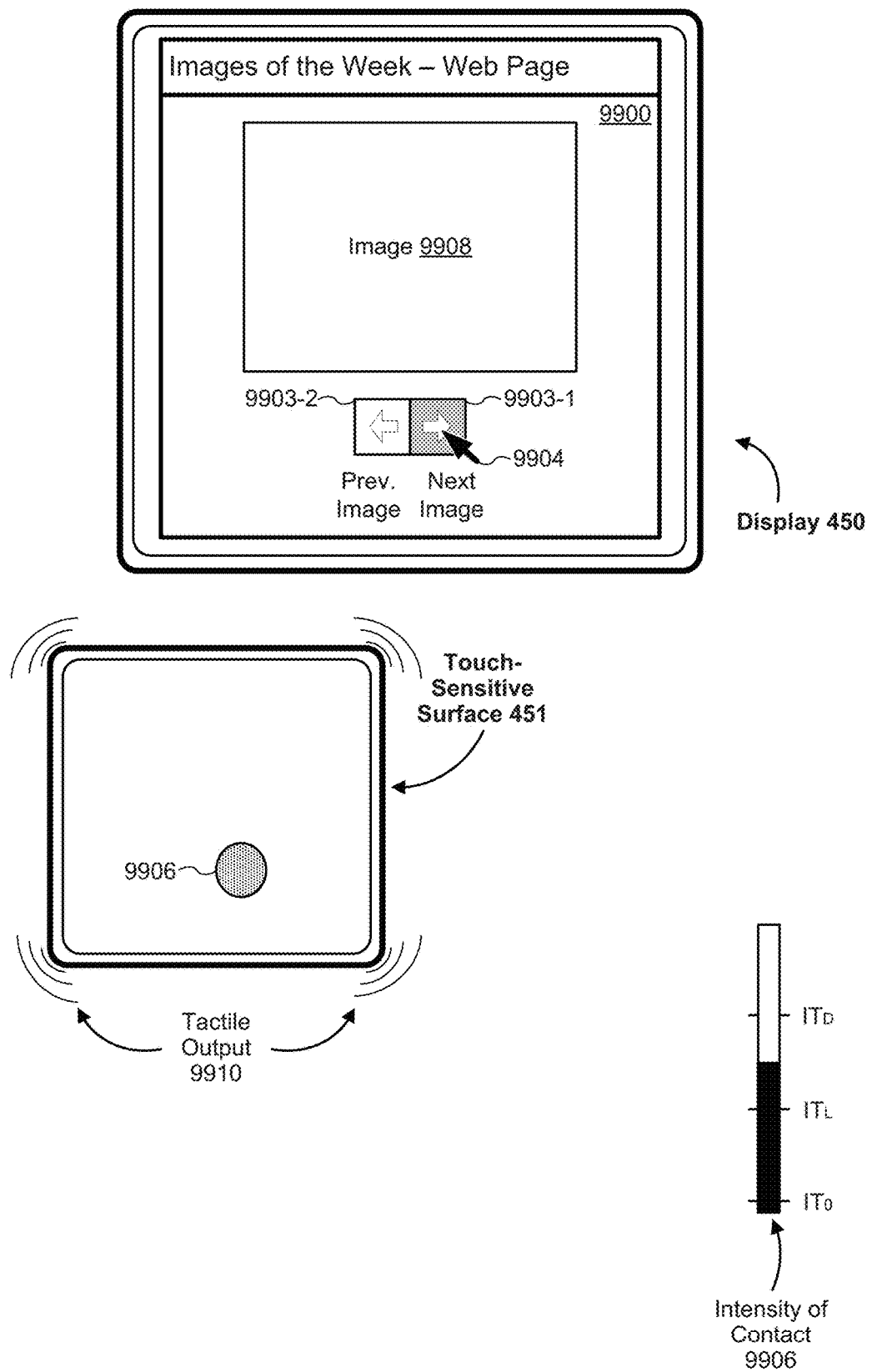

FIGS. 17A-17B illustrates an example of detecting, on the touch-sensitive surface 451, a gesture that includes an increase of intensity of a contact 9906 above a respective intensity threshold (e.g., "$IT_L$"). In this example, the intensity of contact 9906 increases (e.g., from below $IT_L$ in FIG. 17A to above $IT_L$ in FIG. 17B) above the respective intensity threshold (e.g., "$IT_L$").

FIG. 17B illustrates an example of generating a tactile output (e.g., tactile output 9910) on the touch sensitive 451. In this example, the device generates tactile output 9910 on the touch sensitive 451 in response to detecting the gesture (e.g., the increase of intensity of contact 9906 above $IT_L$) and in accordance with a determination that the gesture includes a first number of contacts. In some embodiments, the first number of contacts is one contact. FIGS. 17A-17B illustrate detecting the gesture including one contact (e.g., contact 9906). FIG. 17B further illustrates displaying image 9908 on display 450 in response to the press input (e.g., the increase in intensity of contact 9906 above $IT_L$) while cursor 9904 is over next image button 9903-1, which relates to the next image in the sequence of images of the week.

Figure 17C:
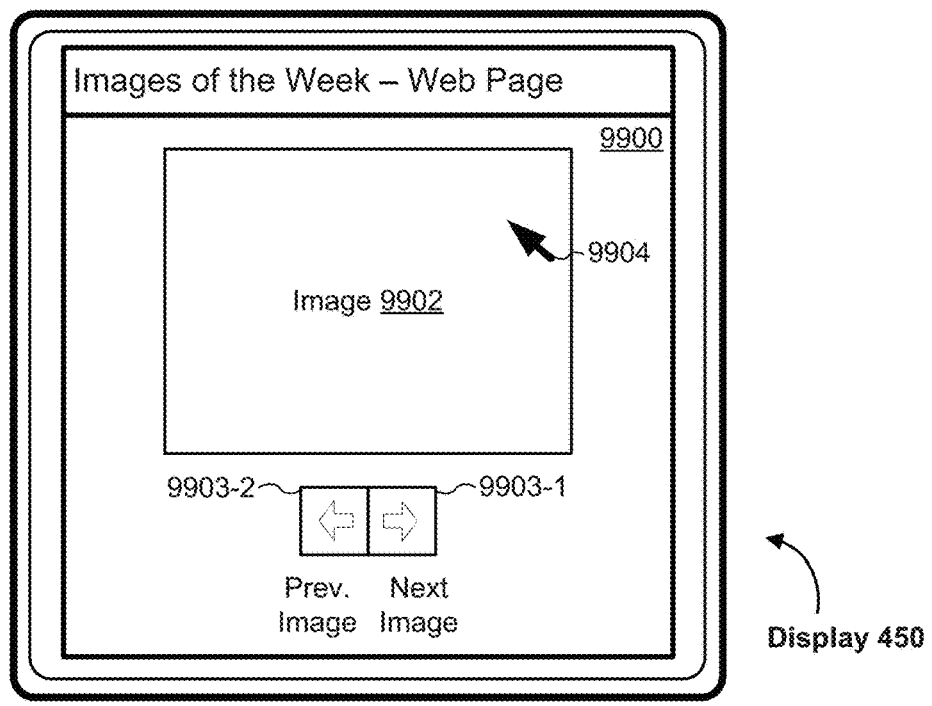
Figure 17C:
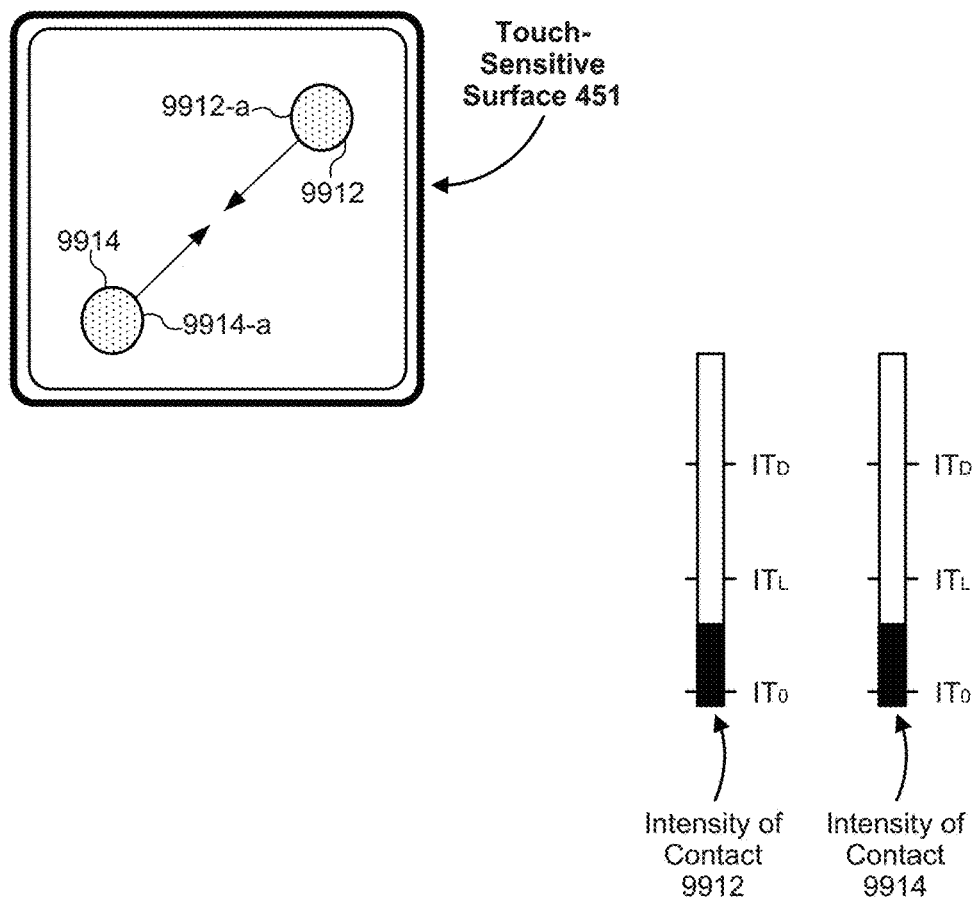

FIG. 17C illustrates detecting two contacts (e.g., contacts 9912 and 9914) on the touch-sensitive surface 451. In this example, contact 9912 corresponds to cursor 9904 (e.g., contact 9912 was detected prior to contact 9914). FIG. 17C further illustrates the intensities of contacts 9912 and 9914 between $IT_0$ and $IT_L$.

Figure 17D:
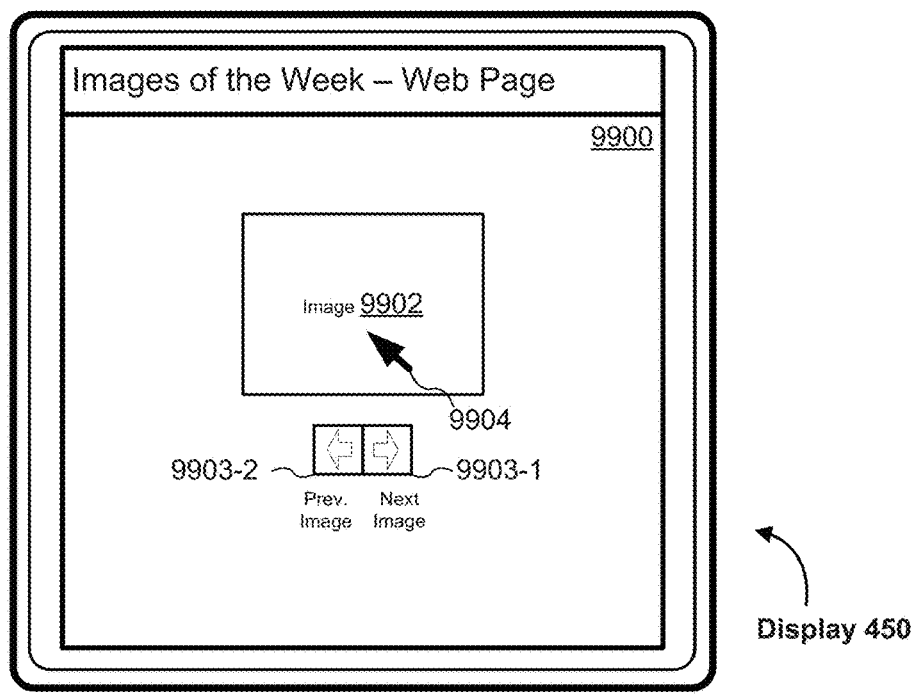
Figure 17D:
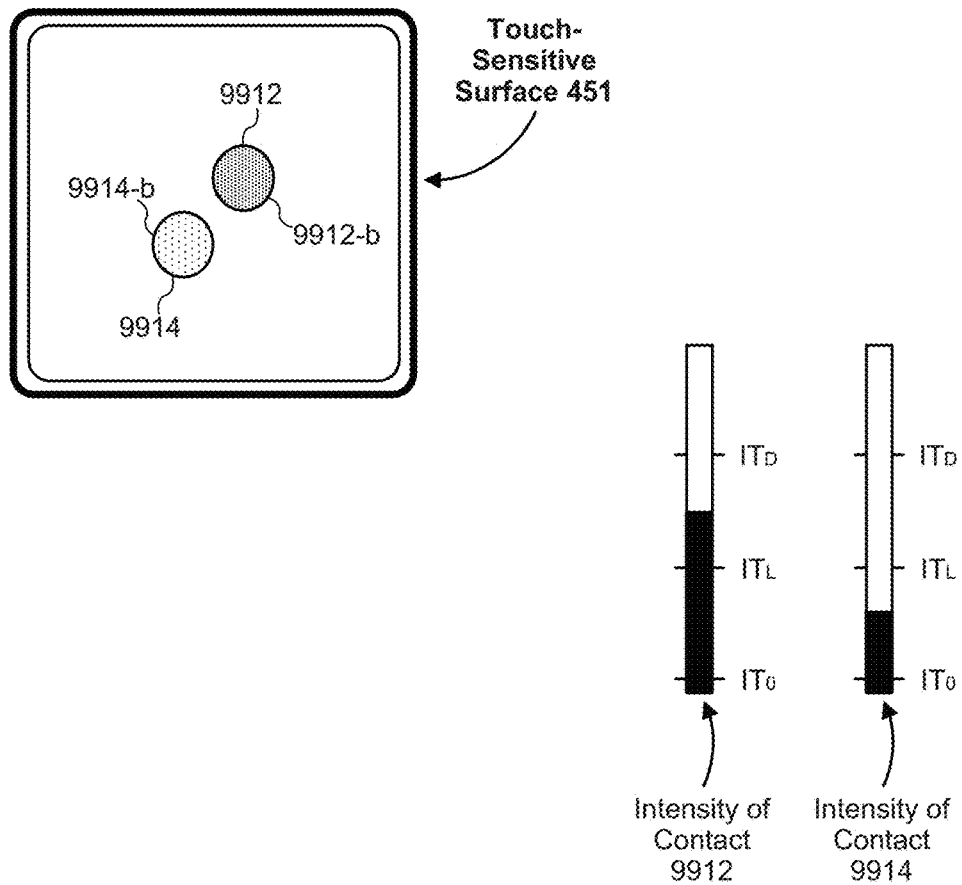

FIGS. 17C-17D illustrate an example of detecting, on the touch-sensitive surface 451, a gesture that includes an increase of intensity of contact 9912 above a respective intensity threshold (e.g., "$IT_L$"). In this example, the intensity of contact 9912 increases (e.g., from below $IT_L$ in FIG. 17C to above $IT_L$ in FIG. 17D) above the respective intensity threshold (e.g., "$IT_L$").

FIGS. 17C-17D further illustrate a multi-touch pinch (zooming out) gesture. In this example, the multi-touch pinch gesture includes contact 9912 moving from location 9912-a in FIG. 17C to location 9912-b in FIG. 17D and contact 9914 moving from location 9914-a in FIG. 17C to location 9914-b in FIG. 17D (e.g., contacts 9912 and 9914 are moving towards each other while remaining contact with the touch-sensitive surface 451). FIGS. 17C-17D illustrate zooming out from, or reducing the size of, image 9902 and control icons 9903 (e.g., image 9902 and control icons 9903 are displayed at a smaller size in FIG. 17D, in contrast to FIG. 17C) in response to the multi-touch pinch gesture.

FIG. 17D illustrates an example of forgoing generating a tactile output on the touch sensitive 451. In this example, the device forgoes generating the tactile output (e.g., tactile output 9910 in FIG. 17B is not generated) on the touch sensitive 451 in response to detecting the gesture (e.g., the movement of contacts 9912 and 9914 toward each other that includes the increase of intensity of contact 9912 above $IT_L$) and in accordance with a determination that the gesture includes a second number of contacts (e.g., contacts 9912 and 9914). In some embodiments, the second number of contacts is two or more contacts. FIGS. 17C-17D illustrate detecting the gesture including two contacts (e.g., contacts 9912 and 9914).

Figure 17E:
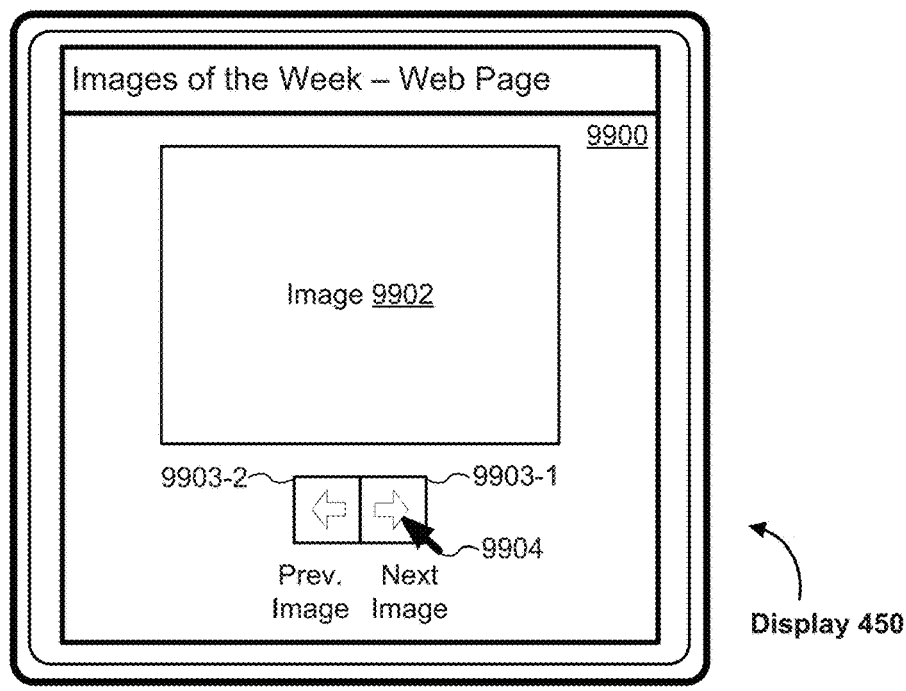
Figure 17E:
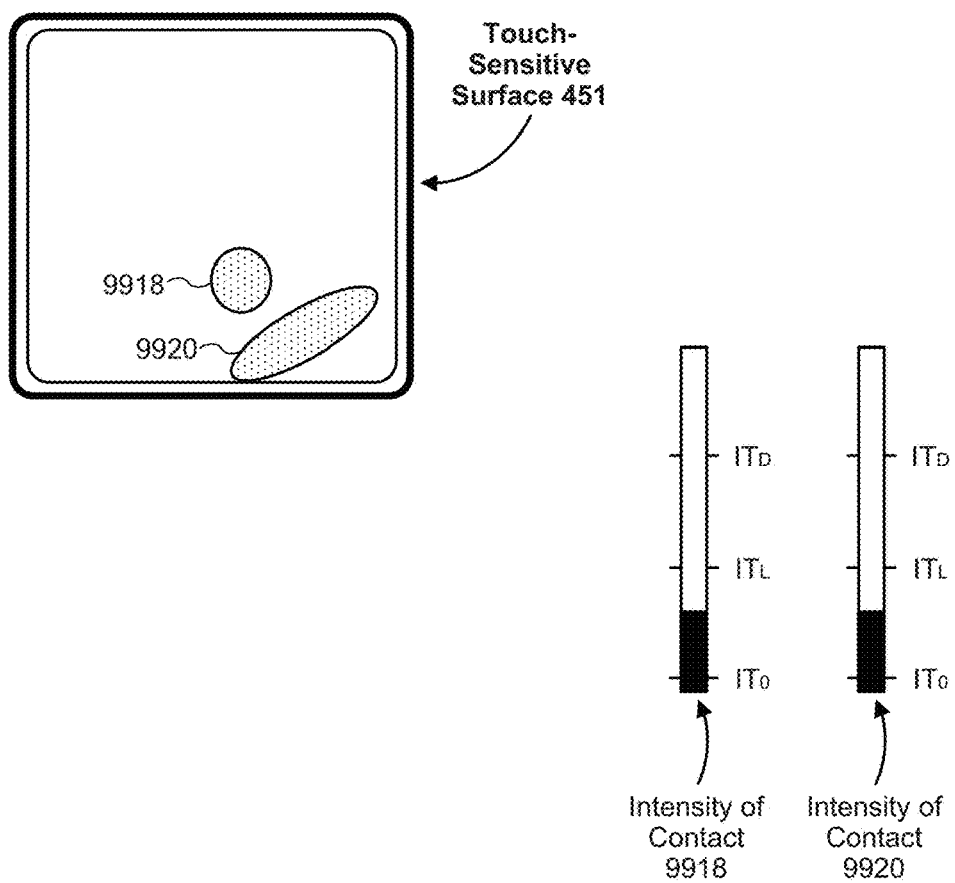

FIG. 17E illustrates detecting a plurality of contacts (e.g., contacts 9918 and 9920) on the touch-sensitive surface 451. In this example, contact 9918 corresponds to cursor 9904 (e.g., contact 9918 was detected prior to contact 9920), and the intensities of contacts 9918 and 9920 are between $IT_0$ and $IT_L$.

FIG. 17E further illustrates assigning one or more of the plurality of contacts, comprising less than all of the plurality of contacts, to the gesture in accordance with predefined gesture criteria. In this example, contact 9918 is assigned to the gesture in accordance with predefined gesture criteria, but contact 9920 (e.g., representing a portion of a user's palm on touch-sensitive surface 451) is not assigned to the gesture (e.g., contact 9920 is not in accordance with predefined gesture criteria including shape and surface area, these predefined gesture criteria sometimes include accidental input rejection criteria such as palm rejection criteria that enable the device to ignore accidental contacts on the touch-sensitive surface such as a contact formed by the palm of a user's hand).

Figure 17F:
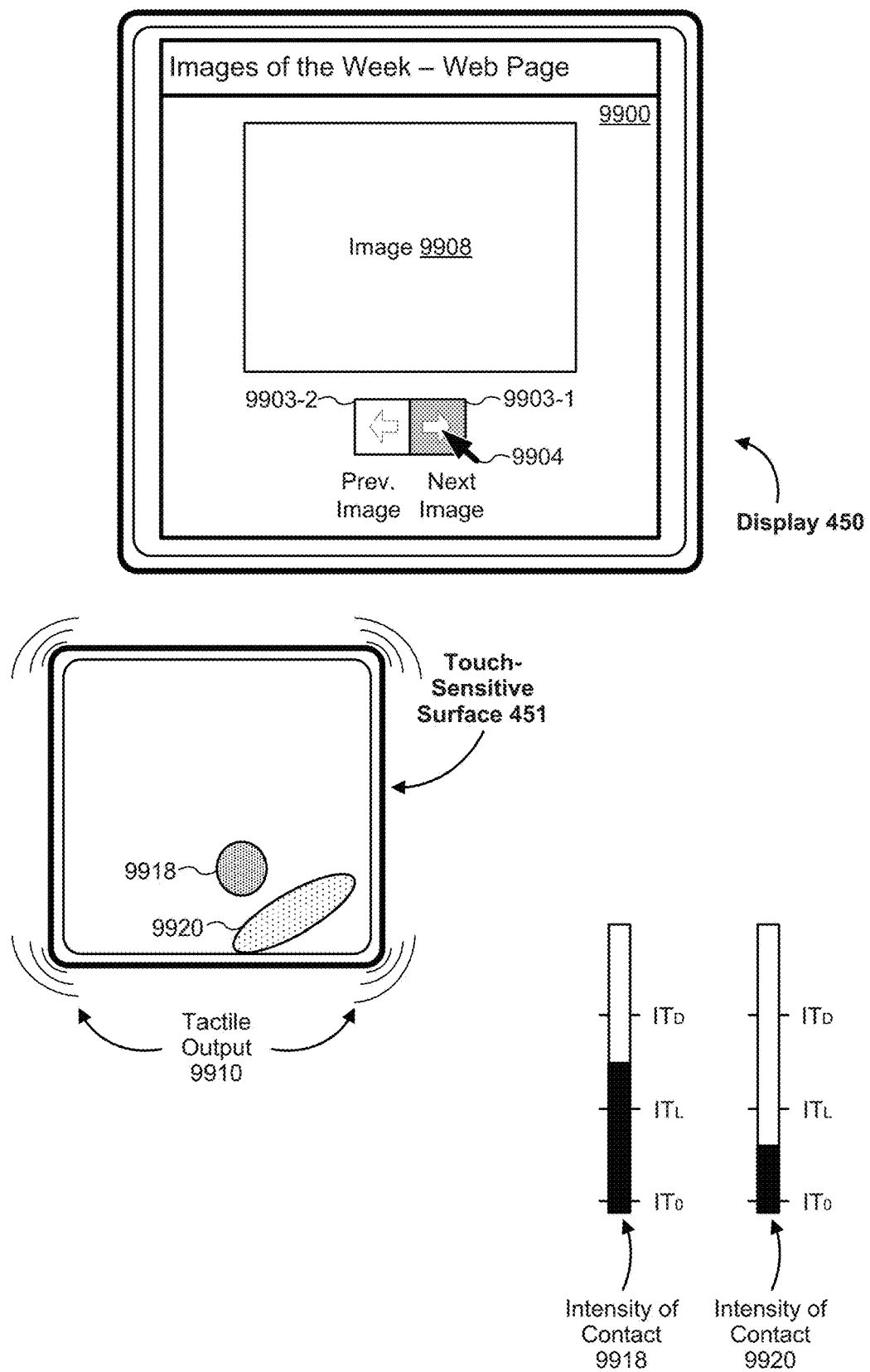

FIGS. 17E-17F illustrate an example of detecting, on the touch-sensitive surface 451, a gesture that includes an increase of intensity of a contact (e.g., contact 9918) above a respective intensity threshold (e.g., "$IT_L$"). In this example, the intensity of contact 9918 increases (e.g., from a level below $IT_L$ in FIG. 17E to a level above $IT_L$ in FIG. 17F) above the respective intensity threshold (e.g., "$IT_L$").

FIG. 17F illustrates an example of generating a tactile output (e.g., tactile output 9910) on the touch sensitive 451. In this example, the device generates tactile output 9910 on the touch sensitive 451 in response to detecting the gesture (e.g., the increase of intensity of contact 9918 above $IT_L$) and in accordance with a determination that the gesture includes a first number of contacts (e.g., one contact, in this example contact 9918, excluding contact 9920). FIG. 17F further illustrates displaying image 9908 on display 450 in response to the press input (e.g., the increase in intensity of contact 9918 above $IT_L$) while cursor 9904 is over next image button 9903-1, which relates to the next image in the sequence of images of the week). In some embodiments, the next image button 9903-1 is activated in response to an increase in intensity of contact 9918 above $IT_L$ (e.g., the down-stroke of a press input). In some embodiments, the next image button 9903-1 is activated in response to a subsequent decrease in intensity of contact 9918 below $IT_L$ (e.g., the up-stroke of a press input).

FIG. 18 is a flow diagram illustrating a method 10000 of generating a tactile output for a gesture having a first number of contacts (e.g., a single contact gesture) and forgoing generation of a tactile output for a gesture having a second number of contacts (e.g., a multi-contact gesture) in accordance with some embodiments. The method 10000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 10000 are, optionally, combined and/or the order of some operations is, optionally, changed.

As described below, the method 10000 provides an intuitive way to generate a tactile output for a gesture having a first number of contacts and forgo generation of a tactile output for a gesture having a second number of contacts. The method reduces the cognitive burden on a user when generating a tactile output for a gesture having a first number of contacts and forgoing generation of a tactile output for a gesture having a second number of contacts, thereby creating a more efficient human-machine interface. For battery-operated electronic devices, enabling a user to generate a tactile output for a gesture having a first number of contacts and forgo generation of a tactile output for a gesture having a second number of contacts conserves power and increases the time between battery charges.

The device detects (10002), on a touch-sensitive surface, a gesture that includes an increase of intensity of a contact above a respective intensity threshold. FIGS. 17A-17B, for example, show a gesture that includes an increase of intensity of contact 9906 (e.g., from below $IT_L$ in FIG. 17A to above $IT_L$ in FIG. 17B) above a respective intensity threshold (e.g., "$IT_L$") on the touch-sensitive surface 451.

In some embodiments, the gesture includes (10004) a press input detected on the touch-sensitive surface while a focus selector is over a control icon (e.g., a button) displayed on the display. FIGS. 17A-17B, for example, show a press input detected on the touch-sensitive surface 451 (e.g., the increase in the intensity of contact 9906 from below $IT_L$ in FIG. 17A to above $IT_L$ in FIG. 17B) while a focus selector (e.g., cursor 9904) is over a control icon (e.g., next image button 9903-1) displayed on the display 450.

In some embodiments, the respective intensity threshold is (10006) an activation threshold and the tactile output provides a confirmation to the user that the activation threshold has been met. For example, a tactile output confirming to the user that an operation has been performed, or a tactile output confirming to the user that an operation will be performed upon detecting an end of the gesture, such as liftoff of the contact. FIG. 17B, for example, shows tactile output 9910 on touch-sensitive surface 451 providing confirmation to the user that the activation threshold has been met (e.g., the respective intensity threshold—$IT_L$).

In response to detecting the gesture (10008) and in accordance with a determination that the gesture includes a first number of contacts, the device generates (10010) a tactile output on the touch-sensitive surface. FIG. 17B, for example, shows tactile output 9910 generated on touch-sensitive surface 451 in response to detecting the gesture (e.g., an increase in the intensity of contact 9906 above $IT_L$) and in accordance with a determination that the gesture includes a first number of contacts (e.g., contact 9906).

In some embodiments, the first number of contacts is (10012) one contact (e.g., the tactile output is generated when the gesture is a single-contact press input). FIGS. 17A-17B, for example, show the gesture including one contact (e.g., contact 9906).

In some embodiments, the tactile output is (10014) a tactile output that corresponds to the increase of intensity of the contact above the respective intensity threshold. For example, the tactile output that is generated when the gesture includes a first number of contacts (and is not generated when the gesture includes a second number of contacts) is a tactile output that corresponds to the increase of intensity of a contact above a respective threshold (e.g., "$IT_L$"). In some embodiments, the tactile output is a simulation of a "mouse click" tactile output that is generated by the device when a contact exceeds a "down click" intensity threshold (e.g., "$IT_L$") and the gesture is performed with a single contact (e.g., the user performs a press input with a single contact). FIG. 17B, for example, shows tactile output 9910 corresponding to the increase of intensity of contact 9906 above the respective intensity threshold (e.g., "$IT_L$").

In some embodiments, the tactile output is (10016) a predefined tactile output (e.g., to simulate a "mouse click" sensation corresponding to depressing a physical actuator on a mouse or trackpad) that is generated when the user performs one of a set of predefined single-contact user interface object interaction operations in the user interface. For example, the tactile output corresponds to a "mouse click" sensation, where the "mouse click" sensation is provided in response to selection of user interface objects when the user is using the touch-sensitive surface as a single-contact trackpad (e.g., rather than a multi-contact gesture input area).

In response to detecting the gesture and in accordance with a determination that the gesture includes a second number of contacts, the device forgoes (10018) generating the tactile output on the touch-sensitive surface. FIG. 17D, for example, shows the device forgoing generation of the tactile output on the touch-sensitive surface 451 (e.g., tactile output 9910 in FIG. 17B is not generated) in response to detecting the gesture (e.g., an increase in the intensity of contact 9912 from below $IT_L$ in FIG. 17C to above $IT_L$ in FIG. 17D) and in accordance with a determination that the gesture includes a second number of contacts (e.g., contacts 9912 and 9914). In some embodiments, the tactile output is not generated when the gesture is performed with multiple contacts (e.g., the user performs a multi-contact gesture such as a pinch or depinch gesture). FIGS. 17C-17D, for example, show a multi-touch pinch gesture on touch-sensitive surface 451.

In some embodiments, the second number of contacts is (10020) two or more contacts (e.g., the tactile output is not generated when the gesture is a multi-contact pinch/depinch gesture). FIGS. 17C-17D, for example, show the pinch gesture including two or more contacts (e.g., contacts 9912 and 9914).

In some embodiments, the device detects (10022) a plurality of contacts on the touch-sensitive surface and assigns one or more of the plurality of contacts, comprising less than all of the plurality of contacts, to the first gesture in accordance with predefined gesture criteria. In some embodiments, one or more simultaneously detected contacts are excluded from the gesture (e.g., the device ignores palm contact or accidental contacts on the touch-sensitive surface). In some embodiments, predefined gesture criteria include: a shape of the one or more of the plurality of contacts, a surface area of the one or more of the plurality of contacts, an intensity of the one or more of the plurality of contacts, a predefined or chronological order of the plurality of contacts, or any combination thereof.

FIGS. 17E-17F, for example, show the detection of a plurality of contacts (e.g., contacts 9918 and 9920) on the touch-sensitive surface 451. FIGS. 17E-17F, for example, also show the assignment of one of the plurality of contacts (e.g., contact 9918), comprising less than all of the plurality of contacts, to the gesture in accordance with predefined gesture criteria. For example, the shape and surface area of contact 9918 (e.g., circular and approximately the surface area of a user's finger tip) are in accordance with the predefined gesture criteria, but the shape and surface area of contact 9920 (e.g., oblong and having a surface area greater than a predefined maximum surface area for a touch contact) are not in accordance with predefined gesture criteria.

It should be understood that the particular order in which the operations in FIG. 18 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in paragraph [0059]) are also applicable in an analogous manner to method 10000 described above with respect to FIG. 18. For example, the contacts, gestures, user interface objects, intensity thresholds, and focus selectors described above with reference to method 10000 optionally have one or more of the characteristics of the contacts, gestures, user interface objects, intensity thresholds, and focus selectors described herein with reference to other methods described herein (e.g., those listed in paragraph [0059]). For brevity, these details are not repeated here.

Figure 19:
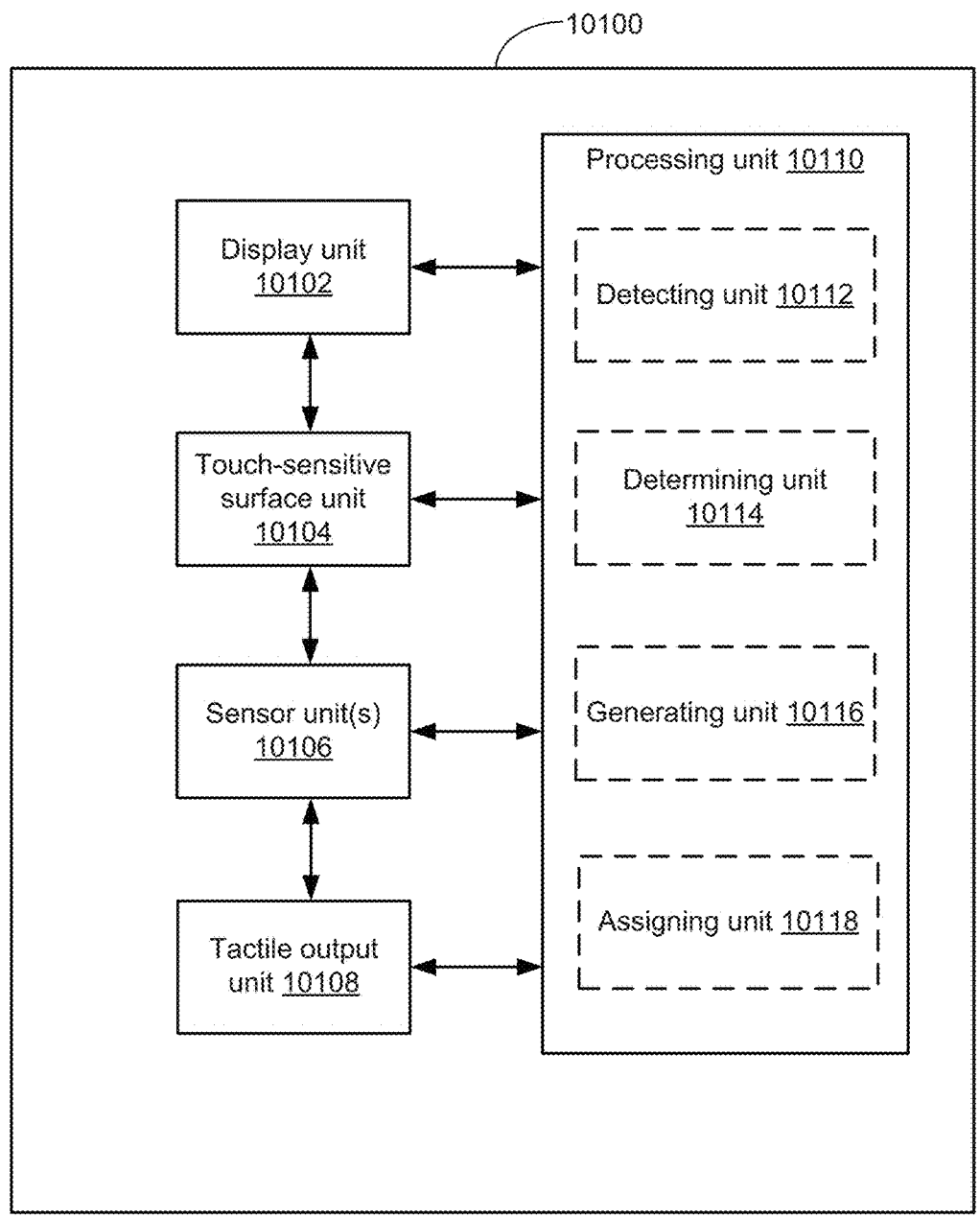
FIG. 19 is a functional block diagram of an electronic device in accordance with some embodiments.

In accordance with some embodiments, FIG. 19 shows a functional block diagram of an electronic device 10100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 10100 includes: a display unit 10102 configured to display a graphical user interface; a touch-sensitive surface unit 10104 configured to receive contacts; one or more sensor units 10106 configured to detect intensity of contacts with the touch-sensitive surface unit 10104; a tactile output unit 10108 configured to generate a tactile output (e.g., generated by movement of the touch-sensitive surface unit 10104); and a processing unit 10110 coupled to the display unit 10102, the touch-sensitive surface unit 10104, the one or more sensor units 10106, and the tactile output unit 10108. In some embodiments, the processing unit 10110 includes a detecting unit 10112, a determining unit 10114, a generating unit 10116, and an assigning unit 10118.

The processing unit 10110 is configured to: detect (e.g., with the detecting unit 10112), on the touch-sensitive surface unit 10104, a gesture that includes an increase of intensity of a contact above a respective intensity threshold. The processing unit 10110 is further configured to, in response to detecting the gesture: in accordance with a determination (e.g., with the determining unit 10114) that the gesture includes a first number of contacts, generate (e.g., with the generating unit 10116) a tactile output via the tactile output unit 10108 on the touch-sensitive surface unit 10104; and in accordance with a determination (e.g., with the determining unit 10114) that the gesture includes a second number of contacts different from the first number, forgo generating the tactile output on the touch-sensitive surface unit 10104.

In some embodiments, the tactile output is a tactile output that corresponds to the increase of intensity of the contact above the respective intensity threshold.

In some embodiments, the tactile output is a predefined tactile output that is generated via the tactile output unit 10108 when the user performs one of a set of predefined single-contact user interface object interaction operations in the user interface.

In some embodiments, the first number of contacts is one contact, and the second number of contacts is two or more contacts.

In some embodiments, the respective intensity threshold is an activation threshold and the tactile output provides a confirmation to the user that the activation threshold has been met.

In some embodiments, the gesture includes a press input detected (e.g., with the detecting unit 10112) on the touch-sensitive surface unit 10104 while a focus selector is over a control icon displayed on the display unit 10102.

In some embodiments, the processing unit 10110 is further configured to: detect (e.g., with the detecting unit 10112) a plurality of contacts on the touch-sensitive surface unit 10104; and assign (e.g., with the assigning unit 10118) one or more of the plurality of contacts, comprising less than all of the plurality of contacts, to the gesture in accordance with predefined gesture criteria.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 18 are, optionally, implemented by components depicted in FIGS. 1A-1B or FIG. 19. For example, detecting operations 10002 and 10022, determining operations 10010 and 10018, and generating operation 10010 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in paragraph [0059]) can be combined with each other in different arrangements. For example, the contacts, user interface objects, tactile sensations, intensity thresholds, and/or focus selectors described above with reference to any one of the various processes separately described herein (e.g., those listed in paragraph [0059]) optionally have one or more of the characteristics of the contacts, gestures, user interface objects, tactile sensations, intensity thresholds, and focus selectors described herein with reference to one or more of the other methods described herein (e.g., those listed in paragraph [0059]). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions, which when executed by an electronic device with a display, a touch-sensitive surface and one or more sensors to detect intensities of contacts with the touch-sensitive surface, cause the device to:
   detect, on the touch-sensitive surface, a gesture that includes an increase of intensity of a contact above a respective intensity threshold; and
   in response to detecting the gesture, conditionally generate a tactile output based on a determination of the number of contacts in the gesture, wherein conditionally generating the tactile output includes:
      in accordance with a determination that the gesture includes a first number of contacts, perform a first operation in accordance with the gesture and generate the tactile output on the touch-sensitive surface, wherein the tactile output is a tactile output that corresponds to the increase of intensity of the contact above the respective intensity threshold; and
      in accordance with a determination that the gesture includes a second number of contacts different from the first number, perform a second operation, distinct from the first operation, in accordance with the gesture without generating the tactile output on the touch- sensitive surface.

2. The computer readable storage medium of claim 1, wherein:
   the tactile output is a predefined tactile output that is generated when a user performs one of a set of predefined single-contact user interface object interaction operations in the user interface.

3. The computer readable storage medium of claim 1, wherein:
   the first number of contacts is one contact; and
   the second number of contacts is two or more contacts.

4. The computer readable storage medium of claim 1, wherein the respective intensity threshold is an activation threshold and the tactile output provides a confirmation that the activation threshold has been met.

5. The computer readable storage medium of claim 1, wherein the gesture includes a press input detected on the touch-sensitive surface while a focus selector is over a control icon displayed on the display.

6. The computer readable storage medium of claim 1, including instructions which cause the device to:
   detect a plurality of contacts on the touch-sensitive surface; and
   assign one or more of the plurality of contacts, comprising less than all of the plurality of contacts, to the gesture in accordance with predefined gesture criteria.

7. An electronic device, comprising:
   a display;
   a touch-sensitive surface;
   one or more sensors to detect intensities of contacts with the touch-sensitive surface;
   one or more processors;
   memory; and one or more programs, wherein the one or more programs are stored in the memory and configured to be executed by the one or more processors, the one or more programs including instructions for:
      detecting, on the touch-sensitive surface, a gesture that includes an increase of intensity of a contact above a respective intensity threshold; and
      in response to detecting the gesture, conditionally generating a tactile output based on a determination of the number of contacts in the gesture, wherein conditionally generating the tactile output includes:
         in accordance with a determination that the gesture includes a first number of contacts, performing a first operation in accordance with the gesture and generating the tactile output on the touch-sensitive surface, wherein the tactile output is a tactile output that corresponds to the increase of intensity of the contact above the respective intensity threshold; and
         in accordance with a determination that the gesture includes a second number of contacts different from the first number, performing a second operation, distinct from the first operation, in accordance with the gesture without generating the tactile output on the touch-sensitive surface.

8. The electronic device of claim 7, wherein:
   the tactile output is a predefined tactile output that is generated when a user performs one of a set of predefined single-contact user interface object interaction operations in the user interface.

9. The electronic device of claim 7, wherein:
   the first number of contacts is one contact; and
   the second number of contacts is two or more contacts.

10. The electronic device of claim 7, wherein the respective intensity threshold is an activation threshold and the tactile output provides a confirmation that the activation threshold has been met.

11. The electronic device of claim 7, wherein the gesture includes a press input detected on the touch-sensitive surface while a focus selector is over a control icon displayed on the display.

12. The electronic device of claim 7, wherein the one or more programs include instructions for:
   detecting a plurality of contacts on the touch-sensitive surface; and
   assigning one or more of the plurality of contacts, comprising less than all of the plurality of contacts, to the gesture in accordance with predefined gesture criteria.

13. A method, comprising:
   at an electronic device with a display and a touch-sensitive surface, wherein the device includes one or more sensors to detect intensities of contacts with the touch-sensitive surface:
      detecting, on the touch-sensitive surface, a gesture that includes an increase of intensity of a contact above a respective intensity threshold; and
      in response to detecting the gesture, conditionally generating a tactile output based on a determination of the number of contacts in the gesture, wherein conditionally generating the tactile output includes:

in accordance with a determination that the gesture includes a first number of contacts, performing a first operation in accordance with the gesture and generating the tactile output on the touch-sensitive surface, wherein the tactile output is a tactile output that corresponds to the increase of intensity of the contact above the respective intensity threshold; and in accordance with a determination that the gesture includes a second number of contacts different from the first number, performing a second operation, distinct from the first operation, in accordance with the gesture without generating the tactile output on the touch-sensitive surface.

14. The method of claim 13, wherein:

the tactile output is a predefined tactile output that is generated when a user performs one of a set of predefined single-contact user interface object interaction operations in the user interface.

15. The method of claim 13, wherein:

the first number of contacts is one contact; and the second number of contacts is two or more contacts.

16. The method of claim 13, wherein the respective intensity threshold is an activation threshold and the tactile output provides a confirmation that the activation threshold has been met.

17. The method of claim 13, wherein the gesture includes a press input detected on the touch-sensitive surface while a focus selector is over a control icon displayed on the display.

18. The method of claim 13, including:

detect a plurality of contacts on the touch-sensitive surface; and assign one or more of the plurality of contacts, comprising less than all of the plurality of contacts, to the gesture in accordance with predefined gesture criteria.

* * * * *

UNITED STATES PATENT AND TRADEMARK OFFICE
CERTIFICATE OF CORRECTION

PATENT NO. : 10,437,333 B2
APPLICATION NO. : 14/608926
DATED : October 8, 2019
INVENTOR(S) : Bernstein et al.

Page 1 of 1

It is certified that error appears in the above-identified patent and that said Letters Patent is hereby corrected as shown below:

In the Claims

Claim 18, Column 80, Line 14, delete "detect a plurality" and insert --detecting a plurality--;

Claim 18, Column 80, Line 16, delete "assign one" and insert --assigning one--.

Signed and Sealed this
Tenth Day of December, 2019

Andrei Iancu
*Director of the United States Patent and Trademark Office*